(12) United States Patent
Ikai et al.

(10) Patent No.: US 10,547,870 B2
(45) Date of Patent: Jan. 28, 2020

(54) DECODING DEVICE, ENCODING DEVICE, AND DECODING METHOD

(71) Applicant: Sharp Kabushiki Kaisha, Sakai, Osaka (JP)

(72) Inventors: Tomohiro Ikai, Sakai (JP); Yukinobu Yasugi, Sakai (JP); Tomoyuki Yamamoto, Sakai (JP); Takeshi Tsukuba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/161,115

(22) Filed: Oct. 16, 2018

(65) Prior Publication Data

US 2019/0052905 A1    Feb. 14, 2019

Related U.S. Application Data

(63) Continuation of application No. 15/885,856, filed on Feb. 1, 2018, now Pat. No. 10,158,887, which is a
(Continued)

(30) Foreign Application Priority Data

| Nov. 4, 2011 | (JP) | ................................. 2011-242840 |
| Dec. 1, 2011 | (JP) | ................................. 2011-264156 |
| Jan. 19, 2012 | (JP) | ................................. 2012-009447 |

(51) Int. Cl.
*H04N 19/60* (2014.01)
*H04N 19/91* (2014.01)
(Continued)

(52) U.S. Cl.
CPC ........... *H04N 19/60* (2014.11); *H04N 19/117* (2014.11); *H04N 19/124* (2014.11); *H04N 19/13* (2014.11);
(Continued)

(58) Field of Classification Search
None
See application file for complete search history.

(56) References Cited

U.S. PATENT DOCUMENTS

2012/0140813 A1* 6/2012 Sole Rojals ........ H03M 7/4018
375/240.02
2013/0016789 A1* 1/2013 Lou ..................... H04N 19/176
375/240.18
(Continued)

OTHER PUBLICATIONS

Ikai et al., "Arithmetic Encoding Device, Arithmetic Decoding Device, Arithmetic Encoding Method, and Arithmetic Decoding Method", U.S. Appl. No. 15/885,856, filed Feb. 1, 2018.

*Primary Examiner* — Janese Duley
(74) *Attorney, Agent, or Firm* — Keating & Bennett, LLP

(57) ABSTRACT

The amount of processing is reduced with high coding efficiency maintained. There is provided an arithmetic decoding device including syntax decoding means for decoding each of at least a first syntax element and a second syntax element indicating a transform coefficient using arithmetic decoding with a context or arithmetic decoding without a context. The syntax decoding means performs decoding that at least includes not decoding the first syntax element and decoding the second syntax element using the arithmetic decoding without a context, and decoding the first syntax element using the arithmetic decoding with a context and decoding the second syntax element using the arithmetic decoding without a context.

3 Claims, 69 Drawing Sheets

Related U.S. Application Data continuation of application No. 15/333,363, filed on Oct. 25, 2016, now abandoned, which is a continuation of application No. 14/354,946, filed as application No. PCT/JP2012/078086 on Oct. 31, 2012, now Pat. No. 9,525,876.

(51) Int. Cl.

| | | |
|---|---|---|
| *H04N 19/176* | (2014.01) | |
| *H04N 19/70* | (2014.01) | |
| *H04N 19/13* | (2014.01) | |
| *H04N 19/14* | (2014.01) | |
| *H04N 19/18* | (2014.01) | |
| *H04N 19/117* | (2014.01) | |
| *H04N 19/124* | (2014.01) | |
| *H04N 19/139* | (2014.01) | |
| *H04N 19/159* | (2014.01) | |
| *H04N 19/436* | (2014.01) | |
| *H04N 19/172* | (2014.01) | |

(52) U.S. Cl.
CPC .......... *H04N 19/139* (2014.11); *H04N 19/14* (2014.11); *H04N 19/159* (2014.11); *H04N 19/176* (2014.11); *H04N 19/18* (2014.11); *H04N 19/70* (2014.11); *H04N 19/91* (2014.11); *H04N 19/172* (2014.11); *H04N 19/436* (2014.11)

(56) References Cited

U.S. PATENT DOCUMENTS

| | | | | |
|---|---|---|---|---|
| 2013/0027230 | A1* | 1/2013 | Marpe | H03M 7/4006 341/107 |
| 2013/0051459 | A1* | 2/2013 | Kirchhoffer | H04N 19/50 375/240.07 |
| 2013/0300591 | A1* | 11/2013 | Marpe | H03M 7/40 341/67 |
| 2014/0210652 | A1* | 7/2014 | Bartnik | H03M 7/40 341/67 |

* cited by examiner

FIG. 2
(a)
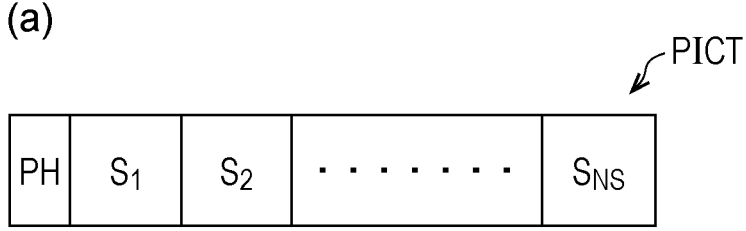
(b)
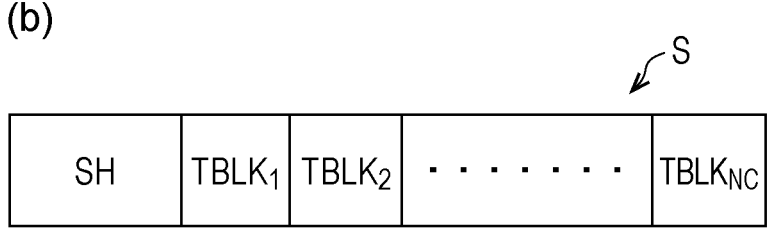
(c)
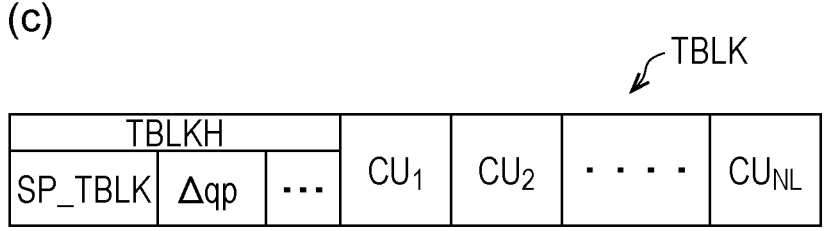
(d)
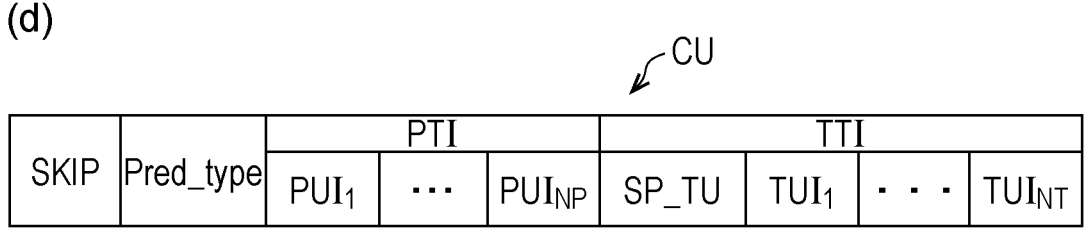

FIG. 5

| | Descriptor |
|---|---|
| residual_coding_cabac( x0, y0, log2TrafoSize, trafoDepth, scanIdx, cIdx ) { | |
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   while( ( xC != last_significant_coeff_x ) || ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|   } | |
|   for( n = numCoeff − 1; n >= 0; n−− ) { | |
|     xC = ScanOrder[ log2TrafoSize − 2 ][ log2TrafoSize − 2 ][ scanIdx ][ n ][ 0 ] | |
|     yC = ScanOrder[ log2TrafoSize − 2 ][ log2TrafoSize − 2 ][ scanIdx ][ n ][ 1 ] | |
|     significant_coeff_flag[ xC ][ yC ] | ae(v) |
|   } | |
|   numLastSubset = numCoeff >> 4 | |
|   for( i = numLastSubset − 1; i >= 0; i−− ) { | |
|     offset = i << 4 | |
|     for( n = 15; n >= 0; n−− ) { | |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset ][ 1 ] | |
|       if( significant_coeff_flag[ xC ][ yC ] ) | |
|         coeff_abs_level_greater1_flag[ n ] | ae(v) |
|     } | |
|     for( n = 15; n >= 0; n−− ) { | |
|       if( coeff_abs_level_greater1_flag[ n ] ) | |
|         coeff_abs_level_greater2_flag[ n ] | ae(v) |
|     } | |
|     for( n = 15; n >= 0; n−− ) { | |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset ][ 1 ] | |
|       if( significant_coeff_flag[ xC ][ yC ] ) { | |
|         coeff_sign_flag[ n ] | ae(v) |
|       } | |
|     for( n = 15; n >= 0; n−− ) { | |
|       if( coeff_abs_level_greater2_flag[ n ] ) | |
|         coeff_abs_level_minus3[ n ] | ae(v) |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset ][ 1 ] | |
|       if( significant_coeff_flag[ xC ][ yC ] ) { | |
|         transCoeffLevel[ x0 ][ y0 ][ trafoDepth ][ cIdx ][ n + offset ] = | |
|           ( coeff_abs_level_minus3[ n ] + 3 ) * ( 1 − 2 * coeff_sign_flag[ n ] ) | |
|       } else | |
|         transCoeffLevel[ x0 ][ y0 ][ trafoDepth ][ cIdx ][ n + offset ] = 0 | |
|     } | |
|   } | |
| } | |

FIG. 10
(a)
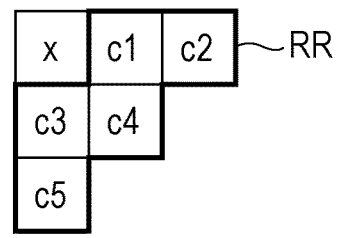
(b)
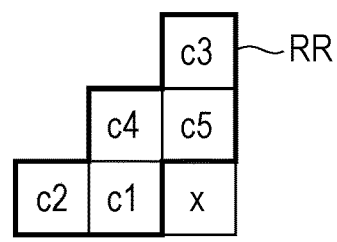
(c)
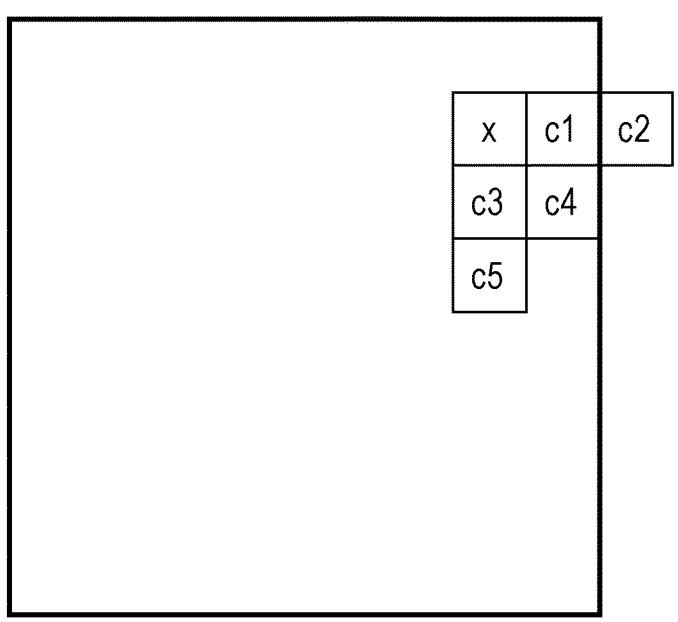

FIG. 11
(a)
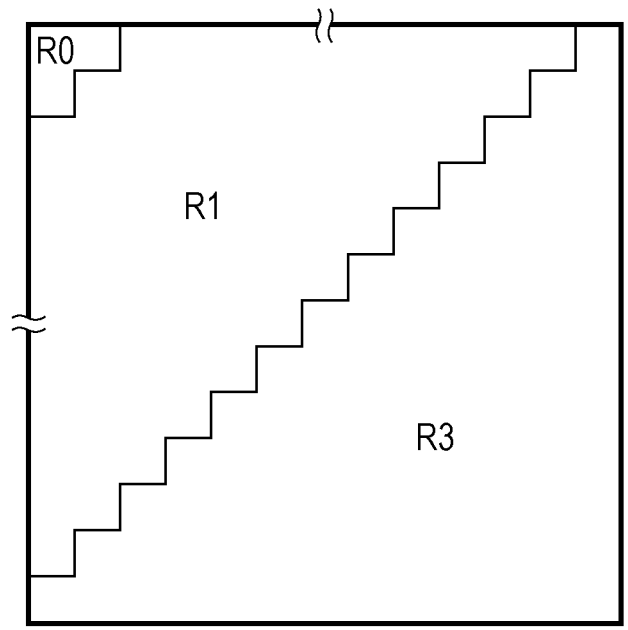
(b)
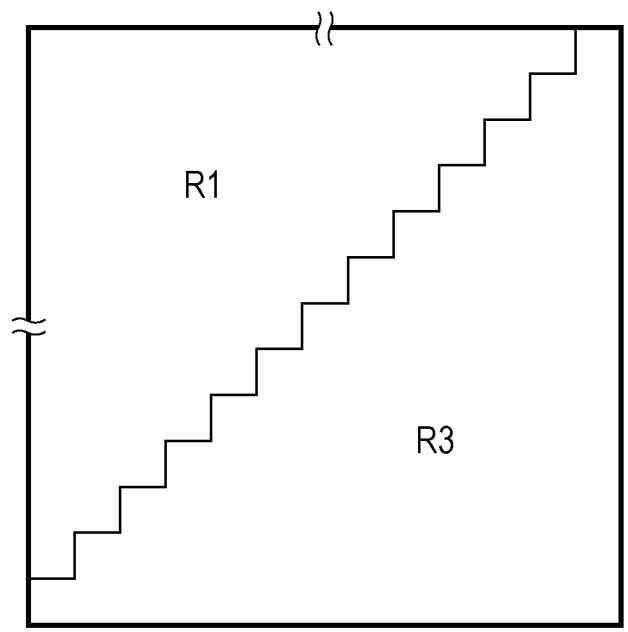

FIG. 13
(a)
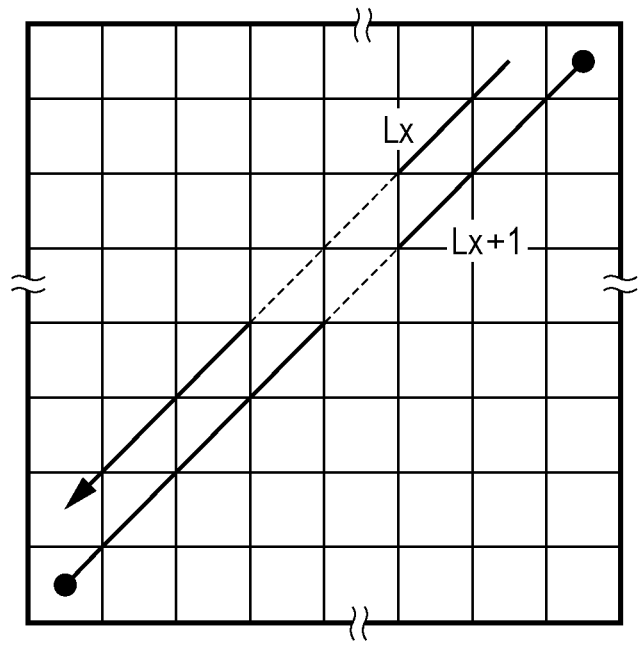
(b)
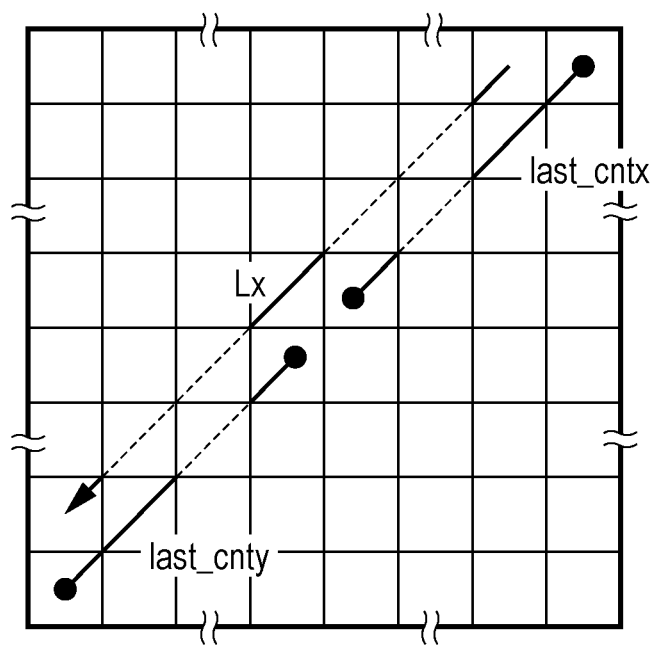

| level | RESTRICTION SETTING |
|---|---|
| 0 TO 2 | RESTRICTIONS |
| 3 OR MORE | NO RESTRICTION |

(b)

| level | RESTRICTION SETTING |
|---|---|
| 0 | TH2 = 14 |
| 1 | TH2 = 14 |
| 2 | TH2 = 22 |
| 3 | TH2 = 30 |
| 4 | NO RESTRICTION |

| 0 | 0 | 1 | 1 | 2 | 2 | 3 | 3 |
|---|---|---|---|---|---|---|---|
| 0 | 0 | 1 | 1 | 2 | 2 | 3 | 3 |
| 4 | 4 | 5 | 5 | 6 | 6 | 7 | 7 |
| 4 | 4 | 5 | 5 | 6 | 6 | 7 | 7 |
| 8 | 8 | 9 | 9 | 10 | 10 | 11 | 11 |
| 8 | 8 | 9 | 9 | 10 | 10 | 11 | 11 |
| 12 | 12 | 13 | 13 | 14 | 14 | 15 | 15 |
| 12 | 12 | 13 | 13 | 14 | 14 | 15 | 15 |

(b)

| 0 | 1 | 1 | 2 | 2 | 3 | 3 | 3 |
|---|---|---|---|---|---|---|---|
| 4 | 5 | 5 | 6 | 6 | 7 | 7 | 7 |
| 4 | 5 | 5 | 6 | 6 | 7 | 7 | 7 |
| 8 | 9 | 9 | 10 | 10 | 11 | 11 | 11 |
| 8 | 9 | 9 | 10 | 10 | 11 | 11 | 11 |
| 12 | 13 | 13 | 14 | 14 | 15 | 15 | 15 |
| 12 | 13 | 13 | 14 | 14 | 15 | 15 | 15 |
| 12 | 13 | 13 | 14 | 14 | 15 | 15 | 15 |

(c)

| 0 | 1 | 1 | 2 | 2 | 3 | 3 | 3 |
|---|---|---|---|---|---|---|---|
| 0 | 1 | 1 | 2 | 2 | 3 | 3 | 3 |
| 4 | 5 | 5 | 6 | 6 | 7 | 7 | 7 |
| 4 | 5 | 5 | 6 | 6 | 7 | 7 | 7 |
| 8 | 9 | 9 | 10 | 10 | 11 | 11 | 11 |
| 8 | 9 | 9 | 10 | 10 | 11 | 11 | 11 |
| 12 | 13 | 13 | 14 | 14 | 15 | 15 | 15 |
| 12 | 13 | 13 | 14 | 14 | 15 | 15 | 15 |

(d)

| 0 | 0 | 1 | 1 | 2 | 2 | 3 | 3 |
|---|---|---|---|---|---|---|---|
| 4 | 4 | 5 | 5 | 6 | 6 | 7 | 7 |
| 4 | 4 | 5 | 5 | 6 | 6 | 7 | 7 |
| 8 | 8 | 9 | 9 | 10 | 10 | 11 | 11 |
| 8 | 8 | 9 | 9 | 10 | 10 | 11 | 11 |
| 12 | 12 | 13 | 13 | 14 | 14 | 15 | 15 |
| 12 | 12 | 13 | 13 | 14 | 14 | 15 | 15 |
| 12 | 12 | 13 | 13 | 14 | 14 | 15 | 15 |

FIG. 29
(a)
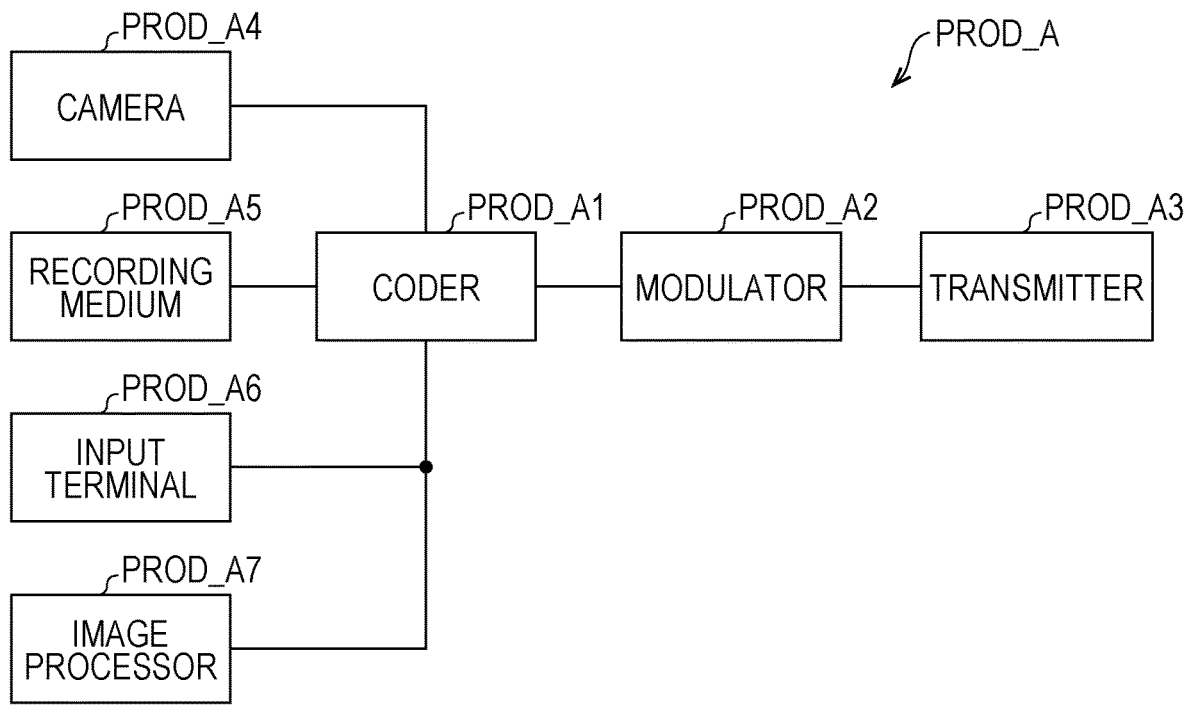
(b)
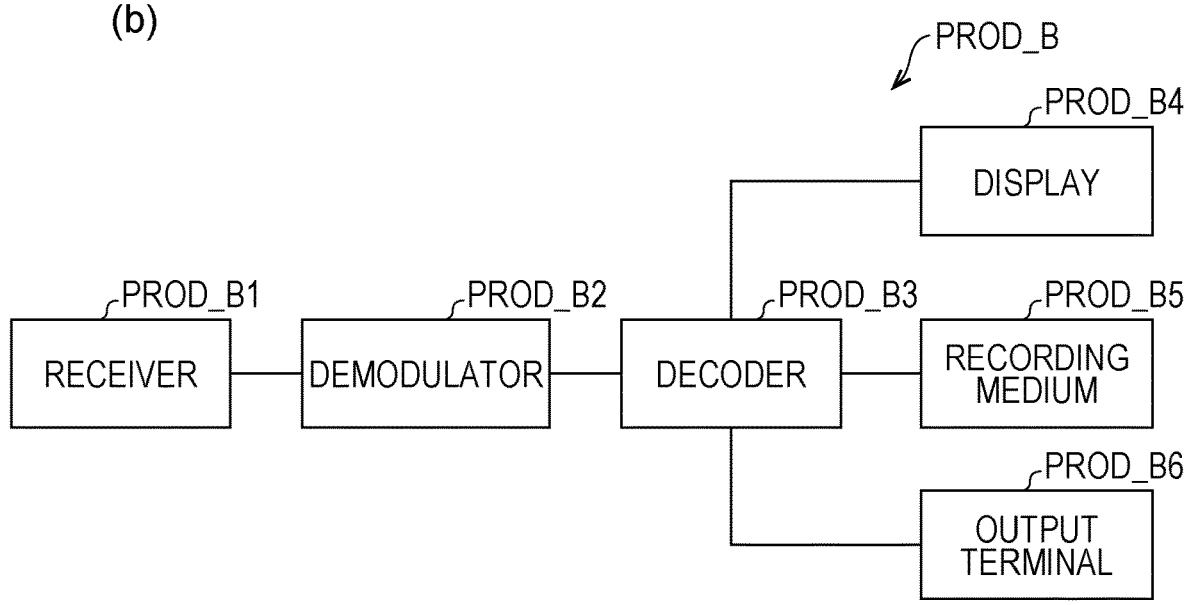

FIG. 30
(a)
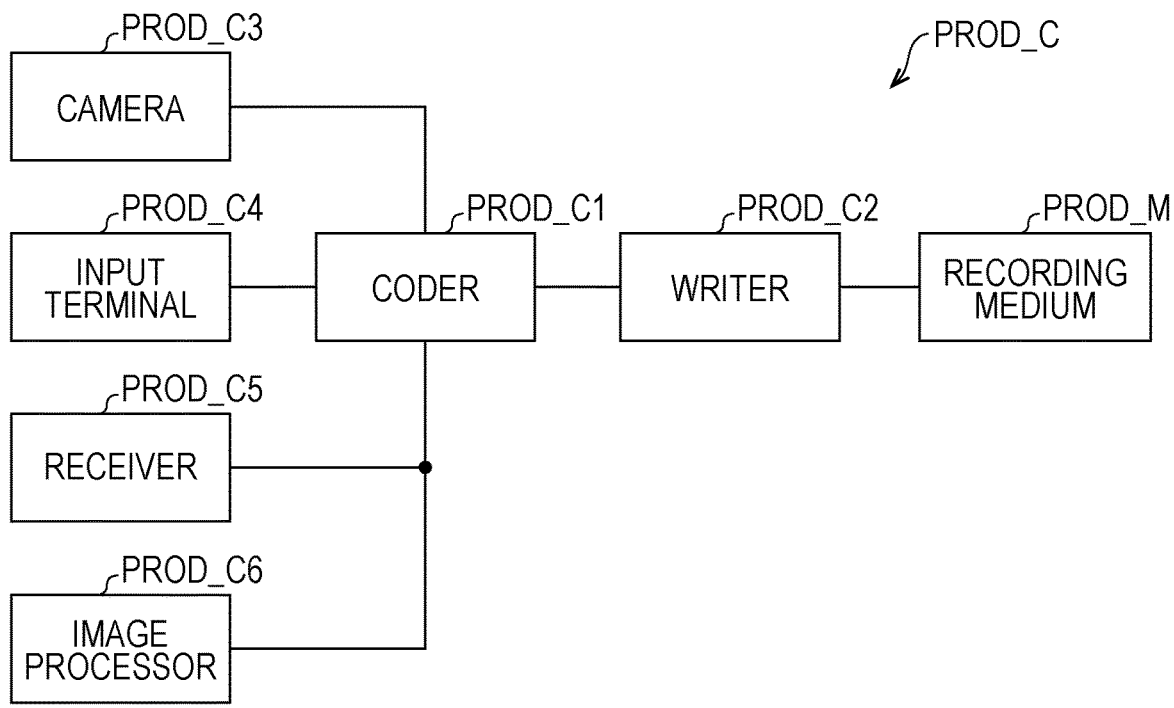
(b)
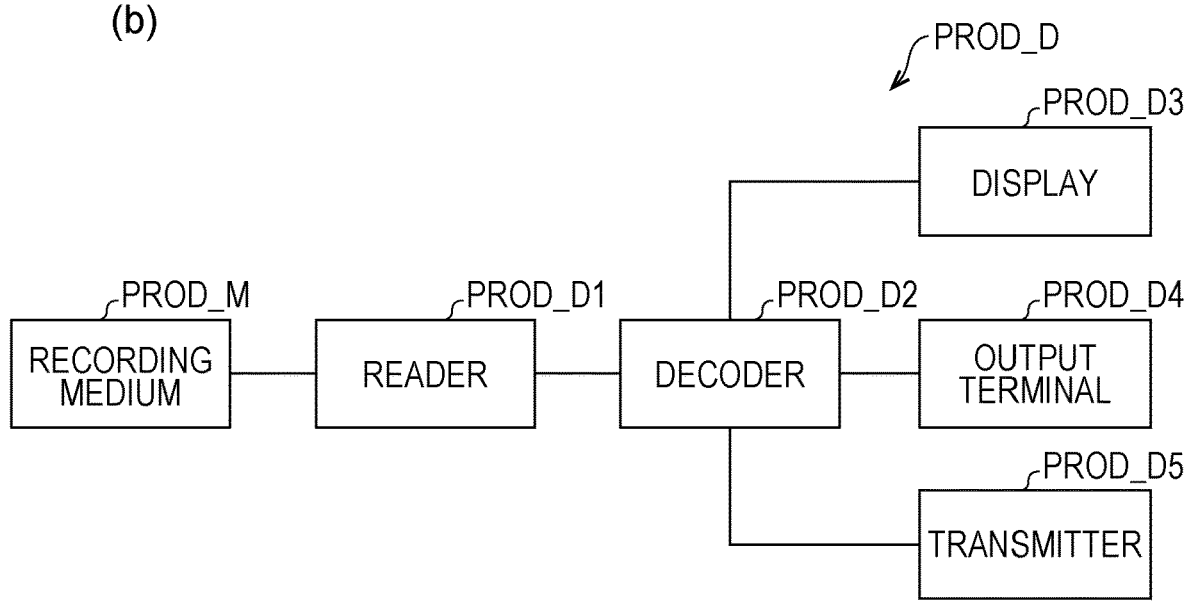

FIG. 32
(a)
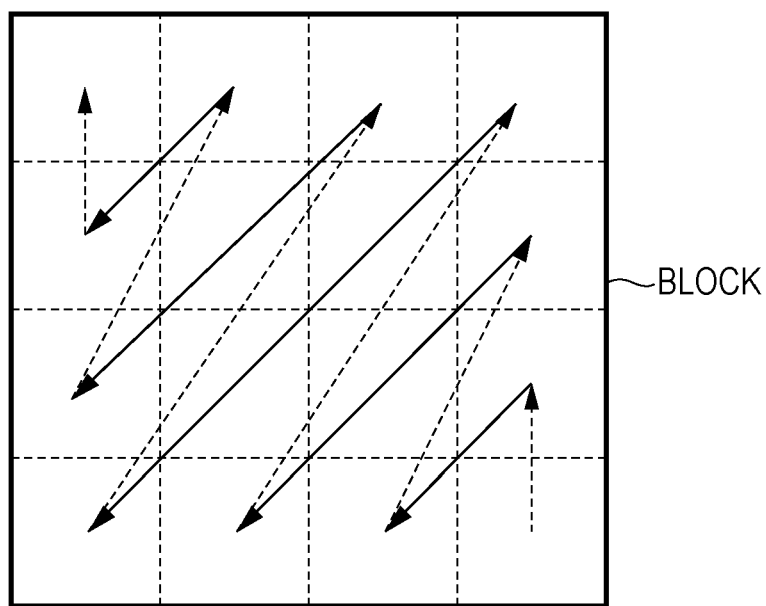
BLOCK
(b)
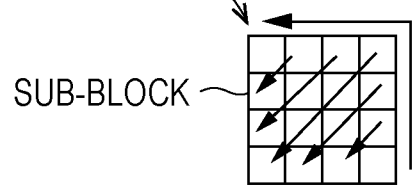
SUB-BLOCK

| x | c1 | c2 |
|---|----|----|
|   | c4 |    |
| c5 |   |    |

(b)

| x | c1 |
|---|----|
|   | c4 |
| c5 |    |

(c)

| x | c1 | c2 |
|---|----|----|
|   | c4 |    |

| | | | |
|---|---|---|---|
| 5 2 0 1<br>5 0 2 1<br>0 1 0 0<br>0 0 0 1 | 1 0 0 0<br>2 0 1 1<br>1 0 1 1<br>1 1 1 1 | 1 1 1 0<br>0 2 1 0<br>0 1 1 1<br>0 0 1 0 | 0 0 0 0<br>0 0 0 0<br>0 0 0 0<br>0 0 0 0 — SBK_A |
| 1 1 0 0<br>2 1 0 1<br>0 0 1 0<br>1 0 0 1 | 1 0 1 0<br>0 0 1 0<br>0 0 1 0<br>1 0 1 0 | 0 1 0 1<br>1 0 0 1<br>1 0 0 0<br>0 0 0 0 | 0 0 0 0<br>0 0 0 0<br>0 0 0 0<br>0 0 0 0 — SBK_B |
| 0 1 1 1<br>0 0 1 0<br>1 0 0 1<br>0 0 1 0 | 0 1 0 1<br>0 1 1 1<br>0 0 0 0<br>0 0 0 0 | 1 1 1 0<br>0 0 0 1<br>1 1 0 0<br>1 1 0 0 | 0 1 0 0<br>0 0 0 0<br>① 0 0 0<br>0 0 0 0 — W1: LAST COEFFICIENT<br>ZERO COEFFICIENTS AFTER LAST COEFFICIENT |
| 0 0 0 0<br>0 0 0 0<br>0 0 0 0<br>0 0 0 0 — SBK_C | 0 0 0 0<br>0 0 0 0<br>0 0 0 0<br>0 0 0 0 — SBK_D | 0 0 0 0<br>0 0 0 0<br>0 0 0 0<br>0 0 0 0 | 0 0 0 0<br>0 0 0 0<br>0 0 0 0<br>0 0 0 0 |

(b)

| 0 | 1 | 2 | 3 |
|---|---|---|---|
| 4 | 5 | 6 | 7 |
| 8 | 9 | 10 | 11 |
| 12 | 13 | 14 | 15 |

(c)

| 1 | 1 | 1 | 0 |
|---|---|---|---|
| 1 | 1 | 1 | 0 |
| 1 | 1 | 1 | ① — SUB-BLOCK INCLUDING LAST COEFFICIENT |
| 0 | 0 | 0 | ⓪ — SUB-BLOCK AFTER SUB-BLOCK INCLUDING LAST COEFFICIENT |

FIG. 48
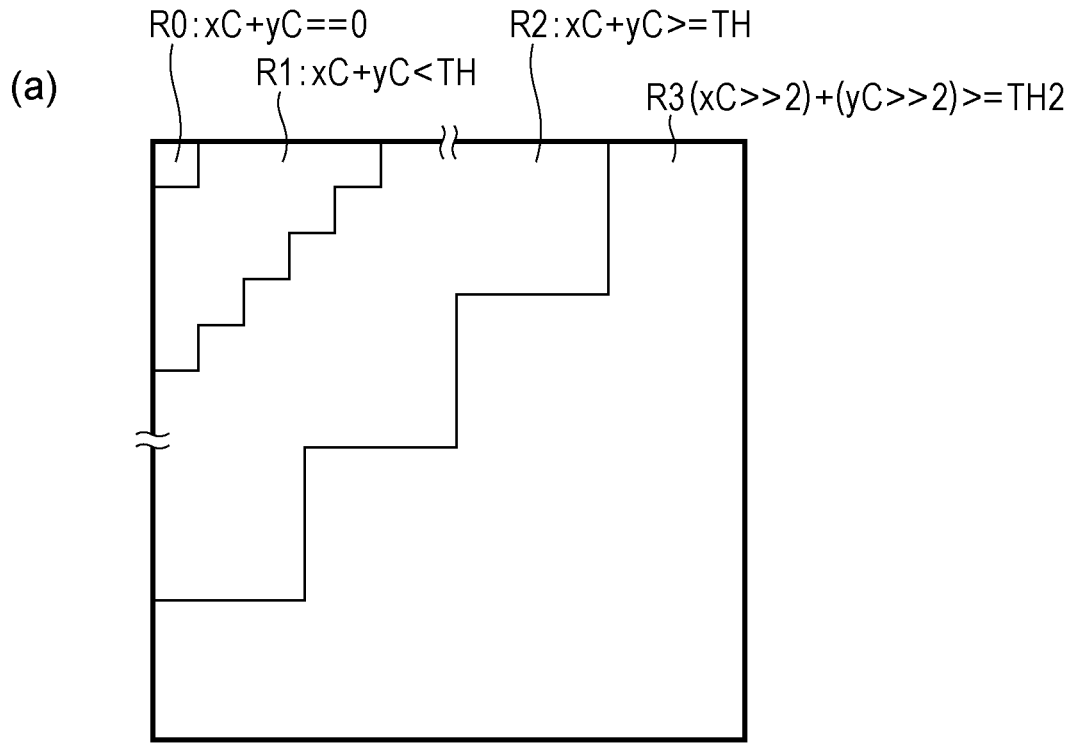
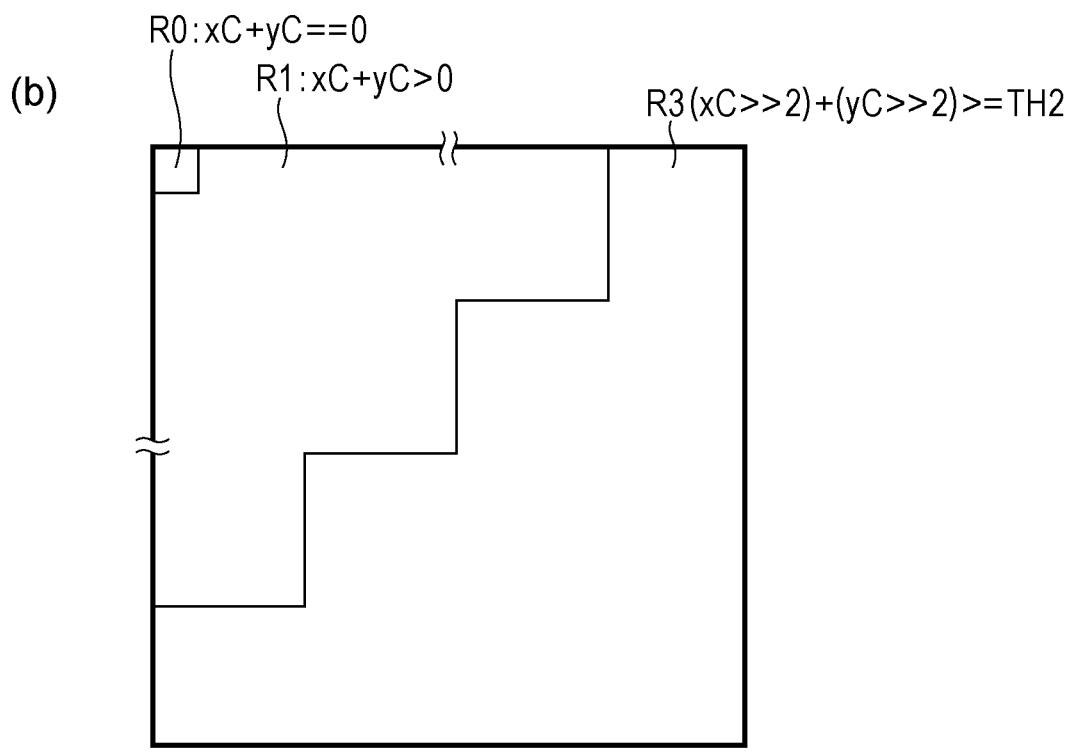

FIG. 49

```
INPUT:
 xC,yC  // COEFFICIENT POSITION (xC,yC)  xC=0,..., width-1, yC=0,..., height-1
 cIdx;  //0 : LUMA (Y), 1:CHROMA (U, V)
 width , height // SIZE (WIDTH, LENGTH) OF TU OUTPUT:
 ctxIdx;// CONTEXT INDEX OF significant_coeff_flag CONTEXT INDEX DERIVATION PROCESS FOR LUMA
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( xC+yC< Max(width, height)>>2 ){// CONTEXT DERIVATION FOR REGION R1
       START NORMAL COUNT PROCESS
       if( ( ( xC & 3 ) || ( yC & 3 ) ) && ( ( (xC+1) & 3 ) || ( (yC+2) & 3 ) ) ){
            cnt = (c1!=0) + (c2!=0) + (c4!=0) + (c5!=0);
       } else{
            cnt= (c1!=0) + (c2!=0) + (c3!=0) + (c4!=0) + (c5!=0);
       }
       END NORMAL COUNT PROCESS
       ctxCnt = (cnt+ 1)>>1;
       sigCtx = sigCtxOffsetR1 + Min(2, ctxCnt);
    }
    else if( (xC>>2)+(yC>>2) < 3*Max(width, height)>>4  ){// CONTEXT DERIVATION
    FOR REGION R2
        NORMAL COUNT PROCESS (DESCRIPTION OMITTED)
        ctxCnt = (cnt+ 1)>>1;
        sigCtx = sigCtxOffsetR2 + Min(2, ctxCnt);
    }
    else { // if( (xC>>2)+(yC>>2) >= 3*Max(width, height)>>4 ){
        // CONTEXT DERIVATION FOR REGION R3
        cnt = (c1!=0) + (c5!=0);
        ctxCnt = cnt;
        sigCtx = sigCtxOffsetR2 + ctxCnt;
    }
    ctxIdx = sigCtx;
}
```

FIG. 50

```
INPUT:
  xC,yC  // COEFFICIENT POSITION (xC,yC)   xC=0,..., width-1, yC=0,..., height-1
  cIdx;  //0 :LUMA (Y), 1:CHROMA (U, V)
  width , height // SIZE (WIDTH, LENGTH) OF TU OUTPUT:
  ctxIdx;// CONTEXT INDEX OF significant_coeff_flag CONTEXT INDEX DERIVATION PROCESS FOR CHROMA
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( (xC>>2)+(yC>>2) < 3*Max(width, height)>>4 ){
       // CONTEXT DERIVATION FOR REGION R1
       if( ( ( xC & 3 ) || ( yC & 3 ) ) && ( ( (xC+1) & 3 ) || ( (yC+2) & 3 ) ) ){
             cnt = (c1!=0) + (c2!=0) + (c4!=0) + (c5!=0);
       } else{
             cnt= (c1!=0) + (c2!=0) + (c3!=0) + (c4!=0) + (c5!=0);
       }
       ctxCnt = (cnt+ 1)>>1;
       sigCtx = sigCtxOffsetR1  +  Min(2, ctxCnt);
    }
    else { // if( (xC>>2)+(yC>>2) >= 3*Max(width, height)>>4
       // CONTEXT DERIVATION FOR REGION R3
       cnt = (c1!=0) + (c5!=0); //  cnt = (c2!=0) + (c5!=0);
       ctxCnt = cnt;
       sigCtx = sigCtxOffsetR2 + ctxCnt;
    }
   // NumOfSigCtxLuma IS THE NUMBER OF CONTEXT INDICES OF signifincant_coeff
   _flag FOR LUMA
    ctxIdx = sigCtx + NumOfSigCtxLuma;
}
```

FIG. 51

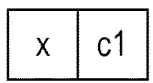
(a)

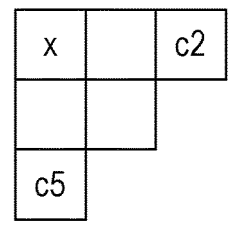
(b)

FIG. 52

```
INPUT:
  xC,yC  // COEFFICIENT POSITION (xC,yC)   xC=0,..., width-1, yC=0,..., height-1
  cIdx;  //0 : LUMA (Y), 1:CHROMA (U, V)
  width , height // SIZE (WIDTH, LENGTH) OF TU OUTPUT:
  ctxIdx;// CONTEXT INDEX OF significant_coeff_flag CONTEXT INDEX DERIVATION PROCESS FOR LUMA
{
    sigCtxOffsetR0  =  31;  // THE NUMBER OF CONTEXT INDICES FOR 4x4 TO 8x8
    sigCtxOffsetR1  =  sigCtxOffsetR0 + 1;
    sigCtxOffsetR2  =  sigCtxOffsetR1 + 4;
    sigCtxOffsetR3  =  sigCtxOffsetR1 + 7;
    if( xC+yC==0 ){ // CONTEXT DERIVATION FOR REGION R0
       sigCtx = sigCtxOffsetR0;
    }
    else if( xC+yC< Max(width, height)>>2 ){ // CONTEXT DERIVATION FOR REGION
    R1 (LOW-FREQUENCY REGION)
       START NORMAL COUNT PROCESS
         if( ( ( xC & 3 ) || ( yC & 3 ) ) && ( ( (xC+1) & 3 ) || ( (yC+2) & 3 ) ) ){
            cnt = (c1!=0) + (c2!=0) + (c4!=0) + (c5!=0);
         } else{
            cnt= (c1!=0) + (c2!=0) + (c3!=0) + (c4!=0) + (c5!=0);
         }
       END NORMAL COUNT PROCESS
       ctxCnt = (cnt+ 1)>>1;
       sigCtx = sigCtxOffsetR1 + Min(2, ctxCnt);
    }
    else if( (xC>>2)+(yC>>2) < 3*Max(width, height)>>4 ){
       NORMAL COUNT PROCESS (DESCRIPTION OMITTED)
       ctxCnt = (cnt+ 1)>>1;
       sigCtx = sigCtxOffsetR2 + Min(2, ctxCnt);
    }
    else { // if( (xC>>2)+(yC>>2) >= 3*Max(width, height)>>4
       sigCtx = sigCtxOffsetR3;
    }
    ctxIdx = sigCtx;
}
```

FIG. 53

```
INPUT:
  xC,yC  // COEFFICIENT POSITION (xC,yC)    xC=0,..., width-1, yC=0,..., height-1
  cIdx;  //0 : LUMA (Y), 1:CHROMA (U, V)
  width , height // SIZE (WIDTH, LENGTH) OF TU OUTPUT:
  ctxIdx;// CONTEXT INDEX OF significant_coeff_flag CONTEXT INDEX DERIVATION PROCESS FOR CHROMA
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;
    if( xC+yC==0 ){ // CONTEXT DERIVATION FOR REGION R0
       sigCtx = sigCtxOffsetR0;
    }
    else if( (xC>>2)+(yC>>2) < 3*Max(width, height)>>4 ){
       if( ( ( xC & 3 ) || ( yC & 3 ) ) && ( ( (xC+1) & 3 ) || ( (yC+2) & 3 ) ) ){
            cnt = (c1!=0) + (c2!=0) + (c4!=0) + (c5!=0);
       } else{
            cnt= (c1!=0) + (c2!=0) + (c3!=0) + (c4!=0) + (c5!=0);
       }
       ctxCnt = (cnt+ 1)>>1;
       sigCtx = sigCtxOffsetR1  +  Min(2, ctxCnt);
    }
    else { // if( (xC>>2)+(yC>>2) >= 3*Max(width, height)>>4
       sigCtx = sigCtxOffsetR3;
    }
// NumOfSigCtxLuma IS THE NUMBER OF CONTEXT INDICES OF signifincant_coeff
_flag FOR LUMA
    ctxIdx = sigCtx + NumOfSigCtxLuma;
}
```

FIG. 54

```
INPUT:
  xC,yC  // COEFFICIENT POSITION (xC,yC)    xC=0,..., width-1, yC=0,..., height-1
  cIdx;  //0 : LUMA (Y), 1: CHROMA (U, V)
  width , height // SIZE (WIDTH, LENGTH) OF TU OUTPUT:
  ctxIdx;// CONTEXT INDEX OF significant_coeff_flag CONTEXT INDEX DERIVATION PROCESS FOR LUMA
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( xC+yC< Max(width, height)>>2 ){ // CONTEXT DERIVATION FOR REGION
  R1 (LOW-FREQUENCY REGION)
       START NORMAL COUNT PROCESS
       if( ( ( xC & 3 ) || ( yC & 3 ) ) && ( ( (xC+1) & 3 ) || ( (yC+2) & 3 ) ) ){
           cnt = (c1!=0) + (c2!=0) + (c4!=0) + (c5!=0);
       } else{
           cnt= (c1!=0) + (c2!=0) + (c3!=0) + (c4!=0) + (c5!=0);
       }
       END NORMAL COUNT PROCESS
       ctxCnt = (cnt+ 1)>>1;
       sigCtx = sigCtxOffsetR1  + Min(2, ctxCnt);
    }
    else if( (xC>>2)+(yC>>2) <  3*Max(width, height)>>4  ){
       NORMAL COUNT PROCESS (DESCRIPTION OMITTED)
       ctxCnt = (cnt+ 1)>>1;
       sigCtx = sigCtxOffsetR2 + Min(2, ctxCnt);
    }
    else { // if( (xC>>2)+(yC>>2) >=  3*Max(width, height)>>4
       ctxCnt = 0;
       sigCtx = sigCtxOffsetR2 + ctxCnt;
    }
    ctxIdx = sigCtx;
}
```

FIG. 55

```
INPUT:
  xC,yC  // COEFFICIENT POSITION (xC,yC)    xC=0,..., width-1, yC=0,..., height-1
  cIdx;  //0 : LUMA (Y), 1: CHROMA (U, V)
  width , height  // SIZE (WIDTH, LENGTH) OF TU OUTPUT:
  ctxIdx;// CONTEXT INDEX OF significant_coeff_flag CONTEXT INDEX DERIVATION PROCESS FOR CHROMA
{
    sigCtxOffsetR0 = 31;  // THE NUMBER OF CONTEXT INDICES FOR 4x4 TO 8x8
    sigCtxOffsetR1 = sigCtxOffsetR0 + 1;
    if( xC+yC==0 ){ // CONTEXT DERIVATION FOR REGION R0
        sigCtx = sigCtxOffsetR0;
    }
    else if( (xC>>2)+(yC>>2) < 3*Max(width, height)>>4 ){
        if( ( ( xC & 3 ) || ( yC & 3 ) ) && ( ( (xC+1) & 3 ) || ( (yC+2) & 3 ) ) ){
            cnt = (c1!=0) + (c2!=0) + (c4!=0) + (c5!=0);
        } else{
            cnt= (c1!=0) + (c2!=0) + (c3!=0) + (c4!=0) + (c5!=0);
        }
        ctxCnt = (cnt+ 1)>>1;
        sigCtx = sigCtxOffsetR1 + Min(2, ctxCnt);
    }
    else { // if( (xC>>2)+(yC>>2) >= 3*Max(width, height)>>4
        ctxCnt = 0;
        sigCtx = sigCtxOffsetR1 + ctxCnt;
    }
// NumOfSigCtxLuma IS THE NUMBER OF CONTEXT INDICES OF signifincant_coeff
_flag FOR LUMA
    ctxIdx = sigCtx + NumOfSigCtxLuma;
}
```

FIG. 56

```
INPUT:
  xC,yC  // COEFFICIENT POSITION (xC,yC)    xC=0,..., width-1, yC=0,..., height-1
  cldx;  //0 : LUMA (Y), 1:CHROMA (U, V)
  width , height // SIZE (WIDTH, LENGTH) OF TU OUTPUT:
  ctxIdx;// CONTEXT INDEX OF significant_coeff_flag PART OF CONTEXT INDEX DERIVATION PROCESS
{
    sigCtxOffsetR0 = 31; // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( cldx == 0 && xC+yC< Max(width, height)>>2 ){
       NORMAL COUNT PROCESS (DESCRIPTION OMITTED)
       ctxCnt = (cnt+ 1)>>1;
       sigCtx = sigCtxOffsetR1 + Min(2, ctxCnt);
    }
    else if( (xC>>2)+(yC>>2) < 3*Max(width, height)>>4 ){
       NORMAL COUNT PROCESS (DESCRIPTION OMITTED)
       ctxCnt = (cnt+ 1)>>1;
       if (cldx == 0) {
         sigCtx = sigCtxOffsetR2 + Min(2, ctxCnt);
       } else {
         sigCtx = sigCtxOffsetR1 + Min(2, ctxCnt);
       }
    }
    else { // if( (xC>>2)+(yC>>2) >= 3*Max(width, height)>>4
       ctxCnt = 0;
       if (cldx == 0) {
         sigCtx = sigCtxOffsetR3 + ctxCnt; // CONTEXT SHARING IS NOT PERFORMED
           (R3-DEDICATED CONTEXT IS USED)
       } else {
         sigCtx = sigCtxOffsetR1 + ctxCnt // CONTEXT SHARING IS NOT PERFORMED
           (CONTEXT FOR R1 IS SHARED)
       }
    }
    if (cldx == 0) {
       ctxIdx = sigCtx;
    } else {
       ctxIdx = sigCtx + NumOfSigCtxLuma;
    }
}
```

(a)

(b)

tbl [] = {0, 0, 1, 1, 1, 0, 0, 0, 1, 1, 1, 0, 0, 0, 1, 1}

(c)

ctxCnt = tbl [(xC & 3) + (yC & 3 << 2)]

(d)

ctxCnt = cntInSubBlock & 1

SUB-BLOCK

| 0 | 2 | 2 | 0 |
|---|---|---|---|
| 1 | 1 | 2 | 0 |
| 0 | 1 | 2 | 2 |
| 0 | 1 | 1 | 0 |

(b)

tbl[] = {0, 2, 2, 0, 1, 1, 2, 0, 0, 1, 2, 2, 0, 1, 1, 0}

(c)

ctxCnt = tbl[(xC & 3) + (yC & 3 << 2)]

(d)

ctxCnt = cntInSubBlock % 3

FIG. 59

```
INPUT:
 xC,yC  // COEFFICIENT POSITION (xC,yC)    xC=0,..., width-1, yC=0,..., height-1
 cIdx;   //0 : LUMA (Y), 1:CHROMA (U, V)
 width , height // SIZE (WIDTH, LENGTH) OF TU OUTPUT:
 ctxIdx;// CONTEXT INDEX OF significant_coeff_flag PART OF CONTEXT INDEX DERIVATION PROCESS
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( cIdx == 0 && xC+yC< Max(width, height)>>2 ){
       NORMAL COUNT PROCESS (DESCRIPTION OMITTED)
       ctxCnt = (cnt+ 1)>>1;
       sigCtx = sigCtxOffsetR1 + Min(2, ctxCnt);
    }
    else if( (xC>>2)+(yC>>2) < 3*Max(width, height)>>4 ){
       NORMAL COUNT PROCESS (DESCRIPTION OMITTED)
       ctxCnt = (cnt+ 1)>>1;
       if (cIdx == 0) {
         sigCtx = sigCtxOffsetR2 + Min(2, ctxCnt);
       } else {
         sigCtx = sigCtxOffsetR1 + Min(2, ctxCnt);
       }
    }
    else { // if( (xC>>2)+(yC>>2) >=  3*Max(width, height)>>4
       ctxCnt = tbl[(xC & 3) + (yC & 3)<<2]
       sigCtx = sigCtxOffsetR3 + ctxCnt
    }
    if (cIdx == 0) {
       ctxIdx = sigCtx;
    } else {
       ctxIdx = sigCtx + NumOfSigCtxLuma;
    }
}
```

FIG. 60

```
INPUT:
 xC,yC  // COEFFICIENT POSITION (xC,yC)   xC=0,..., width-1, yC=0,..., height-1
 cIdx;   //0 : LUMA (Y), 1: CHROMA (U, V)
 width , height // SIZE (WIDTH, LENGTH) OF TU OUTPUT:
 ctxIdx;// CONTEXT INDEX OF significant_coeff_flag PART OF CONTEXT INDEX DERIVATION PROCESS
{
    sigCtxOffsetR0 = 31;  // THE NUMBER OF CONTEXT INDICES FOR 4x4 TO 8x8
    sigCtxOffsetR1 = sigCtxOffsetR0 + 1;
    sigCtxOffsetR2 = sigCtxOffsetR1 + 4;

if( xC+yC==0 ){ // CONTEXT DERIVATION FOR REGION R0
       sigCtx = sigCtxOffsetR0;
    }
    else if( cIdx == 0 && xC+yC< Max(width, height)>>2 ){
       NORMAL COUNT PROCESS (DESCRIPTION OMITTED)
       ctxCnt = (cnt+ 1)>>1;
       sigCtx = sigCtxOffsetR1 + Min(2, ctxCnt);
    }
    else if( (xC>>2)+(yC>>2) <  3*Max(width, height)>>4  ){
       NORMAL COUNT PROCESS (DESCRIPTION OMITTED)
       ctxCnt = (cnt+ 1)>>1;
       if (cIdx == 0) {
         sigCtx = sigCtxOffsetR2 + Min(2, ctxCnt);
       } else {
         sigCtx = sigCtxOffsetR1 + Min(2, ctxCnt);
       }
    }
    else { // if( (xC>>2)+(yC>>2) >=  3*Max(width, height)>>4
       ctxCnt = tbl[(xC & 3) + (yC & 3)<<2]
       if (cIdx == 0) {
         sigCtx = sigCtxOffsetR2 + ctxCnt;
       } else {
         sigCtx = sigCtxOffsetR1 + ctxCnt
       }
    }
    if (cIdx == 0) {
       ctxIdx = sigCtx;
    } else {
       ctxIdx = sigCtx + NumOfSigCtxLuma;
    }
}
```

FIG. 62

| | Descriptor |
|---|---|
| residual_coding_cabac( x0, y0, log2TrafoSize, trafoDepth, scanIdx, cIdx ) { | |
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   if( log2TrafoSize>3 ){ | |
|     log2CoeffGroupSize = log2TrafoSize − 2 | |
|     numCoeffGroup = 0 | |
|     for( xCG=0; xCG<4; xCG++) | |
|       for( yCG=0; yCG<4; yCG++) | |
|         numNonZeroCG[xCG][yCG] = 0 | |
|   } | |
|   while( ( xC != last_significant_coeff_x ) || ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|     if( log2TrafoSize>3 ){ | |
|       if( ( xC%(1<<log2CoeffGroupSize)==0 && (yC%(1<<log2CoeffGroupSize)==0) ){ | |
|         numCoeffGroup++ | |
|       } | |
|     } | |
|   } | |
|   if( log2TrafoSize>3 ){ | |
|     xCGLast = last_significant_coeff_x / ( 1<<log2CoeffgroupSize) | |
|     yCGLast = last_significant_coeff_y / ( 1<<log2CoeffgroupSize) | |
|     significant_coeffgroup_flag[xCGLast][yCGLast]=1 | |
|     significant_coeffgroup_flag[ 0 ][ 0 ] = 1 | |
|     for( n= numCoeffGroup; n>0; n--){ | |
|       xCG = ScanOrder[ 0 ][ 0 ][ scanIdx ][ n ][ 0 ] | |
|       yCG = ScanOrder [0 ][ 0 ][ scanIdx ][n] [ 1 ] | |
|       if ( significant_coeffgroup_flag[xCG+1][yCG]>0 && significant_coeffgroup_flag[xCG][yCG+1]>0){ | |
|         siginificant_coeffgroup_flag[xCG][yCG] = 1; | |
|       } else if( !(xCG==xCGLast) && !(yCG==yCGLast) ){ | |
|         significant_coeffgroup_flag[xCG][yCG] | ae(v) |
|       } | |
|     } | |
|   if (cabac_lowcomp_flag == 0) { | |
|    residual_coding_cabac2_normal( x0, y0, log2TrafoSize, trafoDepth, scanIdx, cIdx ) | |
|   } else { | |
|    residual_coding_cabac2_lowcomp( x0, y0, log2TrafoSize, trafoDepth, scanIdx, cIdx ) | |
|   } | |
| } | |

FIG. 63

| ... | Descriptor |
|---|---|
| numLastSubset = numCoeff >> 4 | |
| for( i = numLastSubset − 1; i >= 0; i− − ) { | |
|   offset = i << 4 | |
|   for( n=15; n>=0; n--){ | |
|     xC = ScanOrder[ log2TrafoSize − 2 ][ log2TrafoSize − 2 ][ scanIdx ][ n ][ 0 ] | |
|     yC = ScanOrder[ log2TrafoSize − 2 ][ log2TrafoSize − 2 ][ scanIdx ][ n ][ 1 ] | |
|     if( log2TrafoSize>3){ | |
|       xCG = xC>>(log2CoeffGroupSize) | |
|       yCG = yC>>(log2CoeffGroupSize ) | |
|       if( significant_coeffgroup_flag[xCG][yCG]>0 ){ | |
|         if ( xC != last_significant_coeff_x ) || ( yC != last_significant_coeff_y ){ | |
|           significant_coeff_flag[ xC ][ yC ] | ae(v) |
|         } | |
|       } | |
|     } else{ | |
|       if ( xC != last_significant_coeff_x ) || ( yC != last_significant_coeff_y ){ | |
|         significant_coeff_flag[ xC ][ yC ] | ae(v) |
|       } | |
|     } | |
|   } | |
|   for( n = 15; n >= 0; n− − ) { | |
|     xC = ScanOrder[ log2TrafoSize − 2 ][ log2TrafoSize − 2 ][ 0 ][ n + offset ][ 0 ] | |
|     yC = ScanOrder[ log2TrafoSize − 2 ][ log2TrafoSize − 2 ][ 0 ][ n + offset` ][ 1 ] | |
|     if( significant_coeff_flag[ xC ][ yC ] ) | |
|       coeff_abs_level_greater1_flag[ n ] | ae(v) |
|   } | |
|   for( n = 15; n >= 0; n− − ) { | |
|     if( coeff_abs_level_greater1_flag[ n ] ) | |
|       coeff_abs_level_greater2_flag[ n ] | ae(v) |
|   } | |
|   for( n = 15; n >= 0; n− − ) { | |
|     xC = ScanOrder[ log2TrafoSize − 2 ][ log2TrafoSize − 2 ][ 0 ][ n + offset ][ 0 ] | |
|     yC = ScanOrder[ log2TrafoSize − 2 ][ log2TrafoSize − 2 ][ 0 ][ n + offset` ][ 1 ] | |
|     if( significant_coeff_flag[ xC ][ yC ] ) { | |
|       coeff_sign_flag[ n ] | ae(v), bypass |
|     } | |
|   for( n = 15; n >= 0; n− − ) { | |
|     if( coeff_abs_level_greater2_flag[ n ] ) | |
|       coeff_abs_level_minus3[ n ] | ae(v), bypass |
|     xC = ScanOrder[ log2TrafoSize − 2 ][ log2TrafoSize − 2 ][ 0 ][ n + offset ][ 0 ] | |
|     yC = ScanOrder[ log2TrafoSize − 2 ][ log2TrafoSize − 2 ][ 0 ][ n + offset` ][ 1 ] | |
|     if( significant_coeff_flag[ xC ][ yC ] ) { | |
|       transCoeffLevel[ x0 ][ y0 ][ trafoDepth ][ cIdx ][ n + offset ] = | |
|         ( coeff_abs_level_minus3[ n ] + 3 ) * ( 1 − 2 * coeff_sign_flag[ n ] ) | |
|     } else | |
|       transCoeffLevel[ x0 ][ y0 ][ trafoDepth ][ cIdx ][ n + offset ] = 0 | |
|   } | |
| } | |

FIG. 64

| | Descriptor |
|---|---|
| residual_coding_cabac( x0, y0, log2TrafoSize, trafoDepth, scanIdx, cIdx ) { | |
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   if( max(width, height)>=16){ | |
|     log2CoeffGroupSize = log2TrafoSize − 2 | |
|     numCoeffGroup = 0 | |
|     for( xCG=0; xCG<4; xCG++) | |
|       for( yCG=0; yCG<4; yCG++) | |
|         numNonZeroCG[xCG][yCG] = 0 | |
|   } | |
|   while( ( xC != last_significant_coeff_x ) || ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|     if( max(width, height)>=16){ | |
|       if(( xC%(1<<log2CoeffGroupSize)==0 && (yC%(1<<log2CoeffGroupSize)==0) ){ | |
|         numCoeffGroup++ | |
|       } | |
|     } | |
|   } | |
|   if( log2TrafoSize>3 ){ | |
|     xCGLast = last_significant_coeff_x / ( 1<<log2CoeffgroupSize) | |
|     yCGLast = last_significant_coeff_y / ( 1<<log2CoeffgroupSize) | |
|     significant_coeffgroup_flag[xCGLast][yCGLast]=1 | |
|     significant_coeffgroup_flag[ 0 ][ 0 ] = 1 | |
|     for( n= numCoeffGroup; n>0; n--){ | |
|       xCG = ScanOrder[ 0 ][ 0 ][ scanIdx ][ n ][ 0 ] | |
|       yCG = ScanOrder [0 ][ 0 ][ scanIdx ][n][ 1 ] | |
|       if ( significant_coeffgroup_flag[xCG+1][yCG]>0 && significant_coeffgroup_flag[xCG][yCG+1]>0){ | |
|         siginificant_coeffgroup_flag[xCG][yCG] = 1; | |
|       } else if( !(xCG==xCGLast) && !(yCG==yCGLast) ){ | |
|         significant_coeffgroup_flag[xCG][yCG] | ae(v) |
|       } | |
|     } | |
|   if (cabac_lowcomp_flag == 0) { | |
|     residual_coding_cabac2_normal( x0, y0, log2TrafoSize, trafoDepth, scanIdx, cIdx ) | |
|   } else { | |
|     residual_coding_cabac2_lowcomp( x0, y0, log2TrafoSize, trafoDepth, scanIdx, cIdx ) | |
|   } | |
| } | |

FIG. 65

| residual_coding_cabac2_normal( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i− − ) { | | ←LP_Y70 |
| offset = i << 4 | | |
| for( n=15; n>=0; n--){ | | ←LP_Y71 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| if ( xC != last_significant_coeff_x ) || ( yC != last_significant_coeff_y ){ | | |
| significant_coeff_flag[ xC ][ yC ] | ae(v) | ←SYN_Y71 |
| } | | |
| } | | |
| } else{ | | |
| if ( xC != last_significant_coeff_x ) || ( yC != last_significant_coeff_y ){ | | |
| significant_coeff_flag[ xC ][ yC ] | ae(v) | ←SYN_Y72 |
| } | | |
| } | | |
| } | | |
| for( n = 15; n >= 0; n− −) { | | ←LP_Y72 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) | | |
| coeff_abs_level_greater1_flag[ n ] | ae(v) | ←SYN_Y73 |
| } | | |
| for( n = 15; n >= 0; n− −) { | | ←LP_Y73 |
| if( coeff_abs_level_greater1_flag[ n ] ) | | |
| coeff_abs_level_greater2_flag[ n ] | ae(v) | |
| } | | |
| for( n = 15; n >= 0; n− −) { | | ←LP_Y74 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) { | | |
| coeff_sign_flag[ n ] | ae(v), bypass | ←SYN_Y74 |
| } | | |
| for( n = 15; n >= 0; n− −) { | | ←LPY75 |
| if( coeff_abs_level_greater2_flag[ n ] ) | | |
| coeff_abs_level_minus3[ n ] | ae(v), bypass | ←SYN_Y75 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) { | | |
| transCoeffLevel[ x0 ][ y0 ][ trafoDepth ][ cIdx ][ n + offset ] = | | |
| ( coeff_abs_level_minus3[ n ] + 3 ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 66

| residual_coding_cabac2_lowcomp( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i−− ) { | | ←LP_Y80 |
| offset = i << 4 | | |
| for( n=15; n>=0; n--){ | | ←LP_Y81 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| if ( xC != last_significant_coeff_x ) \|\| ( yC != last_significant_coeff_y ){ | | |
| significant_coeff_flag[ xC ][ yC ] | ae(v) , bypass | ←SYN_Y81 |
| } | | |
| } | | |
| } else{ | | |
| if ( xC != last_significant_coeff_x ) \|\| ( yC != last_significant_coeff_y ){ | | |
| significant_coeff_flag[ xC ][ yC ] | ae(v) , bypass | ←SYN_Y82 |
| } | | |
| } | | |
| } | | |
| for( n = 15; n >= 0; n−− ) { | | ←LP_Y82 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset ][ 1 ] | | |
| if( significant_coeff_flag[ xC ][ yC ] ) { | | |
| coeff_sign_flag[ n ] | ae(v), bypass | ←SYN_Y83 |
| } | | |
| // Up to here is the same as residual_coding_cabac2_normal | | |
| for( n = 15; n >= 0; n−− ) { | | ←LP_Y83 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset ][ 1 ] | | |
| if( significant_coeff_flag[ xC ][ yC ] ) { | | |
| coeff_abs_level_minus1[ n ] | ae(v) , bypass | ←SYN_Y84 |
| transCoeffLevel[ x0 ][ y0 ][ trafoDepth ][ cIdx ][ n + offset ] = | | |
| ( coeff_abs_level_minus1[ n ] + 1 ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 67

| residual_coding_cabac2_lowcomp( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i − − ) { | | ←LP_Y90 |
| offset = i << 4 | | |
| for( n=15; n>=0; n--){ | | ←LP_Y91 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| if ( xC != last_significant_coeff_x ) \|\| ( yC != last_significant_coeff_y ){ | | |
| significant_coeff_flag[ xC ][ yC ] | ae(v) | ←SYN_Y91 |
| } | | |
| } | | |
| } else{ | | |
| if ( xC != last_significant_coeff_x ) \|\| ( yC != last_significant_coeff_y ){ | | |
| significant_coeff_flag[ xC ][ yC ] | ae(v) | ←SYN_Y92 |
| } | | |
| } | | |
| } | | |
| for( n = 15; n >= 0; n − − ) { | | ←LP_Y92 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) { | | |
| coeff_sign_flag[ n ] | ae(v), bypass | ←SYN_Y93 |
| } | | |
| | | |
| for( n = 15; n >= 0; n − − ) { | | ←LP_Y93 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) { | | |
| coeff_abs_level_minus1[ n ] | ae(v) , bypass | ←SYN_Y94 |
| transCoeffLevel[ x0 ][ y0 ][ trafoDepth ][ cIdx ][ n + offset ] = | | |
| ( coeff_abs_level_minus1[ n ] + 1 ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 68

| residual_coding_cabac2_lowcomp( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i−− ) { | | ←LP_Y100 |
| offset = i << 4 | | |
| for( n=15; n>=0; n−−){ | | ←LP_Y101 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| if ( xC != last_significant_coeff_x ) \|\| ( yC != last_significant_coeff_y ){ | | |
| significant_coeff_flag[ xC ][ yC ] | ae(v) | ←SYN_Y101 |
| } | | |
| } | | |
| } else{ | | |
| if ( xC != last_significant_coeff_x ) \|\| ( yC != last_significant_coeff_y ){ | | |
| significant_coeff_flag[ xC ][ yC ] | ae(v) | ←SYN_Y102 |
| } | | |
| } | | |
| for( n = 15; n >= 0; n−− ) { | | ←LP_Y102 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( significant_coeff_flag[ xC ][ yC ] ) { | | |
| coeff_sign_flag[ n ] | ae(v), bypass | ←SYN_Y103 |
| coeff_abs_level_minus1[ n ] | ae(v), bypass | ←SYN_Y104 |
| transCoeffLevel[ x0 ][ y0 ][ trafoDepth ][ cIdx ][ n + offset ] = | | |
| ( coeff_abs_level_minus1[ n ] + 1 ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 69

| residual_coding_cabac2_lowcomp( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i−− ) { | | ←LP_Y110 |
| offset = i << 4 | | |
| for( n=15; n>=0; n--){ | | ←LP_Y111 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if ( xC == last_significant_coeff_x ) |& ( yC == last_significant_coeff_y ){ | | |
| coeff_abs_level_minus1 [n] | ae(v), bypass | ←SYN_Y111 |
| coeff_abs_level[ n ] =coeff_abs_level_minus1 [n] + 1 | | |
| } else { | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| coeff_abs_level[ n ] | ae(v), bypass | ←SYN_Y112 |
| } | | |
| } else{ | | |
| coeff_abs_level[ n ] | ae(v), bypass | ←SYN_Y113 |
| } | | |
| } | | |
| for( n = 15; n >= 0; n−− ) { | | ←LP_Y112 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( coeff_abs_level[ n ] ) { | | |
| coeff_sign_flag[ n ] | ae(v), bypass | ←SYN_Y114 |
| transCoeffLevel[ x0 ][ y0 ][ trafoDepth ][ cIdx ][ n + offset ] = ( coeff_abs_level[ n ] ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 70

| residual_coding_cabac2_lowcomp( x0, y0, log2TrafoSize, trafoDepth, scanIdx, cIdx ) { | Descriptor | |
|---|---|---|
| numLastSubset = numCoeff >> 4 | | |
| for( i = numLastSubset − 1; i >= 0; i− − ) { | | ←LP_Y120 |
| offset = i << 4 | | |
| for( n=15; n>=0; n−−){ | | ←LP_Y121 |
| xC = ScanOrder[ log2TrafoSize − 2 ][ log2TrafoSize − 2 ][ scanIdx ][ n ][ 0 ] | | |
| yC = ScanOrder[ log2TrafoSize − 2 ][ log2TrafoSize − 2 ][ scanIdx ][ n ][ 1 ] | | |
| if ( xC == last_significant_coeff_x ) |& ( yC == last_significant_coeff_y ){ | | |
| coeff_abs_level_minus1 [n ] | ae(v) | ←SYN_Y121 |
| coeff_abs_level[ n ]  =coeff_abs_level_minus1 [n ] + 1 | | |
| } else { | | |
| if( max(width, height)>=16){ | | |
| xCG = xC>>(log2CoeffGroupSize) | | |
| yCG = yC>>(log2CoeffGroupSize ) | | |
| if( significant_coeffgroup_flag[xCG][yCG]>0 ){ | | |
| coeff_abs_level[ n ] | ae(v) | ←SYN_Y122 |
| } | | |
| } else{ | | |
| coeff_abs_level[ n ] | ae(v) | ←SYN_Y123 |
| } | | |
| } | | |
| for( n = 15; n >= 0; n− − ) { | | ←LP_Y122 |
| xC = ScanOrder[ log2TrafoSize − 2 ][ log2TrafoSize − 2 ][ 0 ][ n + offset ][ 0 ] | | |
| yC = ScanOrder[ log2TrafoSize − 2 ][ log2TrafoSize − 2 ][ 0 ][ n + offset` ][ 1 ] | | |
| if( coeff_abs_level[ n ] ) { | | |
| coeff_sign_flag[ n ] | ae(v), bypass | ←SYN_Y124 |
| transCoeffLevel[ x0 ][ y0 ][ trafoDepth ][ cIdx ][ n + offset ] = | | |
| ( coeff_abs_level[ n ] ) * ( 1 − 2 * coeff_sign_flag[ n ] ) | | |
| } else | | |
| transCoeffLevel[ x0 ][ y0 ][ trafoDepth ][ cIdx ][ n + offset ] = 0 | | |
| } | | |
| } | | |

FIG. 71 significant_coeff_flag_mode = 0

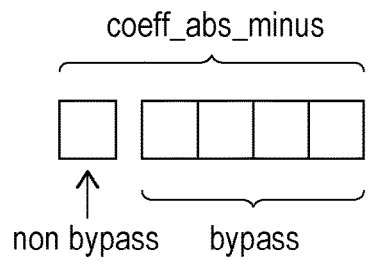

significant_coeff_flag_mode = 1

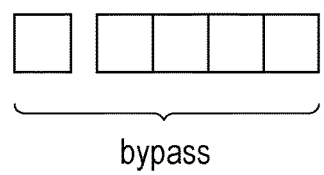

FIG. 73
(a)
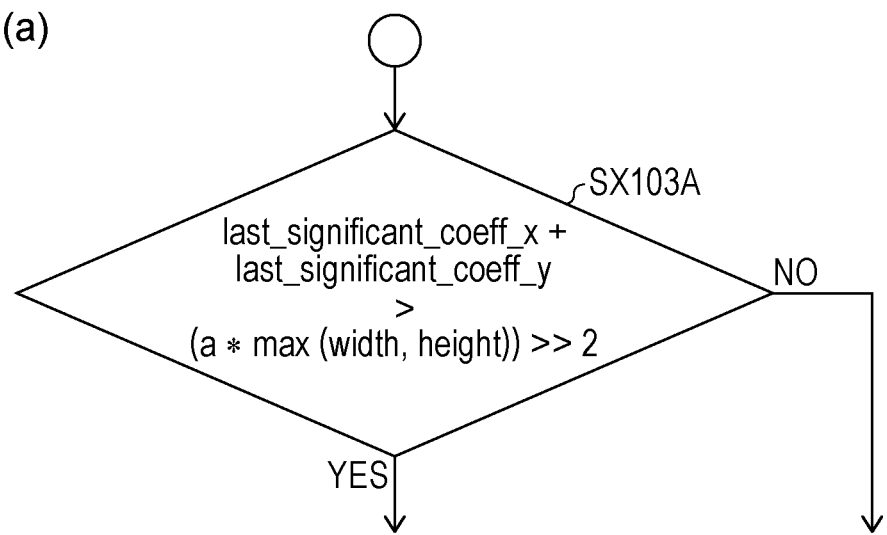
(b)
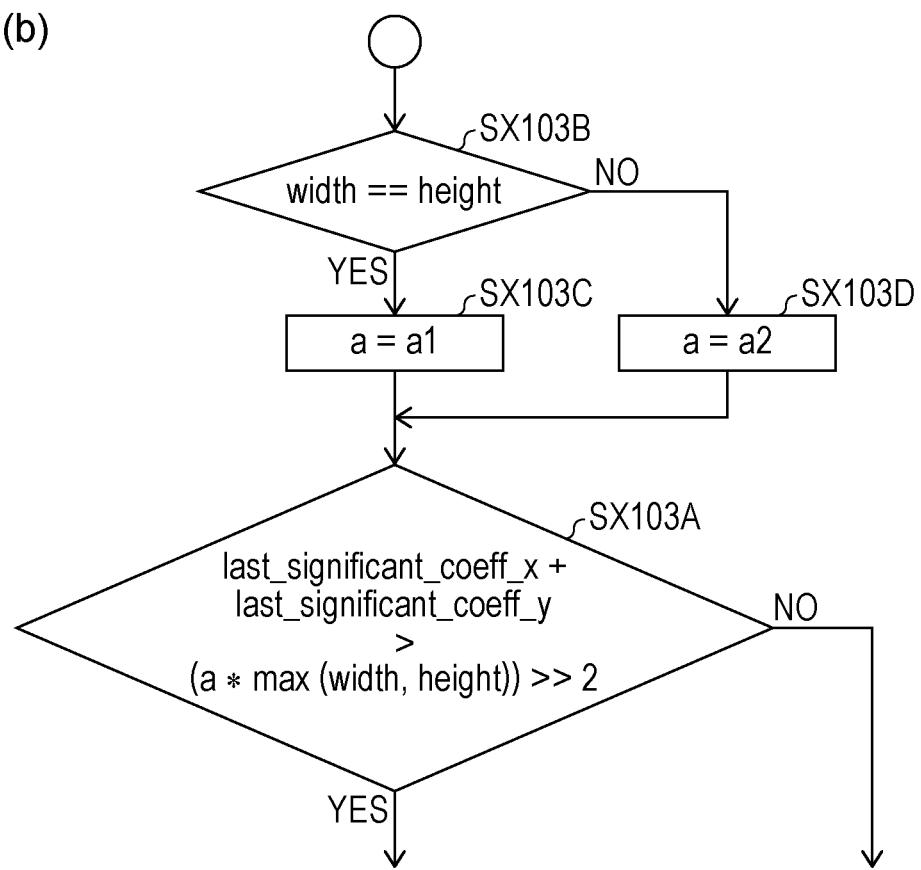

DECODING DEVICE, ENCODING DEVICE, AND DECODING METHOD

TECHNICAL FIELD

The present invention relates to an arithmetic decoding device for decoding coded data that has been arithmetically encoded, and to an image decoding device including the arithmetic decoding device. The present invention further relates to an arithmetic coding device for generating coded data that has been arithmetically encoded, and to an image coding device including the arithmetic coding device. The present invention further relates to an arithmetic decoding method for decoding coded data that has been arithmetically encoded.

BACKGROUND ART

Video coding devices (image coding devices) for coding moving images to generate coded data, and video decoding devices (image decoding devices) for decoding the coded data to generate decoded images are used for efficient transmission or recording of moving images.

Specific examples of video coding schemes include video coding schemes in H.264/MPEG-4.AVC, schemes implemented in KTA software, which is a codec for joint development in VCEG (Video Coding Expert Group), schemes implemented in TMuC (Test Model under Consideration) software, and schemes proposed in HEVC (High-Efficiency Video Coding), which is a successor codec to H.264/MPEG-4.AVC (NPL 1).

In such video coding schemes, images (pictures) forming a moving image are managed using a hierarchical structure that is composed of slices obtained by partitioning each image, coding units obtained by splitting each slice, and blocks and partitions obtained by splitting each coding unit. The images (pictures) are generally coded/decoded on a block-by-block basis.

Such coding schemes generally involve generating a prediction image based on a locally decoded image obtained by coding and decoding an input image, and coding transform coefficients obtained by performing a frequency transform such as a DCT (Discrete Cosine Transform) transform on a difference image (also called a "residual image" or a "prediction residual") between the prediction image and the input image on a block-by-block basis.

Known specific coding schemes for transform coefficients include context-based adaptive variable length coding (CAVLC) and context-based adaptive binary arithmetic coding (CABAC).

In CALVC, transform coefficients are sequentially scanned into a one-dimensional vector, and then syntax elements representing the respective values of the transform coefficients, and syntax elements representing lengths (also referred to as runs) of consecutive zeroes, and the like are coded.

In CABAC, a binarization process is performed on various syntax elements representing transform coefficients, and binary data obtained by the binarization process is arithmetically coded. The various syntax elements include a flag indicating whether or not a transform coefficient is 0, that is, a flag significant_coeff_flag indicating the presence or absence of a non-zero transform coefficient (also referred to as a transform coefficient presence/absence flag), and syntax elements last_significant_coeff_x and last_significant_coeff_y that specify the position of a last non-zero transform coefficient in the processing order.

In CABAC, furthermore, the coding of one symbol (one bit of binary data, also referred to as a bin) involves referring to a context index allocated to the frequency component to be processed, and performing arithmetic coding in accordance with the probability of occurrence specified by a probability state index included in a context variable identified by the context index. The probability of occurrence indicated by the probability state index is updated for each coding of one symbol.

NPL 1 describes (1) division of a frequency region for a block having a comparatively large size such as 16×16 pixels or 32×32 pixels into a plurality of sub-regions, (2) the allocation of a context index (also referred to as a position context) to a frequency component included in a low-frequency-side sub-region, the context index being determined in accordance with the position of the frequency component in the frequency region, and (3) the allocation of a context index (also referred to as a neighbouring reference context) to a frequency component included in a high-frequency-side sub-region, the context index being determined on the basis of the number of non-zero transform coefficients in neighbouring frequency components of the frequency component. This technology can keep the total number of contexts to be referred to small on the high-frequency side while reducing the amount of processing on the low-frequency side.

In NPL 2, a technology is known in which transform coefficients are coded using coding called bypass coding without using contexts while arithmetic coding is used (i.e., coding that is arithmetic coding and that does not use contexts), removing updating of contexts and improving throughput. This technology does not use existing binarization for CABAC coding but uses binarization for CAVLC coding.

PATENT LITERATURE

Non Patent Literature

NPL 1: "WD4: Working Draft 4 of High-Efficiency Video Coding (JCTVC-F803_d2)", Joint Collaborative Team on Video Coding (JCT-VC) of ITU-T SG16 WP3 and ISO/IEC JTC1/SC29/WG11 6th Meeting: Torino, IT, 14-22 Jul. 2011 (published on Oct. 8, 2011)

NPL 2: J. Lainema, K. Ugur and A. Hallapuro "Single entropy coder for HEVC with a high throughput binarization mode", JCTVC-G569, Geneva, November 2011 (published in November 2011)

SUMMARY OF INVENTION

Technical Problem

In the technology described in NPL 1, neighbouring reference contexts are used on the high-frequency side where the number of components is large, causing a problem of an increased amount of computation for context computation for decoding the flag significant_coeff_flag indicating the presence or absence of a non-zero transform coefficient, leading to a delay in the decoding process.

In the technology described in NPL 2, binarization for CAVLC coding is used. Thus, two modes, namely, run mode and level mode, are necessary, causing a problem of an increase in the complexity of processing. There is another problem in that since no contexts are used, coding efficiency is significantly low.

The present invention has been made in view of the foregoing problems, and it is an object of the present invention to achieve an arithmetic decoding device and an arithmetic coding device that may reduce the amount of processing, compared to an existing configuration, while achieving high coding efficiency.

Solution to Problem

In order to overcome the foregoing problems, an arithmetic decoding device according to an aspect of the present invention is an arithmetic decoding device for arithmetically decoding coded data of a transform coefficient obtained by performing a frequency transform on a target image for each unit region, including syntax decoding means for decoding each of at least a first syntax element and a second syntax element that indicate the transform coefficient using arithmetic decoding with a context or arithmetic decoding without a context. The syntax decoding means is configured to perform decoding that at least includes not decoding the first syntax element and decoding the second syntax element using the arithmetic decoding without a context, and decoding the first syntax element using the arithmetic decoding with a context and decoding the second syntax element using the arithmetic decoding without a context.

In order to overcome the foregoing problems, an arithmetic coding device for generating coded data of a transform coefficient obtained by performing a frequency transform on a target image for each unit region, including syntax coding means for arithmetically coding each of at least a first syntax element and a second syntax element that indicate the transform coefficient using arithmetic coding with a context or arithmetic coding without a context. The syntax coding means is configured to perform coding that at least includes not coding the first syntax element and coding the second syntax element using the arithmetic coding without a context, and coding the first syntax element using the arithmetic coding with a context and coding the second syntax element using the arithmetic coding without a context.

In order to overcome the foregoing problems, an arithmetic decoding method according to an aspect of the present invention is an arithmetic decoding method for arithmetically decoding coded data of a transform coefficient obtained by performing a frequency transform on a target image for each unit region, at least including a step of decoding each of at least a first syntax element and a second syntax element that indicate the transform coefficient using arithmetic decoding with a context or arithmetic decoding without a context. The step of decoding at least includes not decoding the first syntax element and decoding the second syntax element using the arithmetic decoding without a context, and decoding the first syntax element using the arithmetic decoding with a context and decoding the second syntax element using the arithmetic decoding without a context.

Advantageous Effects of Invention

According to an aspect of the present invention, it is possible to reduce the amount of processing while achieving high coding efficiency.

BRIEF DESCRIPTION OF DRAWINGS

FIG. 2 includes diagrams illustrating a data structure of coded data generated by a video coding device according to the embodiment of the present invention and decoded by the video decoding device, in which parts (a) to (d) are diagrams illustrating a picture layer, a slice layer, a tree block layer, and a CU layer, respectively.

FIG. 5 is a diagram illustrating syntax elements included in quantized residual information of coded data according to the embodiment.

FIG. 10 includes diagrams illustrating the operation of a neighbouring reference context derivation unit according to the embodiment, in which part (a) illustrates a target frequency component x in a case where the processing order is reverse scan order, and reference frequency components c1 to c5 included in a reference region set near the position of the target frequency component x, part (b) illustrates a target frequency component x in a case where the processing order is forward scan order, and reference frequency components c1 to c5 included in a reference region set near the position of the target frequency component x, and part (c) illustrates a reference region that extends outside a target frequency region.

FIG. 11 Part (a) of FIG. 11 is a diagram illustrating a frequency region divided into three sub-regions by the frequency classification unit according to the embodiment, and part (b) of FIG. 11 is a diagram illustrating a frequency region divided into two sub-regions by the frequency classification unit according to the embodiment.

FIG. 13 includes diagrams depicting the second example configuration of the coefficient presence/absence flag decoding unit according to the embodiment, in which part (a) illustrates a scan sequence Lx and a scan sequence Lx+1, and part (b) illustrates a portion where last_cntx is counted and a portion where last_cnty is counted in the scan sequence Lx and the scan sequence Lx+1.

FIG. 15 includes diagrams illustrating a reference region referred to by a neighbouring reference context derivation unit in the third example configuration of the coefficient presence/absence flag decoding unit according to the embodiment, in which parts (a) to (b) exemplify reference regions where the number of references is 4, parts (c) to (f) exemplify reference regions where the number of references is 3, parts (g) to (h) exemplify reference regions where the number of references is 2, and part (i) illustrates another example of the reference region where the number of references is 3.

FIG. 24 depicts another example configuration of the quantized residual information decoder according to the embodiment, in which part (a) illustrates values of levels and the setting of restrictions corresponding thereto, and part (b) illustrates values of levels and the setting of threshold values corresponding thereto.

FIG. 25 depicts another example configuration of the quantized residual information decoder according to the embodiment, in which part (a) illustrates values of context indices derived by a coefficient presence/absence flag decoding unit according to a comparative example, part (b) illustrates values of context indices ctxIdx derived by a coefficient presence/absence flag decoding unit according to this example configuration, part (c) illustrates an example of ctxIdxH derived by the coefficient presence/absence flag decoding unit according to this example configuration, and part (d) illustrates an example of ctxIdxV derived by the coefficient presence/absence flag decoding unit according to this example configuration.

FIG. 29 includes diagrams illustrating a configuration of a transmitting apparatus including the video coding device described above and a configuration of a receiving apparatus including the video decoding device described above, in which part (a) illustrates the transmitting apparatus including the video coding device, and part (b) illustrates the receiving apparatus including the video decoding device.

FIG. 30 includes diagrams illustrating a configuration of a recording apparatus including the video coding device described above and a configuration of a reproducing apparatus including the video decoding device described above, in which part (a) illustrates the recording apparatus including the video coding device, and part (b) illustrates the reproducing apparatus including the video decoding device.

FIG. 32 includes parts (a) and (b) which depict seventh to ninth example configurations of the coefficient presence/absence flag decoding unit according to the embodiment, in which scanning using a sub-block as a unit is illustrated.

FIG. 36 includes parts (a), (b), and (c) which depict the seventh to ninth example configurations of the coefficient presence/absence flag decoding unit according to the embodiment, in which reference frequency components c1 to c5 included in a reference region set near the position of a target frequency component x are illustrated.

FIG. 47 includes diagrams depicting a sub-block coefficient presence/absence flag according to the embodiment, in which part (a) illustrates an example of values of quantized residual coefficients for a total of 256 frequency components included in a 16×16 transform block, part (b) illustrates an example of sub-block numbers for identifying the respective sub-blocks obtained by subdivision of the 16×16 transform block into 4×4 sub-blocks, and part (c) illustrates an example of sub-block coefficient presence/absence flags for the respective sub-blocks when the quantized residual coefficients illustrated in part (a) are used.

FIG. 48 includes diagrams depicting a classification process performed by a frequency classification unit included in the coefficient presence/absence flag decoding unit according to the embodiment, in which part (a) illustrates subdivision suitable for use in the decoding of transform coefficients for luma value, and part (b) illustrates subdivision suitable for use in the decoding of transform coefficients for chroma.

FIG. 49 is a diagram depicting a context index derivation process with another example configuration of the third example configuration of the coefficient presence/absence flag decoding unit according to the embodiment, in which pseudo code indicating a derivation process for deriving a context index to be allocated to a frequency region included in each of the sub-regions R0 to R3 illustrated in part (a) of FIG. 48 is illustrated.

FIG. 50 is a diagram depicting a context index derivation process performed by the coefficient presence/absence flag decoding unit according to the embodiment, in which pseudo code indicating a derivation process for deriving a context index to be allocated to a frequency region included in each of the sub-regions R0 to R3 illustrated in part (b) of FIG. 48 is illustrated.

FIG. 51 includes parts (a) and (b) which depict another example configuration of the third example configuration of the coefficient presence/absence flag decoding unit according to the embodiment, in which reference frequency components c1, c2, and c5 included in a reference region set near the position of a target frequency component x are illustrated.

FIG. 52 is a diagram depicting a context index derivation process with another example configuration of the eighth example configuration of the coefficient presence/absence flag decoding unit according to the embodiment, in which pseudo code indicating a derivation process for deriving a context index to be allocated to a frequency region included in each of the sub-regions R0 to R3 illustrated in part (a) of FIG. 48 is illustrated.

FIG. 53 is a diagram depicting a context index derivation process with another example configuration of the eighth example configuration of the coefficient presence/absence flag decoding unit according to the embodiment, in which pseudo code indicating a derivation process for deriving a context index to be allocated to a frequency region included in each of the sub-regions R0 to R3 illustrated in part (b) of FIG. 48 is illustrated.

FIG. 54 is a diagram depicting a context index derivation process with another example configuration of the eighth example configuration of the coefficient presence/absence flag decoding unit according to the embodiment, in which pseudo code indicating a derivation process for deriving a context index to be allocated to a frequency region included in each of the sub-regions R0 to R3 illustrated in part (a) of FIG. 48 is illustrated.

FIG. 55 is a diagram depicting a context index derivation process with another example configuration of the eighth example configuration of the coefficient presence/absence flag decoding unit according to the embodiment, in which pseudo code indicating a derivation process for deriving a context index to be allocated to a frequency region included in each of the sub-regions R0 to R3 illustrated in part (b) of FIG. 48 is illustrated.

FIG. 56 is a diagram depicting a context index derivation process with another example configuration of the eighth example configuration of the coefficient presence/absence flag decoding unit according to the embodiment, in which pseudo code indicating a derivation process for deriving a context index to be allocated to a frequency region included in each of the sub-regions R0 to R3 illustrated in parts (a) to (b) of FIG. 48 is illustrated.

FIG. 58 includes parts (a), (b), (c), and (d) which depict a context index derivation process using an example configuration in which the removal of context update delay is taken into account in the eighth example configuration of the coefficient presence/absence flag decoding unit according to the embodiment.

FIG. 59 is a diagram depicting a context index derivation process using an example configuration in which the removal of context update delay is taken into account in the eighth example configuration of the coefficient presence/ absence flag decoding unit according to the embodiment, in which pseudo code indicating a derivation process for deriving a context index to be allocated to a frequency region included in each of the sub-regions R0 to R3 illustrated in parts (a) to (b) of FIG. 48 is illustrated.

FIG. 60 is a diagram depicting a context index derivation process using an example configuration in which the removal of context update delay is taken into account in the eighth example configuration of the coefficient presence/absence flag decoding unit according to the embodiment, in which pseudo code indicating a derivation process for deriving a context index to be allocated to a frequency region included in each of the sub-regions R0 to R3 illustrated in parts (a) to (b) of FIG. 48 is illustrated.

Figure 61:
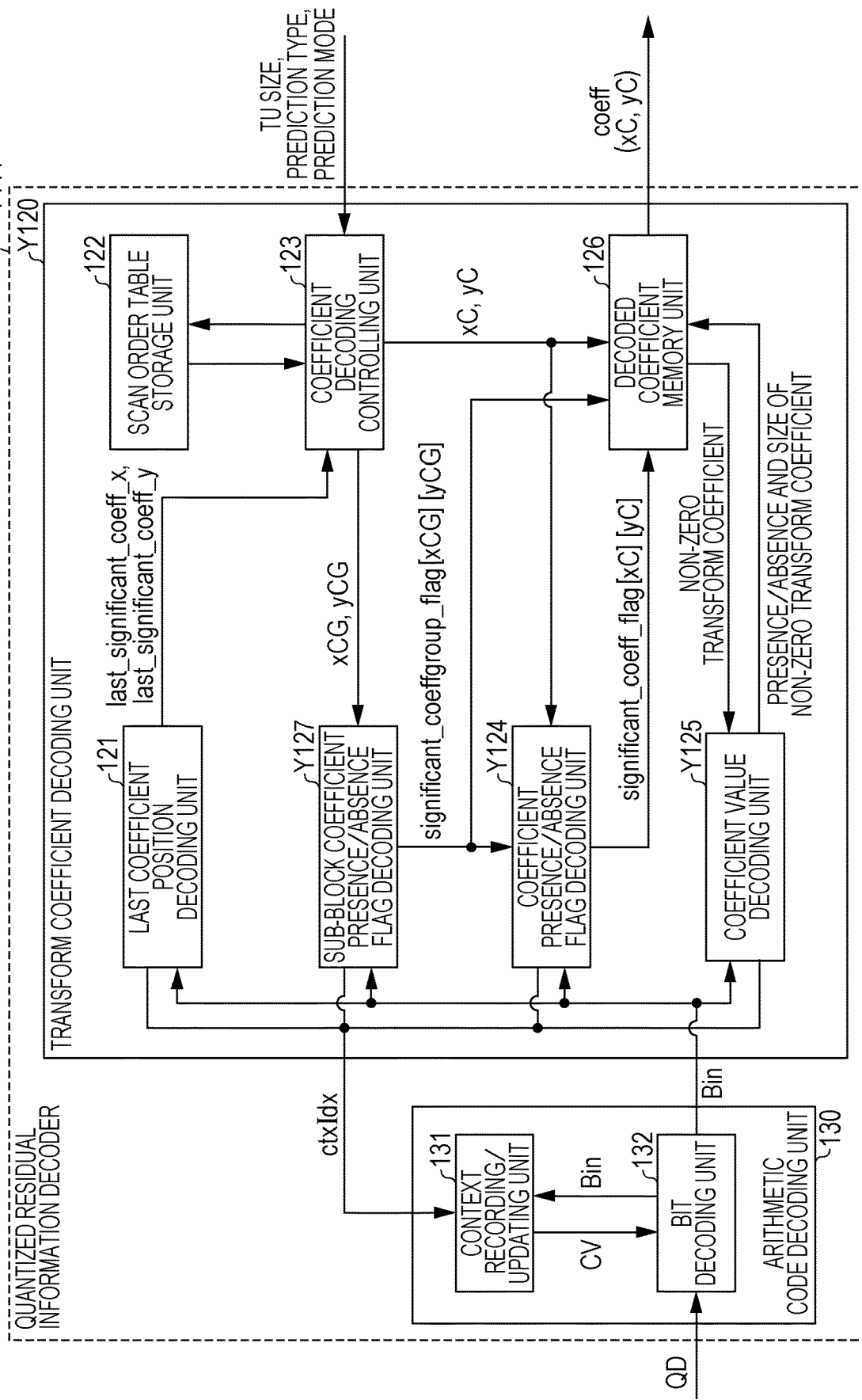

FIG. 61 is a block diagram illustrating a configuration of a quantized residual information decoder included in a video decoding device 3 according to the embodiment of the present invention.

FIG. 62 is a diagram illustrating a first portion of a syntax table indicating syntax elements included in quantized residual information of coded data of the related art.

FIG. 63 is a diagram illustrating a second portion of the syntax table indicating the syntax elements included in the quantized residual information of the coded data of the related art.

FIG. 64 is a diagram illustrating a first portion of a syntax table indicating syntax elements included in quantized residual information of coded data according to the embodiment.

FIG. 65 is a diagram illustrating a normal configuration in a second portion of the syntax table indicating the syntax elements included in the quantized residual information of the coded data according to the embodiment.

FIG. 66 is a diagram illustrating a first simplification configuration in the second portion of the syntax table indicating the syntax included in the quantized residual information of the coded data according to the embodiment.

FIG. 67 is a diagram illustrating a second simplification configuration in the second portion of the syntax table indicating the syntax included in the quantized residual information of the coded data according to the embodiment.

FIG. 68 is a diagram illustrating a third simplification configuration in the second portion of the syntax table indicating the syntax included in the quantized residual information of the coded data according to the embodiment.

FIG. 69 is a diagram illustrating a fourth simplification configuration in the second portion of the syntax table indicating the syntax included in the quantized residual information of the coded data according to the embodiment.

FIG. 70 is a diagram illustrating a fifth simplification configuration in the second portion of the syntax table indicating the syntax included in the quantized residual information of the coded data according to the embodiment.

FIG. 71 is a diagram illustrating a syntax structure indicating a syntax element coeff_abs_minus included in quantized residual information of coded data according to the embodiment.

Figure 72:
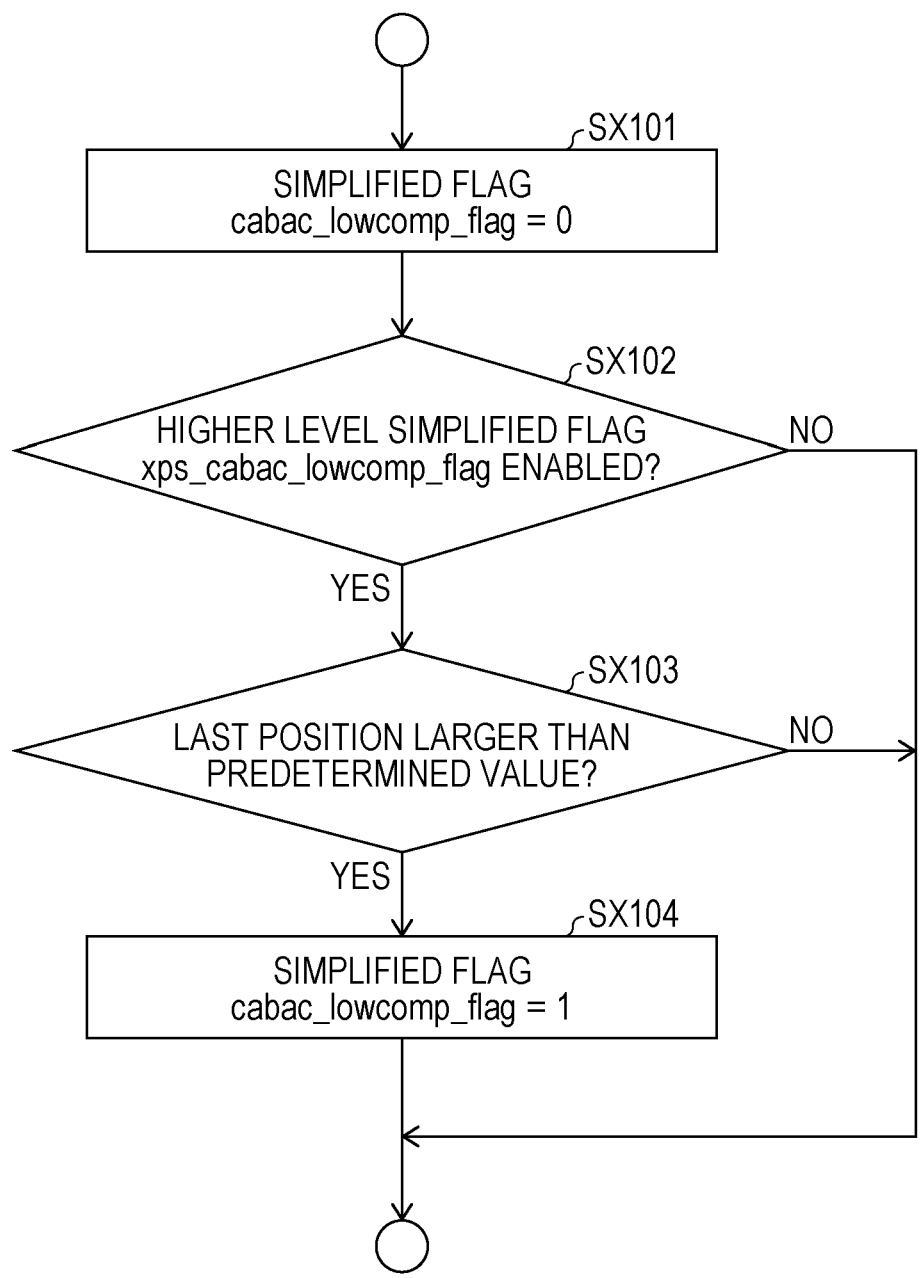

FIG. 72 is a flowchart illustrating a derivation process for a simplified process flag cabac_lowcomp_flag according to the embodiment.

FIG. 73 includes parts (a) and (b) which depict flowcharts illustrating a detailed process of the derivation process for the simplified process flag cabac_lowcomp_flag according to the embodiment.

Figure 74:
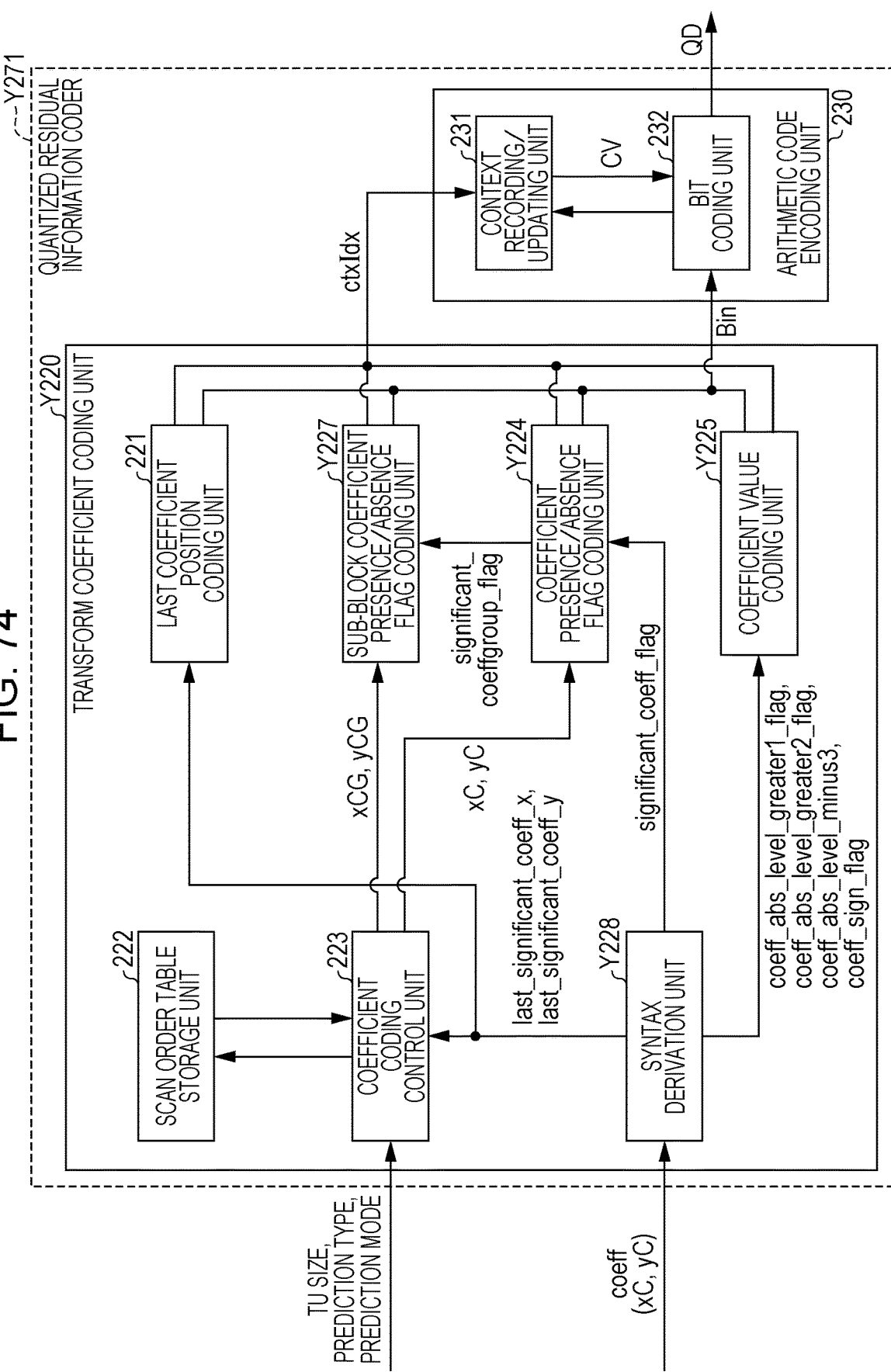

FIG. 74 is a block diagram illustrating a configuration of a quantized residual information coder included in a video coding device 2 according to the embodiment of the present invention.

Figure 75:
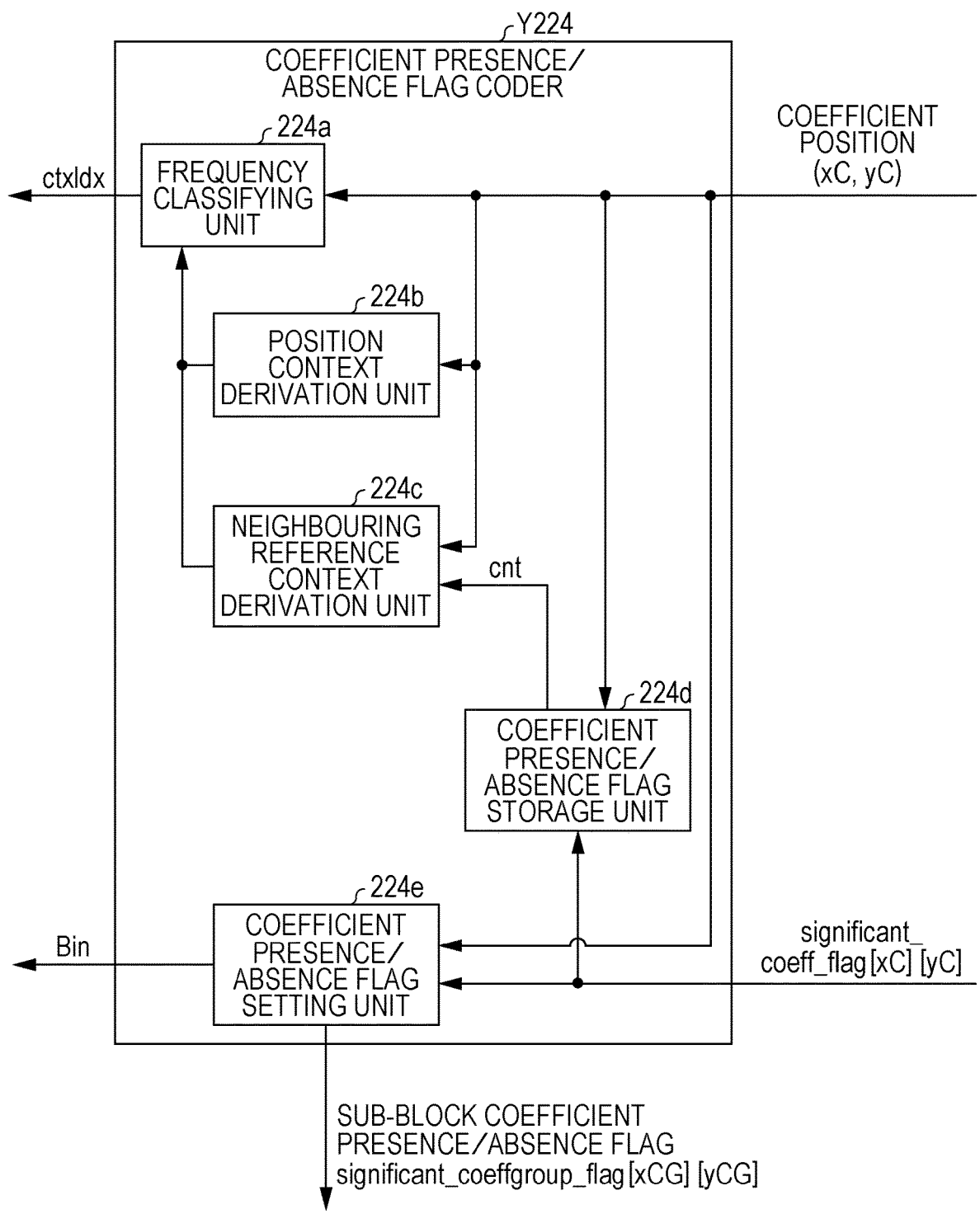

FIG. 75 is a block diagram illustrating a configuration of a coefficient presence/absence flag coding unit Y224 according to the embodiment.

DESCRIPTION OF EMBODIMENTS

An embodiment of a decoding device and a coding device according to the present invention will be described hereinafter with reference to the drawings. A decoding device according to this embodiment is configured to decode a moving image or video from coded data. Thus, in the following, this decoding device is termed a "video decoding device". In addition, a coding device according to this embodiment is configured to encode a moving image or video to generate coded data. Thus, in the following, this coding device is termed a "video coding device".

However, the scope to which the present invention is applied is not limited to that described above. That is, as will also be apparent from the following description, the features of the present invention will be achieved without assuming a plurality of frames. That is, the present invention is applicable to general decoding devices and general coding devices regardless of whether they target moving images or still images.

(Configuration of Coded Data #1)

An example configuration of coded data #1 generated by a video coding device 2 and decoded by a video decoding device 1 will be described with reference to FIG. 2. The coded data #1 includes, by way of example, a sequence and a plurality of pictures forming the sequence.

In the sequence layer, a data set referred to by the video decoding device 1 to decode the sequence to be processed is defined. The sequence layer includes a sequence parameter set SPS, a picture parameter set PPS, and a picture PICT.

A structure of layers including the picture layer and layers below the picture layer in the coded data #1 is illustrated in FIG. 2. Parts (a) to (d) of FIG. 2 are diagrams illustrating, respectively, a picture layer that defines a picture PICT, a slice layer that defines a slice S, a tree block layer that defines a tree block TBLK, and a CU layer that defines a coding unit (CU) included in the tree block TBLK.

(Picture Layer)

The picture layer defines a data set referred to by the video decoding device 1 to decode the picture PICT to be processed (hereinafter also referred to as the target picture). As illustrated in part (a) of FIG. 2, the picture PICT includes a picture header PH and slices $S_1$ to $S_{NS}$ (where NS is the total number of slices included in the picture PICT).

In the following, subscripts may be omitted if there is no need to distinguish the slices $S_1$ to $S_{NS}$ from one another. The above similarly applies to other data with subscripts among the data included in the coded data #1, described below.

The picture header PH includes a coding parameter group referred to by the video decoding device 1 to determine a decoding method for the target picture. For example, coding mode information (entropy_coding_mode_flag) indicating a variable length coding mode used by the video coding device 2 for coding is an example of a coding parameter included in the picture header PH.

If entropy_coding_mode_flag is equal to 0, the picture PICT is a picture encoded using CAVLC (Context-based Adaptive Variable Length Coding). If entropy_coding_mode_flag is equal to 1, the picture PICT is a picture encoded using CABAC (Context-based Adaptive Binary Arithmetic Coding).

(Slice Layer)

The slice layer defines a data set referred to by the video decoding device 1 to decode the slice S to be processed (also referred to as the target slice). As illustrated in part (b) of FIG. 2, the slice S includes a slice header SH and tree blocks $TBLK_1$ to $TBLK_{NC}$ (where NC is the total number of tree blocks included in the slice S).

The slice header SH includes a coding parameter group referred to by the video decoding device 1 to determine a decoding method for the target slice. Slice type specifying information (slice_type) that specifies a slice type is an example of a coding parameter included in the slice header SH.

Slice types that may be specified by the slice type specifying information include (1) I slice that uses only intra prediction for coding, (2) P slice that uses uni-prediction or intra prediction for coding, and (3) B slice that uses uni-prediction, bi-prediction, or intra prediction for coding.

The slice header SH further includes a filter parameter FP referred to by a loop filter included in the video decoding device 1. The filter parameter FP includes a filter coefficient group. The filter coefficient group includes (1) number-of-taps specifying information that specifies the number of taps of the filter, (2) filter coefficients $a_0$ to $a_{NT-1}$ (where NT is the total number of filter coefficients included in the filter coefficient group), and (3) an offset o.

(Tree Block Layer)

The tree block layer defines a data set referred to by the video decoding device 1 to decode the tree block TBLK to be processed (hereinafter also referred to as the target tree block).

The tree block TBLK includes a tree block header TBLKH and coding unit information items $CU_1$ to $CU_{NL}$ (where NL is the total number of coding unit information items included in the tree block TBLK). The following is a description of, first, the relationship between tree block TBLK and the coding unit information CU.

The tree block TBLK is split into units for specifying block sizes for the respective processes of intra prediction or inter prediction, and transformation.

The units of the tree block TBLK are obtained by recursive quadtree partitioning. The tree structure obtained by recursive quadtree partitioning is hereinafter referred to as a coding tree.

In the following, units corresponding to leaf nodes that are end points in a coding tree are referenced as coding nodes. Since a coding node is the basic unit of a coding process, a coding node is hereinafter also referred to as a coding unit (CU).

That is, the coding unit information items $CU_1$ to $CU_{NL}$ are information items corresponding to the coding nodes (coding units) obtained by the recursive quadtree partitioning of the tree block TBLK.

The root of the coding tree is associated with the tree block TBLK. In other words, the tree block TBLK is associated with the highest node of a tree structure for quadtree partitioning which recursively includes a plurality of coding nodes.

The size of each individual coding node is half, both horizontally and vertically, the size of a coding node to which the individual coding node directly belongs (i.e., the unit at the node that is one layer above the individual coding node).

The size that each individual coding node may take depends on size specifying information and the maximum hierarchical depth of the individual coding node, which are included in the sequence parameter set SPS in the coded data #1. For example, if the tree block TBLK has a size of 64×64 pixels and has a maximum hierarchical depth of 3, each of the coding nodes in the layers at or below the tree block TBLK may take any of the following four sizes: 64×64 pixels, 32×32 pixels, 16×16 pixels, and 8×8 pixels.

(Tree Block Header)

The tree block header TBLKH includes coding parameters referred to by the video decoding device 1 to determine a decoding method for the target tree block. Specifically, as illustrated in part (c) of FIG. 2, the tree block header TBLKH includes tree block split information SP_TBLK that specifies a pattern in which the target tree block is split into individual CUs, and a quantization parameter difference Δqp (qp_delta) that specifies a quantization step size.

The tree block split information SP_TBLK is information indicating a coding tree for splitting a tree block. Specifically, the tree block split information SP_TBLK is information that specifies the shape and size of the CUs included in the target tree block and that further specifies the position of the CUs in the target tree block.

The tree block split information SP_TBLK may not necessarily explicitly include the shape or size of the CUs. For example, the tree block split information SP_TBLK may include a set of flags (split_coding_unit_flag) indicating whether or not to split the entire target tree block or a sub-region of a tree block into four sections. In this case, the shape and size of the CUs can be identified using the shape and size of the tree block in combination with the set of flags.

The quantization parameter difference Δqp is a difference qp-qp' between a quantization parameter qp in the target tree block and a quantization parameter qp' in the tree block that has been coded immediately before the target tree block.

(CU Layer)

The CU layer defines a data set referred to by the video decoding device 1 to decode the CU to be processed (hereinafter also referred to as the target CU).

Before proceeding to the discussion of the specific content of the data included in the coding unit information CU, a description will be given of the tree structure of data included in a CU. A coding node is a node at the root of a prediction tree (PT) and a transform tree (TT). The following is a description of the prediction tree and the transform tree.

In the prediction tree, the coding node is split into one or a plurality of prediction blocks, and the position and size of the individual prediction blocks are specified. In other words, the prediction blocks are one or a plurality of non-overlapping regions forming the coding node. The prediction tree includes one or a plurality of prediction blocks obtained by the splitting procedure described above.

A prediction process is performed for each prediction block. In the following, a prediction block, which is the unit of prediction, is also referred to as a prediction unit (PU).

There are roughly two partition types for a prediction tree, namely, intra prediction and inter prediction.

Partitioning methods for intra prediction include 2N×2N (the same size as that of the coding node) and N×N.

Partitioning methods for inter prediction include 2N×2N (the same size as that of the coding node), 2N×N, N×2N, N×N and the like.

In the transform tree, furthermore, the coding node is split into one or a plurality of transform blocks, and the position and size of the individual transform blocks are specified. In other words, transform blocks are one or a plurality of non-overlapping regions forming a coding node. The transform tree includes one or a plurality of transform blocks obtained by the splitting procedure described above.

A transform process is performed for each transform block. In the following, a transform block, which is the unit of transform, is also referred to as a transform unit (TU).

(Data Structure of Coding Unit Information)

Next, the specific content of the data included in the coding unit information CU will be described with reference to part (d) of FIG. 2. As illustrated in part (d) of FIG. 2, specifically, the coding unit information CU includes a skip mode flag (skip flag) SKIP, CU prediction type information Pred_type, PT information PTI, and TT information TTI.

[Skip Flag]

The skip flag SKIP is a flag indicating whether or not a skip mode is applied to the target CU. If the value of the skip flag SKIP is equal to 1, that is, if a skip mode is applied to the target CU, the PT information PTI in the coding unit information CU is omitted. The skip flag SKIP is omitted in I slices.

[CU Prediction Type Information]

The CU prediction type information Pred_type includes CU prediction scheme information PredMode and PU partition type information PartMode. The CU prediction type information may also be called prediction type information.

The CU prediction scheme information PredMode specifies which of intra prediction (intra CU) and inter prediction (inter CU) to use as a prediction image generation method for each of the PUs included in the target CU. In the following, the types of skip, intra prediction, and inter prediction in the target CU are referred to as CU prediction modes.

The PU partition type information PartMode specifies a PU partition type that is a pattern in which the target coding unit (CU) is split into individual PUs. The split of the target coding unit (CU) into individual PUs in the manner described above in accordance with the PU partition type is hereinafter referred to as PU partition.

The PU partition type information PartMode may be, by way of example, an index indicating a type of PU partition pattern, or may specify the shape and size of the PUs included in the target prediction tree and also specify the position of the PUs in the target prediction tree.

Selectable PU partition types differ depending on the CU prediction scheme and the CU size. Moreover, selectable PU partition types differ depending on inter prediction or intra prediction. The details of the PU partition types will be described below.

In the case of non-I slices, the value of the PU partition type information PartMode and the value of the PU partition type information PartMode may be identified by an index (cu_split_pred_part_mode) that specifies a combined method of tree block partitioning, prediction scheme, and CU splitting.

[Pt Information]

The PT information PTI is information concerning a PT included in the target CU. In other words, the PT information PTI is a set of information items each concerning one of one or a plurality of PUs included in the PT. As described above, since a prediction image is generated on a per-PU basis, the PT information PTI is referred to by the video decoding device 1 to generate a prediction image. As illustrated in part (d) of FIG. 2, the PT information PTI includes PU information items $PUI_1$ to $PUI_{NP}$ (where NP is the total number of PUs included in the target PT) each including prediction information and the like on one of the PUs.

The prediction information PUI includes an intra prediction parameter PP_Intra or an inter prediction parameter PP_Inter in accordance with which prediction method the prediction type information Pred_mode specifies. In the following, a PU to which intra prediction is applied is also called an intra PU, and a PU to which inter prediction is applied is also called an inter PU.

The inter prediction parameter PP_Inter includes coding parameters referred to by the video decoding device 1 to generate an inter prediction image using inter prediction.

Examples of the inter prediction parameter PP_Inter include a merge flag (merge_flag), a merge index (merge_idx), a motion vector predictor index (mvp_idx), a reference image index (ref_idx), an inter prediction flag (inter_pred_flag), and a motion vector difference (mvd).

The intra prediction parameter PP_Intra includes coding parameters referred to by the video decoding device 1 to generate an intra prediction image using intra prediction.

Examples of the intra prediction parameter PP_Intra include an estimated prediction mode flag, an estimated prediction mode index, and a remaining prediction mode index.

The intra prediction parameter may include a PCM mode flag indicating whether or not to use a PCM mode. If the PCM mode flag has been coded and the PCM mode flag indicates the use of the PCM mode, the processes of prediction (intra), transformation, and entropy coding are omitted.

[TT Information]

The TT information TTI is information concerning a TT included in a CU. In other words, the TT information TTI is a set of information items each concerning one of one or a plurality of TUs included in the TT, and is referenced by the video decoding device 1 to decode residual data. In the following, a TU may also be referred to as a block.

As illustrated in part (d) of FIG. 2, the TT information TTI includes TT split information SP_TU that specifies a pattern in which the target CU is split into individual transform blocks, and TU information items $TUI_1$ to $TUI_{NT}$ (where NT is the total number of blocks included in the target CU).

Specifically, the TT split information SP_TU is information for determining the shape and size of the TUs included in the target CU and also determining the position of the TUs in the target CU. The TT split information SP_TU may be composed of, for example, information (split_transform_flag) indicating whether or not the split of the node of interest is made and information (trafoDepth) indicating the depth of split.

For example, if the size of the CU is 64×64, each of the TUs obtained by split may have a size in the range of 32×32 pixels to 4×4 pixels.

The TU information items $TUI_1$ to $TUI_{NT}$ are separate information items each concerning one of one or a plurality of TUs included in the TT. For example, the TU information TUI includes quantized prediction residuals (also referred to as quantized residuals).

Each quantized prediction residual is coded data generated by the video coding device 2 performing the following processes 1 to 3 on the target block, which is a block to be processed.

Process 1: Application of a frequency transform (for example, a DCT transform (Discrete Cosine Transform)) to a prediction residual obtained by subtracting a prediction image from an image to be coded;

Process 2: Quantization of a transform coefficient obtained by Process 1; and

Process 3: Variable-length coding of the transform coefficient quantized in Process 2.

The quantization parameter qp described above represents the size of the quantization step QP that is used when the video coding device 2 quantizes a transform coefficient (QP=$2^{qp/6}$).

(PU Partition Type)

Given that the size of the target CU is 2N×2N pixels, the PU partition type has eight patterns in total as follows: four symmetric splittings, namely, 2N×2N pixels, 2N×N pixels, N×2N pixels, and N×N pixels, and four asymmetric splittings, namely, 2N×nU pixels, 2N×nD pixels, nL×2N pixels, and nR×2N pixels. Note that N=$2^m$ (where m is an arbitrary integer greater than or equal to 1). In the following, regions obtained by splitting the target CU are also referred to as partitions.

Figure 3:
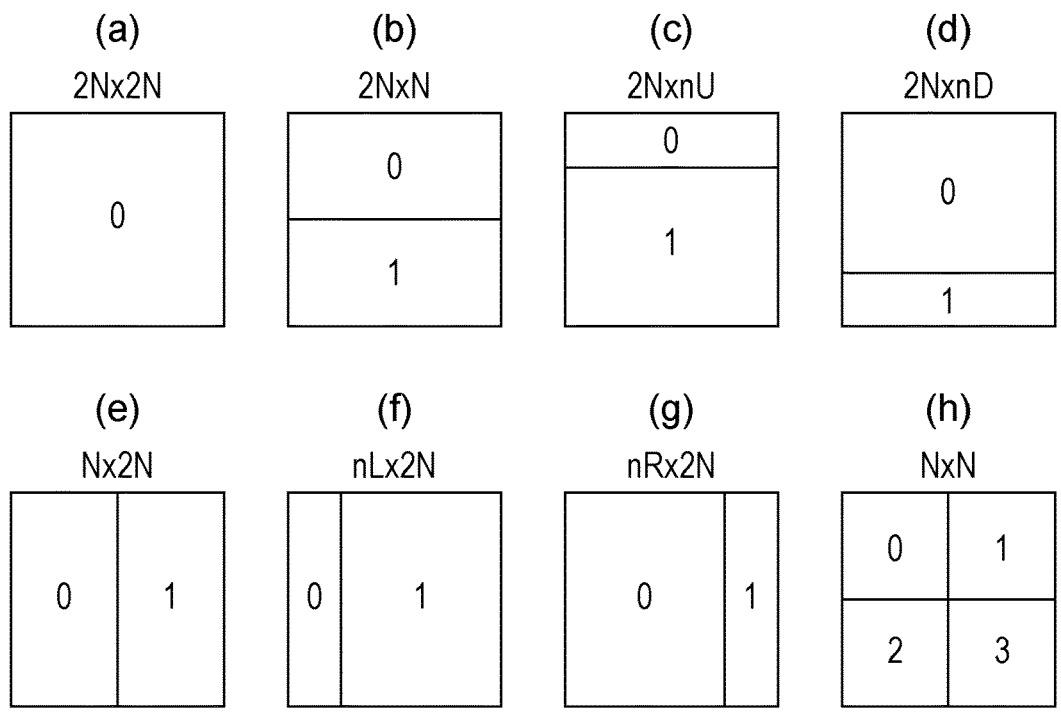
FIG. 3 includes diagrams illustrating patterns of PU partition types, in which parts (a) to (h) represent partition shapes in the PU partition types of 2N×2N, 2N×N, 2N×nU, 2N×nD, N×2N, nL×2N, nR×2N, and N×N respectively.

Parts (a) to (h) of FIG. 3 illustrate specific positions of the boundaries of PU partitions in CUs for the respective partition types.

Part (a) of FIG. 3 illustrates the PU partition type of 2N×2N in which the CU is not split. Parts (b), (c), and (d) of FIG. 3 illustrate the shape of partitions for the PU partition types of 2N×N, 2N×nU, and 2N×nD, respectively. Parts (e), (f), and (g) of FIG. 3 illustrate the shape of partitions for the PU partition types of N×2N, nL×2N, and nR×2N, respectively. Part (h) of FIG. 3 illustrates the shape of partitions for the PU partition type of N×N.

The PU partition types in parts (a) and (h) of FIG. 3 are also referred to as square partition, which is based on the shapes of the partitions. The PU partition types in parts (b) to (g) of FIG. 3 are also referred to as non-square partition.

In parts (a) to (h) of FIG. 3, numbers assigned to individual regions represent the identification numbers of the regions, and the regions are processed in ascending order of their identification numbers. That is, the identification numbers represent the scan order of the regions.

[Partition Type for Inter Prediction]

Of the eight partition types described above, seven types, other than N×N (part (h) of FIG. 3), are defined for inter PUs. The four asymmetric splittings described above may also be referred to as AMP (Asymmetric Motion Partitions).

The specific value of N is specified by the size of the CU to which the corresponding PU belongs, and the specific values of nU, nD, nL, and nR are determined in accordance with the value of N. For example, an inter CU having 128×128 pixels can be split into an inter PU having 128×128 pixels, or into inter PUs having 128×64 pixels, 64×128 pixels, 64×64 pixels, 128×32 pixels, 128×96 pixels, 32×128 pixels, or 96×128 pixels.

[Partition Type for Intra Prediction]

The following two partition patterns are defined for intra PUs: the partition pattern of 2N×2N in which the target CU is not split, that is, the target CU itself is handled as one PU, and the pattern of N×N in which the target CU is symmetrically split into four PUs.

Thus, referring to the examples illustrated in FIG. 3, an intra PU may have any of the partition patterns in parts (a) and (h).

For example, an intra CU having 128×128 pixels may be split into an intra PU having 128×128 pixels or intra PUs having 64×64 pixels.

(TU Partition Type)

A TU partition type will now be described with reference to FIG. 4. A TU partition pattern is determined by the size of CU, the depth of split (trafoDepth), and the PU partition type of the target PU.

TU partition patterns include square quadtree partitions and non-square quadtree partitions.

Figure 4:
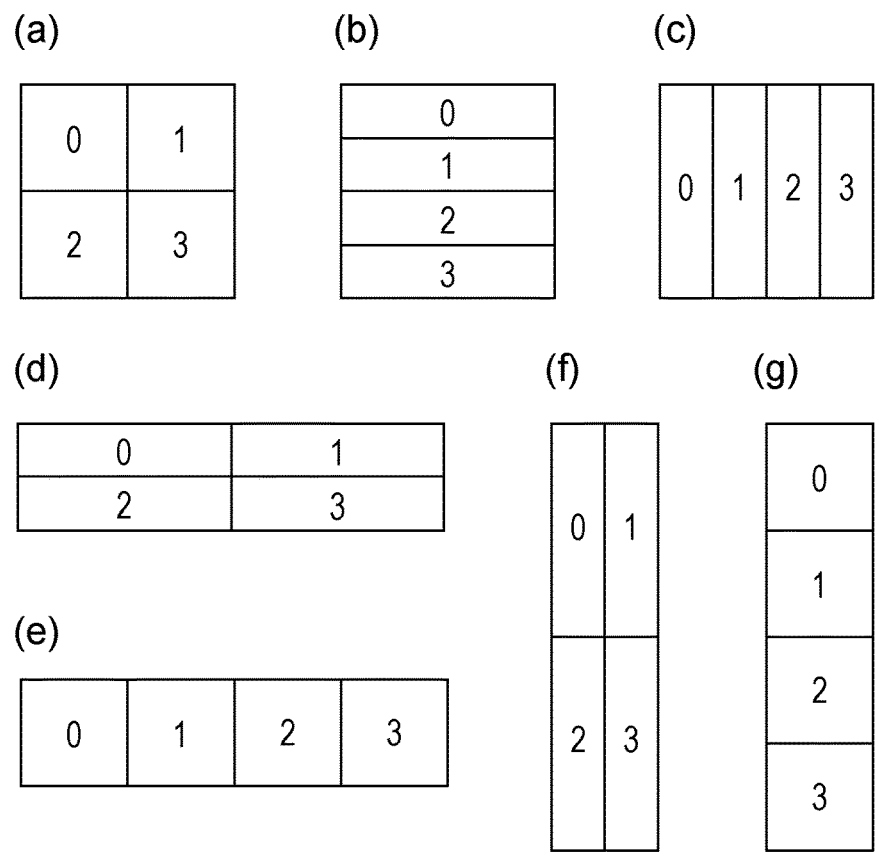
FIG. 4 includes diagrams illustrating partitioning schemes in which a square node is partitioned into square or non-square nodes using quadtree partitioning, in which part (a) illustrates square partitions, part (b) illustrates landscape-oriented rectangular partitions, part (c) illustrates portrait-oriented rectangular partitions, part (d) illustrates landscape-oriented partitions of a landscape-oriented node, part (e) illustrates square partitions of a landscape-oriented node, part (f) illustrates portrait-oriented partitions of a portrait-oriented node, and part (g) illustrates square partitions of a portrait-oriented node.

Parts (a) to (c) of FIG. 4 illustrate partitioning schemes in which a square node is split into square or non-square nodes using quadtree partitioning. More specifically, part (a) of FIG. 4 illustrates a partitioning scheme in which a square node is split into square nodes using quadtree partitioning. Part (b) of FIG. 4 illustrates a partitioning scheme in which a square node is split into landscape-oriented rectangular nodes using quadtree partitioning. Part (c) of FIG. 4 illustrates a partitioning scheme in which a square node is split into portrait-oriented rectangular nodes using quadtree partitioning.

Further, parts (d) to (g) of FIG. 4 illustrate non-partitioning schemes in which a non-square node is split into square or non-square nodes using quadtree partitioning. More specifically, part (d) of FIG. 4 illustrates a partitioning scheme in which a landscape-oriented rectangular node is split into landscape-oriented rectangular nodes using quadtree partitioning. Part (e) of FIG. 4 illustrates a partitioning scheme in which a landscape-oriented rectangular node is split into square nodes using quadtree partitioning. Part (f) of FIG. 4 illustrates a partitioning scheme in which a portrait-oriented rectangular node is split into portrait-oriented rectangular nodes using quadtree partitioning. Part (g) of FIG. 4 illustrates a partitioning scheme in which a portrait-oriented rectangular node is split into square nodes using quadtree partitioning.

(Configuration of Quantized Residual Information QD)

FIG. 5 is a table indicating syntax elements included in quantized residual information QD (denoted by residual_coding_cabac( ) in FIG. 5).

As illustrated in FIG. 5, the quantized residual information QD includes syntax elements last_significant_coeff_x, last_significant_coeff_y, significant_coeff_flag, coeff_abs_level_greater1_flag, coeff_abs_level_greater2_flag, coeff_sign_flag, and coeff_abs_level_minus3.

The syntax elements included in the quantized residual information QD have been encoded using context-based adaptive binary arithmetic coding (CABAC).

In the following, the decoding procedure for the individual syntax elements will be described with reference to FIG. 5 and FIG. 6, taking an example of a block size of 8×8 pixels. In parts (a) to (g) of FIG. 6, the horizontal axis represents horizontal frequencies xC (0≤xC≤7), and the vertical axis represents vertical frequencies yC (0≤yC≤7). In the following description, among the sub-regions included in the frequency region, a sub-region identified by a horizontal frequency xC and a vertical frequency yC is also termed a frequency component (xC, yC). In addition, a transform coefficient for the frequency component (xC, yC) is also denoted by Coeff(xC, yC). The transform coefficient Coeff(0, 0) represents the DC component, and other transform coefficients represent non-DC components. (xC, yC) may be represented herein by (u, v), (uiPosX, uiPosY), or the like.

Figure 6:
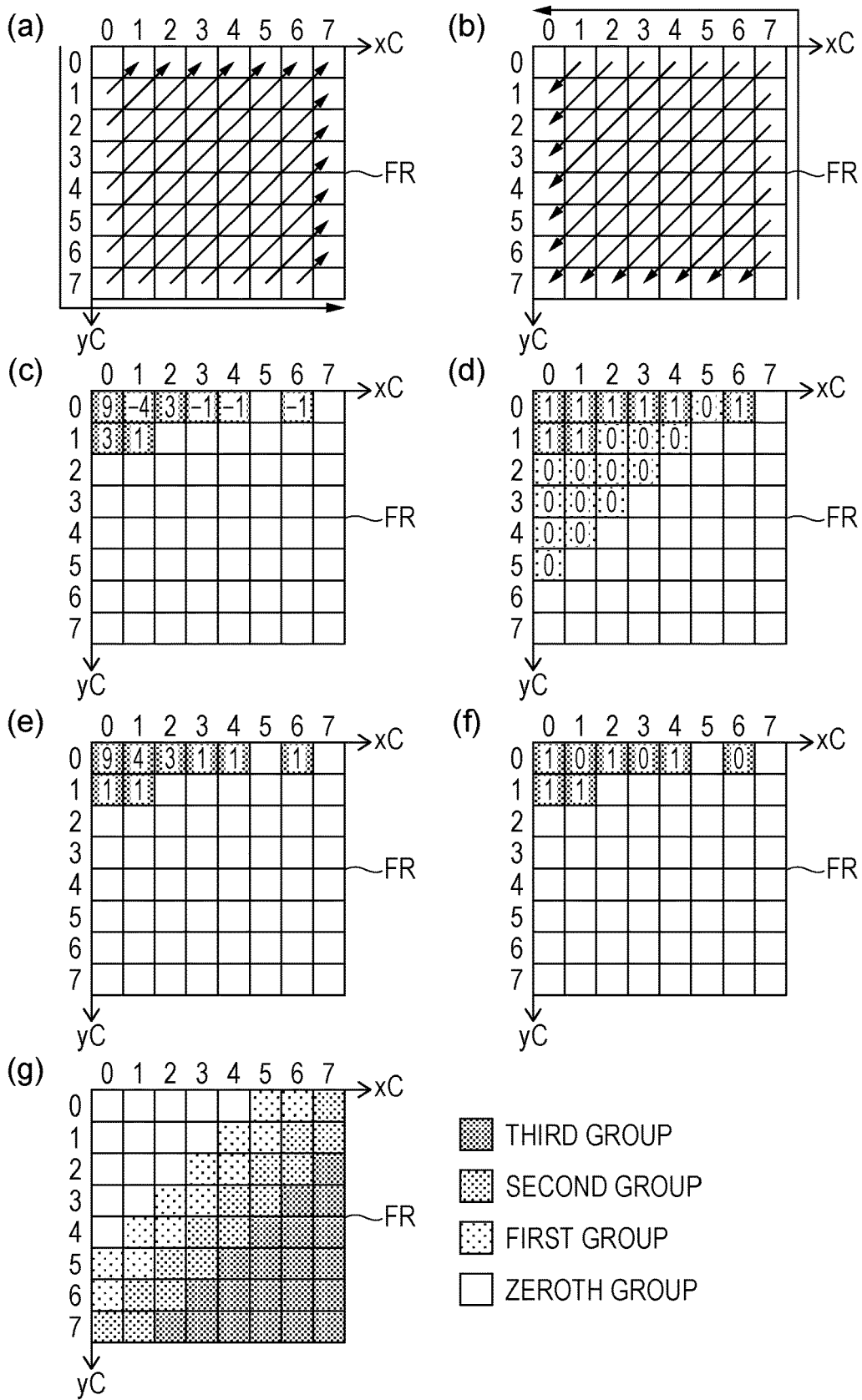
FIG. 6 includes diagrams depicting the operation of the quantized residual information decoder according to the embodiment, in which part (a) illustrates the processing order in the case of a forward scan, part (b) illustrates the processing order in the case of a reverse scan, part (c) exemplifies non-zero transform coefficients in a frequency region for processing, part (d) exemplifies values of the syntax element significant_coeff_flag in the target frequency region, part (e) exemplifies values obtained by decoding syntax elements coeff_abs_level_greater1_flag, coeff_abs_level_greater2_flag, and coeff_abs_level_minus3 in the target frequency region, part (f) exemplifies values of the syntax element coeff_sign_flag in the target frequency region, and part (g) illustrates an example of groups in a frequency region having 8×8 frequency components.

Parts (a) and (b) of FIG. 6 are diagrams illustrating an example of scan order in a frequency region FR including 8×8 frequency components.

In the example illustrated in part (a) of FIG. 6, scanning is sequentially performed from the low-frequency side (upper left in part (a) of FIG. 6) to the high-frequency side (lower right in part (a) of FIG. 6). In the example illustrated in part (a) of FIG. 6, furthermore, scanning is performed in accordance with arrows indicated in the frequency region FR. The scan order illustrated in part (a) of FIG. 6 is also termed a forward scan.

On the other hand, in the example illustrated in part (b) of FIG. 6, scanning is sequentially performed from the high-frequency side (lower right in part (b) of FIG. 6) to the low-frequency side (upper left in part (b) of FIG. 6). In the example illustrated in part (b) of FIG. 6, furthermore, scanning is performed in accordance with arrows indicated in the frequency region FR. The scan order illustrated in part (b) of FIG. 6 is also termed reverse scan.

Part (c) of FIG. 6 is a diagram exemplifying transform coefficients that are not equal to 0 (non-zero transform coefficients) in a frequency region including 8×8 frequency components.

The syntax elements last_significant_coeff_x and last_significant_coeff_y are syntax elements indicating the position of the last non-zero transform coefficient in the forward scan direction. In the example illustrated in part (c) of FIG. 6, last_significant_coeff_x=6 and last_significant_coeff_y=0.

The syntax element significant_coeff_flag is a syntax element indicating the presence or absence of a non-zero transform coefficient for each frequency component in the reverse scan direction with respect to a non-zero transform coefficient as the origin. Part (d) of FIG. 6 illustrates the values of the syntax element significant_coeff_flag when the transform coefficients to be decoded are those illustrated in part (c) of FIG. 6. As illustrated in part (d) of FIG. 6, the syntax element significant_coeff_flag is a flag with 0 if the corresponding transform coefficient is equal to 0 or with 1 if the corresponding transform coefficient is not equal to 0, for each of the xC and yC. The syntax element significant_coeff_flag is also termed a transform coefficient presence/absence flag.

The syntax element coeff_abs_level_greater1_flag is a flag indicating whether or not the absolute value of the corresponding transform coefficient exceeds 1, and is coded for a frequency component with the value of the syntax element significant_coeff_flag being equal to 1. If the absolute value of a transform coefficient exceeds 1, the value of coeff_abs_level_greater1_flag is equal to 1, and, otherwise, the value of coeff_abs_level_greater1_flag is equal to 0.

The syntax element coeff_abs_level_greater2_flag is a flag indicating whether or not the absolute value of the corresponding transform coefficient exceeds 2, and is coded when the value of coeff_abs_level_greater1_flag is equal to 1. If the absolute value of a transform coefficient exceeds 2, the value of coeff_abs_level_greater2_flag is equal to 1, and, otherwise, the value of coeff_abs_level_greater2_flag is equal to 0.

The syntax element coeff_abs_level_minus3 is a syntax element for specifying the absolute value of a transform coefficient when the absolute value of the transform coefficient is greater than or equal to 3, and is coded when the value of coeff_abs_level_greater2_flag is equal to 1. The value of the syntax element coeff_abs_level_minus3 is obtained by subtracting 3 from the absolute value of a transform coefficient. For example, coeff_abs_level_minus3=1 indicates that the absolute value of the transform coefficient is equal to 4.

Part (e) of FIG. 6 illustrates the absolute values of individual transform coefficients obtained by decoding the syntax elements coeff_abs_level_greater1_flag, coeff_abs_level_greater2_flag, and coeff_abs_level_minus3.

The syntax element coeff_sign_flag is a flag indicating the sign (positive or negative) of the corresponding transform coefficient, and is coded for a frequency component with the value of the syntax element significant_coeff_flag being equal to 1.

Part (f) of FIG. 6 is a diagram illustrating the syntax element coeff_sign_flag when the transform coefficients to be decoded are those illustrated in part (c) of FIG. 6. As illustrated in part (f) of FIG. 6, the syntax element coeff_sign_flag is a flag with 1 for a positive transform coefficient and with 0 for a negative transform coefficient.

A variable-length code decoder 11 included in the video decoding device 1 can generate a transform coefficient Coeff(xC, yC) for each frequency component by decoding the syntax elements last_significant_coeff_x, last_significant_coeff_y, significant_coeff_flag, coeff_abs_level_greater1_flag, coeff_abs_level_greater2_flag, coeff_sign_flag, and coeff_abs_level_minus3.

A set of non-zero transform coefficients in a specific region (for example, a TU) is also termed a significance map.

Furthermore, the syntax elements coeff_abs_level_greater1_flag, coeff_abs_level_greater2_flag, coeff_sign_flag, and coeff_abs_level_minus3 are decoded for each group after the frequency components in the frequency region are grouped into one or a plurality of groups. Part (g) of FIG. 6 illustrates an example of groups in a frequency region having 8×8 frequency components. The details of the decoding process for various syntax elements will be described below. A description will now be given of a configuration of the video decoding device 1.

(Video Decoding Device 1)

The video decoding device 1 according to this embodiment will be described hereinafter with reference to FIG. 1 and FIG. 7 to FIG. 25. The video decoding device 1 is a decoding device implementing the technologies adopted in the H.264/MPEG-4 AVC standard, the technologies adopted in KTA software, which is a codec for joint development in VCEG (Video Coding Expert Group), the technologies adopted in TMuC (Test Model under Consideration) software, and the technologies proposed in HEVC (High-Efficiency Video Coding), which is a successor codec to H.264/MPEG-4 AVC.

Figure 7:
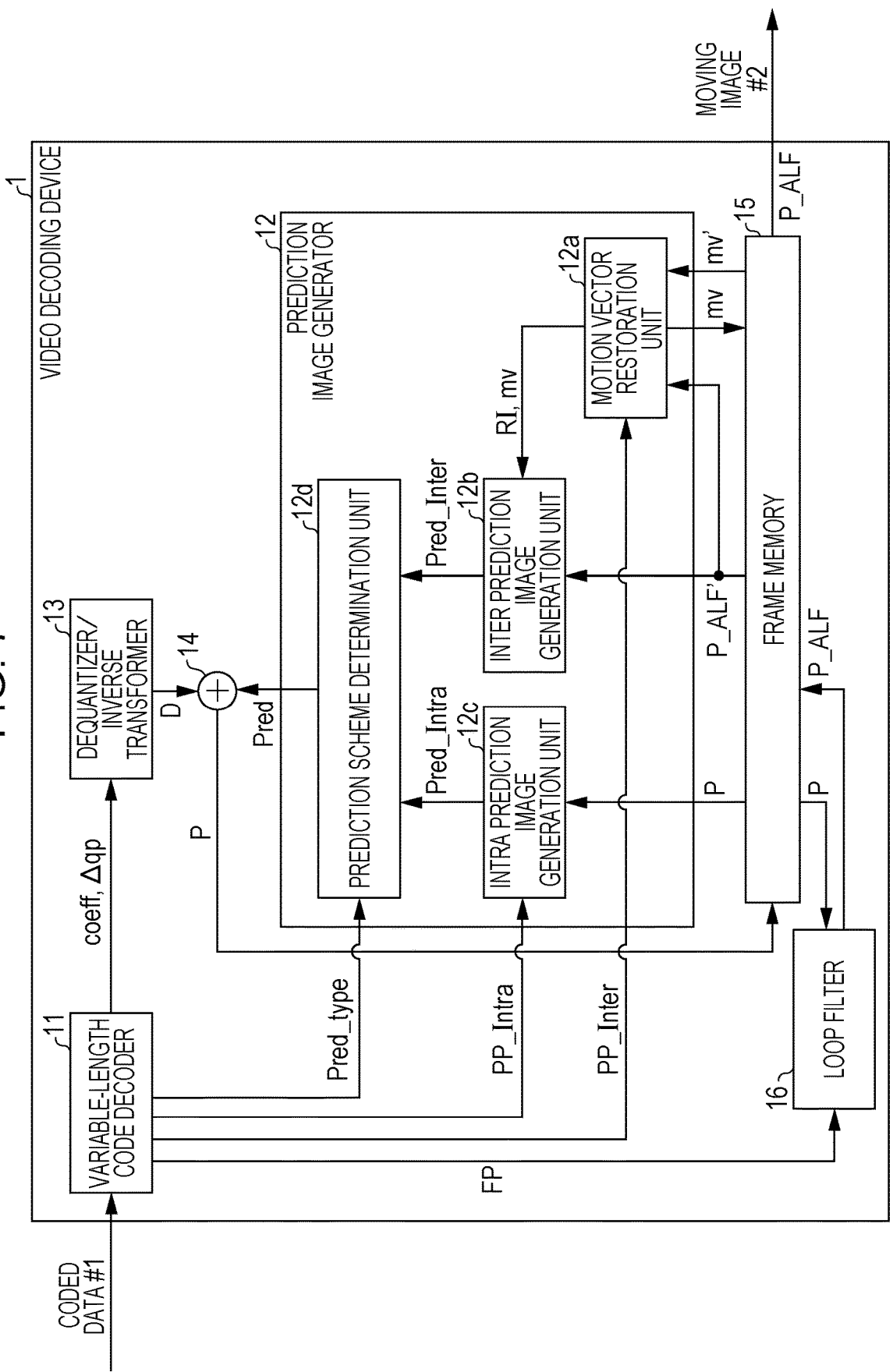
FIG. 7 is a block diagram illustrating a configuration of the video decoding device according to the embodiment.

FIG. 7 is a block diagram illustrating a configuration of the video decoding device 1. As illustrated in FIG. 7, the video decoding device 1 includes a variable-length code decoder 11, a prediction image generator 12, a dequantizer/inverse transformer 13, an adder 14, a frame memory 15, and a loop filter 16. As illustrated in FIG. 7, the prediction image generator 12 includes a motion vector restoration unit 12a, an inter prediction image generation unit 12b, an intra prediction image generation unit 12c, and a prediction scheme determination unit 12d. The video decoding device 1 is an apparatus for decoding coded data #1 to generate a moving image #2.

(Variable-Length Code Decoder 11)

Figure 8:
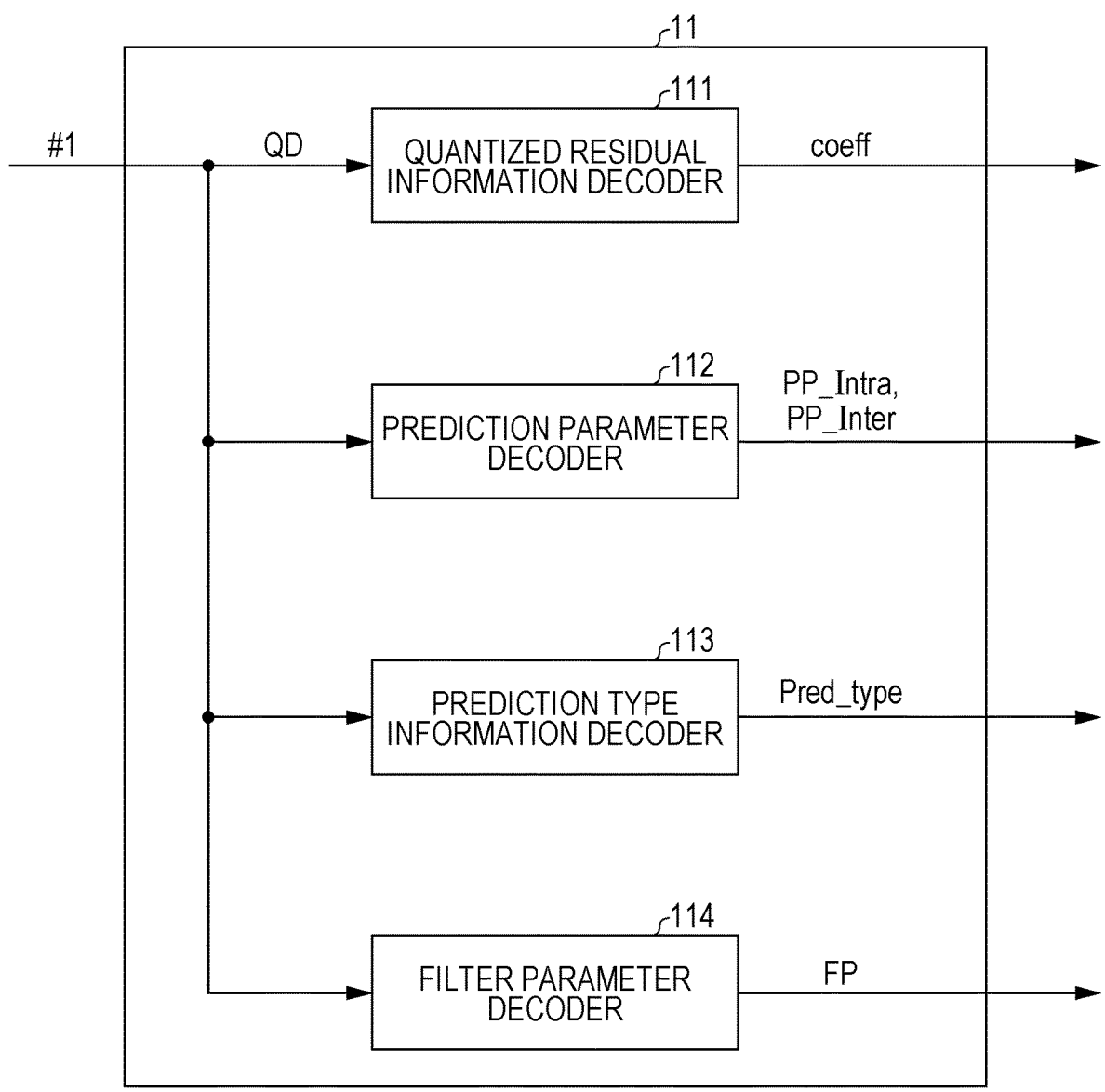
FIG. 8 is a block diagram illustrating a configuration of a variable-length code decoder included in the video decoding device according to the embodiment.

FIG. 8 is a block diagram illustrating a main configuration of the variable-length code decoder 11. As illustrated in FIG. 8, the variable-length code decoder 11 includes a quantized residual information decoder 111, a prediction parameter decoder 112, a prediction type information decoder 113, and a filter parameter decoder 114.

The variable-length code decoder 11 decodes, by the prediction parameter decoder 112, prediction parameters PP for each partition from the coded data #1, and supplies the prediction parameters PP to the prediction image generator 12. Specifically, the prediction parameter decoder 112 decodes an inter prediction parameter PP_Inter for inter prediction partitions, which includes a reference image index, a motion vector predictor index, and a motion vector difference, from the coded data #1, and supplies them to the motion vector restoration unit 12a. For intra prediction partitions, on the other hand, the prediction parameter decoder 112 decodes an intra prediction parameter PP_Intra, which includes an estimated prediction mode flag, an estimated prediction mode index, and a remaining prediction mode index, from the coded data #1, and supplies them to the intra prediction image generation unit 12c.

The variable-length code decoder 11 further decodes, by the prediction type information decoder 113, prediction type information Pred_type for each partition from the coded data #1, and supplies it to the prediction scheme determination unit 12d. Furthermore, the variable-length code decoder 11 decodes, by the quantized residual information decoder 111, quantized residual information QD concerning a block and a quantization parameter difference Δqp concerning a TU including the block from the coded data #1, and supplies them to the dequantizer/inverse transformer 13. Furthermore, the variable-length code decoder 11 decodes, by the filter parameter decoder 114, a filter parameter FP from the coded data #1, and supplies it to the loop filter 16. A specific configuration of the quantized residual information decoder 111 will be described below, and is not described here.

(Prediction Image Generator 12)

The prediction image generator 12 identifies, based on the prediction type information Pred_type for each individual partition, whether the individual partition is an inter prediction partition to be inter-predicted or an intra prediction partition to be intra-predicted. In the former case, the prediction image generator 12 generates an inter prediction image Pred_Inter, and supplies the generated inter prediction image Pred_Inter to the adder 14 as a prediction image Pred. In the latter case, the prediction image generator 12 generates an intra prediction image Pred_Intra, and supplies the generated intra prediction image Pred_Intra to the adder 14. If a skip mode is applied to the PU to be processed, the prediction image generator 12 does not decode other parameters for this PU.

(Motion Vector Restoration Unit 12a)

The motion vector restoration unit 12a restores a motion vector mv for each individual inter prediction partition from a motion vector difference for the individual partition and a previously restored motion vector mv' for another partition. Specifically, a motion vector mv is obtained by (1) deriving an estimated motion vector from the previously restored motion vector mv' in accordance with an estimation method specified by the motion vector predictor index, and (2) adding the derived estimated motion vector and the motion vector difference. The previously restored motion vector mv' for the other partition can be read from the frame memory 15. The motion vector restoration unit 12a supplies the currently restored motion vector mv to the inter prediction image generation unit 12b together with the associated reference image index RI.

(Inter Prediction Image Generation Unit 12b)

The inter prediction image generation unit 12b generates a motion-compensated image mc for each inter prediction partition using inter-frame prediction. Specifically, the inter prediction image generation unit 12b generates a motion-compensated image mc from an adaptively filtered decoded image P_ALF' specified by the reference image index RI supplied from the motion vector restoration unit 12a using the motion vector mv also supplied from the motion vector restoration unit 12a. The adaptively filtered decoded image P_ALF' is an image obtained by performing a filter process using the loop filter 16 on a decoded image in which the decoding of an entire frame has completed. The inter prediction image generation unit 12b can read the pixel values of pixels constituting the adaptively filtered decoded image P_ALF' from the frame memory 15. The motion-compensated image mc generated by the inter prediction image generation unit 12b is supplied to the prediction scheme determination unit 12d as an inter prediction image Pred_Inter.

(Intra Prediction Image Generation Unit 12c)

The intra prediction image generation unit 12c generates a prediction image Pred_Intra for each intra prediction partition. Specifically, first, the intra prediction image generation unit 12c identifies a prediction mode on the basis of the intra prediction parameter PP_Intra supplied from the variable-length code decoder 11, and allocates the identified prediction mode to target partitions in, for example, raster scan order.

The prediction mode may be identified on the basis of the intra prediction parameter PP_Intra in the following way: (1) An estimated prediction mode flag is decoded and, if the estimated prediction mode flag indicates that the prediction mode for the target partition to be processed is identical to a prediction mode allocated to a neighbouring partition of the target partition, the prediction mode allocated to the neighbouring partition of the target partition is allocated to the target partition. (2) On the other hand, if the estimated prediction mode flag indicates that the prediction mode for the target partition to be processed is not identical to a prediction mode allocated to a neighbouring partition of the target partition, the remaining prediction mode index is decoded and the prediction mode indicated by the remaining prediction mode index is allocated to the target partition.

The intra prediction image generation unit 12c generates a prediction image Pred_Intra from a (locally) decoded image P using intra-frame prediction in accordance with the prediction method indicated by the prediction mode allocated to the target partition. The intra prediction image Pred_Intra generated by the intra prediction image generation unit 12c is supplied to the prediction scheme determination unit 12d. The intra prediction image generation unit 12c may also be configured to generate a prediction image Pred_Intra from the adaptively filtered decoded image P_ALF using intra-frame prediction.

(Prediction Scheme Determination Unit 12d)

The prediction scheme determination unit 12d determines, based on the prediction type information Pred_type for the PU to which each individual partition belongs, whether the individual partition is an inter prediction partition to be inter-predicted or an intra prediction partition to be intra-predicted. In the former case, the inter prediction image Pred_Inter generated by the inter prediction image generation unit 12b is supplied to the adder 14 as a prediction image Pred. In the latter case, the intra prediction image Pred_Intra generated by the intra prediction image generation unit 12c is supplied to the adder 14 as a prediction image Pred.

(Dequantizer/Inverse Transformer 13)

The dequantizer/inverse transformer 13 (1) dequantizes a transform coefficient Coeff decoded from the quantized residual information QD in the coded data #1, (2) performs an inverse frequency transform such as an inverse DCT (Discrete Cosine Transform) transform on a transform coefficient Coeff_IQ obtained by dequantization, and (3) supplies a prediction residual D obtained by the inverse frequency transform to the adder 14. When dequantizing the transform coefficient Coeff decoded from the quantized residual information QD, the dequantizer/inverse transformer 13 derives a quantization step QP from the quantization parameter difference $\Delta_{qp}$ supplied from the variable-length code decoder 11. The quantization parameter qp can be derived by the addition of a quantization parameter difference $\Delta_{qp}$ to a quantization parameter qp' for the immediately preceding dequantized and inverse frequency transformed TU, and the quantization step QP can be derived from the quantization step qp using, for example, $QP=2^{pq/6}$. The dequantizer/inverse transformer 13 generates prediction residuals D in units of a TU or in units of a block obtained by subdivision of a TU.

The inverse DCT transform performed by the dequantizer/inverse transformer 13 is given by, for example, mathematical expression (1) below if, for example, the size of the target block is 8×8 pixels, given that a pixel in the target block is located at a position (i, j) (0≤i≤7, 0≤j≤7), the value of the prediction residual D at the position (i, j) is represented by D(i, j), and the dequantized transform coefficient in the frequency component (u, v) (0≤u≤7, 0≤v≤7) is represented by Coeff_IQ(u, v).

[Math. 1]

$$D(i,\,j) = \frac{1}{4}\sum_{u=0}^{7}\sum_{v=0}^{7} C(u)C(v)\text{Coeff\_IQ}(u,\,v)\cos\left\{\frac{(2i+1)u\pi}{16}\right\}\cos\left\{\frac{(2j+1)v\pi}{16}\right\} \quad (1)$$

Here, (u, v) is a variable corresponding to (xC, yC) described above. C(u) and C(v) are given as follows.

| | |
|---|---|
| C(u) = 1/√2 | (u = 0) |
| C(u) = 1 | (u ≠ 0) |
| C(v) = 1/√2 | (v = 0) |
| C(v) = 1 | (v ≠ 0) |

(Adder 14)

The adder 14 adds together the prediction image Pred supplied from the prediction image generator 12 and the prediction residual D supplied from the dequantizer/inverse transformer 13 to generate a decoded image P. The generated decoded image P is stored in the frame memory 15.

(Loop Filter 16)

The loop filter 16 has (1) a function of a deblocking filter (DF) for smoothing block boundaries in the decoded image P or images around partition boundaries (deblocking process), and (2) a function of an adaptive filter (ALF: Adaptive Loop Filter) for performing an adaptive filter process on an image to which the deblocking filter is applied, using a filter parameter FP.

(Quantized Residual Information Decoder 111)

The quantized residual information decoder 111 has a configuration for decoding a transform coefficient Coeff (uiPosX, uiPosY) that is quantized for each frequency component (uiPosX, uiPosY) from the quantized residual information QD included in the coded data #1. Here, uiPosX and uiPosY are indices indicating the position of each frequency component in a frequency region, and are indices corresponding to the horizontal frequency u and vertical frequency v described above, respectively. In addition, the various syntax elements included in the quantized residual information QD have been coded using context-based adaptive binary arithmetic coding (CABAC). In the following, the quantized transform coefficient Coeff may also be simply called the transform coefficient Coeff.

Figure 1:
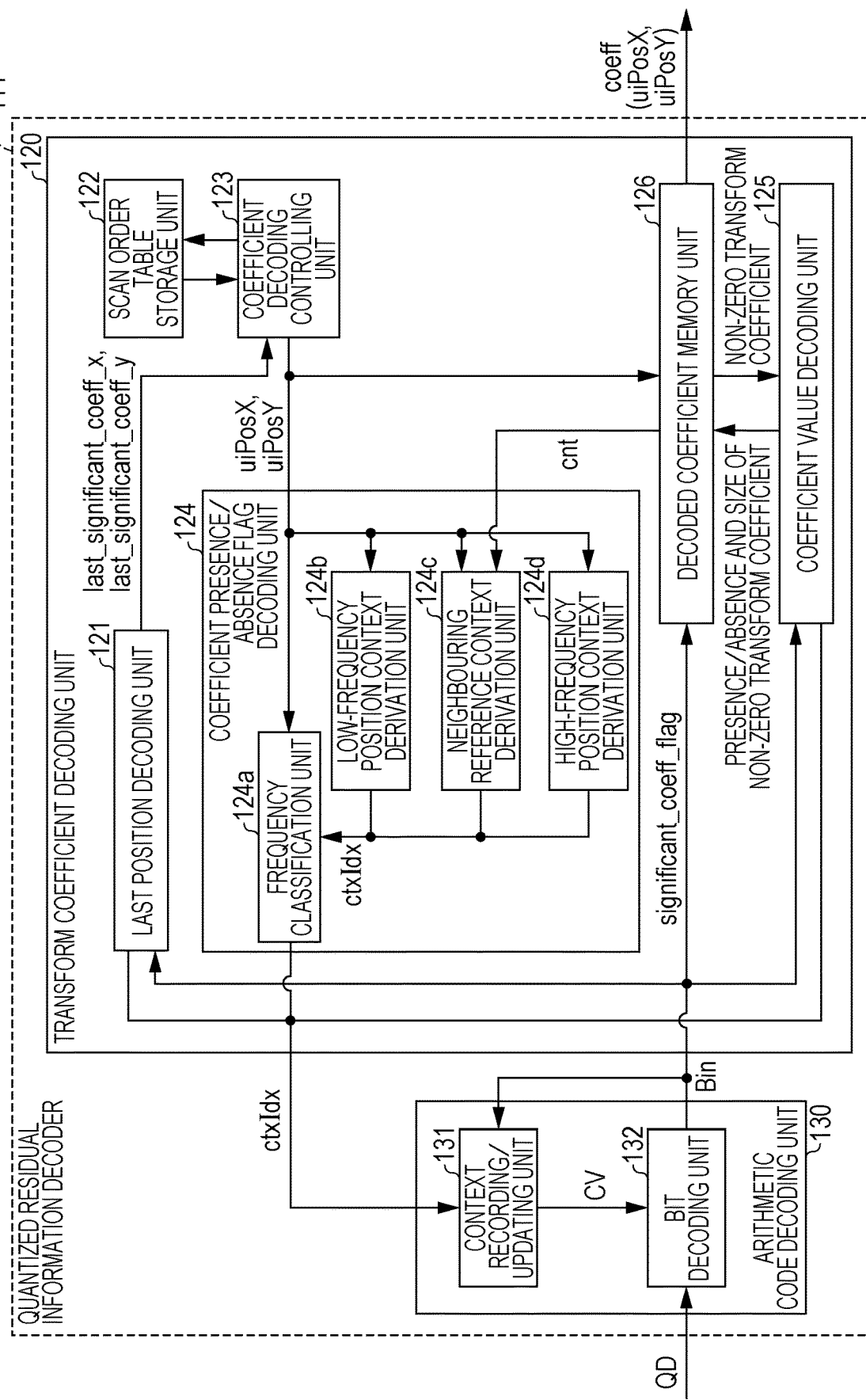
FIG. 1 is a block diagram illustrating a configuration of a quantized residual information decoder included in a video decoding device according to the embodiment of the present invention.

FIG. 1 is a block diagram illustrating a configuration of the quantized residual information decoder 111. As illustrated in FIG. 1, the quantized residual information decoder 111 includes a transform coefficient decoding unit 120 and an arithmetic code decoding unit 130.

(Arithmetic Code Decoding Unit 130)

The arithmetic code decoding unit 130 has a configuration for decoding each bit included in the quantized residual information QD by referring to a context. As illustrated in FIG. 1, the arithmetic code decoding unit 130 includes a context recording/updating unit 131 and a bit decoding unit 132.

(Context Recording/Updating Unit 131)

The context recording/updating unit 131 has a configuration for recording and updating a context variable CV managed by each context index ctxIdx. The context variable CV includes (1) a most probable symbol MPS that occurs with high probability, and (2) a probability state index pStateIdx that specifies the probability of occurrence of the most probable symbol MPS.

The context recording/updating unit 131 refers to the context index ctxIdx supplied from each unit included in the transform coefficient decoding unit 120 and the value of a bin decoded by the bit decoding unit 132 to update the context variable CV, and records the updated context variable CV until the next time the context variable CV is updated. The most probable symbol MPS is equal to 0 or 1. The most probable symbol MPS and the probability state index pStateIdx are updated each time the bit decoding unit 132 decodes one bin.

The context index ctxIdx may directly specify a context for each frequency component, or may be an increment value from the offset of a context index that is set for each TU to be processed (this similarly applies hereinafter).

In CABAC decoding, a decoding process called bypass decoding may be used in addition to the process described above. In bypass mode, the context variable CV is not used, and decoding is performed with the assumption of a probability of 0.5. In this case, the update of the state of the context variable CV is not necessary, resulting in a reduction in a delay caused by the update of a context. Whether or not to use bypass mode may be determined such that the bypass mode is enabled when ctxIdx is negative and the non-bypass mode in which CV is selected in accordance with ctxIdx is enabled when ctxIdx is non-negative. A code decoded in bypass mode is also called a CABAC arithmetic code that does not use a context. Bypass coding may also be referred to as EP coding (equal probability coding).

(Bit Decoding Unit 132)

The bit decoding unit 132 refers to the context variable CV recorded on the context recording/updating unit 131, and decodes each bit (also referred to as bin) included in the quantized residual information QD. The value of a bin obtained by decoding is supplied to each unit included in the transform coefficient decoding unit 120. The value of the bin obtained by decoding is also supplied to the context recording/updating unit 131, and is referred to in order to update the context variable CV.

In general, a bit decoding unit performs a decoding process on a bit-by-bit basis in accordance with the state of the context variable CV. In bypass mode, however, simultaneous decoding of a plurality of bits is possible. The bypass mode, which enables decoding of a plurality of bits in one cycle, can significantly improve throughput.

(Transform Coefficient Decoding Unit 120)

As illustrated in FIG. 1, the transform coefficient decoding unit 120 includes a last position decoding unit 121, a scan order table storage unit 122, a coefficient decoding control unit 123, a coefficient presence/absence flag decoding unit, a coefficient value decoding unit 125, and a decoded coefficient memory unit 126.

(Last Position Decoding Unit 121)

The last position decoding unit 121 interprets a decoded bit (bin) supplied from the bit decoding unit 132, and decodes the syntax elements last_significant_coeff_x and last_significant_coeff_y. The decoded syntax elements last_significant_coeff_x and last_significant_coeff_y are supplied to the coefficient decoding control unit 123. The context index ctxIdx used for the decoding of the syntax elements last_significant_coeff_x and last_significant_coeff_y is supplied to the context recording/updating unit 131.

(Scan Order Table Storage Unit 122)

The scan order table storage unit 122 stores a table that provides the position of the frequency component to be processed in the frequency region using the size of the TU to be processed, a scan index indicating a type of scan direction, and a frequency component identification index assigned in scan order as arguments.

Examples of the scan order table include ScanOrder illustrated in FIG. 5. In the ScanOrder illustrated in FIG. 5, log 2TrafoSize−2 represents the size of the TU to be processed, scanIdx represents a scan index, and n represents a frequency component identification index assigned in scan order. In FIG. 5, furthermore, xC and yC represent the position of the frequency component to be processed in the frequency region.

(Coefficient Decoding Control Unit 123)

The coefficient decoding control unit 123 has a configuration for controlling the order of the decoding process in each unit included in the quantized residual information decoder 111. The coefficient decoding control unit 123 refers to the syntax elements last_significant_coeff_x and last_significant_coeff_y supplied from the last position decoding unit 121 to identify the position of the last non-zero transform coefficient in a forward scan, and supplies the position (uiPosX, uiPosY) of the individual frequency components to the coefficient presence/absence flag decoding unit in scan order that starts with the identified position of the last non-zero transform coefficient as the origin and that is reverse scan order to the scan order provided in the scan order table stored in the scan order table storage unit 122.

The coefficient decoding control unit 123 further supplies sz, which is a parameter indicating the size of the TU to be processed, that is, the size of the target frequency region, to each unit included in the transform coefficient decoding unit 120 (not illustrated in the drawing). Here, specifically, sz is a parameter indicating the number of pixels in one side of the TU to be processed, that is, the number of frequency components in one side of the target frequency region.

The coefficient decoding control unit 123 may be configured to supply the position (uiPosX, uiPosY) of the individual frequency components to the coefficient presence/absence flag decoding unit in forward scan order that is the scan order provided in the scan order table stored in the scan order table storage unit 122.

(Coefficient Value Decoding Unit 125)

The coefficient value decoding unit 125 interprets each bin supplied from the bit decoding unit 132, and decodes the syntax elements coeff_abs_level_greater1_flag, coeff_abs_level_greater2_flag, coeff_sign_flag, and coeff_abs_level_minus3. In addition, the coefficient value decoding unit 125 derives the value of a transform coefficient (more specifically, a non-zero transform coefficient) for the frequency component to be processed on the basis of the results of decoding these syntax elements. The context index ctxIdx used for the decoding of the various syntax elements is supplied to the context recording/updating unit 131. The derived value of the transform coefficient is stored in the decoded coefficient memory unit 126.

(Decoded Coefficient Memory Unit 126)

The decoded coefficient memory unit 126 has a configuration for storing the values of transform coefficients decoded by the coefficient value decoding unit 125. The decoded coefficient memory unit 126 also stores the values of the syntax element significant_coeff_flag decoded by the coefficient presence/absence flag decoding unit. The values of the transform coefficients stored in the decoded coefficient memory unit 126 are supplied to the dequantizer/inverse transformer 13.

(Coefficient Presence/Absence Flag Decoding Unit)

The coefficient presence/absence flag decoding unit according to this embodiment has a configuration for classifying a frequency region into one or a plurality of sub-regions in accordance with the magnitude of the frequency, deriving a context index ctxIdx using a derivation method determined for each sub-region, and decoding the syntax element significant_coeff_flag indicating the presence or absence of a non-zero transform coefficient using the derived context index ctxIdx.

First Example Configuration of Coefficient Presence/Absence Flag Decoding Unit

FIG. 1 illustrates a coefficient presence/absence flag decoding unit 124 serving as a first example configuration of the coefficient presence/absence flag decoding unit according to this embodiment.

As illustrated in FIG. 1, the coefficient presence/absence flag decoding unit 124 according to this example configuration includes a frequency classification unit 124a, a low-frequency position context derivation unit 124b, a neighbouring reference context derivation unit 124c, and a high-frequency position context derivation unit 124d.

(Frequency Classification Unit 124a)

The frequency classification unit 124a has a configuration for classifying the frequency component to be decoded into any of a plurality of sub-regions in accordance with the position of the frequency component in the frequency region, and for allocating the context index ctxIdx derived by any of the low-frequency position context derivation unit 124b, the neighbouring reference context derivation unit 124c, and the high-frequency position context derivation unit 124d to the frequency component to be decoded.

The frequency classification unit 124a according to this example configuration refers to the position (uiPosX, uiPosY) at which each individual frequency component included in the frequency region is located in the frequency region, and classifies the individual frequency component into a plurality of sub-regions R0 to R3. It is assumed here that uiPosX=0, 1, . . . , sz−1 and uiPosY=0, 1, . . . , sz−1 (where sz represents, as described above, the number of pixels in one side of the TU to be processed, that is, the number of frequency components in one side of the target frequency region; for example, sz=16, 32, etc.).

More specifically, the frequency classification unit 124a performs the following classification process:

Classifying a frequency component satisfying uiPosX+uiPosY<2 into the sub-region R0.

Classifying a frequency component satisfying 2≤uiPosX+uiPosY<TH1 into the sub-region R1.

Classifying a frequency component satisfying TH1≤uiPosX+uiPosY<TH2 into the sub-region R2.

Classifying a frequency component satisfying TH2≤uiPosX+uiPosY into the sub-region R3.

Here, TH1 and TH2 represent threshold values satisfying TH1<TH2. Specific values may be such that, for example, TH1=5 and TH2=14 regardless of the frequency region size (the size of the TU to be processed). The values may also be such that TH1=5 and TH2=14 when the frequency region size is 16×16, and TH1=5 and TH2=30 when the frequency region size is 32×32. In this manner, different threshold values may be used in accordance with the frequency region size.

Figure 9:
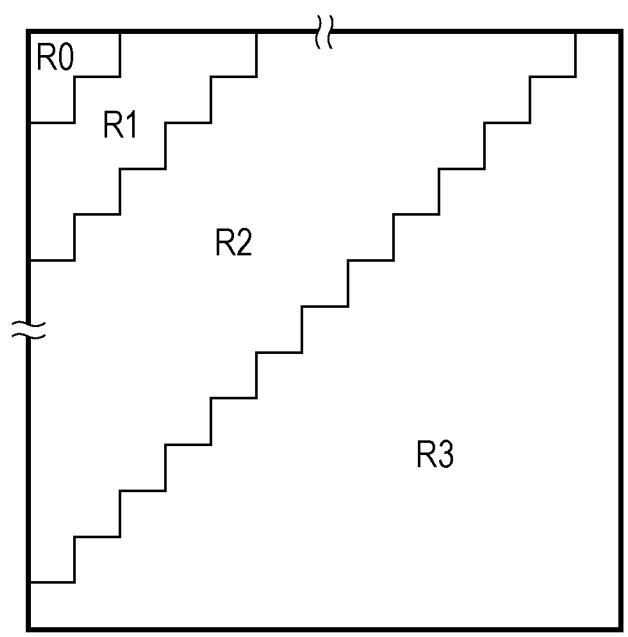
FIG. 9 is a diagram illustrating a frequency region divided into four sub-regions by a frequency classification unit according to the embodiment.

FIG. 9 illustrates an example of a frequency region that is divided into sub-regions R0, R1, R2, and R3 using a classification process by the frequency classification unit 124a according to this example configuration.

Furthermore, the frequency classification unit 124a allocates the context index derived by the low-frequency position context derivation unit 124b to the frequency components included in the sub-region R0, allocates the context index derived by the neighbouring reference context derivation unit 124c to the frequency components included in the sub-regions R1 and R2, and allocates the context index derived by the high-frequency position context derivation unit 124d to the frequency components included in the sub-region R3.

Preferably, the value of TH2 is set to be less than or equal to sz−2 because, as described below, the neighbouring reference context derivation unit 124c may omit the determination of whether or not it is possible to refer to a neighbouring frequency component of the target frequency component. In other words, preferably, a neighbouring reference context is used for frequency components for which all the reference pixels used for the derivation of the neighbouring reference context are within the TU to be processed, and a position context is used for the other frequency components.

The value of TH2 is preferably set to be equal to sz−2 when neighbouring frequency components also include a component at a position that is spaced apart by 2 with respect to the target position. As described below in the description of the calculation method for a limited reference count, if a component at a position that is spaced apart by 1 from the target position is used as a neighbouring frequency component, the value of TH2 may be set to be equal to sz−1.

According to the inventors' experiment, the value of TH2 is preferably set to be greater than or equal to sz in the case of a position context, which will be described in Embodiment 1, in order to achieve high coding efficiency.

According to the inventors' experiment, furthermore, in the case of a neighbouring reference context that utilizes a limited reference count described below in embodiment 3, the value of TH2 can be and is preferably set to be less than or equal to sz−2. In the case of sz−2, TH2 may be determined using a method using sz−2 or may also be determined by the multiply-accumulate operation, such as sz×7>>3.

The values of the threshold values may be determined by the reference to a table determined for each sz. For example, the value of the logarithm log 2(sz) of the size is 4 when the frequency region size is 16×16, and is 5 when the frequency region size is 32×32. The constant TH2 can be calculated by referring to the table tableTH2[ ] below with the value of the logarithm of the size.

tableTH2[ ]={0,0,0,0,14,30}

TH2=table[log 2($sz$)]

If the threshold values are determined by computation using the sz size, the table can be deleted. For example, the threshold values are desirably determined by a computation method using the difference or sum of the size and a predetermined constant, such as TH2=sz−2, or by a method using the product and division of the size and the constant or using shifting, such as TH2=sz×⅞ or TH2=sz×7>>3.

In the foregoing description, the frequency classification unit 124a refers to (uiPosX, uiPosY) as the position of the target frequency component. However, this embodiment is not limited to this. For example, a frequency component identification index assigned in forward scan order or reverse scan order (for example, "n" in FIG. 5) may be referenced as the position of the target frequency component, and the target frequency component may be classified into any of a plurality of sub-regions.

Furthermore, the frequency classification unit 124a calculates a context index ctxIdx for determining a context to be used to decode the syntax element significant_coeff_flag using the arithmetic code decoding unit 130. The context index ctxIdx is calculated for each frequency region size and for each frequency component to be decoded. The decoded syntax element significant_coeff_flag is stored in the decoded coefficient memory unit 126, and is referenced by the coefficient value decoding unit 125. The context index ctxIdx, which has been used for decoding, is supplied to the context recording/updating unit 131.

(Low-Frequency Position Context Derivation Unit 124b)

The low-frequency position context derivation unit 124b has a configuration for deriving a context index ctxIdx for the frequency component to be decoded, on the basis of the position of the frequency component in the frequency region if the frequency component is included in a low-frequency-side sub-region. The context derived or to be derived on the basis of the position of the target frequency component is also termed herein a "position context". The position context is such that a context for a coefficient presence/absence flag at the position of a given transform coefficient is determined regardless of the value of a previously decoded coefficient presence/absence flag, achieving the advantage of providing parallel execution of the derivation of contexts for coefficient presence/absence flags and the decoding of coefficient presence/absence flags.

The low-frequency position context derivation unit 124b according to this example configuration derives a context index ctxIdx for the frequency components included in the sub-region R0 using the expression below, and supplies the derived context index ctxIdx to the frequency classification unit 124a.

ctxIdx=$NX$+2×$ui$PosX+$ui$PosY

NX represents a constant indicating the starting point of the context index. If the frequency region size is 4×4 and 8×8 and the numbers of contexts used therefor are N4 and N8, respectively, the starting point for frequency region sizes of 16×16 and 32×32 is given by NX=N4+N8.

The context index of the position context derivation unit may be a fixed value. That is, one context may be allocated to the positions of all the frequency components included in a sub-region that is allocated a position context. For example, the following allocation method may be used.

ctxIdx=NX

The fixed value (the starting point NX) may be selected in accordance with the color component and the frequency region size.

Also in other configurations which will be described below, the term position context derivation unit is used to also include a context derivation unit configured to derive a context index as a fixed value. In actuality, a method in which sub-regions are classified in accordance with the positions of transform coefficients and then a fixed value is assigned to a context index for a given sub-region is equivalent to the allocation of a context according to the position. Such a context can be a position context in this sense.

(Neighbouring Reference Context Derivation Unit 124c)

The neighbouring reference context derivation unit 124c has a configuration for deriving a context index ctxIdx for the frequency component to be decoded, on the basis of the number of decoded non-zero transform coefficients for neighbouring frequency components of the frequency component to be decoded. The context derived or to be derived with reference to a decoded non-zero transform coefficient for a neighbouring frequency component of the target frequency component is also termed herein a "neighbouring reference context".

The neighbouring reference context derivation unit 124c according to this example configuration derives a context index ctxIdx for the frequency components included in the sub-region R1 using the expression below, and supplies the derived context index ctxIdx to the frequency classification unit 124a.

ctxIdx=NX+3+min(4,cnt)

Here, the count cnt is clipped at a fixed value (here, 4), thereby achieving a many-to-one transformation process.

Here, the starting point of the context index for the sub-region R1 is NX+3 for the following reason. Since the range of the values of the offset 2×uiPosX+uiPosY from the starting point of the sub-region R1 is 0, 1, and 2, NX, NX+1, and NX+2 are used in the sub-region R1. Accordingly, the starting point of R1 is determined so that the contexts for R1 and R0 do not overlap. In the following, the starting point of the sub-region RN+1 is set to be equal to the maximum value of the starting point of the sub-region RN and a threshold value of the offset of the sub-region RN plus 1, unless otherwise stated. This can prevent contexts for two sub-regions from overlapping.

The neighbouring reference context derivation unit 124c according to this example configuration further derives a context index ctxIdx for the frequency components included in the sub-region R2, using the expression below, and supplies the derived context index ctxIdx to the frequency classification unit 124a.

ctxIdx=NX+8+min(4,cnt), where min(A, B) is a function that takes the smallest value out of A and B. That is, if A<B, min(A, B)=A. cnt represents the number (count) of non-zero transform coefficients decoded for neighbouring frequency components of the target frequency component. Part (a) of FIG. 10 illustrates a target frequency component x in a case where the processing order is reverse scan order, and reference frequency components c1 to c5 that are frequency components included in a reference region RR set near the position of the target frequency component x. As illustrated in part (a) of FIG. 10, if the values of transform coefficients decoded for the respective reference frequency components are represented by c1 to c5, cnt for the target frequency component x can be derived using, for example, the following expression:

cnt=($c_1$!=0)+($c_2$!=0)+($c_3$!=0)+($c_4$!=0)+($c_5$!=0)

Each term takes 1 if the argument in parentheses is true and takes 0 if the argument in parentheses is false.

Part (b) of FIG. 10 illustrates a target frequency component x in a case where the processing order is forward scan order, and reference frequency components c1 to c5 that are frequency components included in a reference region RR set near the position of the target frequency component x. The expression used to calculate cnt is similar to that described above. As illustrated in part (b) of FIG. 10, the position of the reference frequency components in the case of forward scan can be obtained by the position of each of the reference frequency components in the case of reverse scan being inverted in the X-axis direction and the Y-axis direction with respect to the target frequency component x.

As illustrated in part (c) of FIG. 10, if any of the reference frequency components lies outside the frequency region, that is, part of the reference region extends outside the target frequency region, a frequency component that lies outside the target frequency region is determined not to be referable, and the value of the transform coefficient for the frequency component is handled to be equal to 0. That is, in the example illustrated in part (c) of FIG. 10, $c_2$=0.

(High-Frequency Position Context Derivation Unit 124d)

The high-frequency position context derivation unit 124d has a configuration for deriving a context index ctxIdx for the frequency component to be decoded, on the basis of the position of the frequency component in the frequency region if the frequency component is included in a high-frequency-side sub-region.

The high-frequency position context derivation unit 124d according to this example configuration derives a context index ctxIdx for the frequency components included in the sub-region R3, using the expression below, and supplies the derived context index ctxIdx to the frequency classification unit 124a.

ctxIdx=NX+13+min(maxR3,(uiPosX+uiPosY−TH2)
>>shift), where the sign ">>" represents the right-bit shift operation. In addition, for example, shift=4 and maxR3=3 may be used as shift and maxR3. However, this embodiment is not limited to this.

The low-frequency position context derivation unit 124b, the neighbouring reference context derivation unit 124c, and the high-frequency position context derivation unit 124d according to this example configuration may be configured to derive a context index ctxIdx using a common expression regardless of whether the size of the target frequency region is 16×16 or 32×32, or may be configured to derive a context index ctxIdx using a different expression depending on whether the size of the target frequency region is 16×16 or 32×32. An example of this configuration may be a configuration in which if the size of the target frequency region is 16×16, the high-frequency position context derivation unit 124d uses ctxIdx=NX+13+min(maxR3,(uiPosX+uiPosY−TH2)
>>shift), and if the size of the target frequency region is 32×32, the high-frequency position context derivation unit 124d uses ctxIdx=*NX*+13+max*R*3+1+min(max*R*3,(*ui*Pos*X*+*ui*Pos*Y*−TH2)>>shift).

Another example may be a configuration in which
if the size of the target frequency region is 16×16, the high-frequency position context derivation unit 124d uses ctxIdx=*NX*+13+min(3,(*ui*Pos*X*+*ui*Pos*Y*−14)>>4), and if the size of the target frequency region is 32×32, the high-frequency position context derivation unit 124d uses ctxIdx=*NX*+13+min(3,(*ui*Pos*X*+*ui*Pos*Y*−30)>>4).

Still another example may be a configuration in which
if the size of the target frequency region is 16×16, the high-frequency position context derivation unit 124d uses ctxIdx=*NX*+13+min(3,(*ui*Pos*X*+*ui*Pos*Y*−TH2)>>3), and if the size of the target frequency region is 32×32, the high-frequency position context derivation unit 124d uses ctxIdx=*NX*+13+min(3,(*ui*Pos*X*+*ui*Pos*Y*−TH2)>>4).

Still another example may be a configuration in which
if the size of the target frequency region is 16×16, the high-frequency position context derivation unit 124d uses ctxIdx=*NX*+13+min(*R*3maz,(*ui*Pos*X*+*ui*Pos*Y*−TH2)>>3), and if the size of the target frequency region is 32×32, the high-frequency position context derivation unit 124d uses ctxIdx=*NX*+13+*R*3max+1+min(*R*3max,(*ui*Pos*X*+*ui*Pos*Y*−TH2)>>4).

The low-frequency position context derivation unit 124b and the high-frequency position context derivation unit 124d may be configured to derive a context index ctxIdx using a different expression for each frequency region size, and the neighbouring reference context derivation unit 124c may be configured to derive a context index ctxIdx using a common expression for frequency regions having different sizes.

An example of a frequency region that is divided using the classification process by the frequency classification unit 124a according to this example configuration is not limited to that illustrated in FIG. 9. For example, a frequency region may be divided in a manner illustrated in part (a) or (b) of FIG. 11.

The context index for the position context derivation unit may be a fixed value. That is, one context may be allocated to all the frequency positions in the sub-regions that can be allocated using a position context. For example, the following allocation method is also referred to as a position context derivation unit.

ctxIdx=*NX*

The fixed value (the starting point NX) may be selected in accordance with the color component and the frequency region size.

In the example illustrated in part (a) of FIG. 11, a frequency region is classified into sub-regions R0, R1, and R3. For the frequency components included in the sub-regions R0, R1, and R3, as described above, context indices ctxIdx are calculated by the low-frequency position context derivation unit 124b, the neighbouring reference context derivation unit 124c, and the high-frequency position context derivation unit 124d, respectively.

In the example illustrated in part (b) of FIG. 11, a frequency region is classified into sub-regions R1 and R3. For the frequency components included in the sub-regions R1 and R3, as described above, context indices ctxIdx are calculated by the neighbouring reference context derivation unit 124c and the high-frequency position context derivation unit 124d, respectively.

As described above, the coefficient presence/absence flag decoding unit according to this example configuration derives a context index to be allocated to each transform coefficient presence/absence flag that belongs to a high-frequency-side sub-region among the plurality of sub-regions described above in the target frequency region, on the basis of the position of the transform coefficient presence/absence flag in the target frequency region. Thus, it is possible to reduce the amount of processing for a context index derivation process on the high-frequency side, compared to an existing configuration, while achieving high coding efficiency.

Second Example Configuration of Coefficient Presence/Absence Flag Decoding Unit

Figure 12:
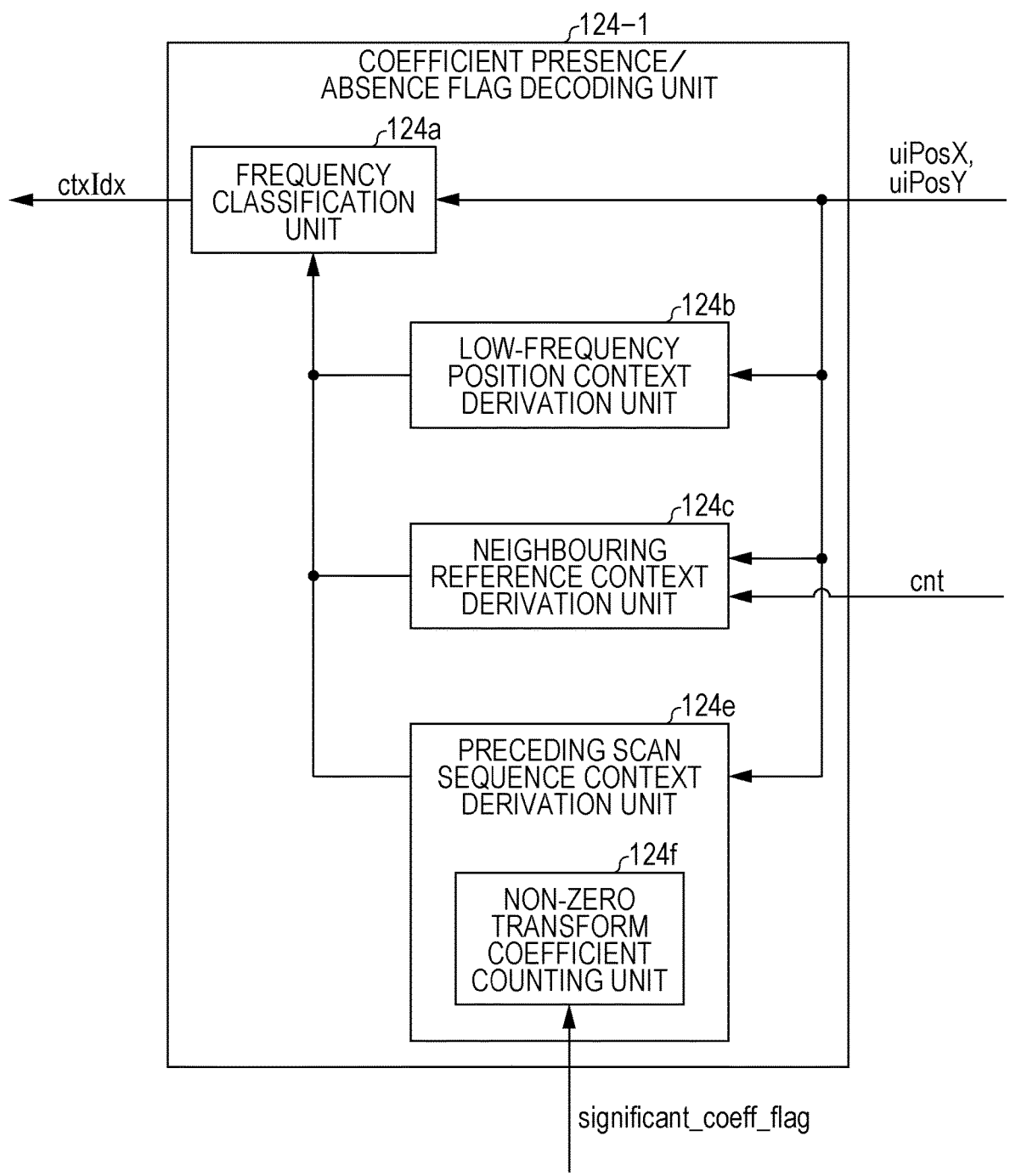
FIG. 12 is a block diagram illustrating a second example configuration of a coefficient presence/absence flag decoding unit according to the embodiment.

A second example configuration of the coefficient presence/absence flag decoding unit according to this embodiment will be described with reference to FIGS. 12 and 13. FIG. 12 is a block diagram illustrating a configuration of a coefficient presence/absence flag decoding unit 124-1 according to this example configuration. FIG. 13 is a diagram depicting scan sequences in which a non-zero transform coefficient counting unit 124f counts the number of non-zero transform coefficients.

As illustrated in FIG. 12, the coefficient presence/absence flag decoding unit 124-1 according to this example configuration includes a frequency classification unit 124a, a low-frequency position context derivation unit 124b, a neighbouring reference context derivation unit 124c, and a preceding scan sequence context derivation unit 124e. The preceding scan sequence context derivation unit 124e includes the non-zero transform coefficient counting unit 124f. Members having the same functions as the members illustrated in the first example configuration described above are given the same numerals, and a description thereof is omitted.

This example configuration is different from the first example configuration described above in terms of a derivation method for a context index ctxIdx for the frequency components included in the sub-region R3.

Thus, also in this example configuration, for the frequency components included in the sub-region R0, similarly to the first example configuration described above, a context index ctxIdx is derived using the following expression.

ctxIdx=*NX*+2×*ui*Pos*X*+*ui*Pos*Y*

For the frequency components included in the sub-region R1, a context index ctxIdx is derived using the following expression.

ctxIdx=*NX*+3+min(4,cnt)

For the frequency components included in the sub-region R2, a context index ctxIdx is derived using the following expression.

ctxIdx=*NX*+8+min(4,cnt)

For the frequency components included in the sub-region R3, in contrast, the preceding scan sequence context derivation unit 124e derives a context index ctxIdx using the following method.

(Preceding Scan Sequence Context Derivation Unit 124e)

The preceding scan sequence context derivation unit 124e has a configuration for deriving a context index ctxIdx for the frequency component to be decoded, on the basis of the number of non-zero transform coefficients included in an immediately preceding scan sequence in scan order if the frequency component is included in a high-frequency-side sub-region.

The non-zero transform coefficient counting unit 124f included in the preceding scan sequence context derivation unit 124e also has a configuration for counting the number of non-zero transform coefficients that appeared in the immediately preceding scan sequence.

The preceding scan sequence context derivation unit 124e according to this example configuration derives a context index ctxIdx for the frequency components included in the sub-region R3 using the expression below, and supplies the derived context index ctxIdx to the frequency classification unit 124a.

$$\text{ctxIdx} = NX + 13 + \min(\max R3, \text{last\_cnt} \times \text{linetbl}[uiPosX + uiPosY] \gg \text{shift})$$

Here, last_cnt represents the number of non-zero transform coefficients that appeared in the immediately preceding scan sequence. In addition, linetbl represents a coefficient table for normalizing the number of non-zero transform coefficients since the number of non-zero transform coefficients that are present differs depending on the scan sequence, and is generated using the following expressions.

$$\text{linetbl}(x) = 2^{shift1}/(x+1) \quad (x < sz)$$

$$\text{linetbl}(x) = 2^{shift1}/(2 \times sz - x - 1) \quad (x \geq sz)$$

Furthermore, shift=shift1+2, and, for example, shift1=3 (this similarly applies hereinafter).

If the scan order is reverse scan and if the scan sequence Lx (part (a) of FIG. 13) including the target frequency component is to be processed, the non-zero transform coefficient counting unit 124f according to this example configuration counts the number of non-zero transform coefficients last_cnt that occurred in the preceding scan sequence Lx+1. In the case of forward scan, the non-zero transform coefficient counting unit 124f counts the number of non-zero transform coefficients that occurred in the line Lx−1.

The preceding scan sequence context derivation unit 124e may also be configured to use, instead of the number of non-zero transform coefficients that appeared in an immediately preceding scan sequence, the number of non-zero transform coefficients that appeared in a scan sequence that precedes the immediately preceding scan sequence. For example, last_cnt may be determined by adding the value last_cnt'≫1 to the number of non-zero transform coefficients curr_cnt in the current scan sequence, where the value last_cnt'≫1 is obtained by weighting last_cnt' used in the immediately preceding scan sequence. A specific expression may be $$\text{last\_cnt} = (\text{last\_cnt}' \gg 1) + \text{curr\_cnt}.$$

The preceding scan sequence context derivation unit 124e may also be configured to derive a context index ctxIdx using a different method in accordance with the position of the frequency component.

For example, if the position of a frequency component satisfies uiPosX>uiPosY, a context index ctxIdx is derived using the following expression.

$$\text{ctxIdx} = 13 + \min(\max R3, \text{last\_cntx} \times \text{linetbl}[uiPosX + uiPosY] \gg \text{shift})$$

On the other hand, if the position of a frequency component satisfies uiPosX≤uiPosY, a context index ctxIdx is derived using the following expression.

$$\text{ctxIdx} = NX + 13 + \max R3 + 1 + \min(\max R3, \text{last\_cnty} \times \text{linetbl}[uiPosX + uiPosY] \gg \text{shift})$$

Here, last_cntx is the number of non-zero transform coefficients that appeared in an immediately preceding scan sequence, which satisfies uiPosX>uiPosY, and last_cnty is the number of non-zero transform coefficients that appeared in the immediately preceding scan sequence, which satisfies uiPosX≤uiPosY. That is, in the immediately preceding scan sequence, a scan sequence portion in the upper right direction from the center is the target of counting last_cntx, and a scan sequence portion in the lower left from the center is the target of counting last_cnty (part (b) of FIG. 13).

Furthermore, shift=shift1+1.

The preceding scan sequence context derivation unit 124e may also be configured to derive a context index ctxIdx using the following expression.

$$\text{ctxIdx} = 13 + \min(\max R3, \text{last\_cnt} \gg \text{shifttbl}[uiPosX + uiPosY + 1])$$

Here, shifttbl[k]=Int(log$_2$(numLineCoeff[k]/maxR3)), and numLineCoeff[k] is the number of non-zero transform coefficients in the scan sequence at the position of k. Int means that decimal fractions of an argument are cut off.

As described above, the coefficient presence/absence flag decoding unit according to this example configuration derives a context index to be allocated to each transform coefficient presence/absence flag lying along the current scan sequence in a high-frequency-side sub-region among the plurality of sub-regions described above, on the basis of the number of non-zero transform coefficients that lie along the preceding scan sequence. If the number of non-zero transform coefficients that lie along the preceding scan sequence is counted once, the number of non-zero transform coefficients can be commonly used to derive a context index to be allocated to each transform coefficient presence/absence flag lying along the current scan sequence. Thus, it is possible to reduce the amount of processing for a context index derivation process on the high-frequency side, compared to an existing configuration which requires separate derivation of context indices for transform coefficient presence/absence flags at different positions, and it is also possible to achieve high coding efficiency.

Third Example Configuration of Coefficient Presence/Absence Flag Decoding Unit

Figure 14:
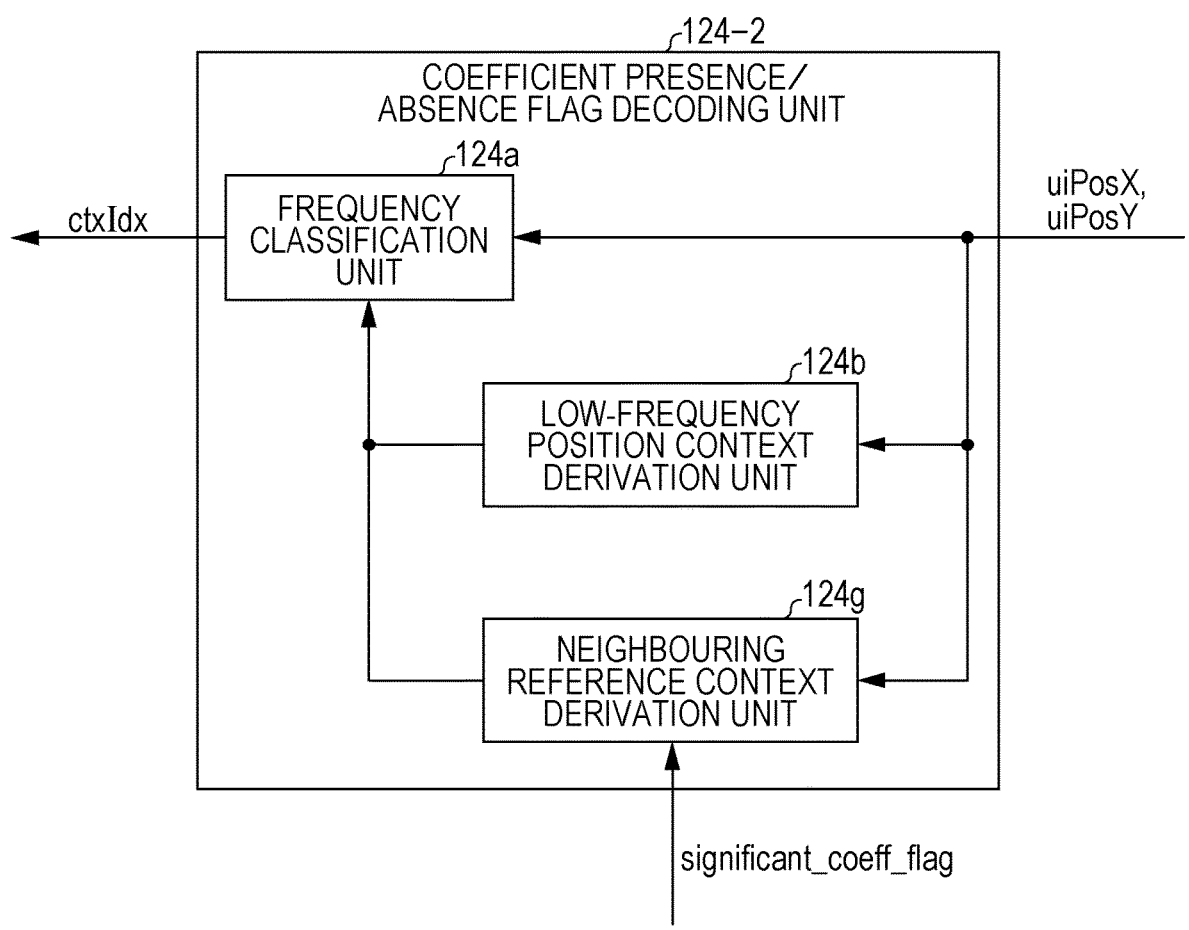
FIG. 14 is a block diagram illustrating a third example configuration of the coefficient presence/absence flag decoding unit according to the embodiment.

A third example configuration of the coefficient presence/absence flag decoding unit according to this embodiment will be described with reference to FIGS. 14 and 15. FIG. 14 is a block diagram illustrating a configuration of a coefficient presence/absence flag decoding unit 124-2 according to this example configuration. Parts (a) to (i) of FIG. 15 are diagrams illustrating frequency components referred to by the neighbouring reference context derivation unit 124g to derive a context. As previously described in the relationship between part (a) of FIG. 10 and part (b) of FIG. 10, also in parts (a) to (i) of FIG. 15, the position of a corresponding reference frequency component in forward scan can be obtained by the positions of each of the reference frequency components in the case of reverse scan being inverted in the X-axis direction and the Y-axis direction with respect to the target frequency component x. Accordingly, the present invention can also be applied to an implementation of significant_coeff_flag in forward scan.

As illustrated in FIG. 14, the coefficient presence/absence flag decoding unit 124-2 according to this example configuration includes a frequency classification unit 124a, a low-frequency position context derivation unit 124b, and a neighbouring reference context derivation unit 124g. Members having the same functions as the members illustrated in the first example configuration described above are given the same numerals, and a description thereof is omitted.

This example configuration is different from the first example configuration described above in terms of a derivation method for a context index ctxIdx for the frequency components included in the sub-region R3.

Thus, also in this example configuration, for the frequency components included in the sub-region R0, similarly to the first example configuration described above, a context index ctxIdx is derived using the following expression.

ctxIdx=$NX$+2×$uiPosX$+$uiPosY$

For the frequency components included in the sub-region R1, a context index ctxIdx is derived using the following expression.

ctxIdx=$NX$+3+min(4,cnt)

For the frequency components included in the sub-region R2, a context index ctxIdx is derived using the following expression.

ctxIdx=$NX$+8+min(4,cnt)

For the frequency components included in the sub-region R3, in contrast, the neighbouring reference context derivation unit 124g derives a context index ctxIdx using the following method.

(Neighbouring Reference Context Derivation Unit 124g)

The neighbouring reference context derivation unit 124g has a configuration for deriving a context index ctxIdx for the frequency component to be decoded, on the basis of the number of decoded non-zero transform coefficients for neighbouring frequency components of the frequency component to be decoded.

The neighbouring reference context derivation unit 124g derives a context index ctxIdx for the frequency components included in the sub-region R3 using cnt2 (limited reference count) with a smaller number of references than cnt used for the low-frequency regions R1 and R2, in accordance with the expression below. The term "limited reference count" means a reference region that is smaller than and more limited than that for the count used in other sub-regions. On the other hand, the computation of a normal count cnt with five references or the like is called a normal reference count.

ctxIdx=$NX$+8+cnt2 cnt2 is calculated using the following expression.

cnt2=($c1$!=0)+($c3$!=0)+($c4$!=0), where c1, c3, and c4 are transform coefficients decoded for neighbouring frequency components of the target frequency component x illustrated in part (i) of FIG. 15.

The reference position of the limited reference count cnt2 is not limited to that described above, and another reference position at which the number of references is smaller than 5 may be used. For example, when the number of references is equal to 2, an example is as follows:

cnt2=($c1$!=0)+($c3$!=0).

Furthermore, if the size of the target frequency region is 16×16, the neighbouring reference context derivation unit 124g derives a context index ctxIdx using ctxIdx=$NX$+8+cnt2.

If the size of the target frequency region is 32×32, the neighbouring reference context derivation unit 124g derives a context index ctxIdx using ctxIdx=$NX$+8+cnt2.

In this manner, preferably, count values for a number of references to a region on the high-frequency side smaller than the number of references to a region on the low-frequency side are used, and the count values are added to starting points each determined for a region to determine a context index.

In the example described above, the starting point of the context for the sub-region R3 is NX+8, which is equal to the starting point of the context for the sub-region R2. This means that the sub-region R2 and the sub-region R3 have the same context index ctxIdx if the counts cnt and cnt2 have the same value. In other words, the sub-region R2 and the sub-region R3 share the same context. In this manner, in a case where regions located in different frequency regions share the same context, the context obtained in the region that is scanned first (if the coding order of significant_coeff_flag is reverse scan, R3) can be used for the region that is scanned next (if the coding order of significant_coeff_flag is reverse scan, R2), resulting in high efficiency coding. In addition, also when a region is divided into sub-regions, the number of contexts is not increased, resulting in a reduction in memory usage caused by contexts.

Figure 16:
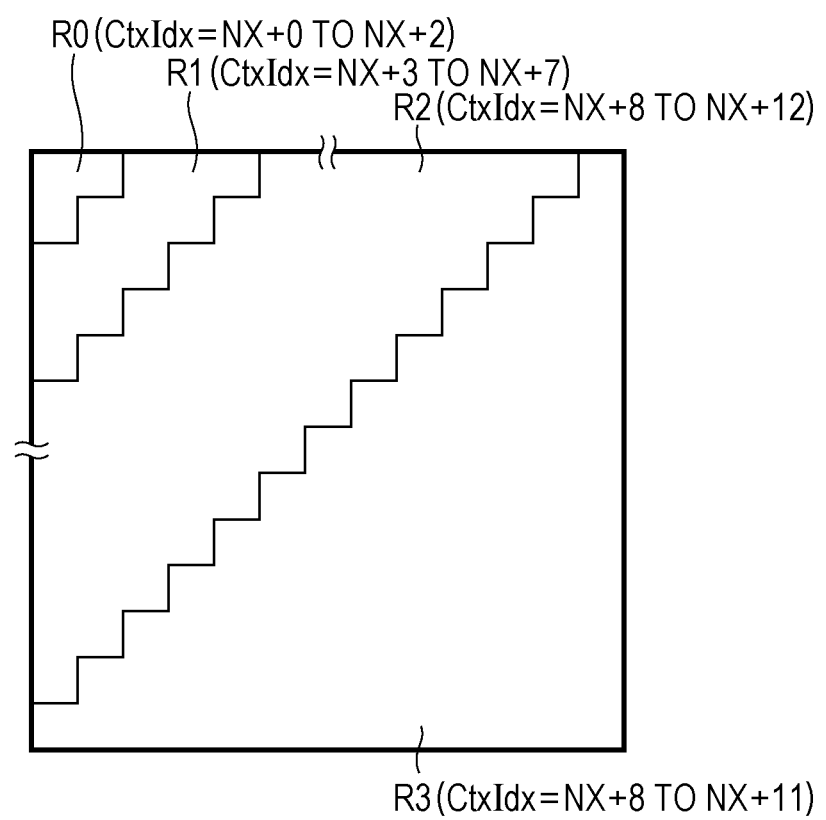
FIG. 16 is a diagram depicting the third example configuration of the coefficient presence/absence flag decoding unit according to the embodiment in a case where sub-regions R2 and R3 out of sub-regions R0 to R3 constituting a target frequency region share some contexts.

FIG. 16 illustrates the sharing of some contexts between sub-regions R2 and R3 among sub-regions R0 to R3 constituting a target frequency region. More specifically, contexts identified by the same context indices (here, NX+8 to NX+11) are shared between the normal reference count used in the sub-region R2 and the limited reference count used in the sub-region R3.

The inventors' experiment shows that using the same starting point for both a region with a small count (the sub-region R2) and a region with a large count (the sub-region R3) and sharing a context between the two regions make higher coding efficiency feasible than not sharing a context. A method in which no contexts are shared between the two regions is also feasible. In this case, the following is used for the sub-region R3:

ctxIdx=$NX$+13+cnt2.

As described above, the neighbouring reference context derivation unit 124g according to this example configuration is configured to derive a context index by adding together a predetermined starting point (for example, NX described above) determined for each sub-region and a variable (for example, cnt2 described above) determined for each sub-region, and is configured to set the starting points for a plurality of sub-regions for each of which a variable is derived using a different method to the same value so that a common context is used for the plurality of sub-regions for each of which a context index is derived using a different method.

Other Example Configuration of Third Example Configuration of Coefficient Presence/Absence Flag Decoding Unit Another exemplary process performed by the coefficient presence/absence flag decoding unit 124-2 will be described hereinafter with reference to FIG. 48 to FIG. 50.

Parts (a) to (b) of FIG. 48 are diagrams illustrating sub-regions obtained by subdivision by the frequency classification unit 124a using this exemplary process. Part (a) of FIG. 48 illustrates sub-regions suitable for use in the decoding of transform coefficients for luminance (luma) value, and part (b) of FIG. 48 illustrates sub-regions suitable for use in the decoding of transform coefficients for chrominance (chroma). In parts (a) to (b) of FIG. 48, the threshold value TH and the threshold value TH2 are determined in accordance with the maximum value of the width and height of the target frequency region using the following expressions:

$$TH=Max(width, height)>>2$$

$$TH2=3\times Max(width, height)>>4.$$

Here, width represents the width of the target frequency region expressed in terms of frequency component as a unit, and height represents the height of the target frequency region expressed in terms of a frequency component as a unit. For example, in a case where the target frequency region has a width of 16 components (corresponding to 16 pixels) and a height of 4 components (corresponding to 4 pixels), called a 16×4 transform, width=16 and height=4.

As illustrated in FIG. 49, the frequency classification unit 124a classifies the sub-region R1 and the sub-region R2 in accordance with the position (xC, yC) of the target transform coefficient over the frequency components, using comparison between the sum of the X coordinate and the Y coordinate and the threshold value TH, as given in the following expression.

$$xC+yC<TH \text{ (or } xC+yC>=TH)$$

As illustrated in FIG. 49, furthermore, the frequency classification unit 124a classifies the sub-region R2 and the sub-region R3 having different numbers of references in accordance with a value (sub-block coordinates) obtained by dividing the position (xC, yC) of the target transform coefficient over the frequency components by a given sub-block size (here, 4), using comparison between the sum of the X coordinate and the Y coordinate in the sub-block coordinates and the threshold value TH2, as given in the following expression.

$$(xC>>2)+(yC>>2)<TH2$$

Here, the threshold value TH2 that distinguishes between the two sub-regions preferably satisfies the relation in which a value given by TH2×sub-block size (=4) is smaller than the size sz (=Max(width, height)) of the target frequency region. In this case, the determination of whether or not it is possible to refer to a neighbouring frequency component of the target frequency component can be omitted. For example, $$3\times Max(width, height)>>4$$

is equal to Max(width, height)×¾, and the relation described above is satisfied.

Furthermore, in terms of the balance between a reduction in the amount of processing and a reduction in coding efficiency, the value of TH2 is preferably less than or equal to Max(width, height)>>2 (>>2 represents a process of division by sub-block when the sub-block size is 4).

That is, if the size of the target frequency region is represented by sz, in terms of the balance between a reduction in the amount of processing and a reduction in coding efficiency, the threshold values TH and TH2 are preferably values less than or equal to sz when the sum of the X coordinate and the Y coordinate is used for determination, and have a magnitude less than or equal to sz/sub-block when the sum of the X coordinate and the Y coordinate of a sub-block is used. TH and TH2 described above satisfy this relationship.

Furthermore, if the size of the target frequency region is represented by sz, in order to omit the determination of whether or not it is possible to refer to a neighbouring frequency component, the threshold values TH and TH2 are preferably values less than sz when the sum of the X coordinate and the Y coordinate is used for determination, and have a magnitude less than sz/sub-block when the sum of the X coordinate and the Y coordinate of a sub-block is used. TH and TH2 described above satisfy this relationship.

The threshold values may also be determined in accordance with the size of the target frequency region. For example, as given in the expressions below, a value obtained by right-shifting the maximum value of the width and height of the target frequency region, and a value obtained by adding or subtracting a predetermined value after right-shifting may be used:

$$TH2=3\times Max(width, height)>>4$$

$$TH2=(3\times Max(width, height)>>4)+4$$

FIG. 49 is pseudo code for a derivation process for deriving a context index cxtIdx for luma, which is a context index to be allocated to a frequency region included in each of the sub-regions R0 to R3 illustrated in part (a) of FIG. 48. In FIG. 49, the context for the region R0 is derived by the low-frequency position context derivation unit 124b, and the context for the regions R1 to R3 is derived by the neighbouring reference context derivation unit 124g.

The neighbouring reference context derivation unit 124g derives a context index sigCtx for, for example, the frequency components included in the sub-region R1 using the expression below, and supplies the derivation result sigCtx to the frequency classification unit 124a.

$$sigCtx=sigCtxOffsetR1+Min(2, ctxCnt)$$

In this way, the context index sigCtx can be determined using the sum of the starting point sigCtxOffsetR1 and the offset value ctxCnt. The offset value ctxCnt in this configuration is a value obtained in accordance with a count value. Here, the offset value ctxCnt is a value obtained by right-shifting so that the count value is reduced to about ½, and is determined by $$ctxCnt=(cnt+1)>>1 \qquad (eq. A4).$$

The many-to-one transformation process may not necessarily be performed using right-shifting, and may be a process for clipping the count value at a fixed value (here, 3) as follows.

$$ctxCnt=min(3, cnt)$$

In this case, a context index is calculated using $$sigCtx=sigCtxOffsetR1+ctxCnt.$$

The count cnt of non-zero transform coefficients may be calculated by changing the transform coefficient to be referred to in accordance with the position (xC, yC) of the target transform coefficient over the frequency components. For example, in the pseudo code illustrated in FIG. 49, reference to five, namely, c1, c2, c3, c4, and c5, and reference to four, namely, c1, c2, c4, and c5, are switched in accordance with the position.

```
if((( xC & 3 ) || ( yC & 3 ) ) && ( ( (xC+1) & 3 )
|| ( (yC+2) & 3 ) )))
    {
        cnt = (c1!=0) + (c2!=0) + (c4!=0) + (c5!=0);
    } else{
        cnt= (c1!=0) + (c2!=0) + (c3!=0) + (c4!=0) +
(c5!=0);
    }
```

The neighbouring reference context derivation unit 124g further derives a context index sigCtx for, for example, the frequency components included in the sub-region R2 using a starting point (here, sigCtxOffsetR2) different from that for the sub-region R1, using the expression below, and supplies the derivation result sigCtx to the frequency classification unit 124a.

sigCtx=sigCtxOffset*R*2+Min(2,ctxCnt)

The computation method for the offset value ctxCnt is similar to that for the sub-region R1. In the foregoing, a process for clipping the value at 2 or less is added. This can also be regarded as a many-to-one transformation process.

The neighbouring reference context derivation unit 124g further derives a context index sigCtx for, for example, the frequency components included in the sub-region R3, which are high-frequency components, using the expression below, and supplies the derivation result sigCtx to the frequency classification unit 124a.

sigCtx=sigCtxOffset*R*2+Min(2,ctxCnt)

Similarly to the sub-region R2, the starting point of the sub-region R3 is sigCtxOffsetR2. Accordingly, as described above, the sharing of a context can achieve both high coding efficiency and a reduction in the number of contexts.

The offset value ctxCnt is computed using the following expressions:

cnt=(*c*1!=0)+(*c*5!=0);

ctxCnt=cnt;

In the sub-region R3 of high-frequency components, therefore, the count cnt is calculated with a smaller number of references than the sub-regions R1 and R2 of low-frequency components. Thus, the amount of processing may be reduced.

In the expressions given above, the count cnt is calculated using two points, namely, c1 and c5 illustrated in part (a) of FIG. 51. In this case, the transform coefficient at the coordinates (for example, c3 illustrated in part (a) of FIG. 10) of the immediately preceding position in the processing order (if the processing order is reverse scan order, the transform coefficient below the position of the target transform coefficient) is not referred to. Accordingly, parallel execution of the context derivation process and the decoding process can be achieved.

In order to further increase the degree of parallel processing, it is desirable that, in addition to the transform coefficient at the coordinates of the immediately preceding position, the transform coefficient at the coordinates (for example, c1 illustrated in part (a) of FIG. 10) of the position that immediately precedes the immediately preceding position in the processing order not be referred to. In this case, the count value may be calculated using two points, namely, c2 and c5 illustrated in part (b) of FIG. 51, as given in the following expression.

cnt=(*c*2!=0)+(*c*5!=0)

Here, for the sub-region (R2) having a larger number of references out of the sub-region R2 and the sub-region R3 having different numbers of references, the offset value ctxCnt is determined by the many-to-one transformation process (also referred to as an aggregation process) of the count value using right-shifting or the like to calculate a context index, whereas, for the sub-region (R3) having a smaller number of references, a context index is directly calculated without using a process for reducing the count value. In the sub-region R3, compared to the sub-region R2, the aggregation process of the count value can be omitted, resulting in a reduction in the amount of processing. Note that priority may be given to uniformity in design for the processing of two sub-regions, and a similar aggregation process (such as right-shifting for the sub-region R3) may be performed for two sub-regions. The many-to-one transformation process of the count value may be regarded as a process for reducing the range of the values of the count value.

Also for chroma, processing similar to that for luma is performed on the sub-region R0, the sub-region R1, and the sub-region R3 in part (b) of FIG. 48. First, the frequency classification unit 124a classifies the sub-region R1 and the sub-region R3 having different numbers of references, using, as illustrated in FIG. 50, comparison between the sum of the X coordinate and the Y coordinate in the sub-block coordinates which is obtained by dividing the position (xC, yC) of the target transform coefficient over the frequency components by a given sub-block size (here, 4) and the threshold value TH2 computed from the sum of the width and height of the frequency region. As illustrated in FIG. 50, furthermore, for the sub-region R0, the low-frequency position context derivation unit 124b derives a context using a position context, and, for the sub-regions R1 and R3, the neighbouring reference context derivation unit 124g derives a context using a neighbouring reference context. The sub-region R1 and the sub-region R3, which use different numbers of references, share a context. In addition, for the sub-region R1 having a large number of references, a context index is derived using an aggregation process of the count values. For the sub-region R2 having a small number of references, a context index is derived without using aggregation process of the count values.

In the example described above, a small count value is used for a high-frequency region. Thus, the amount of processing can be reduced, compared to the case where a large count value is used for a low-frequency region. In addition, for a sub-region that uses a small count value, a context index is derived without using a many-to-one transformation process such as right-shifting or clipping of the count value. Accordingly, the amount of processing may further be reduced.

According to the configuration described above, in a plurality of sub-regions for each of which a different derivation method is used, the starting points determined for the respective sub-regions are made equal. Accordingly, it is possible to reduce the amount of processing, without increasing the number of contexts, while achieving high coding efficiency.

As given below, the neighbouring reference context derivation unit 124g may switch the transform coefficient to be referred to, in accordance with the deviation.

More specifically, the neighbouring reference context derivation unit 124g according to this example configuration may be configured to derive a context index ctxIdx for the frequency components included in the sub-region R3 using the expression below and to supply the derived context index ctxIdx to the frequency classification unit 124a.

ctxIdx=$NX$+13+min(3,pref_y_flag?cnty:cntx)

Here, pref_y_flag is a vertical preference flag pref_y_flag derived taking into account a deviation of a transform coefficient. The vertical preference flag may be used to determine which of cnty and cntx to refer to. The vertical preference flag can be determined using the following three methods.

Determination based on the target position

If uiPosY>uiPosX, the vertical preference flag is set to true. That is, pref_y_flag=$ui$PosY>$ui$PosX?true:false.

Determination based on the position of the last non-zero transform coefficient in the scan order If last_significant_coeff_x<last_significant_coeff_y, the vertical preference flag is set to true. That is, pref_y_flag=last_significant_coeff_$x$<last_significant_coeff_$y$? true:false.

Determination based on an immediately preceding scan sequence

If last_cntx<last_cnty, the vertical preference flag is set to true. That is, pref_y_flag=last_cnt$x$<last_cnt$y$?true:false.

The determination of the vertical preference flag is not limited to the three methods described above.

Also in a case where the vertical preference flag is used, the same context can be shared between the normal reference count and the limited reference count. This can be achieved by setting the starting point of the context for the sub-region R3 to NX+8, which is the same as the starting point for the sub-region R2, as follows:

ctxIdx=$NX$+8+min(3,pref_y_flag?cnty:cntx), where cnty and cntx each represent the number of non-zero transform coefficients decoded for frequency components to be referred to among neighbouring frequency components of the target frequency component. The number of frequency components to be referred to in order to derive cnty and cntx is in the range of 2 to 4, inclusive, which is smaller than the number of references of cnt described above, or 5. In the following, cnty and cntx are also referred to as priority reference count.

Next, a calculation method of cnty and cntx will be described with reference to FIG. 15. FIG. 15 illustrates a target frequency component x in a case where the processing order is forward scan order, and transform coefficients (c1 to c5) decoded for neighbouring reference frequency components of the target frequency component x.

First, parts (a) and (b) of FIG. 15 illustrate the case where the number of references is 4. If the number of references is 4, cnty and cntx are calculated with reference to c1, c3, c4, and c5 illustrated in part (a) of FIG. 15 or c1, c2, c3, and c4 illustrated in part (b) of FIG. 15, using the following expressions.

cnt$y$=($c1$!=0)+($c3$!=0)+($c4$!=0)+($c5$!=0)

cnt$x$=($c1$!=0)+($c2$!=0)+($c3$!=0)+($c4$!=0)

Each term takes 1 if the argument in parentheses is true and takes 0 if the argument in parentheses is false. This similarly applies to the following description.

If the number of references is equal to 3, cnty and cntx are calculated with reference to c1, c3, and c5 illustrated in part (c) of FIG. 15 or c1, c2, and c3 illustrated in part (d) of FIG. 15, using the following expressions.

cnt$y$=($c1$!=0)+($c3$!=0)+($c5$!=0)

cnt$x$=($c1$!=0)+($c2$!=0)+($c3$!=0)

If the number of references is equal to 3, cnty and cntx may be calculated with reference to c3, c4, and c5 illustrated in part (e) of FIG. 15 or c1, c2, and c4 illustrated in part (f) of FIG. 15, using the following expressions.

cnt$y$=($c3$!=0)+($c4$!=0)+($c5$!=0)

cnt$x$=($c1$!=0)+($c2$!=0)+($c4$!=0)

If the number of references is equal to 2, cnty and cntx may be calculated with reference to c3 and c5 illustrated in part (g) of FIG. 15 or c1 and c2 illustrated in part (h) of FIG. 15, using the following expressions.

cnt$y$=($c3$!=0)+($c5$!=0)

cnt$x$=($c1$!=0)+($c2$!=0)

As described above, the coefficient presence/absence flag decoding unit according to this example configuration derives a context index to be allocated to each transform coefficient presence/absence flag, on the basis of the number of decoded non-zero transform coefficients included in a reference region set near the position of the transform coefficient presence/absence flag in the target frequency region. In the plurality of sub-regions described above, the reference region set in a high-frequency-side sub-region is smaller than the reference region set in a low-frequency-side sub-region. Thus, it is possible to reduce the amount of processing for a context index derivation process on the high-frequency side, compared to an existing configuration in which a reference region set in a low-frequency-side sub-region and a reference region set in a high-frequency-side sub-region have the same size, and it is also possible to achieve high coding efficiency.

Fourth Example Configuration of Coefficient Presence/Absence Flag Decoding Unit

A fourth example configuration of the coefficient presence/absence flag decoding unit according to this embodiment will be described with reference to FIG. 17. This example configuration is a configuration obtained by combining the first example configuration and the third example configuration. Members having the same functions as the members illustrated in the first to third example configurations are given the same numerals, and a description thereof is omitted.

Figure 17:
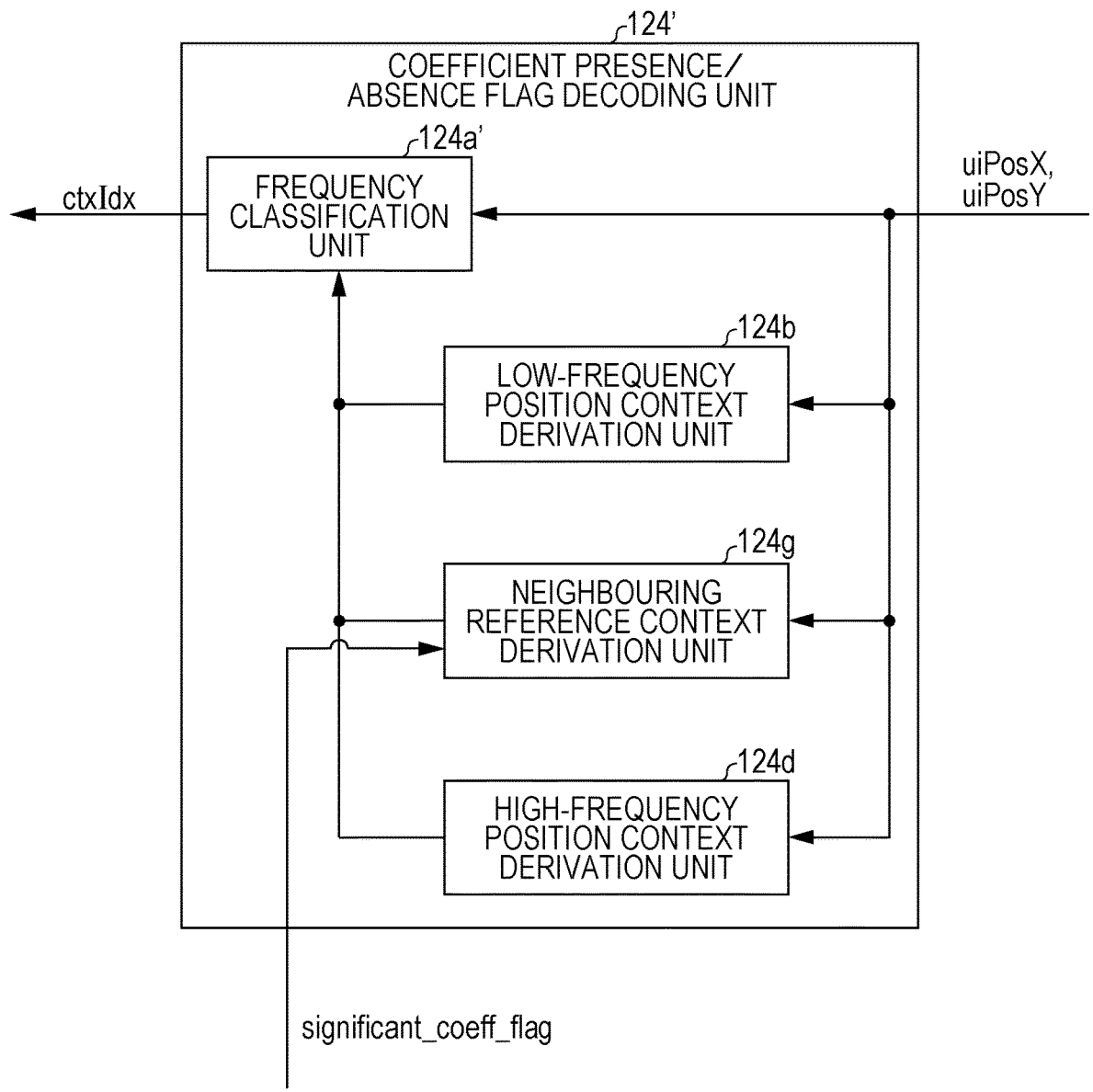
FIG. 17 is a block diagram illustrating a fourth example configuration of the coefficient presence/absence flag decoding unit according to the embodiment.

FIG. 17 is a block diagram illustrating a configuration of a coefficient presence/absence flag decoding unit according to this example configuration. As illustrated in FIG. 17, a coefficient presence/absence flag decoding unit 124' according to this example configuration includes a frequency classification unit 124a', a low-frequency position context derivation unit 124b, a neighbouring reference context derivation unit 124g, and a high-frequency position context derivation unit 124d.

This example configuration is different from the third example configuration described above in that a sub-region R4 is additionally provided and a context index ctxIdx for frequency components included in R4 is derived using the position context given in the first example configuration.

Thus, also in this example configuration, for the frequency components included in the sub-region R0, similarly to the first example configuration described above, the low-frequency position context derivation unit 124b derives a context index ctxIdx using the following expression.

ctxIdx=$NX$+2×$uiPosX$+$uiPosY$

For the frequency components included in the sub-region R1, the neighbouring reference context derivation unit 124g derives a context index ctxIdx using the following expression.

ctxIdx=$NX$+3+min(4,cnt)

For the frequency components included in the sub-region R2, the neighbouring reference context derivation unit 124g derives a context index ctxIdx using the following expression.

ctxIdx=$NX$+8+min(4,cnt)

The neighbouring reference context derivation unit 124g also derives a context index ctxIdx for the frequency components included in the sub-region R3, using cnt2 (limited reference count) with a smaller number of references than cnt used for the low-frequency regions R1 and R2, in accordance with the expression below. Also in this example, cnt2 is also referred to as a limited reference count.

ctxIdx=$NX$+8+cnt2

The high-frequency position context derivation unit 124d according to this example configuration derives a context index ctxIdx for the frequency components included in the sub-region R4, using the following expression.

ctxIdx=$NX$+13

In the example described above, the number of contexts for the sub-region R4 is 1. Thus, if it is determined that the current sub-region is the sub-region R4, the process for further deriving a context index ctxIdx is not necessary. The inventors' experiment shows that also if the number of contexts is equal to 1, a threshold value TH4 is appropriately determined, making it possible to reduce the amount of processing while achieving high coding efficiency.

In the example described above, since the number of contexts for the sub-region R4 is equal to 1, the high-frequency position context derivation unit 124d derives a context index using a fixed value.

Figure 18:
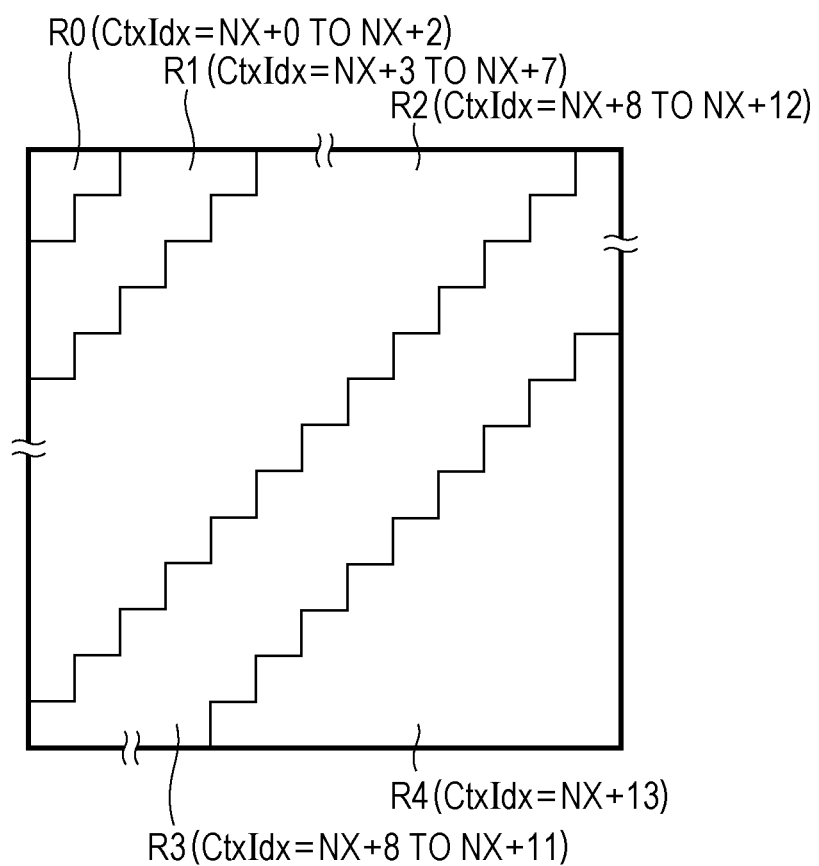
FIG. 18 is a diagram depicting the fourth example configuration of the coefficient presence/absence flag decoding unit according to the embodiment in a case where sub-regions R2 and R3 out of sub-regions R0 to R4 constituting a target frequency region share some contexts.

FIG. 18 illustrates the sharing of some contexts between sub-regions R2 and R3 among sub-regions R0 to R4 constituting a target frequency region. More specifically, contexts identified by the same context indices (here, NX+8 to NX+11) are shared between the normal reference count used in the sub-region R2 and the limited reference count used in the sub-region R3. In FIG. 18, the number of contexts used for the sub-region R4 is equal to 1. However, as below, the number of contexts may be two. For example, a configuration for distinguishing between two contexts in accordance with the frequency region size:

ctxIdx=($sz$==16)?$NX$+13:$NX$+14, or a configuration for distinguishing between two contexts using comparison between the X coordinate and the Y coordinate:

ctxIdx=($uiPosY$>$uiPosX$)?$NX$+13:$NX$+14 may be possible.

As in the first example configuration, a context may be derived generally using the following format:

ctxIdx=$NX$+13+min(max$R3$,($uiPosX$+$uiPosY$−TH2)
>>shift)

As illustrated in FIG. 18, furthermore, the frequency classification unit 124a' used in this embodiment classifies frequency components into five sub-regions R0 to R4. More specifically, the frequency classification unit 124a' performs the following classification process:

Classifying a frequency component satisfying uiPosX+uiPosY<2 into the sub-region R0.

Classifying a frequency component satisfying 2≤uiPosX+uiPosY<TH1 into the sub-region R1.

Classifying a frequency component satisfying TH1≤uiPosX+uiPosY<TH2 into the sub-region R2.

Classifying a frequency component satisfying TH2≤uiPosX+uiPosY<TH3 into the sub-region R3.

Classifying a frequency component satisfying TH3≤uiPosX+uiPosY into the sub-region R4.

TH1 described above may be set to, for example, 5. TH2 and TH3 can be determined in accordance with sz using the following expressions.

TH2=$sz$×7>>3

TH3=$sz$+6

If the size of this frequency region is 16×16, TH2=14 and TH3=22. If the size of this frequency region is 32×32, TH2=28 and TH3=38.

Furthermore, in order to mitigate a performance degradation at low QP, the threshold values TH2 and TH3 may be set as follows.

TH2=$sz$

TH3=$sz$+8

That is, when the frequency region size is 16×16, TH2=16 and TH3=24 may be set. When the frequency region size is 32×32, TH2=32 and TH3=40 may be set.

The general expressions for calculating the threshold values are

TH2=$sz$×a2/b2+c2

TH3=$sz$×a3/b3+c3, where a2, b2, c2, a3, b3, and c3 are predetermined constants. The processing of division by b2 and b3 may be performed using shift operation. In general, the larger the threshold values are, the higher the coding efficiency becomes. However, the area of the high-frequency-side sub-space R3 and sub-space R4, where the amount of processing is reduced, becomes smaller, diminishing the advantage of a reduction in the amount of processing.

In a case where a constant used for the computation of the threshold values depends on the size sz, computation with reference to a table can omit branching that depends on the size. If the constant does not depend on the size, a process for referring to a table can be omitted. If the constant does not depend on the size, the threshold values may be determined as follows.

TH2=$sz$×a/b+c

TH3=$sz$×a/b+c

The threshold values may be controlled using a ratio of a/b or the addition of c. If the threshold values are to be controlled using a/b, the ratio of the area of a high-frequency-side sub-space to the area of a low-frequency-side sub-space does not depend on the size sz, whereas if the threshold values are to be controlled using the addition of c, the ratio of the areas depends on the size. In the inventors' experiment, for 32×32, there will be no problem if the area ratio in the sub-region R4 is larger than that for 16×16, and thus it is appropriate to use the addition of c for the calculation of TH3. In this example, the expressions below other than the expressions described above may also be used.

TH2=$sz \times 7 \gg 3$

TH3=$sz+12$

According to the inventors' experiment, TH2 less than or equal to sz−2 is suitable to obtain a large amount of processing, and TH3 greater than or equal to sz is suitable to achieve high coding efficiency. For example, expressions below are appropriate in addition to the expressions above. Furthermore, if TH2=sz−1, the determination of whether or not it is possible to refer to a neighbouring frequency component of the target frequency component can be omitted for the sub-region R1. Accordingly, in terms of assurance, TH2=sz−1 may be used although the advantage of a reduction in the amount of processing may slightly be diminished.

TH2=$sz \times 7 \gg 3$

TH3=$sz \times 11 \gg 3$

As described above, according to the coefficient presence/absence flag decoding unit according to this example configuration, the range of values that a context index to be allocated to each transform coefficient presence/absence flag may take in a higher-frequency-side sub-region than the predetermined threshold value TH2 is smaller than the range of values that may be taken in the reference region set in a low-frequency-side sub-region. Thus, it is possible to reduce the amount of processing for a context index derivation process on the high-frequency side. In addition, a context index for another higher-frequency-side sub-region than the threshold value TH3 is derived on the basis of the position. Thus, it is possible to further reduce the amount of processing.

In a form of the foregoing configuration, in two sub-regions for which a count value is derived using a different method, the starting points determined for the respective sub-regions are made equal. Accordingly, it is possible to reduce the amount of processing, without increasing the number of contexts, while achieving high coding efficiency.

In a form of the foregoing configuration, furthermore, the number of contexts derived on the basis of the position is as small as 1 or 2. This can minimize the increase in the number of contexts, and can reduce the amount of processing for distinguishing between contexts. It is possible to reduce the amount of processing while achieving high coding efficiency.

As described above, in the coefficient presence/absence flag decoding unit according to this example configuration, the frequency classification unit 124a' is configured to classify the target frequency region into at least three sub-regions in accordance with the position of the transform coefficient presence/absence flag to be processed. The neighbouring reference context derivation unit 124g refers to N1 decoded non-zero transform coefficients (where N1 is a natural number) for a first sub-region (the sub-region R1 or R2) and refers to N2 decoded non-zero transform coefficients (where N2 is a natural number satisfying N2<N1) for a second sub-region (the sub-region R3) to derive a context index. For a third sub-region (the sub-region R4), the high-frequency position context derivation unit 124d derives a context index in accordance with the position of the transform coefficient presence/absence flag.

According to the configuration described above, a sub-region for which the number of decoded non-zero transform coefficients to be derived to in order to refer to a context index is set to be smaller, and a sub-region for which a context index is derived on the basis of the position of the transform coefficient presence/absence flag in the target frequency region are combined. Thus, it is possible to reduce the amount of processing for a context index derivation process on the high-frequency side, compared to an existing configuration, while achieving high coding efficiency.

Fifth Example Configuration of Coefficient Presence/Absence Flag Decoding Unit

Figure 19:
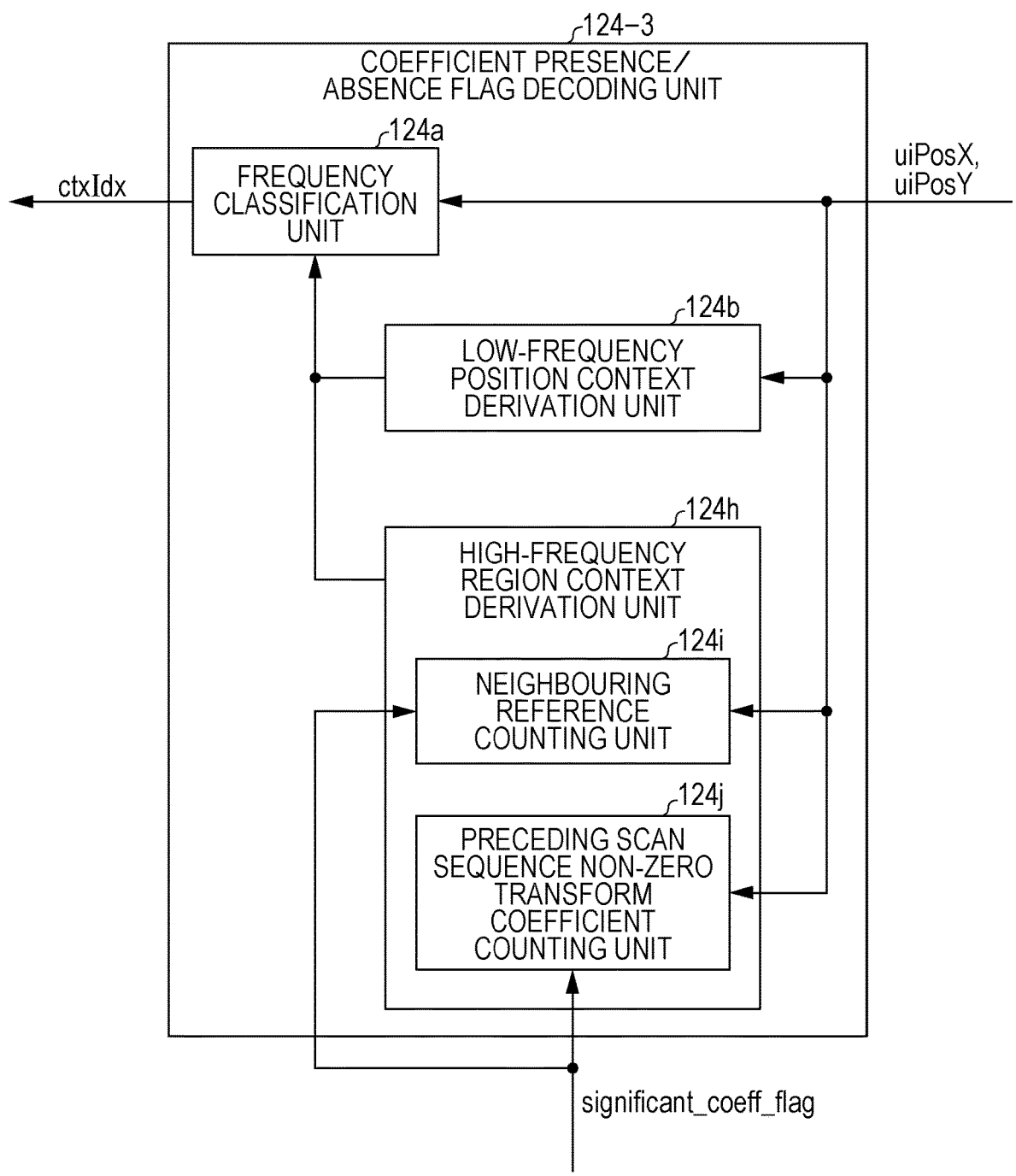
FIG. 19 is a block diagram illustrating a fifth example configuration of the coefficient presence/absence flag decoding unit according to the embodiment.
Figures 20, 21:
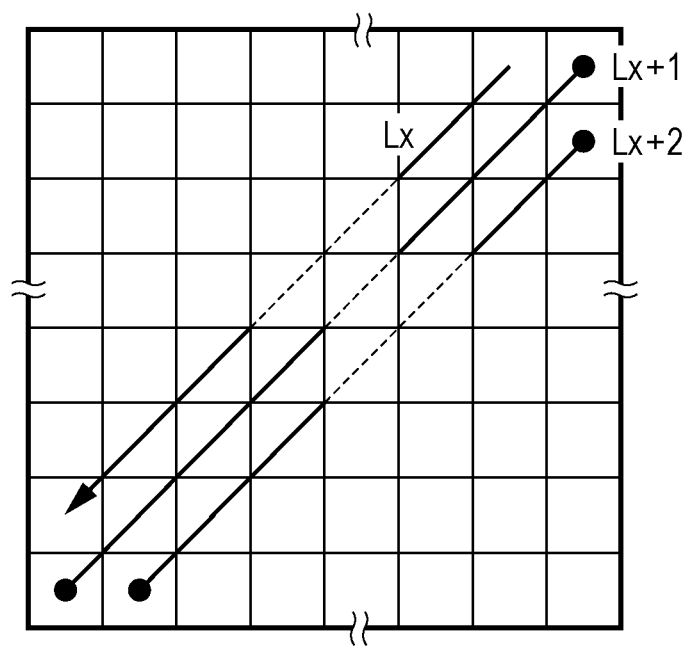
FIG. 20 is a diagram depicting the fifth example configuration of the coefficient presence/absence flag decoding unit according to the embodiment, in which a scan sequence Lx, a scan sequence Lx+1, and a scan sequence Lx+2 are illustrated.
FIG. 21 includes diagrams depicting the fifth example configuration of the coefficient presence/absence flag decoding unit according to the embodiment, in which parts (a) to (c) exemplify a reference region where the number of references is 2.

A fifth example configuration of the coefficient presence/absence flag decoding unit according to this embodiment will be described with reference to FIG. 19 to FIG. 21. FIG. 19 is a block diagram illustrating a configuration of a coefficient presence/absence flag decoding unit 124-3 according to this example configuration. FIG. 20 is a diagram depicting scan sequences in which the number of non-zero transform coefficients is counted. Parts (a) to (c) of FIG. 21 are diagrams depicting objects to be referred to in order to derive a context.

As illustrated in FIG. 19, the coefficient presence/absence flag decoding unit 124-3 according to this example configuration includes a frequency classification unit 124a, a low-frequency position context derivation unit 124b, and a high-frequency region context derivation unit 124h. The high-frequency region context derivation unit 124h includes a neighbouring reference counting unit 124i and a preceding scan sequence non-zero transform coefficient counting unit 124j. Members having the same functions as the members illustrated in the first to third example configurations described above are given the same numerals, and a description thereof is omitted.

This example configuration is different from the first example configuration described above in terms of a derivation method for a context index ctxIdx for the frequency components included in the sub-region R3.

Thus, also in this example configuration, for the frequency components included in the sub-region R0, similarly to the first example configuration described above, a context index ctxIdx is derived using the following expression.

ctxIdx=$NX+2 \times uiPosX+uiPosY$

For the frequency components included in the sub-region R1, a context index ctxIdx is derived using the following expression.

ctxIdx=$NX+3+\min(4,cnt)$

For the frequency components included in the sub-region R2, a context index ctxIdx is derived using the following expression.

ctxIdx=$NX+8+\min(4,cnt)$

For the frequency components included in the sub-region R3, in contrast, the high-frequency region context derivation unit 124h derives a context index ctxIdx using the following method.

(High-Frequency Region Context Derivation Unit 124*h*)

The high-frequency region context derivation unit 124*h* has a configuration for deriving a context index ctxIdx for the frequency component to be decoded, on the basis of the number of decoded non-zero transform coefficients for neighbouring frequency components of the frequency component to be decoded and the number of non-zero transform coefficients included in the immediately preceding scan sequence.

The neighbouring reference counting unit 124*i* included in the high-frequency region context derivation unit 124*h* refers to a decoded transform coefficient adjacent to the target frequency component, and derives cnt2' using the expression below. cnt2' is also referred to as a limited reference count.

$$cnt2'=(c1!=0)+(c3!=0)$$

Here, c1 and c3 are transform coefficients decoded for neighbouring frequency components of the target frequency component x illustrated in part (a) of FIG. 21.

The preceding scan sequence non-zero transform coefficient counting unit 124*j* included in the high-frequency region context derivation unit 124*h* derives cnt3 using the following expression.

$$cnt3=(last\_cnt>THc)?1:0$$

Here, the threshold value THc may use, for example, THc=1, which does not limit this embodiment. THc may be a threshold value that depends on uiPosX and uiPosY. More specifically, THc may be a threshold value having a positive correlation with the number of frequency components lying along the scan sequence including the target frequency component.

Furthermore, as described above, last_cnt represents the number of non-zero transform coefficients that appeared in the scan sequence that precedes the current scan sequence by one.

The preceding scan sequence non-zero transform coefficient counting unit 124*j* may also be configured to derive cnt3 using the following expression.

$$cnt3=(last\_cnt2>THc)?1:0$$

Here, last_cnt2 represents the number of non-zero transform coefficients that appeared in the scan sequence that precedes the current scan sequence by two.

FIG. 20 illustrates an example of a scan sequence to be processed Lx, an immediately preceding scan sequence Lx+1 that precedes the scan sequence to be processed by one scan sequence, and a second immediately preceding scan sequence Lx+2 that precedes the scan sequence to be processed by two scan sequences when the scan order is reverse scan order.

The preceding scan sequence non-zero transform coefficient counting unit 124*j* updates, for example, last_cnt and last_cnt2 as below when the processing for the subsequent scan sequence is to be performed after the processing for the current scan sequence is completed.

$$last\_cnt2=last\_cnt$$

$$last\_cnt=curr\_cnt$$

Here, as described above, curr_cnt represents the number of non-zero transform coefficients in the current scan sequence.

The high-frequency region context derivation unit 124*h* according to this example configuration refers to cnt2' derived by the neighbouring reference counting unit 124*i* and cnt3 derived by the preceding scan sequence non-zero transform coefficient counting unit 124*j* to derive a context index ctxIdx for the frequency components included in the sub-region R3 using the expression below, and supplies the derived context index ctxIdx to the frequency classification unit 124*a*.

$$ctxIdx=NX+13+\min(3,cnt2'+cnt3)$$

As described above, the coefficient presence/absence flag decoding unit according to this example configuration is configured to derive a context index to be allocated to each transform coefficient presence/absence flag lying along the current scan sequence in a high-frequency-side sub-region among the plurality of sub-regions described above, on the basis of the number of non-zero transform coefficients lying along the preceding scan sequence and the number of decoded non-zero transform coefficients included in a reference region set near the position of the transform coefficient presence/absence flag in the target frequency region. The reference region set in the high-frequency-side sub-region among the plurality of sub-regions described above is smaller than the reference region set in a low-frequency-side sub-region. Thus, it is possible to more effectively reduce the amount of processing for a context index derivation process on the high-frequency side, than an existing configuration, and it is also possible to achieve high coding efficiency.

The neighbouring reference counting unit 124*i* may be configured to derive cnt2' using the following expression.

$$cnt2'=pref\_y\_flag?cnty':cntx',$$

where the priority reference count cnty' may be derived for, for example, the reference frequency components illustrated in part (b) of FIG. 21 using the decoded transform coefficients c3 and c5 in accordance with $$cnty'=(c3!=0)+(c5!=0), \text{ or}$$

may be derived for the reference frequency components illustrated in part (c) of FIG. 21 using the decoded transform coefficients c1 and c2 in accordance with $$cntx'=(c1!=0)+(c2!=0).$$

Sixth Example Configuration of Coefficient Presence/Absence Flag Decoding Unit

Figure 22:
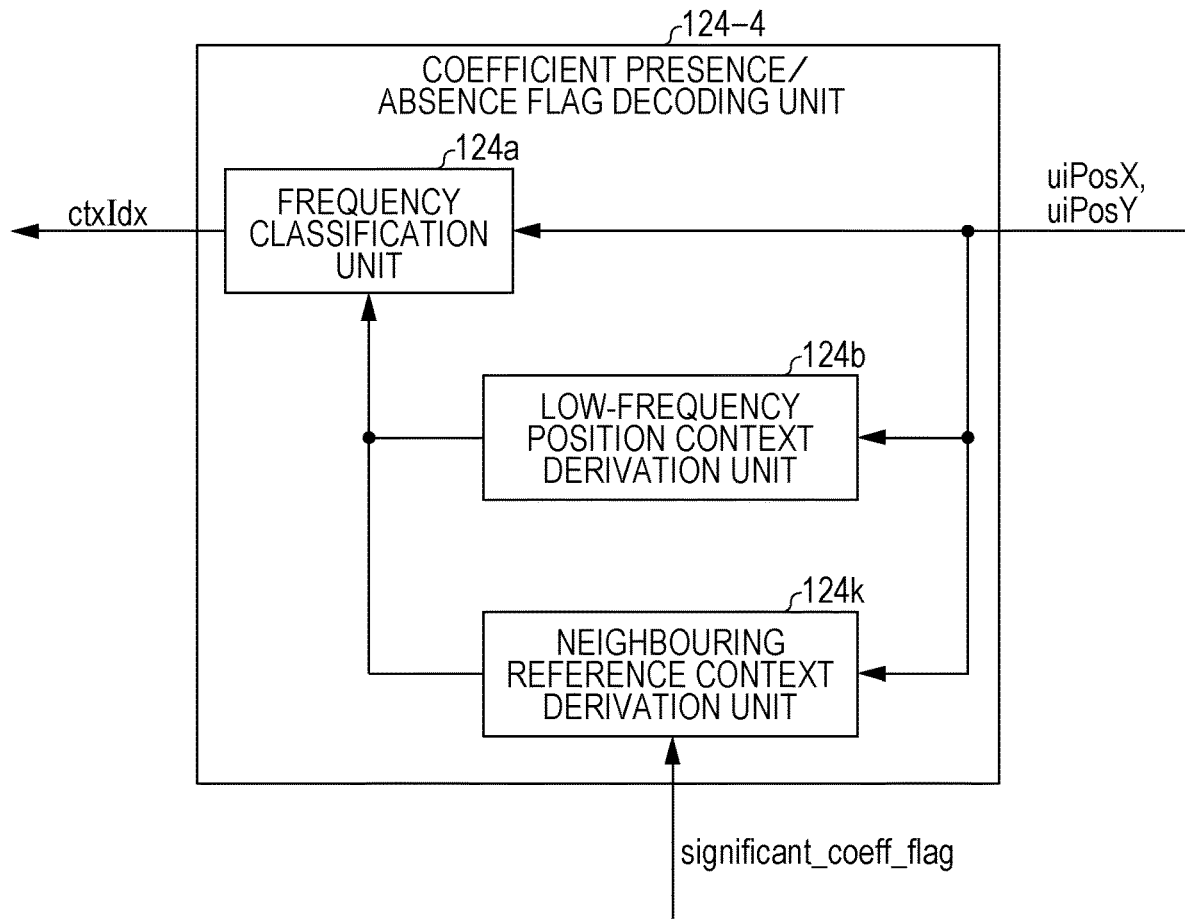
FIG. 22 is a block diagram illustrating a sixth example configuration of the coefficient presence/absence flag decoding unit according to the embodiment.

A sixth example configuration of the coefficient presence/absence flag decoding unit according to this embodiment will be described with reference to FIG. 22. FIG. 22 is a block diagram illustrating a configuration of a coefficient presence/absence flag decoding unit 124-4 according to this example configuration.

As illustrated in FIG. 22, the coefficient presence/absence flag decoding unit 124-4 according to this example configuration includes a frequency classification unit 124*a*, a low-frequency position context derivation unit 124*b*, and a neighbouring reference context derivation unit 124*k*. Members having the same functions as the members illustrated in the first to fourth example configurations are given the same numerals, and a description thereof is omitted.

This example configuration is different from the first example configuration described above in terms of a derivation method for a context index ctxIdx for the frequency components included in the sub-regions R1 to R3.

Thus, also in this example configuration, for the frequency components included in the sub-region R0, similarly to the first example configuration described above, a context index ctxIdx is derived using the following expression.

$$ctxIdx=NX+2\times uiPosX+uiPosY$$

For the frequency components included in the sub-region R1, in contrast, the neighbouring reference context derivation unit 124k derives a context index ctxIdx using the following method.

ctxIdx=NX+3+min(4,pref_y_flag?cnty:cntx)

Furthermore, for the frequency components included in the sub-region R2, the neighbouring reference context derivation unit 124k derives a context index ctxIdx using the following method.

ctxIdx=NX+8+min(4,pref_y_flag?cnty:cntx)

Furthermore, for the frequency components included in the sub-region R3, the neighbouring reference context derivation unit 124k derives a context index ctxIdx using the following method.

ctxIdx=NX+13+min(4,pref_y_flag?cnty:cntx)

Here, pref_y_flag, cnty, and cntx have been described above, and are not described here.

As described above, the coefficient presence/absence flag decoding unit according to this example configuration is configured to derive a context index to be allocated to each transform coefficient presence/absence flag, on the basis of the number of decoded non-zero transform coefficients included in a reference region set near the position of the transform coefficient presence/absence flag in the target frequency region. The number of decoded transform coefficients included in the reference region described above is less than or equal to 4. Thus, it is only required to refer to a number of decoded transform coefficients smaller than that in an existing configuration. According to the configuration described above, therefore, it is possible to reduce the amount of processing for a context index derivation process on the high-frequency side, compared to an existing configuration, and it is also possible to achieve high coding efficiency.

Other Example Configuration 1 of Transform Coefficient Decoding Unit 120

While the transform coefficient decoding unit 120 according to this embodiment has been described focusing on an example configuration of the coefficient presence/absence flag decoding unit, the configuration of the transform coefficient decoding unit 120 according to this embodiment is not limited to the examples described above.

For example, the sequence parameter set SPS in the coded data #1 may include a flag (restriction flag) high_coeff_restriction_flag that restricts the coding of a high-frequency component. In this configuration, the transform coefficient decoding unit 120 is configured to decode the flag high_coeff_restriction_flag and to restrict the decoding of transform coefficients in the following way. If high_coeff_restriction_flag=0, the transform coefficient decoding unit 120 decodes transform coefficients for all the frequency components included in the frequency region to be processed. If high_coeff_restriction_flag=1, the transform coefficient decoding unit 120 decodes only a transform coefficient for a frequency component satisfying the following condition uiPosX+uiPosY<TH2.

In addition, the restriction described above may be applied only when the TU to be processed has a specific size (for example, 32×32 or 16×16).

Figure 23:
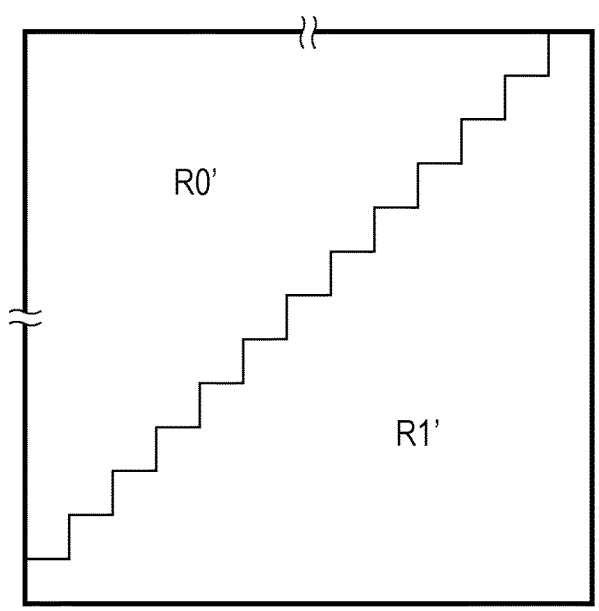
FIG. 23 is a diagram depicting another example configuration of the quantized residual information decoder according to the embodiment, in which a low-frequency-side sub-region R0' and a high-frequency-side sub-region R1' that are obtained by dividing a frequency region are illustrated.

FIG. 23 is a diagram illustrating a region R0' including frequency components satisfying uiPosX+uiPosY<TH2, and a remaining region R1' in the frequency region to be processed. In FIG. 23, for the frequency components included in the region R0', transform coefficients are decoded. For the frequency components included in the region R1', transform coefficients are not decoded and are uniformly set to a predefined value (for example, 0).

The threshold value TH2 described above may be a fixed value, for example, TH2=14, and the syntax element indicating the value of the threshold value TH2 may be included in the coded data #1.

The syntax element indicating the value of the threshold value TH2 may be, for example, a syntax element sps_coeff_restriction_value_minus14_div2 that indicates the value given by (TH2−14)/2.

Furthermore, whether to apply the restriction described above may be determined in accordance with the level. The term level means the limit to which a range of values used in a syntax element is restricted. The level of restriction ranges from 0 to a predetermined value, in which a level with a smaller value corresponds to higher restriction. The level is used to restrict, in particular, the complexity of decoding, and the width or height of an image, a frame rate, and so forth are included in the syntax element to be restricted. The profile is used for the restriction of the tools to be used. If a syntax element differs depending on the tool, the syntax element changes in accordance with the profile. The level is determined for each profile. The profile and level are coded using, for example, but not limited to, the sequence parameter set.

For example, as illustrated in part (a) of FIG. 24, restriction may be set for a level of 0 to 2, inclusive, and no restriction may be set for a level of 3 or more.

Alternatively, the threshold value may be adaptively changed in accordance with the level. For example, as illustrated in part (b) of FIG. 24, the restriction to TH2=14 may be applied for a level of 0 or 1, the restriction to TH2=22 may be applied for a level of 2, the restriction to TH2=30 may be applied for a level of 3, and no restriction may be applied for a level of 4.

If the range of values usable in a syntax element is to be restricted, the range to be restricted may be determined using, as a determination expression, the expression below in which the sum of the X coordinate and the Y coordinate of the position of the frequency region is compared with the threshold value uiPosX+uiPosY<TH2, or using a sub-block position obtained by dividing the position of the frequency region by a sub-block size (here, 4), as given in the expression below, by comparison between the sum of the X coordinate and the Y coordinate in the sub-block coordinates and the threshold value.

(uiPosX>>2)+(uiPosY>>2)<(TH2>>2)

That is, if the size of the target frequency region is represented by sz, in terms of the balance between a reduction in the amount of processing and a degradation in coding efficiency, the threshold values TH and TH2 are preferably values less than or equal to sz when the sum of the X coordinate and the Y coordinate is used for determination, and have a magnitude less than or equal to sz/sub-block when the sum of the X coordinate and the Y coordinate of a sub-block is used. TH and TH2 described above satisfy this relationship.

Furthermore, if the size of the target frequency region is represented by sz, in order to omit the determination of whether or not it is possible to refer to a neighbouring frequency component, the threshold values TH and TH2 are preferably values less than sz when the sum of the X coordinate and the Y coordinate is used for determination, and have a magnitude less than sz/sub-block when the sum of the X coordinate and the Y coordinate of a sub-block is used. TH and TH2 described above satisfy this relationship.

The threshold value may also be determined in accordance with the size of the target frequency region. For example, as given in the expressions below, a value obtained by right-shifting the maximum value of the width and height of the target frequency region, and a value obtained by adding or subtracting a predetermined value after right-shifting may be used.

$$TH2=3\times Max(width,height)>>4$$

$$TH2=(3\times Max(width,height)>>4)+4$$

The coded data #1 having the configuration described above includes a restriction flag indicating whether or not to decode a high-frequency-side transform coefficient in each target frequency region corresponding to a unit region. If the restriction flag indicates that a high-frequency-side transform coefficient is not decoded, the transform coefficient decoding unit 120 can omit the decoding process for the high-frequency-side transform coefficient. Accordingly, the amount of processing for decoding transform coefficients can be reduced.

Other Example Configuration 2 of Transform Coefficient Decoding Unit 120

In addition, if the size of the target TU is a comparatively small size such as 8×8 pixels, the coefficient presence/absence flag decoding unit included in the transform coefficient decoding unit 120 may be configured to derive a context index ctxIdx using the expressions below and to allocate the context index ctxIdx to each frequency component.

$$ctxIdx=N8+4\times tbl[uiPosY]+tbl[uiPosX]$$

Here, $$tbl=\{0,1,1,2,2,3,3,3\}.$$

Here, N8 is the starting point of a context index when the frequency region size is 8×8.

The coefficient presence/absence flag decoding unit according to this example configuration interprets a bin supplied from the bit decoding unit 132, and decodes the syntax element significant_coeff_flag for the frequency component to be decoded, using the context index ctxIdx allocated to the frequency component to be decoded. The decoded syntax element significant_coeff_flag is stored in the decoded coefficient memory unit 126, and is referenced by the coefficient value decoding unit 125. The context index ctxIdx used for decoding is supplied to the context recording/updating unit 131.

Part (a) of FIG. 25 illustrates the values of context indices ctxIdx derived by a coefficient presence/absence flag decoding unit according to a comparative example, and part (b) of FIG. 25 illustrates the values of context indices ctxIdx derived by the coefficient presence/absence flag decoding unit according to this example configuration.

Here, the coefficient presence/absence flag decoding unit according to the comparative example is configured to derive a context index ctxIdx using $$ctxIdx=N8+4\times tbl[uiPosY]+tbl[uiPosX]$$

$$tbl=\{0,0,1,1,2,2,3,3\}.$$

As illustrated in part (b) of FIG. 25, the coefficient presence/absence flag decoding unit according to this example configuration assigns finer context indices ctxIdx to low-frequency components than the coefficient presence/absence flag decoding unit according to the comparative example.

As illustrated in part (b) of FIG. 25, furthermore, the coefficient presence/absence flag decoding unit according to this example configuration divides a low-frequency component into smaller regions than a high-frequency component, and assigns different context indices ctxIdx to the individual regions.

Using the configuration described above, the coefficient presence/absence flag decoding unit according to this example configuration can efficiently decode significant_coeff_flag for the low-frequency component side, resulting in an increase in coding efficiency.

The derivation process for the context index ctxIdx by the coefficient presence/absence flag decoding unit according to this example configuration is not limited to that in the example described above. For example, ctxIdxH may be calculated using the expressions below so that frequency components near PosX=0 are divided into smaller sections, and the individual values may be set to the context index ctxIdx.

$$ctxIdxH=N8+4\times (uiPosY>>1)+tbl[uiPosX]$$

$$tbl=\{0,1,1,2,2,3,3,3\}$$

Part (c) of FIG. 25 illustrates an example of ctxIdxH derived by the coefficient presence/absence flag decoding unit according to this example configuration.

With the use of this configuration, significant_coeff_flag for frequency components near PosX=0 can be efficiently decoded, resulting in an increase in coding efficiency.

In addition, ctxIdxV may be calculated using the expressions below so that frequency components near PosY=0 are divided into smaller sections, and the individual values may be set to the context index ctxIdx.

$$ctxIdxV=N8+4\times tbl[uiPosY]+(uiPosX>>1)$$

$$tbl=\{0,1,1,2,2,3,3,3\}$$

Part (d) of FIG. 25 illustrates an example of ctxIdxV derived by the coefficient presence/absence flag decoding unit according to this example configuration.

With the use of this configuration, significant_coeff_flag for frequency components near PosY=0 can be efficiently decoded, resulting in an increase in coding efficiency.

The coefficient presence/absence flag decoding unit according to this example configuration may also be configured to refer to the value of the vertical preference flag pref_y_flag described above, and to switch between ctxIdxV and ctxIdxH to be used, in accordance with the value of the vertical preference flag pref_y_flag. More specifically, the coefficient presence/absence flag decoding unit according to this example configuration may be configured to derive a context index ctxIdx using $$ctxIdx=pref\_y\_flag?ctxIdxV:ctxIdxH.$$

With the use of this configuration, a more appropriate context index ctxIdx can be used in accordance with the deviation of the transform coefficient, resulting in an increase in coding efficiency.

As described above, the coefficient presence/absence flag decoding unit according to this example configuration is configured to divide the target frequency region corresponding to the unit region to be processed into a plurality of sub-regions, to allocate a different context index to each sub-region, and to arithmetically decode each transform coefficient presence/absence flag that is a syntax element indicating whether or not each of the transform coefficients that belong to the respective sub-regions is equal to 0, on the basis of a probability state specified by the context index allocated to the sub-region to which the transform coefficient presence/absence flag belongs. In the plurality of sub-regions described above, a low-frequency-side sub-region is smaller than a high-frequency-side sub-region. Thus, finer context indices can be allocated to low-frequency-side regions. According to the configuration described above, therefore, it is possible to efficiently decode a syntax element for the low-frequency side, resulting in an increase in coding efficiency.

(Sub-Block-by-Sub-Block Exemplary Decoding Process for Coefficient Presence/Absence Flag)

The coefficient presence/absence flag decoding unit according to this embodiment may also be configured to, instead of decoding a coefficient presence/absence flag using an entire frequency region as one block (transform block), divide one block indicating an entire frequency region into, for example, 4×4 sub-blocks, and to decode a coefficient presence/absence flag for each sub-block.

FIG. 32 includes diagrams illustrating sub-block scanning. Sub-block scanning is scanning on a sub-block-by-sub-block basis. As illustrated in FIG. 32, for example, the coefficient presence/absence flag decoding unit divides one block corresponding to an entire frequency region into four sub-blocks in the uiPosX direction and four sub-blocks in the uiPosY direction, that is, 16 sub-blocks in total, and decodes a coefficient presence/absence flag using a sub-block as the unit of processing.

The coefficient presence/absence flag decoding unit decodes a coefficient presence/absence flag using sub-blocks by, as illustrated in part (a) of FIG. 32, decoding, for each sub-block, a flag (sub-block coefficient presence/absence flag significant_coeffgroup_flag) indicating whether or not at least one non-zero transform coefficient is present in the sub-block, in sub-block reverse scan order (the arrow direction indicated in the block in FIG. 32). If the sub-block coefficient presence/absence flag significant_coeffgroup_flag is not equal to 0, as illustrated in part (b) of FIG. 32, the coefficient presence/absence flag decoding unit decodes a presence/absence flag for each transform coefficient in the sub-block to be processed, in reverse scan order within the sub-block (the arrow direction indicated in the sub-blocks in FIG. 32).

The scan order of sub-block scanning illustrated in part (a) of FIG. 32 and the scan order of scanning within sub-blocks illustrated in part (b) of FIG. 32 are merely examples, and other scan order may be used. For example, a zigzag scan, a horizontal priority scan, or a vertical priority scan may also be used.

In the following, a description will be given of an example of the sub-block-by-sub-block decoding/coding of sub-block non-zero coefficient presence/absence flags and non-zero coefficient presence/absence flags.

First, an example of a sub-block coefficient presence/absence flag for a transform block size of 16×16 and a sub-block size of 4×4 will be described with reference to FIG. 47.

Part (a) of FIG. 47 illustrates an example of the values of quantized residual coefficients for a total of 256 frequency components included in a 16×16 transform block. Part (b) of FIG. 47 is a diagram illustrating an example of sub-block numbers for identifying the respective sub-blocks obtained by subdivision of the 16×16 transform block into 4×4 sub-blocks. Part (c) of FIG. 47 illustrates an example of sub-block coefficient presence/absence flags for the respective sub-blocks when the quantized residual coefficients illustrated in part (a) of FIG. 47 are used.

In part (a) of FIG. 47, symbol W1 represents the position of the last coefficient. In part (a) of FIG. 47, zero coefficients that are greyed out are zero coefficients located after the last coefficient W1 in forward scan order. In part (a) of FIG. 47, furthermore, the values of all the quantized residual coefficients in sub-blocks identified by symbols SBK_A to ABK_D (in part (b) of FIG. 47, the sub-blocks with sub-block numbers 3, 7, 12, and 13) are zero.

In this situation, as usual, if the presence or absence of a non-zero coefficient is represented using a coefficient presence/absence flag for each of the coefficients from the DC coefficient to the last coefficient, a total of 218 coefficient presence/absence flags are needed.

In contrast, if the presence or absence of a non-zero coefficient is expressed in terms of a sub-block as a unit, sub-block coefficient presence/absence flags for the respective sub-blocks in part (a) of FIG. 47, indicating whether or not there is a non-zero coefficient, are represented in the manner illustrated in part (c) of FIG. 47. That is, in sub-blocks (with the sub-block numbers 3, 7, 12, 13, 14, and 15 in part (b) of FIG. 47), the number of non-zero coefficients is equal to 0. Thus, the sub-block coefficient presence/absence flag significant_coeffgroup_flag is set to "0", and coefficient presence/absence flags in each sub-block are not added.

Furthermore, in sub-blocks (with the sub-block numbers 0, 1, 2, 4, 5, 6, 8, 9, 10, and 11 in part (b) of FIG. 47), the number of non-zero coefficients is greater than or equal to 1. Thus, the sub-block coefficient presence/absence flag significant_coeffgroup_flag is set to "1", and coefficient presence/absence flags for each sub-block are added.

That is, if the presence or absence of a non-zero coefficient is expressed in terms of a sub-block as a unit, the number of coefficient presence/absence flags is 154 in total since a total of 64 coefficient presence/absence flags in sub-blocks (with the sub-block numbers 3, 7, 12, and 13 in part (b) of FIG. 47) are deleted. Although 16 additional sub-block coefficient presence/absence flags are necessary, there are 170 flags altogether, the number of which is smaller than the number of flags in the existing structure by at least 48. In this manner, the presence or absence of transform coefficients is represented for each sub-block, resulting in a significant reduction in the number of coefficient presence/absence flags to be coded/decoded. That is, the context derivation process necessary for the coding/decoding of coefficient presence/absence flags can be reduced, improving the throughput of coding/decoding.

Subsequently, an exemplary embodiment of the sub-block-by-sub-block decoding of coefficient presence/absence flags will be described hereinafter.

Figure 31:
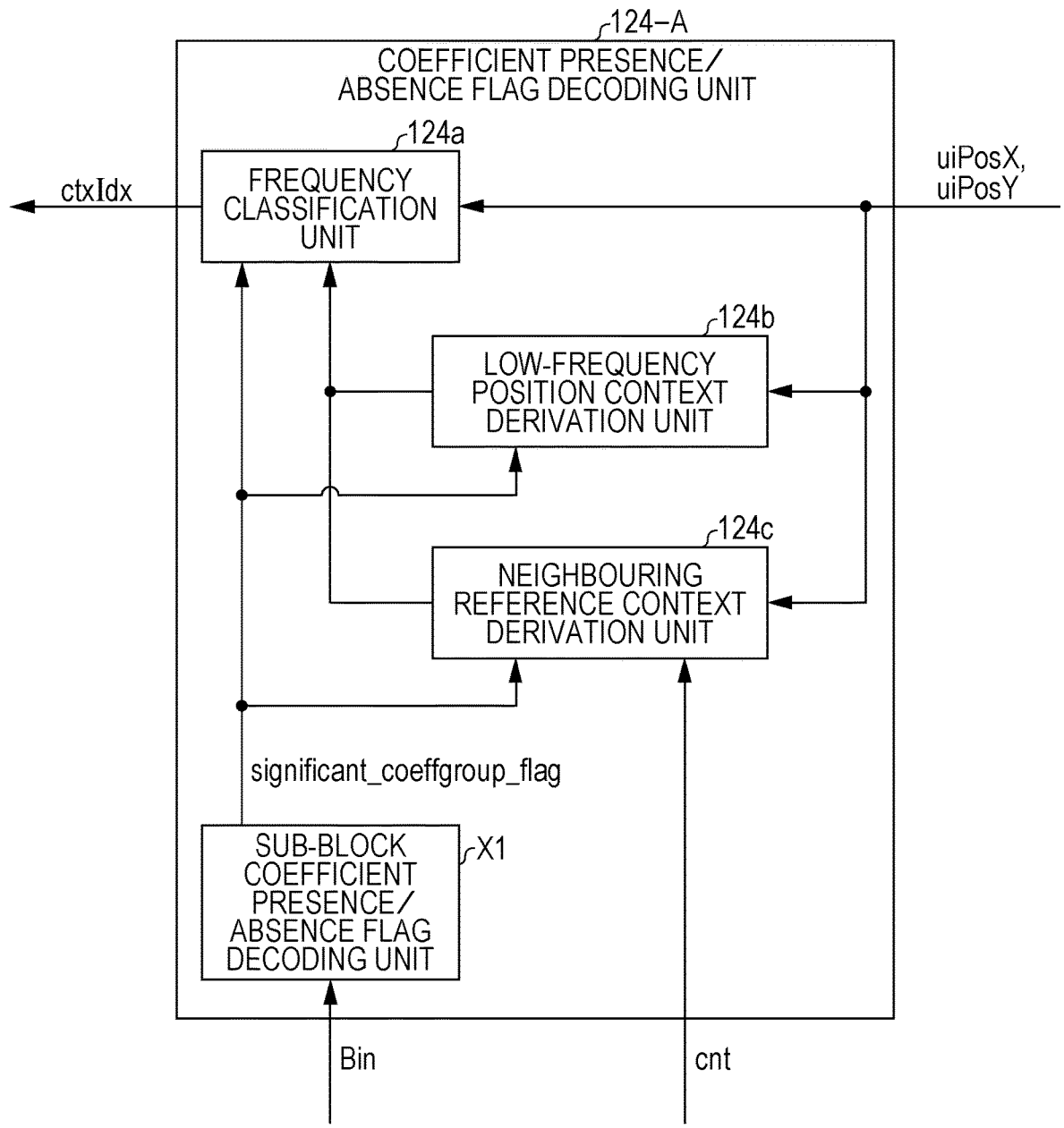
FIG. 31 is a block diagram illustrating a seventh example configuration of the coefficient presence/absence flag decoding unit according to the embodiment.

Seventh Example Configuration of Coefficient Presence/Absence Flag Decoding Unit FIG. 31 is a block diagram illustrating a coefficient presence/absence flag decoding unit 124-A serving as a seventh example configuration of the coefficient presence/absence flag decoding unit according to this embodiment.

Figure 33:
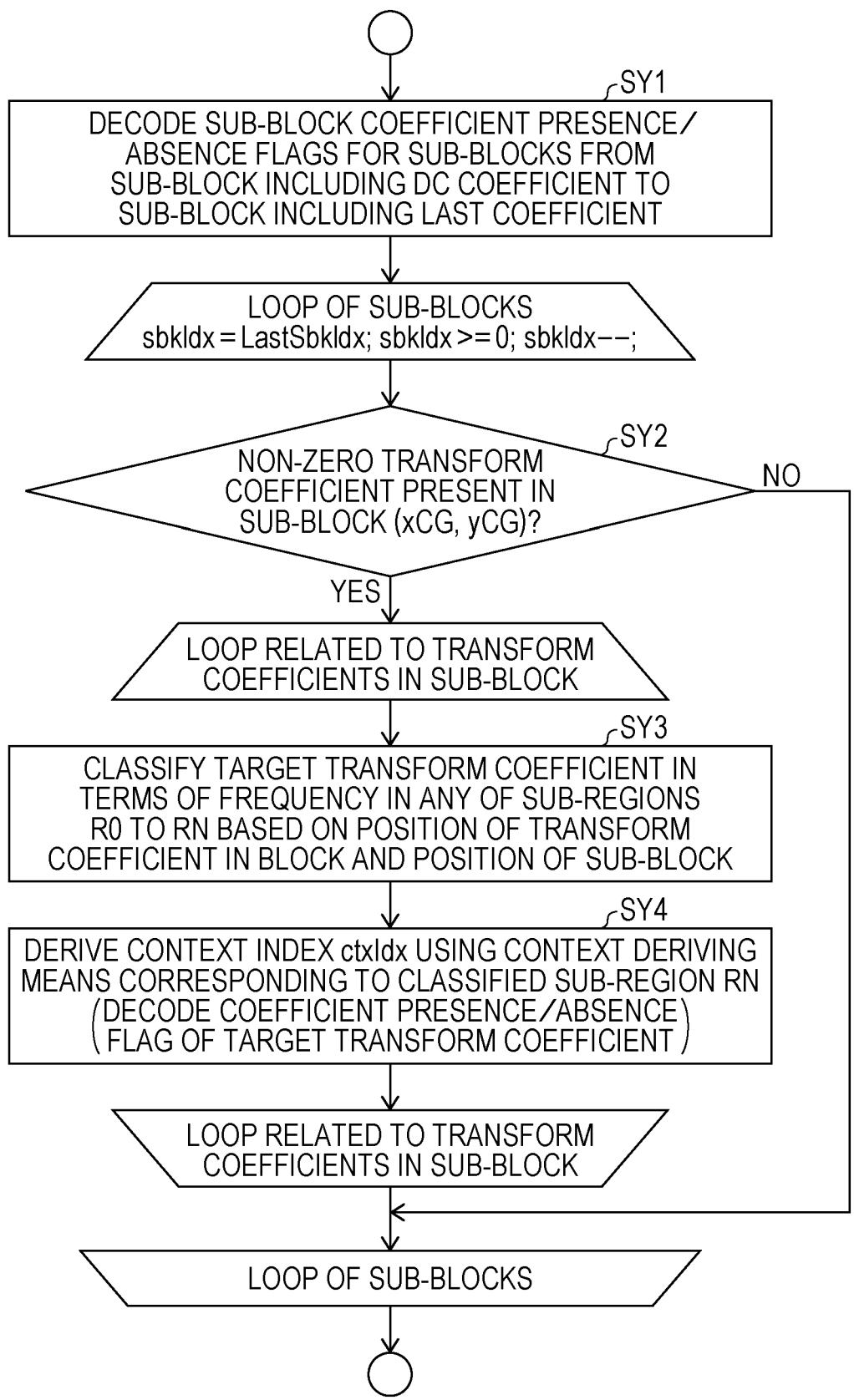
FIG. 33 is a flowchart illustrating an example of the flow of the operation in the seventh to ninth example configurations of the coefficient presence/absence flag decoding unit according to the embodiment.

FIG. 33 is a flowchart illustrating the flow of a decoding process performed by the coefficient presence/absence flag decoding unit 124-A.

As illustrated in FIG. 31, the coefficient presence/absence flag decoding unit 124-A according to this example configuration includes a sub-block coefficient presence/absence flag decoding unit X1, a frequency classification unit 124a, a low-frequency position context derivation unit 124b, and a neighbouring reference context derivation unit 124c.

(Sub-Block Coefficient Presence/Absence Flag Decoding Unit X1)

The sub-block coefficient presence/absence flag decoding unit X1 interprets a bin supplied from the bit decoding unit 132, and decodes a sub-block coefficient presence/absence flag (significant_coeffgroup_flag) indicating whether or not at least one non-zero transform coefficient is present in each of the sub-blocks constituting the frequency region (step SY1 in FIG. 33).

As illustrated in part (a) of FIG. 32, the scan order of the sub-blocks may be such that the sub-blocks are decoded in order from the sub-block including the last coefficient to the sub-block including the DC coefficient, or opposite. In addition, sub-block coefficient presence/absence flags may be determined in accordance with a sub-block coefficient presence/absence flag for a previously decoded sub-block, without decoding data from the coded data. That is, a sub-block coefficient presence/absence flag may be set equal to 1 without data being decoded from the coded data if the sub-block coefficient presence/absence flags for two adjacent sub-blocks are each equal to 1, and otherwise a sub-block coefficient presence/absence flag may be decoded from the coded data.

Then, the coefficient presence/absence flag decoding unit 124-A decodes, for each sub-block in a transform block, a coefficient presence/absence flag in the sub-block (step SY2 to step SY4 in FIG. 33). That is, if the sub-block coefficient presence/absence flag is equal to 1 (YES in step SY2 in FIG. 33) in the sub-block coefficient presence/absence flag decoding unit X1, a coefficient presence/absence flag in the sub-block is decoded using the frequency classification unit 124a, the low-frequency position context derivation unit 124b, and the neighbouring reference context derivation unit 124c. If the sub-block coefficient presence/absence flag is equal to 0 (NO in step SY2 in FIG. 33), the decoding of a coefficient presence/absence flag in the sub-block is skipped, and the process proceeds to the processing of the subsequent sub-block.

Figure 34:
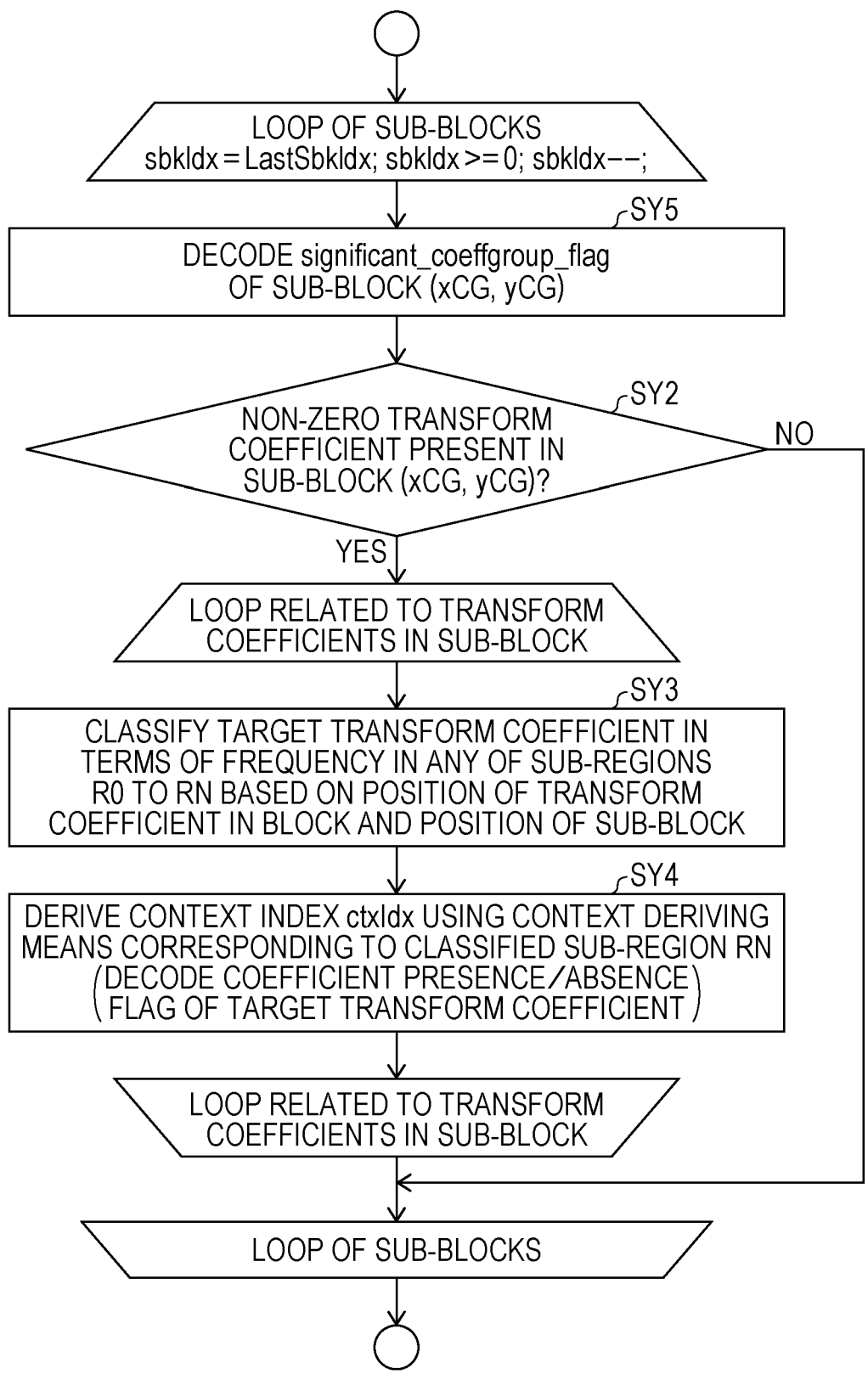
FIG. 34 is a flowchart illustrating another example of the flow of the operation in the seventh to ninth example configurations of the coefficient presence/absence flag decoding unit according to the embodiment.

As illustrated in FIG. 34, in a loop of the sub-blocks, the sub-block coefficient presence/absence flag for the target sub-block (xCG, yCG) may be decoded. Here, in step SY5 in FIG. 34, the sub-block coefficient presence/absence flag decoding unit X1 decodes the sub-block coefficient presence/absence flag significant_coeffgroup_flag for the sub-block specified by (xCG, yCG).

In the loops of the sub-blocks in FIG. 33 and FIG. 34, sbkIdx represents the scan order number of the target sub-block in a forward scan of sub-blocks, and LastSbkIdx represents the scan order number of the sub-block that includes the last coefficient in the forward scan of sub-blocks. If a transform block of sz×sz is divided into 4×4 sub-blocks, the values that sbkIdx and LastSbkIdx take are in the range of 0 to (sz>>2)×(sz>>2)−1, inclusive.

(Frequency Classification Unit 124a Included in Coefficient Presence/Absence Flag Decoding Unit 124-A)

The frequency classification unit 124a included in the coefficient presence/absence flag decoding unit 124-A classifies the frequency component to be decoded into any of a plurality of sub-regions in accordance with the position of the frequency component to be decoded in the frequency region, and allocates a context index ctxIdx derived by any of the low-frequency position context derivation unit 124b and the neighbouring reference context derivation unit 124c to the frequency component to be decoded (step SY3 in FIG. 33).

The frequency classification unit 124a included in the coefficient presence/absence flag decoding unit 124-A classifies the frequency components included in the frequency region into a plurality of sub-regions R0 to R2 using the positions (uiPosX, uiPosY) of the respective frequency regions. It is assumed here that uiPosX=0, 1, . . . , sz−1 and uiPosY=0, 1, . . . , sz−1 (where sz represents, as described above, the number of pixels in one side of the TU to be processed, that is, the number of frequency components in one side of the target frequency region, for example, sz=16, 32, etc.).

Here, a frequency region of sz×sz blocks is divided into 4×4 sub-blocks, and the position of the sub-block including the frequency component (uiPosX, uiPosY) is represented by (xCG, yCG). The position (xCG, yCG) of the sub-block including the frequency component is derived using the following expressions (eq. A1) to (eq. A2).

$$xCG = uiPosX >> 2 \qquad \text{(eq. A1)}$$

$$yCG = uiPosY >> 2 \qquad \text{(eq. A2)}$$

Here, it is assumed that xCG=0, 1, . . . , (sz−1)>>2 and yCG=0, 1, . . . , (sz−1)>>2.

More specifically, the frequency classification unit 124a included in the coefficient presence/absence flag decoding unit 124-A performs the following classification process:

(1) Classifying a frequency component satisfying xCG+yCG<THA and uiPosX+uiPosY<THZ into the sub-region R0.

(2) Classifying a frequency component satisfying xCG+yCG<THA and THZ≤uiPosX+uiPosY into the sub-region R1.

(3) Classifying a frequency component satisfying THA≤xCG+yCG into the sub-region R2.

Pseudo code for the classification process described above is as follows.

```
*************************************************************
if (xCG+yCG < THA) {
    if (uiPosX+uiPosY < THZ) {
        classify into R0
    }
    else{// if (uiPosX+uiPosY>= THZ)
        classify into R1
    }
    else{//if (xCG+yCG>= THA) {
        classify into R2
    }
}
*************************************************************
```

Here, the threshold value THZ is set to 2. THA represents a threshold value satisfying THA≥THZ/4. As a specific value, for example, THA=1 may be used regardless of the frequency region size (the size of the TU to be processed). Alternatively, THA=1<<(log 2TrafoSize−2) may be used using the frequency region size log 2TrafoSize. That is, THA=1 may be used when the frequency region size is 16×16, and THA=2 may be used when the frequency region size is 32×32. In this manner, a different threshold value may be used in accordance with the frequency region size. The threshold value THZ may be equal to 1.

Figure 35:
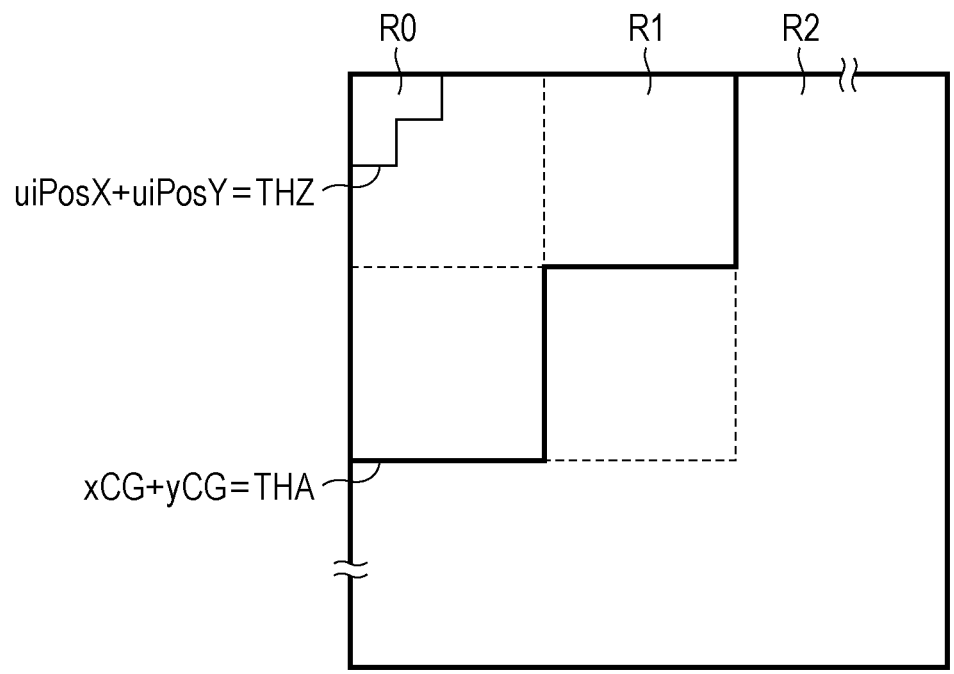
FIG. 35 is a diagram illustrating an example of a frequency region divided into sub-regions R0, R1, and R2 using a classification process by a frequency classification unit included in the seventh example configuration of the coefficient presence/absence flag decoding unit according to the embodiment.

FIG. 35 illustrates an example of a frequency region that is divided into sub-regions R0, R1, and R2 using a classification process performed by the frequency classification unit 124a included in the coefficient presence/absence flag decoding unit 124-A.

The frequency classification unit 124a included in the coefficient presence/absence flag decoding unit 124-A allocates the context index derived by the low-frequency position context derivation unit 124b to the frequency components included in the sub-region R0, and allocates the context index derived by the neighbouring reference context derivation unit 124c to the frequency components included in the sub-regions R1 and R2. The description has been given using, as an example but not limited to, a sub-block size of 4×4. A sub-block of (sz>>n)×(sz>>n) may be used, where n satisfies n=1, . . . , log 2TrafoSize>>1.

Furthermore, the frequency classification unit 124a included in the coefficient presence/absence flag decoding unit 124-A calculates a context index ctxIdx for determining a context to be used to decode the syntax element significant_coeff_flag using the arithmetic code decoding unit 130. The context index ctxIdx is calculated for each frequency region size and for each frequency component to be decoded (step SY4 in FIG. 33). The decoded syntax element significant_coeff_flag is stored in the decoded coefficient memory unit 126, and is referenced by the coefficient value decoding unit 125. The context index ctxIdx used for decoding is supplied to the context recording/updating unit 131.

In the following, a specific description will be given of context derivation for the sub-regions R0 to R2.

(Low-Frequency Position Context Derivation Unit 124b Included in Coefficient Presence/Absence Flag Decoding Unit 124-A)

The low-frequency position context derivation unit 124b included in the coefficient presence/absence flag decoding unit 124-A derives a context index ctxIdx for the frequency component to be decoded, on the basis of the position of the frequency component in the frequency region if the frequency component is included in a low-frequency-side sub-region.

The low-frequency position context derivation unit 124b included in the coefficient presence/absence flag decoding unit 124-A derives a context index ctxIdx for the frequency components included in the sub-region R0 using the expression below (eq. A3), and supplies the derivation result ctxIdx to the frequency classification unit 124a.

$$\text{ctxIdx}=NX+2\times uiPosX+uiPosY \quad \text{(eq. A3)}$$

NX is a constant representing the starting point of the context index. If the frequency region size is 4×4 and 8×8 and the numbers of contexts used therefor are N4 and N8, respectively, the starting point for frequency region sizes of 16×16 and 32×32 is given by NX=N4+N8.

(Neighbouring Reference Context Derivation Unit 124c Included in Coefficient Presence/Absence Flag Decoding Unit 124-A)

The neighbouring reference context derivation unit 124c included in the coefficient presence/absence flag decoding unit 124-A derives a context index ctxIdx for the frequency component to be decoded, on the basis of the number of decoded non-zero transform coefficients cnt for neighbouring frequency components of the frequency component.

The neighbouring reference context derivation unit 124c included in the coefficient presence/absence flag decoding unit 124-A derives a context index ctxIdx for the frequency components included in the sub-region R1 using the expression below (eq. A4), and supplies the derivation result ctxIdx to the frequency classification unit 124a.

$$\text{ctxIdx}=NX+3+\min(2,\text{temp}) \quad \text{(eq. A4)}$$

Here, temp is determined by $$\text{temp}=(\text{cnt}+1)>>1.$$

The neighbouring reference context derivation unit 124c, included in the coefficient presence/absence flag decoding unit 124-A, further derives a context index ctxIdx for the frequency components included in the sub-region R2 using the expression below (eq. A5), and supplies the derivation result ctxIdx to the frequency classification unit 124a.

$$\text{ctxIdx}=NX+6+\min(2,\text{temp}) \quad \text{(eq. A5)}$$

Here, similarly to above, temp is determined by $$\text{temp}=(\text{cnt}+1)>>1.$$

In expressions (eq. A4) to (eq. A5), the right-shifting of the number of counts of the non-zero transform coefficient cnt by 1 bit can reduce the number of contexts.

The neighbouring reference context derivation unit 124c further derives the number of counts of the non-zero transform coefficient cnt in the sub-region R1, using the reference frequency components c1 to c5 illustrated in part (a) of FIG. 10 or part (b) of FIG. 10 in accordance with the following expression (eq. A6).

$$\text{cnt}=(c1!=0)+(c2!=0)+(c3!=0)+(c4!=0)+(c5!=0) \quad \text{(eq. A6)}$$

In (eq. A6), each term takes 1 if the comparison in parentheses is true, and takes 0 if the comparison in parentheses is false.

Figure 36:
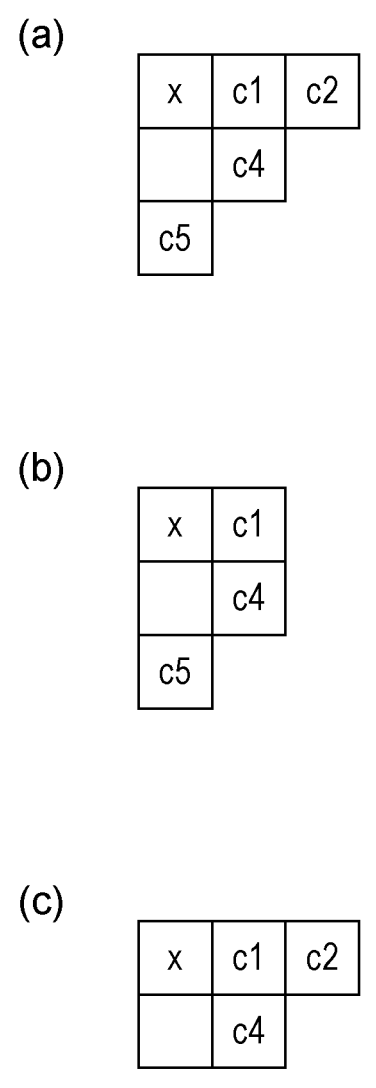

The number of non-zero transform coefficients cnt may be calculated using mathematical expression (eq. A7) instead of expression (eq. A6). In mathematical expression (eq. A7), reference frequency components (c1, c2, c4, and c5) illustrated in part (a) of FIG. 36 are used, and the transform coefficient at the coordinates (c3) of the immediately preceding position of the target transform coefficient in the processing order (if the processing order is reverse scan order, the transform coefficient below the position of the target transform coefficient) is not referred to. This process allows a context used for the decoding of a coefficient presence/absence flag at a given position to be derived without reference to the value of the immediately preceding coefficient presence/absence flag, and can therefore achieve parallel execution of the context derivation process and the decoding process.

$$\text{cnt}=(c1!=0)+(c2!=0)+(c4!=0)+(c5!=0) \quad \text{(eq. A7)}$$

Alternatively, a transform coefficient may be derived using either mathematical expression (eq. A6) or mathematical expression (eq. A7) in accordance with the position of the target transform coefficient in the sub-block. That is, the reference component to be used for the derivation of a transform coefficient may be changed in accordance with the position of the target transform coefficient in the sub-block.

More specifically, in either a case where the target transform coefficient is at the upper left of a sub-block or a case where the target transform coefficient is at the lower right of the sub-block, the reference frequency components in mathematical expression (eq. A7) may be used in order to avoid the dependence on the value of the transform coefficient immediately preceding the target transform coefficient (here, below the target transform coefficient) in the sub-block in the processing order, and otherwise the reference frequency components in mathematical expression (eq. A6) may be used.

As described above, according to the coefficient presence/absence flag decoding unit 124-A according to this example configuration, the frequency classification unit 124a classifies frequency components in accordance with the sub-block coordinates. Accordingly, if the sub-block coordinates (xCG, yCG) satisfy xCG+yCG>0, a branching process for frequency classification within a sub-block can be omitted. The classification described above, examples of which include Classification of a frequency component satisfying uiPosX+uiPosY<2 into the sub-region R0.
Classification of a frequency component satisfying 2≤uiPosX+uiPosY<TH1 into the sub-region R1.
Classification of a frequency component satisfying TH1≤uiPosX+uiPosY<TH2 into the sub-region R2.
Classification of a frequency component satisfying TH2≤uiPosX+uiPosY into the sub-region R3.

In the case of the above-identified classification, a branching process for performing the classification described within a sub-block is necessary. However, this example configuration does not involve the branching described above for referring to (uiPosX, uiPosY) because the coordinates to be referred to in the classification process can be replaced by the sub-block coordinates (xCG, yCG) rather than the coordinates (uiPosX, uiPosY) in an entire block. Accordingly, the delay caused in the derivation of context indices in a sub-block can be removed, improving the throughput of context derivation.

In the configuration described above, furthermore, a sub-block coefficient presence/absence flag for each sub-block and a coefficient presence/absence flag in the sub-block are combined to decode the presence or absence of a non-zero coefficient. This configuration can simplify the derivation of contexts to be used for the decoding of coefficient presence/absence flags in a sub-block. That is, as illustrated in part (a) of FIG. 36, the number of references can be reduced to four.

In the example described above, frequency components are classified into three sub-regions. Alternatively, frequency components may be classified into two sub-regions. In this case, (1) A frequency component satisfying uiPosX+uiPosY<THZ is classified into a sub-region R0.
(2) A frequency component satisfying THZ≤uiPosX+uiPosY is classified into a sub-region R1.

The derivation of contexts used for the decoding of coefficient presence/absence flags for the sub-region R0 is as described above. The derivation of contexts used for the decoding of coefficient presence/absence flags for the sub-region R1 may be based on ctxIdx=NX+3+min(2,temp)　　　　(eq. A4)

temp=(cnt+1)>>1, and cnt may be determined using four references, for example, using mathematical expression (eq. A7). This configuration can simplify the derivation of contexts used for the decoding of coefficient presence/absence flags in a sub-block.

Frequency components may also be classified into R0 and R1 in accordance with the following conditions.

(1) A frequency component satisfying xCG+yCG==0 and uiPosX+uiPosY<THZ is classified into the sub-region R0.
(2) A frequency component satisfying xCG+yCG>0 or THZ≤uiPosX+uiPosY is classified into the sub-region R1.

Pseudo code for the classification process described above is as follows.

```
*************************************************************
if ( xCG+yCG==0 ){
        if( uiPosX+uiPosY<THZ ){
            classify into R0
        }
        else {// if( uiPosX+uiPosY>=THZ)
            classify into R1
        }
}
else{//if{ xCG+yCG>0 )
        classify into R1
}
*************************************************************
```

The classification process described above can remove a branching process for classifying frequency components in a sub-block in a portion other than the position at which the sub-block position (xCG, yCG) is (0, 0).

As described above, for the high-frequency side, the frequency classification unit 124a included in the coefficient presence/absence flag decoding unit 124-A refers to the position of the target sub-block in the target frequency region, and divides the frequency region into sub-regions.

The neighbouring reference context derivation unit 124c derives a context to be used to decode coefficient presence/absence flags that belong to the sub-regions obtained by the above-described subdivision.

Accordingly, if the target sub-block is included in a high-frequency-side sub-region in the target frequency region, the coefficient presence/absence flag decoding unit 124-A can be regarded as being configured to derive a context index to be allocated to each transform coefficient presence/absence flag that belongs to the target sub-block, in accordance with the position of the target sub-block in the target frequency region.

The following is a pseudo code in the seventh example configuration of the coefficient presence/absence flag decoding unit in a case where for a transform block size of 16×16 or 32×32, a frequency region is divided into sub-regions R0 and R1, a context index ctxIdx for R0 is derived using a low-frequency position context, and a context index ctxIdx for R1 is derived using neighbouring reference contexts that are based on the four reference frequency components (c1, c2, c4, and c5) illustrated in part (a) of FIG. 36. sigCtx in the pseudo code is synonym for ctxIdx.

```
*************************************************************
If log2TrafoSize is less than or equal to 3, sigCtx is
derived as follows.
        shift = log2TrafoSize = = 3 ? 1 : 0 sigCtx =
(shift * 15) + ((yC >> shift) << 2) + (xC >> shift)
If cIdx is equal to 0 and log2TrafoSize is larger than 3,
sigCtx is derived as follows
    If xC + yC is less than 1, sigCtx is derived as
follows.
        sigCtx = 31
    Otherwise if (xC>>2) + (yC>>2) is less than 1 <<
(uiLog2BlkSize−4), sigCtx is derived as follows.
        temp = significant_coeff_flag[ xC + 1 ][ yC ] +
significant_coeff_flag[ xC + 2 ][ yC ] +
significant_coeff_flag[ xC ][ yC + 1 ] +
significant_coeff_flag[ xC + 1 ][ yC + 1 ] +
significant_coeff_flag[ xC ][ yC + 2 ]
        temp = (temp + 1) >> 1
        sigCtx = 32 + Min(2, temp)
    Otherwise ((xC>>2) + (yC>>2) is greater than or equal
to 1 << (uiLog2BlkSize−4))), sigCtx is derived using
previously decoded bins of the syntax element
significant_coeff_flag as follows.
        The variable ctxCnt is initialized as follows.
            ctxCnt = 0
```

-continued

```
        When xC is less than (1 << log2TrafoSize) ? 1, the
following applies.
                ctxCnt = ctxCnt + significant_coeff_flag[ xC +
1 ][ yC ]
        When xC and yC are less than (1 << log2TrafoSize) ? 1,
the following applies.
                ctxCnt = ctxCnt + significant_coeff_flag[ xC +
1 ][ yC + 1 ]
        When xC is less than (1 << log2TrafoSize) ? 2, the
following applies.
                ctxCnt = ctxCnt + significant_coeff_flag[ xC +
2 ][ yC ]
        When yC is less than (1 << log2TrafoSize) ? 2 and
ctxCnt is less than 3, the following applies.
                ctxCnt = ctxCnt + significant_coeff_flag[ xC ][ yC +
2 ]
        ctxCnt = (ctxCnt + 1) >> 1
        sigCtx = 35 + ctxCnt
If cIdx is greater than 0 and log2TrafoSize is larger than
3, sigCtx is derived as follows
        If xC + yC is less than 1, sigCtx is derived as
follows.
                sigCtx = 31
        Otherwise (xC + yC is greater than or equal to 1),
sigCtx is derived using previously decoded bins of the
syntax element significant_coeff_flag as follows.
        The variable ctxCnt is initialized as follows.
                ctxCnt = 0
        When xC is less than (1 << log2TrafoSize) ? 1, the
following applies.
                ctxCnt = ctxCnt + significant_coeff_flag[ xC +
1 ][ yC ]
        When xC and yC are less than (1 << log2TrafoSize) ? 1,
the following applies.
                ctxCnt = ctxCnt + significant_coeff_flag[ xC +
1 ][ yC + 1 ]
        When xC is less than (1 << log2TrafoSize) ? 2, the
following applies.
                ctxCnt = ctxCnt + significant_coeff_flag[ xC +
2 ][ yC ]
        When yC is less than (1 << log2TrafoSize) ? 1, the
following applies.
                ctxCnt = ctxCnt + significant_coeff_flag[ xC ][ yC +
1 ]
        When yC is less than (1 << log2TrafoSize) ? 2 and
ctxCnt is less than 3, the following applies.
                ctxCnt = ctxCnt + significant_coeff_flag[ xC ][ yC +
2 ]
        ctxCnt = ((ctxCnt + 1) >> 1
        sigCtx = 32 + ctxCnt
*****************************************************
```

The following is pseudo code in the seventh example configuration of the coefficient presence/absence flag decoding unit in a case where for a transform block size of 16×16 or 32×32, frequency regions are divided into sub-regions R0, R1, and R2, a context index ctxIdx for R0 is derived using a low-frequency position context, a context index ctxIdx for R1 is derived using neighbouring reference contexts that are based on the five reference frequency components (c1, c2, c3, c4, and c5) illustrated in part (a) of FIG. 10, and a context index ctxIdx for R2 is derived using neighbouring reference contexts that are based on the four reference frequency components (c1, c2, c4, and c5) illustrated in part (a) of FIG. 36. sigCtx in the pseudo code is synonym for ctxIdx.

```
*****************************************************
        If log2TrafoSize is less than or equal to 3, sigCtx is
derived as follows.
                shift = log2TrafoSize = = 3 ? 1 : 0
                sigCtx = (shift * 15) + ((yC >> shift) << 2) + (xC
>> shift)
If cIdx is equal to 0 and log2TrafoSize is larger than 3,
sigCtx is derived as follows
        If xC + yC is less than 1, sigCtx is derived as
follows.
                sigCtx = 31
        Otherwise if xC + yC is less than 1 << (uiLog2BlkSize-
2), sigCtx is derived as follows.
                temp = significant_coeff_flag[ xC + 1 ][ yC ] +
significant_coeff_flag[ xC + 2 ][ yC ] +
significant_coeff_flag[ xC ][ yC + 1 ] +
significant_coeff_flag[ xC + 1 ][ yC + 1 ] +
significant_coeff_flag[ xC ][ yC + 2 ]
                temp = (temp + 1) >> 1
                sigCtx = 32 + Min(2, temp)
        Otherwise (xC + yC is greater than or equal to 1 <<
(uiLog2BlkSize-2)), sigCtx is derived using previously
decoded bins of the syntax element significant_coeff_flag as
follows.
        The variable ctxCnt is initialized as follows.
                ctxCnt = 0
        When xC is less than (1 << log2TrafoSize) ? 1, the
following applies.
                ctxCnt = ctxCnt + significant_coeff_flag[ xC +
1 ][ yC ]
        When xC and yC are less than (1 << log2TrafoSize) ? 1,
the following applies.
                ctxCnt = ctxCnt + significant_coeff_flag[ xC +
1 ][ yC + 1 ]
        When xC is less than (1 << log2TrafoSize) ? 2, the
following applies.
                ctxCnt = ctxCnt + significant_coeff_flag[ xC +
2 ][ yC ]
        When yC is less than (1 << log2TrafoSize) ? 2 and
ctxCnt is less than 3, the following applies.
                ctxCnt = ctxCnt + significant_coeff_flag[ xC ][ yC +
2 ]
        ctxCnt = (ctxCnt + 1) >> 1
        sigCtx = 35 + ctxCnt
If cIdx is greater than 0 and log2TrafoSize is larger than
3, sigCtx is derived as follows
        If xC + yC is less than 1, sigCtx is derived as
follows.
                sigCtx = 31
        Otherwise if xC + yC is less than 1 << (uiLog2BlkSize-
2), sigCtx is derived as follows.
                temp = significant_coeff_flag[ xC + 1 ][ yC ] +
significant_coeff_flag[ xC + 2 ][ yC ] +
significant_coeff_flag[ xC ][ yC + 1 ] +
significant_coeff_flag[ xC + 1 ][ yC + 1 ] +
significant_coeff_flag[ xC ][ yC + 2 ]
                temp = (temp + 1) >> 1
                sigCtx = 32 + Min(2, temp)
        Otherwise (xC + yC is greater than or equal to 1 <<
(uiLog2BlkSize-2)), sigCtx is derived using previously
decoded bins of the syntax element significant_coeff_flag as
follows.
        The variable ctxCnt is initialized as follows.
                ctxCnt = 0
        When xC is less than (1 << log2TrafoSize) ? 1, the
following applies.
                ctxCnt = ctxCnt + significant_coeff_flag[ xC +
1 ][ yC ]
        When xC and yC are less than (1 << log2TrafoSize) ? 1,
the following applies.
                ctxCnt = ctxCnt + significant_coeff_flag[ xC +
1 ][ yC + 1 ]
        When xC is less than (1 << log2TrafoSize) ? 2, the
following applies.
                ctxCnt = ctxCnt + significant_coeff_flag[ xC +
2 ][ yC ]
        When yC is less than (1 << log2TrafoSize) ? 2 and
ctxCnt is less than 3, the following applies.
                ctxCnt = ctxCnt + significant_coeff_flag[ xC ][ yC +
2 ]
        ctxCnt = (ctxCnt + 1) >> 1
        sigCtx = 32 + ctxCnt
*****************************************************
```

Eighth Example Configuration of Coefficient
Presence/Absence Flag Decoding Unit

Figure 37:
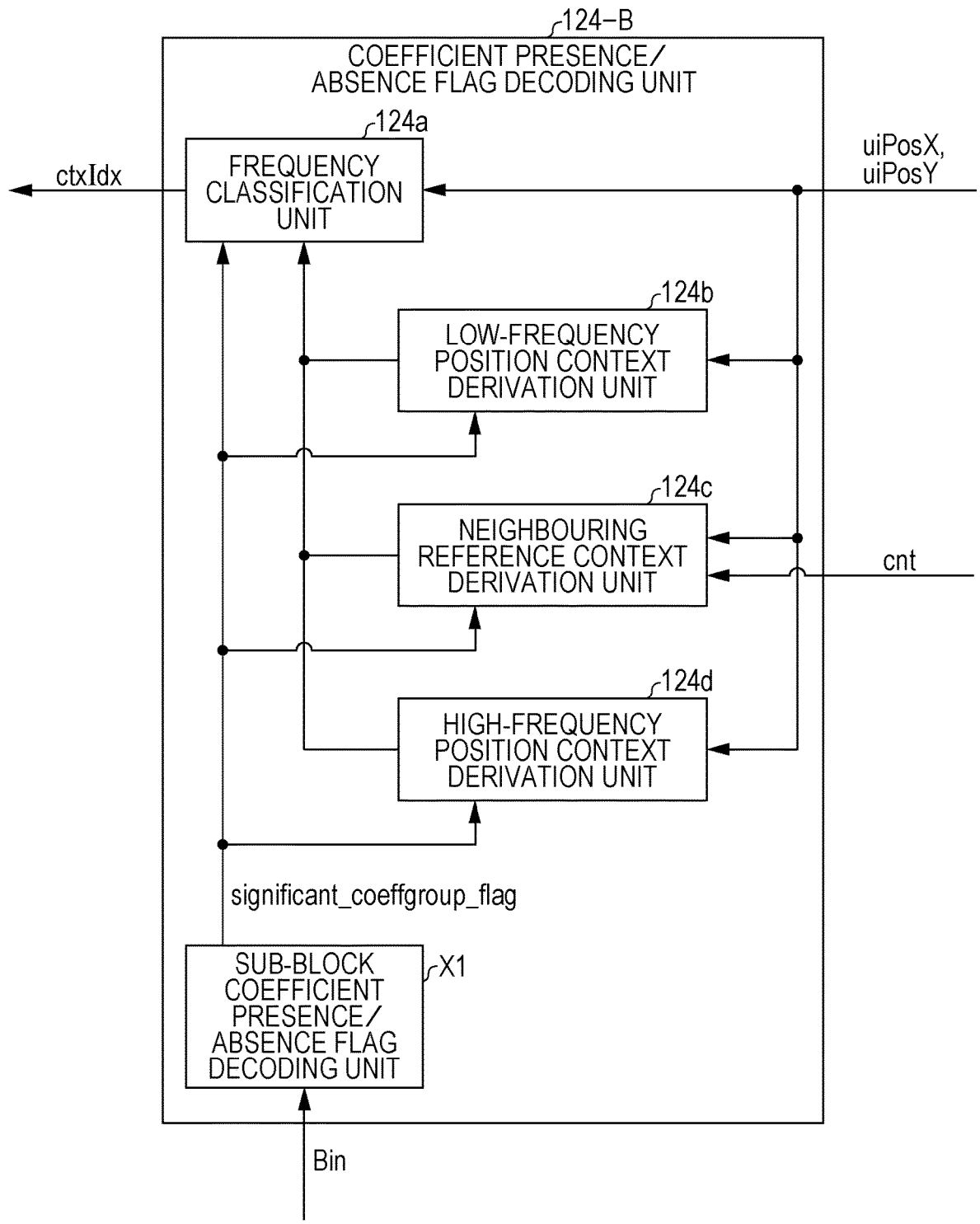
FIG. 37 is a block diagram illustrating an eighth example configuration of the coefficient presence/absence flag decoding unit according to the embodiment.

FIG. 37 is a block diagram illustrating a coefficient presence/absence flag decoding unit 124-B as an eighth example configuration of the coefficient presence/absence flag decoding unit according to this embodiment. The flow of a decoding process performed by the coefficient presence/absence flag decoding unit 124-B according to this example configuration will be described with reference to the flowchart illustrated in FIG. 33.

As illustrated in FIG. 37, the coefficient presence/absence flag decoding unit 124-B according to this example configuration includes a sub-block coefficient presence/absence flag decoding unit X1, a frequency classification unit 124a, a low-frequency position context derivation unit 124b, a neighbouring reference context derivation unit 124c, and a high-frequency position context derivation unit 124d.

(Sub-Block Coefficient Presence/Absence Flag Decoding Unit x1 Included in Coefficient Presence/Absence Flag Decoding Unit 124-B)

The sub-block coefficient presence/absence flag decoding unit X1 included in the coefficient presence/absence flag decoding unit 124-B interprets a bin supplied from the bit decoding unit 132, and decodes a sub-block coefficient presence/absence flag (significant_coeffgroup_flag) indicating whether or not at least one non-zero transform coefficient is present in each of sub-blocks constituting a frequency region (step SY1 in FIG. 33).

Then, the sub-block coefficient presence/absence flag decoding unit X1 decodes, for each sub-block in a transform block, a transform coefficient presence/absence flag in the sub-block (step SY2 to step SY4 in FIG. 33). That is, if the sub-block coefficient presence/absence flag is equal to 1 (YES in step SY2 in FIG. 33) in the sub-block coefficient presence/absence flag decoding unit X1, a coefficient presence/absence flag in the sub-block is decoded using the frequency classification unit 124a, the low-frequency position context derivation unit 124b, the neighbouring reference context derivation unit 124c, and the high-frequency position context derivation unit 124d. If the sub-block coefficient presence/absence flag is equal to 0 (NO in step SY2 in FIG. 33), the decoding of a coefficient presence/absence flag in the sub-block is skipped, and the process proceeds to the processing of the subsequent sub-block.

(Frequency Classification Unit 124a Included in Coefficient Presence/Absence Flag Decoding Unit 124-B)

The frequency classification unit 124a included in the coefficient presence/absence flag decoding unit 124-B classifies the frequency component to be decoded into any of a plurality of sub-regions in accordance with the position of the frequency component to be decoded in the frequency region, and allocates a context index ctxIdx derived by any of the low-frequency position context derivation unit 124b, the neighbouring reference context derivation unit 124c, and the high-frequency position context derivation unit 124d to the frequency component to be decoded (step SY3 in FIG. 33).

The frequency classification unit 124a included in the coefficient presence/absence flag decoding unit 124-B refers to the position (uiPosX, uiPosY) at which each frequency component included in the frequency region is located in the frequency region, and classifies the frequency component into a plurality of sub-regions R0 to R3. It is assumed here that uiPosX=0, 1, . . . , sz−1 and uiPosY=0, 1, . . . , sz−1 (where sz represents, as described above, the number of pixels in one side of the TU to be processed, that is, the number of frequency components in one side of the target frequency region; for example, sz=16, 32, etc.).

Here, a frequency region of sz×sz blocks is divided into 4×4 sub-blocks, and the position of the sub-block including the frequency component (uiPosX, uiPosY) is represented by (xCG, yCG). The position (xCG, yCG) of the sub-block including the frequency component is derived using the following expressions (eq. B1) to (eq. B2).

$$xCG = uiPosX \gg 2 \qquad (eq. B1)$$

$$yCG = uiPosY \gg 2 \qquad (eq. B2)$$

Here, xCG=0, 1, . . . , (sz−1)≫2 and yCG=0, 1, . . . , (sz−1)≫2.

More specifically, the frequency classification unit 124a included in the coefficient presence/absence flag decoding unit 124-B performs the following classification process:

(1) Classifying a frequency component satisfying xCG+yCG<THB and uiPosX+uiPosY<THZ into the sub-region R0.

(2) Classifying a frequency component satisfying xCG+yCG<THB and THZ≤uiPosX+uiPosY<TH1 into the sub-region R1.

(3) Classifying a frequency component satisfying xCG+yCG<THB and TH1≤uiPosX+uiPosY into the sub-region R2.

(4) Classifying a frequency component satisfying THB≤xCG+yCG into the sub-region R3.

Pseudo code for the classification process described above is as follows.

```
***************************************************
if (xCG+yCG < THB) {
    if (uiPosX+uiPosY < THZ) {
        classify into R0
    }
    else if (uiPosX+uiPosY < TH1) {
        classify into R1
    } else{ //if (uiPosX+uiPosY >= TH1)
        classify into R2
    }
else{// if (xCG+yCG >= THB)
    classify into R3
}
***************************************************
```

Here, the threshold value THZ is set to 2. Specifically, TH1 and THB may be set to, for example, TH1=5, and $THB = 1 \ll (\log 2TrafoSize-2)$ using the frequency region size (the size of the TU to be processed) log 2TrafoSize. TH1=5 and THB=4 may be used when the frequency region size is 16×16, and TH1=5 and THB=8 may be used when the frequency region size is 32×32. Alternatively, the threshold values TH1 and THB may be set to TH1=5, and $THB = 1 \ll (\log 2TrafoSize-4)$ using the frequency region size log 2TrafoSize. That is, TH1=5 and THB=1 are set when the frequency region size is 16×16, and TH1=5 and THB=2 are set when the frequency region size is 32×32. Other values may be set.

Alternatively, the threshold values TH1 and THB may be set to

TH1=5, and $THB = 1 \ll (\log 2TrafoSize-3)$.

That is, TH1=5 and THB=2 are set when the frequency region size is 16×16, and TH1=5 and THB=4 are set when the frequency region size is 32×32. In this manner, different threshold values may be used in accordance with the frequency region size.

According to the frequency classification unit 124a having the configuration described above, a branching process for switching the context derivation method in accordance with the position of a transform coefficient can be replaced by a branching process that uses sub-block coordinates (xCG, yCG). A branching process in which (uiPosX, uiPosY) are referred to, which is performed within a sub-block, can be omitted, improving the throughput of context derivation, compared to the branching process in which (uiPosX, uiPosY) are referred to.

Figure 38:
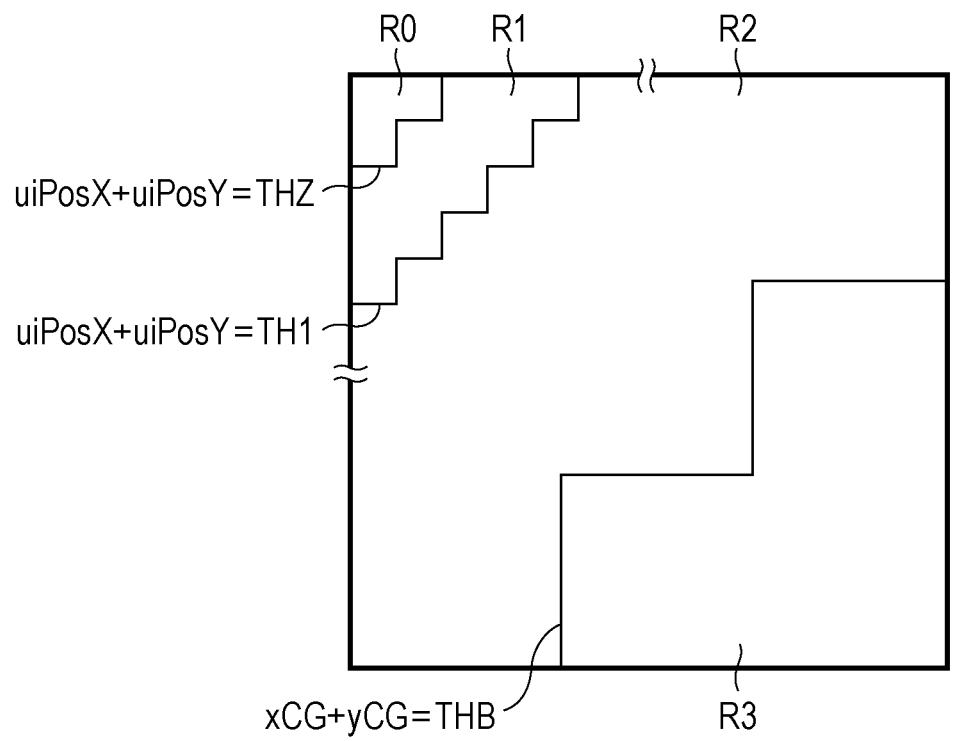
FIG. 38 is a diagram illustrating an example of a frequency region divided into sub-regions R0, R1, R2, and R3 using a classification process by a frequency classification unit included in the eighth example configuration of the coefficient presence/absence flag decoding unit according to the embodiment.

FIG. 38 illustrates an example of a frequency region that is divided into sub-regions R0, R1, R2, and R3 using a classification process by the frequency classification unit 124a included in the coefficient presence/absence flag decoding unit 124-B.

The frequency classification unit 124a included in the coefficient presence/absence flag decoding unit 124-B allocates the context index derived by the low-frequency position context derivation unit 124b to the frequency components included in the sub-region R0, allocates the context index derived by the neighbouring reference context derivation unit 124c to the frequency components included in the sub-regions R1 and R2, and allocates the context index derived by the high-frequency position context derivation unit 124d to the frequency components included in the sub-region R3.

In the foregoing description, the frequency classification unit 124a refers to (uiPosX, uiPosY) as the position of the target frequency component, and refers to the position (xCG, yCG) of the sub-block including the target frequency component. However, this embodiment is not limited to this. For example, a frequency component identification index (for example, "n" in FIG. 5) assigned in forward scan order or reverse scan order may be referenced as the position of the target frequency component, and the target frequency component may be classified into any of a plurality of sub-regions.

Furthermore, the frequency classification unit 124a included in the coefficient presence/absence flag decoding unit 124-B calculates a context index ctxIdx for determining a context to be used to decode the syntax element significant_coeff_flag using the arithmetic code decoding unit 130. The context index ctxIdx is calculated for each frequency region size and for each frequency component to be decoded (step SY4 in FIG. 33). The decoded syntax element significant_coeff_flag is stored in the decoded coefficient memory unit 126, and is referenced by the coefficient value decoding unit 125. The context index ctxIdx used for decoding is supplied to the context recording/updating unit 131.

In the following, a specific description will be given of context derivation for the sub-regions R0 to R3.

(Low-Frequency Position Context Derivation Unit 124b Included in Coefficient Presence/Absence Flag Decoding Unit 124-B)

The low-frequency position context derivation unit 124b included in the coefficient presence/absence flag decoding unit 124-B derives a context index ctxIdx for the frequency component to be decoded, on the basis of the position of the frequency component in the frequency region if the frequency component is included in a low-frequency-side sub-region.

The low-frequency position context derivation unit 124b included in the coefficient presence/absence flag decoding unit 124-B derives a context index ctxIdx for the frequency components included in the sub-region R0 using the expression below (eq. B3), and supplies the derived context index ctxIdx to the frequency classification unit 124a.

$$\text{ctxIdx}=NX+2\times uiPosX+uiPosY \quad (\text{eq. B3})$$

NX is a constant representing the starting point of the context index. If the frequency region size is 4×4 and 8×8 and the numbers of contexts used therefor are N4 and N8, respectively, the starting point for frequency region sizes of 16×16 and 32×32 is given by NX=N4+N8.

(Neighbouring Reference Context Derivation Unit 124c Included in Coefficient Presence/Absence Flag Decoding Unit 124-B)

The neighbouring reference context derivation unit 124c included in the coefficient presence/absence flag decoding unit 124-B derives a context index ctxIdx for the frequency component to be decoded, on the basis of the number of decoded non-zero transform coefficients cnt for neighbouring frequency components of the frequency component.

The neighbouring reference context derivation unit 124c included in the coefficient presence/absence flag decoding unit 124-B derives a context index ctxIdx for the frequency components included in the sub-region R1 using the expression below (eq. B4), and supplies the derivation result ctxIdx to the frequency classification unit 124a.

$$\text{ctxIdx}=NX+3+\min(4,\text{cnt}) \quad (\text{eq. B4})$$

In the sub-region R1, the number of counts of the non-zero transform coefficient cnt is derived using (C1, C2, C3, C4, and C5) illustrated in part (a) of FIG. 10 or part (b) of FIG. 10 in accordance with the following expression (eq. B5).

$$\text{cnt}=(c1!=0)+(c2!=0)+(c3!=0)+(c4!=0)+(c5!=0) \quad (\text{eq. B5})$$

The neighbouring reference context derivation unit 124c included in the coefficient presence/absence flag decoding unit 124-B further derives a context index ctxIdx for the frequency components included in the sub-region R2 using the expression below (eq. B6), and supplies the derived context index ctxIdx to the frequency classification unit 124a.

$$\text{ctxIdx}=NX+8+\min(4,\text{cnt}) \quad (\text{eq. B6})$$

In the sub-region R2, the number of counts of the non-zero transform coefficient cnt is derived using the reference frequency components (c1, c2, c4, and c5) illustrated in part (a) of FIG. 36 in accordance with the expression below (eq. B7) in which the transform coefficient at the coordinates (c3) of the immediately preceding position in the processing order (if the processing order is reverse scan order, the transform coefficient below the position of the target transform coefficient) is not referred to. This process allows a context used for the decoding of a coefficient presence/absence flag at a given position to be derived without reference to the value of the immediately preceding coefficient presence/absence flag, and can therefore achieve parallel execution of the context derivation process and the decoding process.

$$\text{cnt}=(c1!=0)+(c2!=0)+(c4!=0)+(c5!=0) \quad (\text{eq. B7})$$

In expression (eq. B7), each term takes 1 if the comparison in parentheses is true, and takes 0 if the comparison in parentheses is false.

For the sub-region R1, the number of non-zero coefficients cnt may be calculated using expression (eq. B7) instead of expression (eq. B6).

For the sub-region R2, the number of non-zero coefficients cnt may be calculated using three reference coefficients illustrated in part (c), (d), (e), or (f) of FIG. 15, part (b) of FIG. 36, or part (c) of FIG. 36 instead of using expression (eq. B7).

(High-Frequency Position Context Derivation Unit 124*d* Included in Coefficient Presence/Absence Flag Decoding Unit 124-B)

The high-frequency position context derivation unit 124*d* included in the coefficient presence/absence flag decoding unit 124-B derives a context index ctxIdx for the frequency component to be decoded, on the basis of the position of the frequency component in the frequency region and the position of the sub-block including the frequency component if the frequency component is included in a high-frequency-side sub-region.

The high-frequency position context derivation unit 124*d* included in the coefficient presence/absence flag decoding unit 124-B derives a context index ctxIdx for the frequency components included in the sub-region R3, using the expression (eq. B8) below, and supplies the derivation result ctxIdx to the frequency classification unit 124*a*.

$$\text{ctxIdx} = NX + 13 + \min(\max R3, (xCG + yCG - THB) \gg \text{shift}) \quad \text{(eq. B8)}$$

Here, the sign ">>" represents the right-bit shift operation. In addition, as shift and maxR3, for example, shift=0 and maxR3=3 may be used when the size of the target frequency region is 16×16, and shift=1 and maxR3=3 may be used when the size of the target frequency region is 32×32. However, this embodiment is not limited to this.

An example of a frequency region that is divided using the classification process by the frequency classification unit 124*a* included in the coefficient presence/absence flag decoding unit 124-B is not limited to that illustrated in FIG. 38. For example, a frequency region may be divided in a manner illustrated in FIG. 39. That is, the frequency classification unit 124*a* included in the coefficient presence/absence flag decoding unit 124-B may be configured to classify a frequency region into sub-regions R0, R1, R2, and R3 as follows.

(1) A frequency component satisfying xCG+yCG<THA and uiPosX+uiPosY<THZ is classified into the sub-region R0.

(2) A frequency component satisfying xCG+yCG<THA and uiPosX+uiPosY≥THZ is classified into the sub-region R1.

(3) A frequency component satisfying THA≤xCG+yCG<THB is classified into the sub-region R2.

(4) A frequency component satisfying THB≤xCG+yCG is classified into the sub-region R3.

Pseudo code for the classification process described above is as follows.

```
***************************************************************
if (xCG+yCG < THA) {
    if (uiPosX+uiPosY < THZ) {
        classify into R0
    }
    else {// if (uiPosX+uiPosY>THZ)
        classify into R1
    }
}
else if (xCG+yCG < THB) {
    classify into R2
}
else{ // if (xCG+yCG>= THB)
    classify into R3
}
***************************************************************
```

Here, the threshold value THZ is set to 2. Specifically, THA and THB may be set to, for example, the following values $$THA = 1 \ll (\log 2TrafoSize - 4), \text{ and}$$

$$THB = 1 \ll (\log 2TrafoSize - 2)$$

using the frequency region size (the size of the TU to be processed) log 2TrafoSize. THA=1 and THB=4 may be used when the frequency region size is 16×16, and THA=2 and THB=8 may be used when the frequency region size is 32×32. Alternatively, the threshold value THB may be set to $$THB = 1 \ll (\log 2TrafoSize - 3)$$

using the frequency region size log 2TrafoSize. That is, THB=2 is set when the frequency region size is 16×16, and THB=4 is set when the frequency region size is 32×32. In this manner, different threshold values may be used in accordance with the frequency region size.

Figure 39:
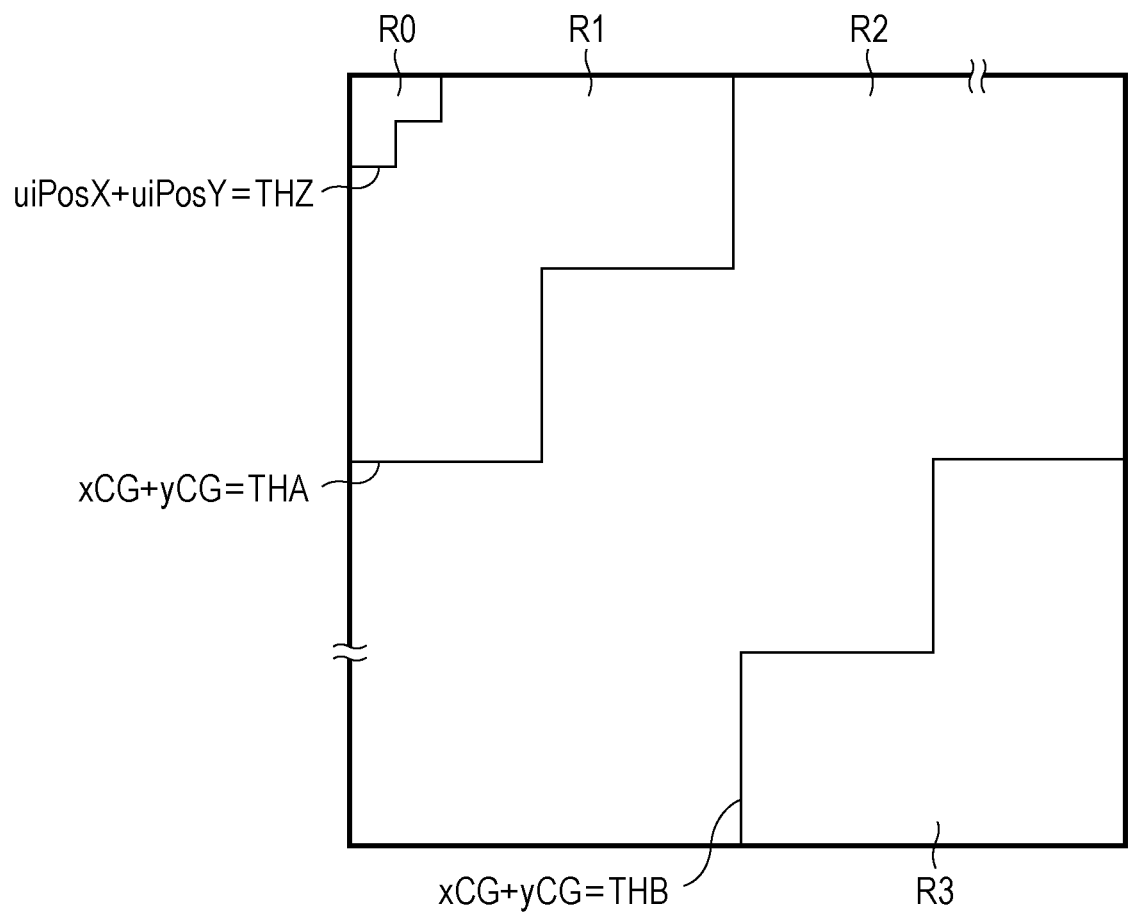
FIG. 39 is a diagram illustrating another example of the frequency region divided into sub-regions R0, R1, R2, and R3 using a classification process by the frequency classification unit included in the eighth example configuration of the coefficient presence/absence flag decoding unit according to the embodiment.

In the example illustrated in FIG. 39, a frequency region is classified into sub-regions R0, R1, R2, and R3. For the frequency components included in the sub-regions R0, R1 and R2, and R3, as described above, context indices ctxIdx are calculated by the low-frequency position context derivation unit 124*b*, the neighbouring reference context derivation unit 124*c*, and the high-frequency position context derivation unit 124*d*, respectively.

According to the frequency classification unit 124*a* having the configuration described above, branching for switching the context derivation method in accordance with the position of a transform coefficient can be replaced by branching that uses sub-block coordinates (xCG, yCG). A branching process in which (uiPosX, uiPosY) are referred to, which is performed within a sub-block, can be omitted, improving the throughput of context derivation, compared to the branching process in which (uiPosX, uiPosY) are referred to.

Furthermore, according to the coefficient presence/absence flag decoding unit and the sub-block coefficient presence/absence flag decoding unit having the configuration described above, in the calculation of a position context, a context for a coefficient presence/absence flag at the position of a given transform coefficient is determined regardless of the value of a previously decoded coefficient presence/absence flag, achieving the advantage of providing parallel execution of the derivation of contexts for coefficient presence/absence flags and the decoding of coefficient presence/absence flags.

The following is pseudo code in the eighth example configuration of the coefficient presence/absence flag decoding unit in a case where when the transform block size is 16×16 or 32×32, a frequency region is divided into sub-regions R0, R1, R2, and R3, a context index ctxIdx for R0 is derived using a low-frequency position context, a context index ctxIdx for R1 to R2 is derived using neighbouring reference contexts that are based on the four reference frequency components (c1, c2, c4, and c5) illustrated in part (a) of FIG. 36, and a context index ctxIdx for R3 is derived using a high-frequency position. sigCtx in the pseudo code is synonym for ctxIdx.

```
*************************************************************
If log2TrafoSize is less than or equal to 3, sigCtx is
derived as follows.
        shift = log2TrafoSize = = 3 ? 1 : 0
        sigCtx = (shift * 15) + ((yC >> shift) << 2) + (xC
>> shift)
If cIdx is equal to 0 and log2TrafoSize is larger than 3,
sigCtx is derived as follows
        If xC + yC is less than 1, sigCtx is derived as
follows.
                sigCtx = 31
            Otherwise if (xC>>2) + (yC>>2) is less than 1 <<
(uiLog2BlkSize-4), sigCtx is derived as follows.
                temp = significant_coeff_flag[ xC + 1 ][ yC ] +
significant_coeff_flag[ xC + 2 ][ yC ] +
significant_coeff_flag[ xC + 1 ][ yC + 1 ] +
significant_coeff_flag[ xC ][ yC + 2 ]
                temp = (temp + 1) >> 1
                sigCtx = 32 + Min(2, temp)
            Otherwise if (xC>>2) + (yC>>2) is less than 1 <<
(uiLog2BlkSize-2), sigCtx is derived as follows.
                temp = significant_coeff_flag[ xC + 1 ][ yC ] +
significant_coeff_flag[ xC + 2 ][ yC ] +
significant_coeff_flag[ xC ][ yC + 1 ] +
significant_coeff_flag[ xC + 1 ][ yC + 1 ] +
significant_coeff_flag[ xC ][ yC + 2 ]
                temp = (temp + 1) >> 1
                sigCtx = 35 + Min(2, temp)
            Otherwise (xC>>2) + (yC>>2) is greater than or equal to
1 << (uiLog2BlkSize-2), sigCtx is derived using previously
decoded bins of the syntax element significant_coeff_flag as
follows.
                sigCtx = 38
If cIdx is greater than 0 and log2TrafoSize is larger than 3,
sigCtx is derived as follows
        If xC + yC is less than 1, sigCtx is derived as
follows.
                sigCtx = 31
            Otherwise if (xC>>2) + (yC>>2) is less than 1 <<
(uiLog2BlkSize-3), sigCtx is derived using previously
decoded bins of the syntax element significant_coeff_flag as
follows.
                temp = significant_coeff_flag[ xC + 1 ][ yC ] +
significant_coeff_flag[ xC + 2 ][ yC ] +
significant_coeff_flag[ xC + 1 ][ yC + 1 ] +
significant_coeff_flag[ xC ][ yC + 2 ]
                temp = (temp + 1) >> 1
                sigCtx = 35 + Min(2, temp)
            Otherwise if ((xC>>2) + (yC>>2) is greater than or
equal to 1 << (uiLog2BlkSize-3))), sigCtx is derived using
previously decoded bins of the syntax element
significant_coeff_flag as follows.
                sigCtx = 38
*************************************************************
```

Other Example Configuration of Eighth Example Configuration of Coefficient Presence/Absence Flag Decoding Unit Another exemplary process performed by the coefficient presence/absence flag decoding unit 124-B will be described hereinafter with reference to FIG. 48 and FIG. 52 to FIG. 53.

Parts (a) to (b) of FIG. 48 are diagrams illustrating sub-regions obtained by subdivision by the frequency classification unit 124a using this exemplary process. Part (a) of FIG. 48 illustrates sub-regions suitable for use in the decoding of transform coefficients for luma value, and part (b) of FIG. 48 illustrates sub-regions suitable for use in the decoding of transform coefficients for chroma. In parts (a) to (b) of FIG. 48, the method for setting the threshold value TH and the threshold value TH2 is as described above.

As illustrated in FIG. 52, the frequency classification unit 124a classifies the sub-region R1 and the sub-region R2 using the threshold value TH in accordance with the position (xC, yC) of the target transform coefficient over the frequency components.

$xC+yC<TH$

As illustrated in FIG. 52, the frequency classification unit 124a classifies the sub-region R2 and the sub-region R3 having different numbers of references using the threshold value TH2 in accordance with a value obtained by dividing the position (xC, yC) of the target transform coefficient over the frequency components by a given sub-block size (here, 4).

$(xC>>2)+(yC>>2)<TH2$

Here, as described above, the threshold value TH2 that distinguishes between the two sub-regions preferably satisfies the relation in which TH2×sub-block size (=4) is smaller than the size Max(width, height) of the target frequency region.

FIG. 52 is pseudo code for a derivation process for deriving a context index cxtIdx for luma, which is a context index to be allocated to a frequency region included in each of the sub-regions R0 to R3 illustrated in part (a) of FIG. 48. In FIG. 52, the context for the region R0 is derived by the low-frequency position context derivation unit 124b, the context for the region R1 to the region R2 is derived by the neighbouring reference context derivation unit 124c, and the context for the region R3 is derived by the high-frequency position context derivation unit 124d.

The neighbouring reference context derivation unit 124c derives a context index sigCtx for, for example, the frequency components included in the sub-region R1 illustrated in part (a) or (b) of FIG. 48 using the expression below, and supplies the derivation result sigCtx to the frequency classification unit 124a.

$sigCtx = sigCtxOffsetR1 + Min(2, ctxCnt)$

Here, ctxCnt is a value obtained in accordance with a count value. Here, a count value is obtained by aggregation using a many-to-one transformation process (aggregation process). That is, as given in the following expression, ctxCnt is a value obtained by right-shifting so that the count value is reduced to about ½, and is determined by $ctxCnt = (cnt+1) >> 1.$ Instead of right-shifting, as given below, many-to-one transformation may be performed using a process for clipping a count value at a fixed value (here, 3).

$ctxCnt = min(3, cnt)$

The number of counts of the non-zero transform coefficient cnt is calculated by, as in the following pseudo code, referring to the five previously decoded transform coefficients c1, c2, c3, c4, and c5 or referring to the four previously decoded transform coefficients c1, c2, c4, and c5 in accordance with the position (xC, yC) of the target transform coefficient over the frequency components.

```
if (((xC&3)||(yC&3))&&(((xC+1)&3)||((yC+2)&3))
))
    {
        cnt = (c1!=0) + (c2!=0) + (c4!=0) + (c5!=0) ;
    } else{
        cnt = (c1!=0) + (c2!=0) + (c3!=0) + (c4!=0) +
(c5!=0) ;
    }
```

Furthermore, the neighbouring reference context derivation unit 124c derives a context index sigCtx for, for example, the frequency components included in the sub-region R2 illustrated in part (a) of FIG. 48 using the expression below, and supplies the derivation result sigCtx to the frequency classification unit 124*a*.

sigCtx=sigCtxOffset*R*2+Min(2,ctxCnt)

The computation method for the number of counts of the non-zero transform coefficient cnt is similar to that for the sub-region R1.

The high-frequency position context derivation unit 124*d* derives a context index sigCtx for, for example, the frequency components included in the sub-region R3 illustrated in FIG. 48 using the following expression, and supplies the derivation result sigCtx to the frequency classification unit 124*a*. That is, a context index is derived using a fixed value.

sigCtx=sigCtxOffset*R*3

For the sub-region R3, which includes high-frequency components, unlike the sub-regions R1 and R2, which include low-frequency components, a context is derived using a position context. Thus, the amount of processing may be reduced.

Also for chroma, processing similar to that for luma is performed on the sub-region R0, the sub-region R1, and the sub-region R3 in part (b) of FIG. 48. First, the frequency classification unit 124*a* classifies the sub-region R1 and the sub-region R3 having different numbers of references in accordance with, as illustrated in FIG. 53, a value obtained by dividing the position (xC, yC) of the target transform coefficient over the frequency components by a given sub-block size (here, 4). As illustrated in FIG. 53, furthermore, for the sub-region R0, the low-frequency position context derivation unit 124*b* derives a context using a position context, and, for the sub-region R1, the neighbouring reference context derivation unit 124*c* derives a context using a neighbouring reference context. For the sub-region R3, a context is derived using a position context. Accordingly, the amount of processing may be reduced.

The configuration described above may also be expressed as follows.

Dividing means (the frequency classification unit 124*a*) is configured to divide a target frequency region into at least two, low-frequency-side and high-frequency-side sub-regions, and the context index deriving means described above derives a context index for at least one of sub-regions located on the low-frequency side by referring to a decoded non-zero transform coefficient, and derives, for a sub-region located on the high-frequency side, a value that is based on the position of the sub-region in the frequency region or a fixed predetermined value as a context index.

(Context Sharing of Neighbouring Reference Context and Position Context)

The high-frequency position context derivation unit 124*d* may use the context that the neighbouring reference context derivation unit 124*c* uses. That is, a context may be shared between a sub-region where a neighbouring reference context is used and a high-frequency sub-region where a position context is used. A specific example of this configuration will be described using FIG. 54 to FIG. 56.

Similarly to FIG. 52, FIG. 54 is also pseudo code for the derivation process for deriving a context index cxtIdx for luma. Only the difference from FIG. 52 is the process of the high-frequency position context derivation unit 124*d*. In the process illustrated in FIG. 54, a context index sigCtx is derived using the following expression.

sigCtx=sigCtxOffset*R*2

That is, the context used for the sub-region R2, which is determined as offset value ctxCnt=0 by the neighbouring reference context derivation unit 124*c*, is also used as the context for the sub-region R3, which is derived by the high-frequency position context derivation unit 124*d*. In order to unify two processes, a context index for the sub-region R3 may be derived using the following expressions.

ctxCnt=0 sigCtx=sigCtxOffset*R*2+Min(2,ctxCnt)

In this case, the offset value ctxCnt is determined from the count cnt for the sub-region R2, whereas the offset value ctxCnt fixed to 0 is determined for the sub-region R3.

Similar context sharing can be carried out for chroma. Specifically, FIG. 55 is pseudo code for the process for deriving a context index cxtIdx for chroma in the case of context sharing. Only the difference from FIG. 53 in which context sharing is not performed is the process of the high-frequency position context derivation unit 124*d*.

In this manner, a context can be shared between a sub-region where a neighbouring reference context is used and a high-frequency sub-region where a position context is used. This can be expressed such that the value of the context index used for a sub-region located on the high-frequency side, which is derived by a context index deriving means (the high-frequency position context derivation unit 124*d*, the neighbouring reference context derivation unit 124*c*), is within the range of context indices used for sub-regions located on the low-frequency side.

Note that the configuration (FIG. 55) for the sharing of a position context and a neighbouring reference context for high frequencies may be used for chroma, and the configuration (FIG. 52) for non-sharing of a position context and a neighbouring reference context for high frequencies may be used for luma. Specifically, as illustrated in FIG. 56, for luma, a context index for the sub-region R3 is determined using the following expression.

sigCtx=sigCtxOffset*R*3+ctxCnt, where ctxCnt=0.

For chroma, a context index for the sub-region R3 is determined using the following expression.

sigCtx=sigCtxOffset*R*1+ctxCnt, where ctxCnt=0.

Accordingly, the context dedicated to the sub-region R3 is used for luma, and the context for a sub-region other than the sub-region R3, here, the context for the sub-region1 where a neighbouring reference context is used, is used for chroma.

The configuration described above in which the same context is shared by two different derivation methods (position context and neighbouring reference context) can reduce memory usage caused by contexts.

In the context sharing described above, besides the sharing of a neighbouring reference context with the offset value ctxCnt=0 and a position context, a context with the offset value ctxCnt being non-zero and a position context may be shared, as given in the following expressions.

ctxCnt=1 sigCtx=sigCtxOffset*R*1+ctxCnt

The configuration described above can be expressed such that the value of a context index for luma, which is a context index used for a sub-region located on the high-frequency side and which is derived by context index deriving means (the high-frequency position context derivation unit 124*d*, the neighbouring reference context derivation unit 124*c*), is a value outside the range of context indices used for sub-regions located on the low-frequency side, and the value of a context index for chroma, which is a context index used for a sub-region located on the high-frequency side and which is derived by the context index deriving means, is within the range of context indices used for sub-region located on the low-frequency side.

Example Configuration in which Removal of Context Update Delay is Taken into Account in Eighth Example Configuration of Coefficient Presence/Absence Flag Decoding Unit An exemplary process performed by the coefficient presence/absence flag decoding unit 124-B in which the removal of context update delay is taken into account will be described hereinafter with reference to FIG. 48 and FIG. 52 to FIG. 53.

In a case where a position context is used, as described previously, a context used for the decoding of a coefficient presence/absence flag at a given position can be derived without reference to the value of the immediately preceding coefficient presence/absence flag. Therefore, parallel execution of the context derivation process and the decoding process can be achieved.

However, in a case where the same context is used in a decoding process, an update of the state possessed by a context is necessary in accordance with whether the decoding result of the immediately preceding context is 0 or 1. Therefore, a delay for this update occurs. The following is an example configuration of a coefficient presence/absence flag decoding unit that achieves the advantage of reducing a delay caused by the update of the state of a context in the case of a position context by allocating a context different from the immediately preceding context.

Figure 57:
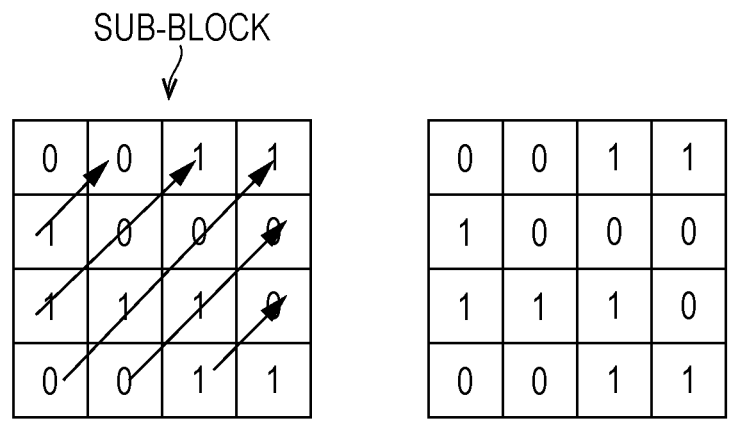
FIG. 57 includes parts (a), (b), (c), and (d) which depict a context index derivation process using an example configuration in which the removal of context update delay is taken into account in the eighth example configuration of the coefficient presence/absence flag decoding unit according to the embodiment.

FIG. 57 includes diagrams illustrating a derivation method for a context index within a sub-block. Part (a) of FIG. 57 is a diagram illustrating the relationship between the scan order of sub-blocks and offset values ctxCnt of context indices within the sub-blocks. As illustrated in the drawing, the offset value ctxCnt uses different values such as 0, 1, 0, and 1 for each scan order. Such offset values can be used to allocate a context different from the immediately preceding context. Part (b) of FIG. 57 illustrates an example of a table used for the processing described above. The table illustrated in part (b) of FIG. 57 is a table in which a relative position in a sub-block is input as an address in raster scan to obtain an offset value ctxCnt.

Part (c) of FIG. 57 illustrates a use example. In the use example, an address in raster scan is obtained by the computation of $(xC\&3)+(yC\&3<<2)$ from the position (xC, yC) of a frequency component, and then the table illustrated in part (b) of FIG. 57 is referenced to obtain an offset value ctxCnt. The offset value ctxCnt may be calculated by normal computation, without using a table, by using a counter cntInSubBlock in a sub-block. Part (d) of FIG. 57 illustrates an example of this computation. The counter cntInSubBlock takes the values 0, 1, 2, 3, . . . , 15 in the scan order of sub-blocks. In this case, the offset values ctxCnt can be calculated by the remainder of the counter cntInSubBlock divided by 2 (&1). The value of the counter cntInSubBlock may take the values 0, 1, 2, 3, . . . , 15 in reverse scan order.

FIG. 58 illustrates a configuration that can provide a higher degree of parallel processing than that in the example in FIG. 57. Part (a) of FIG. 58 is a diagram illustrating the relationship between the scan order of sub-blocks and offset values ctxCnt of context indices within the sub-blocks. As illustrated in the drawing, the offset value ctxCnt uses different values in units of N (N=3), such as 0, 1, 2, 0, 1, 2, . . . for each scan order. Such offset values can be used to allocate N different consecutive contexts. Since not only immediately preceding decoding but also decoding that precedes the immediately preceding decoding by two (or more) can be maintained independent, parallelism can further be increased. Part (b) of FIG. 58 illustrates an example of a table used for the processing described above, part (c) of FIG. 58 illustrates a use example, and part (d) of FIG. 58 illustrates an exemplary calculation method based on computation. All of them are related to processing similar to that in FIG. 57, and a description thereof is thus omitted. While N=3 is used, similar processing may be performed for N greater than or equal to N=4.

FIG. 59 is a diagram illustrating pseudo code that implements the context allocation method described above. Specifically, illustrated is a derivation process for deriving a context index cxtIdx for luma and chroma, which is a context index to be allocated to a frequency region included in each of the sub-regions R0 to R3 illustrated in part (a) of FIG. 48. In FIG. 59, the context for the region R0 is derived by the low-frequency position context derivation unit 124b, the context for the region R1 to the region R2 is derived by the neighbouring reference context derivation unit 124c, and the context for the region R3 is derived by the high-frequency position context derivation unit 124d.

The neighbouring reference context derivation unit 124c derives a context index sigCtx for, for example, the frequency components included in the sub-region R1 illustrated in part (a) or (b) of FIG. 48 using the expression below, and supplies the derivation result sigCtx to the frequency classification unit 124a.

$sigCtx=sigCtxOffsetR1+Min(2,ctxCnt)$

Here, ctxcCnt is obtained by a many-to-one transformation process (aggregation process), here, by performing right-shifting so that, as given in the expression below, the count value is reduced to about ½.

$ctxCnt=(cnt+1)>>1$

The many-to-one transformation process may be replaced by a process for clipping a count at a fixed value (here, 3) as follows.

$ctxCnt=min(3,cnt)$

The number of counts of the non-zero transform coefficient cnt is calculated by, as in the following pseudo code, referring to the five previously decoded transform coefficients c1, c2, c3, c4, and c5 or referring to the four previously decoded transform coefficients c1, c2, c4, and c5 in accordance with the position (xC, yC) of the target transform coefficient over the frequency components.

```
if (((xC&3)||(yC&3))&&(((xC+1)&3)||((yC+2)&3))
))
    {
        cnt = (c1!=0) + (c2!=0) + (c4!=0) + (c5!=0) ;
    } else{
        cnt = (c1!=0) + (c2!=0) + (c3!=0) + (c4!=0) +
(c5!=0) ;
    }
```

Furthermore, the neighbouring reference context derivation unit 124c derives a context index sigCtx for, for example, the frequency components included in the sub-region R2 illustrated in part (a) of FIG. 48 using the expression below, and supplies the derivation result sigCtx to the frequency classification unit 124a.

sigCtx=sigCtxOffsetR2+Min(2,ctxCnt)

The computation method for the number of counts of the non-zero transform coefficient cnt is similar to that for the sub-region R1.

The high-frequency position context derivation unit 124d calculates an offset value for, for example, the frequency components included in the sub-region R3 illustrated in FIG. 48 using the following expression.

ctxCnt=tbl[(xC&3)+(yC&3)<<2]

A context index sigCtx is derived using the sum of the offset value given above and the starting point of sigCtx-OffsetR3 of the context index for the sub-region R3 in accordance with the expression below, and the derivation result sigCtx is supplied to the frequency classification unit 124a.

sigCtx=sigCtxOffsetR3+ctxCnt

For the sub-region R3, which includes high-frequency components, the advantage of reducing the amount of processing because a context is derived using a position context, providing a context derivation process and a decoding process, and improving throughput due to the removal of a delay caused by the update of the state of a context can be achieved.

While this configuration provides a configuration for the sub-region R3 of high-frequency components, the advantage of improving throughput due to the removal of a delay caused by the update of the state possessed by a context can also be utilized in any other configuration for calculating different offset values ctxIdx at successive frequency positions in a block and a sub-block and for calculating a context index sigCtx from the sum of the offset value ctxIdx and a given starting point.

Also in a case where the removal of context update delay is taken into account, the high-frequency position context derivation unit 124d can use the context that the neighbouring reference context derivation unit 124c derives. That is, a context can be shared between a sub-region where a neighbouring reference context is used and a high-frequency sub-region where a position context is used. A specific example of this configuration will be described using FIG. 60.

The processes in FIG. 59 and FIG. 60 are different only in terms of the process for the high-frequency position context derivation unit 124d. After an offset value ctxCnt is derived, a context index sigCtx is derived for luma using the following expression.

sigCtx=sigCtxOffsetR2+ctxCnt

For chroma, a context index sigCtx is derived using the following expression.

sigCtx=sigCtxOffsetR1+ctxCnt

The process described above can achieve the advantage of, while reducing memory usage for contexts due to context sharing, reducing the amount of processing because a context is derived using a position context, providing a context derivation process and a decoding process, and improving throughput due to the removal of a delay caused by the update of the state of a context.

Ninth Example Configuration of Coefficient Presence/Absence Flag Decoding Unit

A ninth example configuration of the coefficient presence/absence flag decoding unit according to this embodiment will be described with reference to FIG. 40. In this example configuration, the conditions in which the frequency classification unit 124a according to the fourth example configuration classifies a frequency region into sub-regions R0 to R5 are changed. Members having the same functions as the members illustrated in the seventh to eighth example configurations described above are given the same numerals, and a description thereof is omitted.

Figure 40:
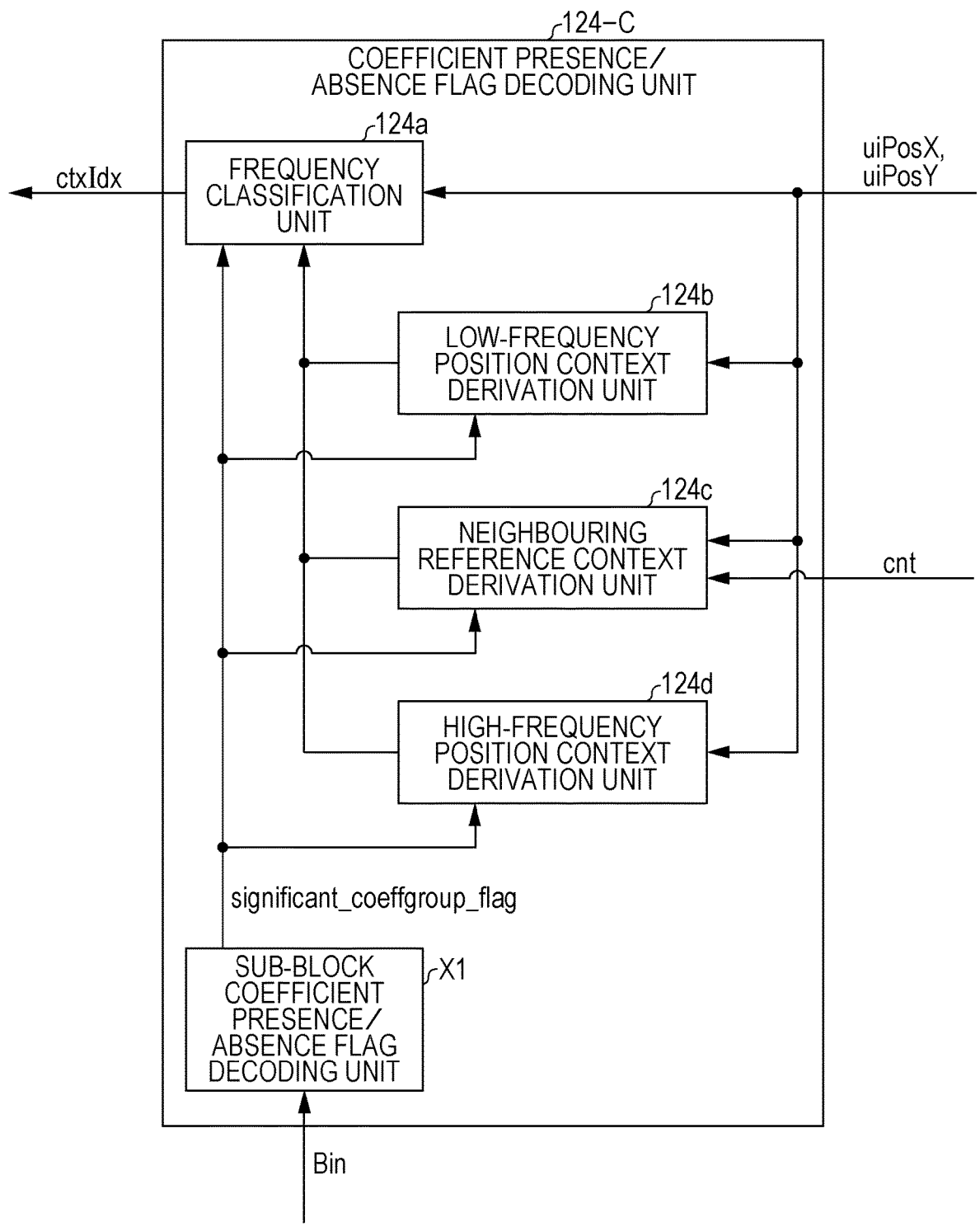
FIG. 40 is a block diagram illustrating a ninth example configuration of the coefficient presence/absence flag decoding unit according to the embodiment.

FIG. 40 is a block diagram illustrating a configuration of a coefficient presence/absence flag decoding unit 124-C according to this example configuration. As illustrated in FIG. 40, the coefficient presence/absence flag decoding unit 124-C according to this example configuration includes a sub-block coefficient presence/absence flag decoding unit X1, a frequency classification unit 124a, a low-frequency position context derivation unit 124b, a neighbouring reference context derivation unit 124c, and a high-frequency position context derivation unit 124d. The flow of a decoding process performed by the coefficient presence/absence flag decoding unit 124-C will be described using FIG. 33.

(Sub-Block Coefficient Presence/Absence Flag Decoding Unit x1 Included in Coefficient Presence/Absence Flag Decoding Unit 124-C)

The sub-block coefficient presence/absence flag decoding unit X1 included in the coefficient presence/absence flag decoding unit 124-C interprets a bin supplied from the bit decoding unit 132, and decodes a sub-block coefficient presence/absence flag (significant_coeffgroup_flag) indicating whether or not at least one non-zero transform coefficient is present in each of sub-blocks constituting a frequency region (step SY1 in FIG. 33).

Then, the sub-block coefficient presence/absence flag decoding unit X1 decodes, for each sub-block in a transform block, a transform coefficient presence/absence flag in the corresponding sub-block (step SY2 to step SY4 in FIG. 33). That is, if the sub-block coefficient presence/absence flag is equal to 1 (YES in step SY2 in FIG. 33) in the sub-block coefficient presence/absence flag decoding unit X1, a coefficient presence/absence flag in the sub-block is decoded using the frequency classification unit 124a, the low-frequency position context derivation unit 124b, the neighbouring reference context derivation unit 124c, and the high-frequency position context derivation unit 124d. If the sub-block coefficient presence/absence flag is equal to 0 (NO in step SY2 in FIG. 33), the decoding of a coefficient presence/absence flag in the sub-block is skipped, and the process proceeds to the processing of the subsequent sub-block.

(Frequency Classification Unit 124a Included in Coefficient Presence/Absence Flag Decoding Unit 124-C)

The frequency classification unit 124a included in the coefficient presence/absence flag decoding unit 124-C classifies the frequency component to be decoded into any of a plurality of sub-regions in accordance with the position of the frequency component to be decoded in the frequency region, and allocates a context index ctxIdx derived by any of the low-frequency position context derivation unit 124b, the neighbouring reference context derivation unit 124c, and the high-frequency position context derivation unit 124d to the frequency component to be decoded (step SY3 in FIG. 33).

The frequency classification unit 124a included in the coefficient presence/absence flag decoding unit 124-C refers to the position (uiPosX, uiPosY) at which each frequency component included in the frequency region is located in the frequency region, and classifies the corresponding frequency component into five sub-regions R0 to R4. It is assumed here that uiPosX=0, 1, . . . , sz–1 and uiPosY=0, 1, . . . , sz–1 (where sz represents, as described above, the number of pixels in one side of the TU to be processed, that is, the number of frequency components in one side of the target frequency region; for example, sz=16, 32, etc.).

Here, a frequency region of sz×sz blocks is divided into 4×4 sub-blocks, and the position of the sub-block including the frequency component (uiPosX, uiPosY) is represented by (xCG, yCG). The position (xCG, yCG) of the sub-block including the frequency component is derived using the following expressions (eq. C1) to (eq. C2).

$$xCG = uiPosX >> 2 \qquad (eq.\ C1)$$

$$yCG = uiPosY >> 2 \qquad (eq.\ C2)$$

Here, xCG=0, 1, . . . , (sz–1)>>2 and yCG=0, 1, . . . , (sz–1)>>2.

More specifically, the frequency classification unit 124a included in the coefficient presence/absence flag decoding unit 124-C performs the following classification process:

(1) Classifying a frequency component satisfying xCG+yCG<THC and uiPosX+uiPosY<THZ into the sub-region R0

(2) Classifying a frequency component satisfying xCG+yCG<THC and THZ≤uiPosX+uiPosY<TH1 into the sub-region R1.

(3) Classifying a frequency component satisfying xCG+yCG<THC and TH1≤uiPosX+uiPosY into the sub-region R2.

(4) Classifying a frequency component satisfying THC≤xCG+yCG<THD into the sub-region R3.

(5) Classifying a frequency component satisfying THD≤xCG+yCG into the sub-region R4.

Pseudo code for the classification process described above is as follows.

```
****************************************************************
if (xCG+yCG < THC) {
    if (uiPosX+uiPosY < THZ) {
        classify into R0
    }
    else if (uiPosX+uiPosY < TH1) {
        classify into R1
    }
    else { //if (uiPosX+uiPosY >= TH1)
        classify into R2
    }
}
else if (xCG+yCG < THD) {
    classify into R3
}
else { // if (xCG+yCG >= THD)
    classify into R4
}
****************************************************************
```

Here, the threshold value THZ is set to 2. Furthermore, threshold value TH1=5. Specific values of the threshold values THC and THD may be set using, for example, the frequency region size log 2TrafoSize as follows.

THC=1<<(log 2TrafoSize–2),

THD=1<<(log 2TrafoSize–2)+2

That is, THC=4 and THD=6 are set when the frequency region size is 16×16, and THC=8 and THD=10 are set when the frequency region size is 32×32. In this manner, different threshold values may be used in accordance with the frequency region size.

Figure 41:
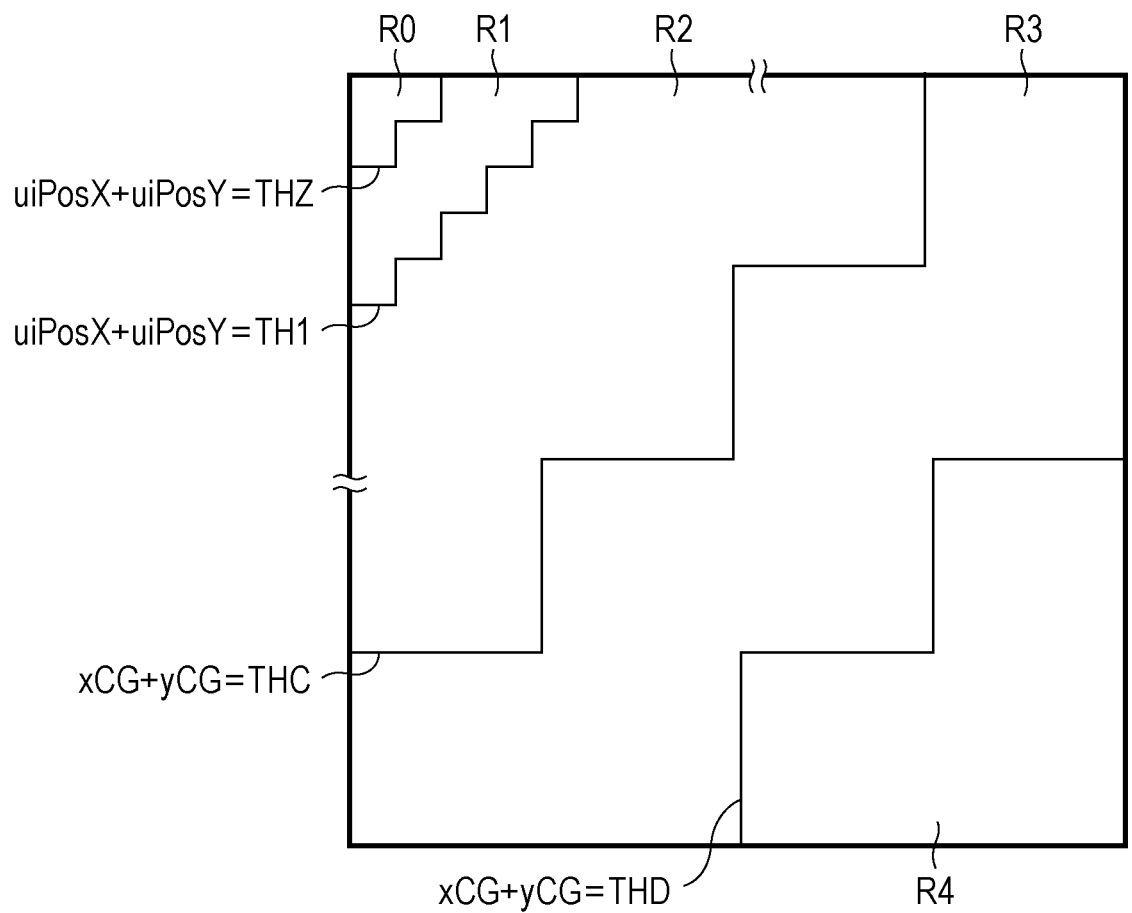
FIG. 41 is a diagram illustrating an example of a frequency region divided into sub-regions R0, R1, R2, R3, and R4 using a classification process by a frequency classification unit included in the ninth example configuration of the coefficient presence/absence flag decoding unit according to the embodiment.

FIG. 41 illustrates an example of a frequency region that is divided into sub-regions R0, R1, R2, R3, and R4 using a classification process performed by the frequency classification unit 124a included in the coefficient presence/absence flag decoding unit 124-C.

The frequency classification unit 124a included in the coefficient presence/absence flag decoding unit 124-C allocates the context index derived by the low-frequency position context derivation unit 124b to the frequency components included in the sub-region R0, allocates the context index derived by the neighbouring reference context derivation unit 124c to the frequency components included in the sub-regions R1, R2 and R3, and allocates the context index derived by the high-frequency position context derivation unit 124d to the frequency components included in the sub-region R3.

Furthermore, the frequency classification unit 124a included in the coefficient presence/absence flag decoding unit 124-C calculates a context index ctxIdx for determining a context to be used to decode the syntax element significant_coeff_flag using the arithmetic code decoding unit 130. The context index ctxIdx is calculated for each frequency region size and for each frequency component to be decoded (step SY4 in FIG. 33). The decoded syntax element significant_coeff_flag is stored in the decoded coefficient memory unit 126, and is referenced by the coefficient value decoding unit 125. The context index ctxIdx used for decoding is supplied to the context recording/updating unit 131.

In the following, a specific description will be given of context derivation for the sub-regions R0 to R4.

(Low-Frequency Position Context Derivation Unit 124b Included in Coefficient Presence/Absence Flag Decoding Unit 124-C)

The low-frequency position context derivation unit 124b included in the coefficient presence/absence flag decoding unit 124-C derives a context index ctxIdx for the frequency component to be decoded, on the basis of the position of the frequency component in the frequency region if the frequency component is included in a low-frequency-side sub-region.

The low-frequency position context derivation unit 124b included in the coefficient presence/absence flag decoding unit 124-C derives a context index ctxIdx for the frequency components included in the sub-region R0 using the expression below (eq. C3), and supplies the derivation result ctxIdx to the frequency classification unit 124a.

$$ctxIdx = NX + 2 \times uiPosX + uiPosY \qquad (eq.\ C3)$$

NX is a constant representing the starting point of the context index. If the frequency region size is 4×4 and 8×8 and the numbers of contexts used therefor are N4 and N8, respectively, the starting point for frequency region sizes of 16×16 and 32×32 is given by NX=N4+N8.

(Neighbouring Reference Context Derivation Unit 124c Included in Coefficient Presence/Absence Flag Decoding Unit 124-C)

The neighbouring reference context derivation unit 124c included in the coefficient presence/absence flag decoding unit 124-C derives a context index ctxIdx for the frequency component to be decoded, on the basis of the number of decoded non-zero transform coefficients cnt for neighbouring frequency components of the frequency component.

The neighbouring reference context derivation unit 124c included in the coefficient presence/absence flag decoding unit 124-C derives a context index ctxIdx for the frequency components included in the sub-region R1 using expression (eq. C4) and a context index ctxIdx for the frequency components included in the sub-region R2 using expression (eq. C5), and supplies the derivation results ctxIdx to the frequency classification unit 124a.

$$\text{ctxIdx}=NX+3+\min(2,\text{temp}) \quad \text{(eq. C4)}$$

$$\text{temp}=(\text{cnt}+1)>>1$$

$$\text{ctxIdx}=NX+6+\min(2,\text{temp}) \quad \text{(eq. C5)}$$

$$\text{temp}=(\text{cnt}+1)>>1$$

In the sub-regions R1 and R2, the number of counts of the non-zero transform coefficient cnt is derived using (C1, C2, C3, C4, and C5) illustrated in part (a) of FIG. 10 or part (b) of FIG. 10 in accordance with the following expression (eq. C6).

$$\text{cnt}=(c1!=0)+(c2!=0)+(c3!=0)+(c4!=0)+(c5!=0) \quad \text{(eq. C6)}$$

Alternatively, the number of counts of the non-zero transform coefficient cnt may be derived using the reference frequency components (c1, c2, c4, and c5) illustrated in part (a) of FIG. 36 in accordance with the expression below (eq. C7) in which the transform coefficient at the coordinates (c3) of the immediately preceding position in the processing order preceding (if the processing order is reverse scan order, the transform coefficient below the position of the target transform coefficient) is not referred to. This process allows a context used for the decoding of a coefficient presence/absence flag at a given position to be derived without reference to the value of the immediately preceding coefficient presence/absence flag, and can therefore achieve parallel execution of the context derivation process and the decoding process.

$$\text{cnt}=(c1!=0)+(c2!=0)+(c4!=0)+(c5!=0) \quad \text{(eq. C7)}$$

The neighbouring reference context derivation unit 124c according to this example configuration derives a context index ctxIdx for the frequency components included in the sub-region R3 using the expression below (eq. C8), and supplies the derivation result ctxIdx to the frequency classification unit 124a.

$$\text{ctxIdx}=NX+9+\min(2,\text{temp}) \quad \text{(eq. C8)}$$

$$\text{temp}=(\text{cnt}+1)>>1$$

For the sub-region R3, the number of counts of the non-zero transform coefficient cnt is derived using the three reference frequency components (c1, c3, and c4) illustrated in part (i) of FIG. 15 in accordance with the expression below (eq. C9).

$$\text{cnt}=(c1!=0)+(c3!=0)+(c4!=0) \quad \text{(eq. C9)}$$

Each term takes 1 if the comparison in parentheses is true, and takes 0 if the comparison in parentheses is false.

The reference frequency components are not limited to c1, c3, and c4 illustrated in part (i) of FIG. 15, and the three reference frequency components illustrated in part (c), (d), (e), or (f) of FIG. 15 may be used.

The context index ctxIdx for the sub-region R3 may not necessarily be derived using expression (eq. C8), but may be derived using expression (eq. C10).

$$\text{ctxIdx}=NX+9+\min(2,\text{cnt}) \quad \text{(eq. C10)}$$

(High-Frequency Position Context Derivation Unit 124d Included in Coefficient Presence/Absence Flag Decoding Unit 124-C)

The high-frequency position context derivation unit 124d included in the coefficient presence/absence flag decoding unit 124-C derives a context index ctxIdx for the frequency component to be decoded, on the basis of the position of the frequency component in the frequency region if the frequency component is included in a high-frequency-side sub-region.

The high-frequency position context derivation unit 124d included in the coefficient presence/absence flag decoding unit 124-C derives a context index ctxIdx for the frequency components included in the sub-region R4 using the expression below (eq. C11), and supplies the derivation result ctxIdx to the frequency classification unit 124a.

$$\text{ctxIdx}=NX+11+\min(\max R3,(xCG+yCG-THD)>>\text{shift}) \quad \text{(eq. C11)}$$

Here, as shift and maxR3, for example, shift=0 and maxR3=3 may be used when the size of the target frequency region is 16×16, and shift=1 and maxR3=3 may be used when the size of the target frequency region is 32×32. However, this embodiment is not limited to this.

Figure 42:
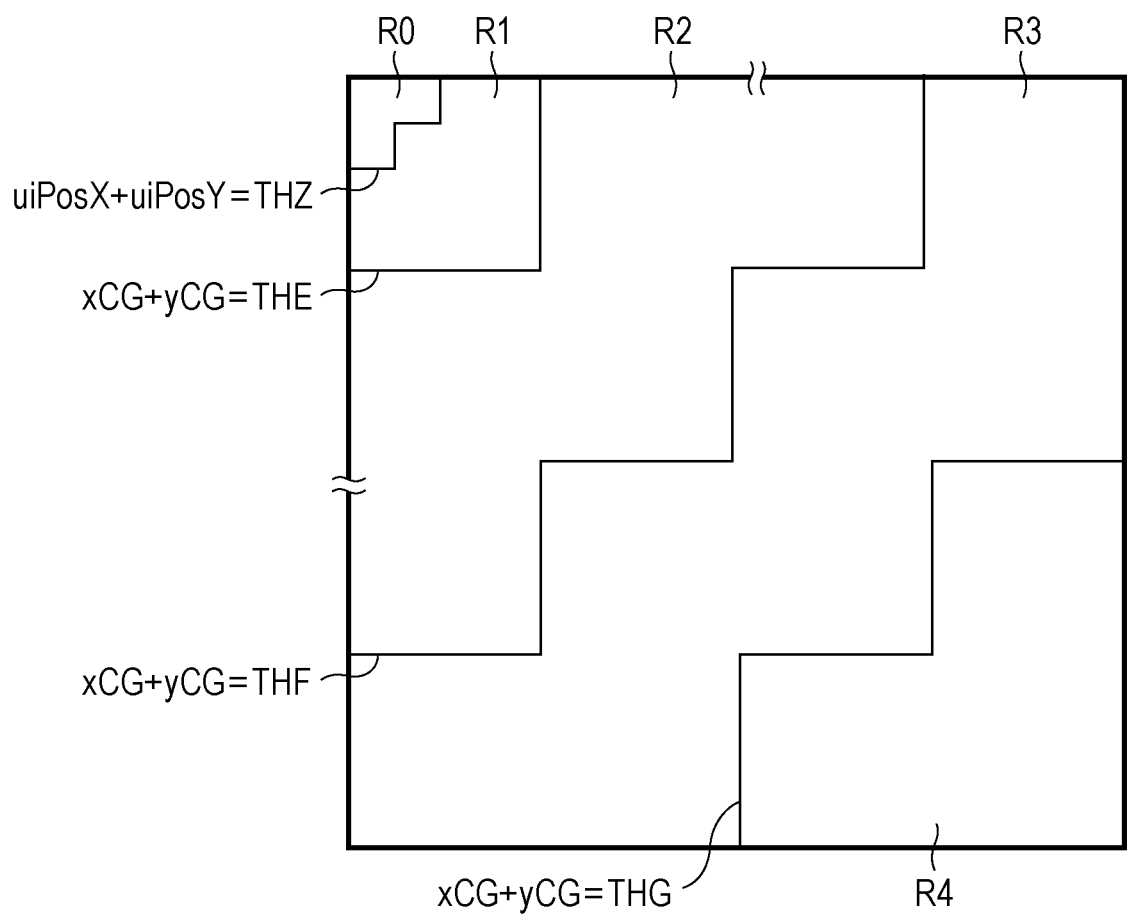
FIG. 42 is a diagram illustrating another example of the frequency region divided into sub-regions R0, R1, R2, R3, and R4 using a classification process by the frequency classification unit included in the ninth example configuration of the coefficient presence/absence flag decoding unit according to the embodiment.

An example of a frequency region that is divided using the classification process by the frequency classification unit 124a included in the coefficient presence/absence flag decoding unit 124-C is not limited to that illustrated in FIG. 41. For example, a frequency region may be divided in a manner illustrated in FIG. 42. That is, the frequency classification unit 124a may be configured to classify a frequency region into sub-regions R0, R1, R2, R3, and R4 as follows.

(1) A frequency component satisfying xCG+yCG<THE and uiPosX+uiPosY<THZ is classified into the sub-region R0.

(2) A frequency component satisfying xCG+yCG<THE and THZ≤uiPosX+uiPosY is classified into the sub-region R1.

(3) A frequency component satisfying THE≤xCG+yCG<THF is classified into the sub-region R2.

(4) A frequency component satisfying THF≤xCG+yCG<THG is classified into the sub-region R3.

(5) A frequency component satisfying THG≤xCG+yCG is classified into the sub-region R4.

Pseudo code for the classification process described above is as follows.

```
****************************************************
if (xCG+yCG < THE) {
    if (uiPosX+uiPosY < THZ) {
        classify into R0
    }
    else{ // if (uiPosX+uiPosY>= THZ)
        classify into R1
    }
}
else if (xCG+yCG < THF) {
    classify into R2
}
else if (xCG+yCG < THG) {
    classify into R3
}
else{ // xCG+yCG>= THG
    classify into R4
}
****************************************************
```

Here, the threshold value THZ is set to 2. Specifically, the threshold values THE, THF, and THG may be set to, for example, the following values

THE=1

THF=1<<(log 2TrafoSize−2)

THG=1<<(log 2TrafoSize−2)+2 using the frequency region size (the size of the TU to be processed) log 2TrafoSize. That is, THE=1, THF=2, and THG=4 may be used when the frequency region size is 16×16, and THE=1, THF=8, and THG=10 may be used when the frequency region size is 32×32. In this manner, different threshold values may be used in accordance with the frequency region size.

As described above, according to the coefficient presence/absence flag decoding unit according to this example configuration, for a higher-frequency-side sub-region (for example, the sub-region R3 in FIG. 41) than a predetermined threshold value THF, the number of decoded non-zero transform coefficients to be referred to for the derivation of a context index to be allocated to each transform coefficient presence/absence flag is smaller than the number of decoded non-zero transform coefficients to be referred to for a low-frequency-side sub-region (for example, the sub-region R2 in FIG. 41). Thus, it is possible to reduce the amount of processing for a context index derivation process on the high-frequency side. Furthermore, for a higher-frequency-side sub-region (for example, the sub-region R4 in FIG. 41) than the other threshold value THG, a context index is derived on the basis of the position regardless of a neighbouring reference. Thus, it is possible to further reduce the amount of processing. In addition, a position reference does not use the value of a previously decoded coefficient presence/absence flag for the derivation of a context. Thus, it is also possible to improve parallelism.

In the configuration described above, the frequency classification unit 124a classifies frequency components into five sub-regions. Alternatively, frequency components may be classified into three sub-regions. For example, the following procedures may be performed.

(1) A frequency component satisfying uiPosX+uiPosY<THZ and xCG+yCG<THG is classified into a sub-region R0.

(2) A frequency component satisfying THZ≤uiPosX+uiPosY and xCG+yCG<THG is classified into a sub-region R1.

(3) A frequency component satisfying THG≤xCG+yCG is classified into a sub-region R4.

Pseudo code for the classification process described above is as follows.

```
*************************************************************
if (xCG+yCG < THG) {
    if (uiPosX+uiPosY < THZ) {
        classify into R0
    }
    else{ //if (uiPosX+uiPosY>= THZ)
        classify into R1
    }
}
else {// if (xCG+yCG>= THG)
    classify into R4}
*************************************************************
```

As described above, in the coefficient presence/absence flag decoding unit 124-C according to this example configuration, the frequency classification unit 124a is configured to classify the target frequency region into at least three sub-regions in accordance with the position of the transform coefficient presence/absence flag to be processed and the position of the sub-block to which the transform coefficient presence/absence flag belongs.

The neighbouring reference context derivation unit 124c derives a context index by referring to N1 decoded non-zero transform coefficients (where N1 is a natural number) for a first sub-region (the sub-region R1 or R2), and referring to N2 decoded non-zero transform coefficients (where N2 is a natural number satisfying N2<N1) for a second sub-region (the sub-region R3).

For a third sub-region (the sub-region R4), the high-frequency position context derivation unit 124d derives a context index in accordance with the position of a sub-block to which a transform coefficient presence/absence flag belongs.

According to the configuration described above, a combination of a sub-region where the number of decoded non-zero transform coefficients to be referred to for the derivation of a context index is set to be smaller and a sub-region for which a context index is derived on the basis of the position of a transform coefficient presence/absence flag in the target frequency region and the position of the sub-block to which the transform coefficient presence/absence flag belongs can reduce the amount of processing for a context index derivation process on the high-frequency side, compared to an existing configuration, while achieving high coding efficiency.

(Video Coding Device 2)

A configuration of the video coding device 2 according to this embodiment will be described with reference to FIG. 26 to FIG. 28. The video coding device 2 is a coding device implementing the technologies adopted in the H.264/MPEG-4 AVC standard, the technologies adopted in KTA software, which is a codec for joint development in VCEG (Video Coding Expert Group), the technologies adopted in TMuC (Test Model under Consideration) software, and the technologies proposed in HEVC (High-Efficiency Video Coding), which is a successor codec to H.264/MPEG-4 AVC. In the following, the same portions as the portions described above are assigned the same numerals, and a description thereof is omitted.

Figure 26:
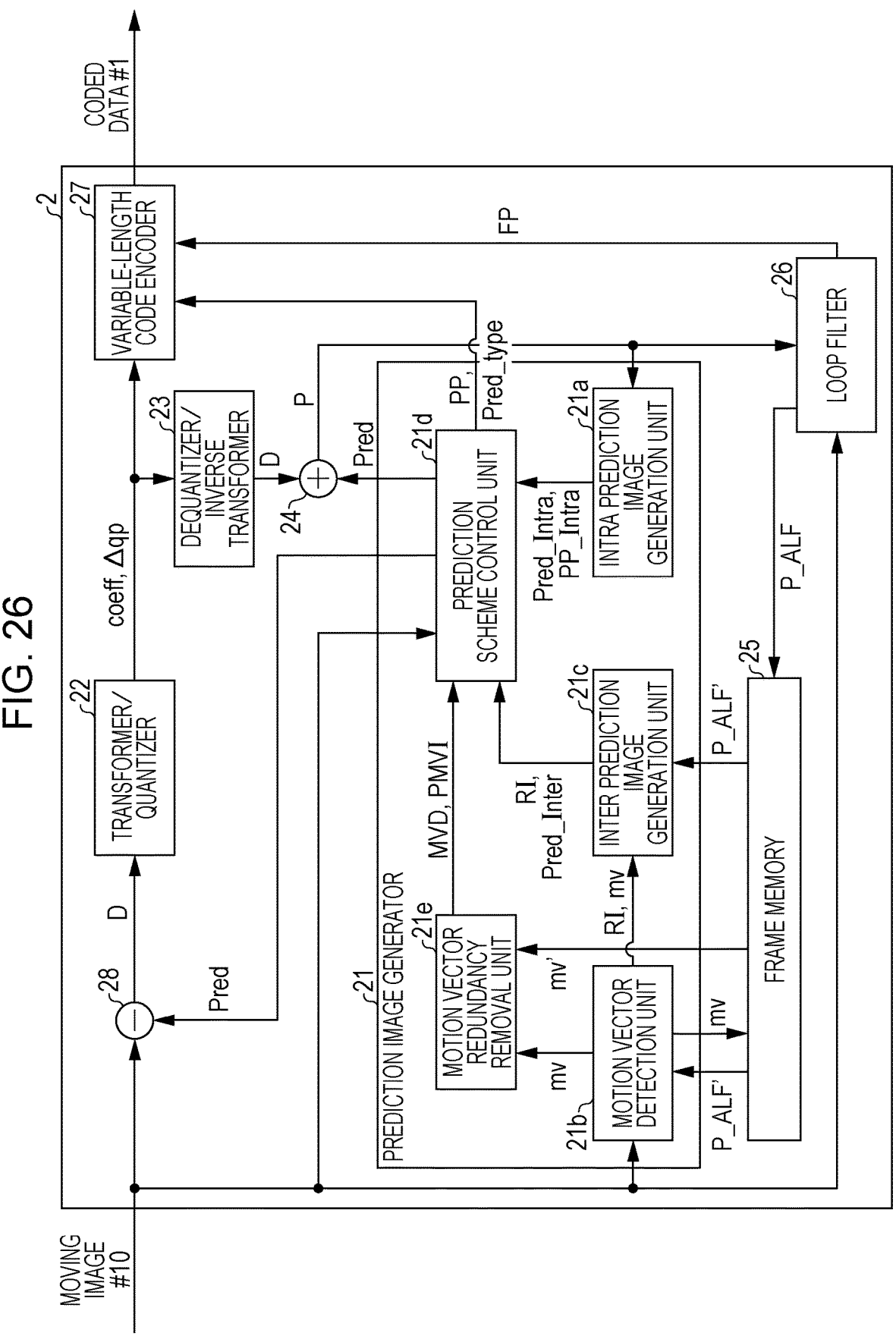
FIG. 26 is a block diagram illustrating a configuration of the video coding device according to the embodiment.

FIG. 26 is a block diagram illustrating a configuration of the video coding device 2. As illustrated in FIG. 26, the video coding device 2 includes a prediction image generator 21, a transformer/quantizer 22, a dequantizer/inverse transformer 23, an adder 24, a frame memory 25, a loop filter 26, a variable-length code encoder 27, and a subtractor 28. As illustrated in FIG. 26, furthermore, the prediction image generator 21 includes an intra prediction image generation unit 21a, a motion vector detection unit 21b, an inter prediction image generation unit 21c, a prediction scheme control unit 21d, and a motion vector redundancy removal unit 21e. The video coding device 2 is a device configured to code a moving image #10 (an image to be coded) to generate coded data #1.

(Prediction Image Generator 21)

The prediction image generator 21 recursively partitions an LCU to be processed into one or a plurality of sub-CUs, and further partitions each leaf CU into one or a plurality of partitions so as to generate, for each partition, an inter prediction image Pred_Inter that uses inter-frame prediction or an intra prediction image Pred_Intra that uses intra-frame prediction. The generated inter prediction image Pred_Inter and intra prediction image Pred_Intra are supplied to the adder 24 and the subtractor 28 as prediction images Pred.

The prediction image generator 21 skips, for a PU to which a skip mode is applied, the coding of other parameters included in the PU. In addition, (1) the mode of partition of the target LCU into sub-CUs and partitions, (2) whether or not to apply the skip mode, and (3) which of the inter prediction image Pred_Inter and the intra prediction image Pred_Intra to generate for each partition are determined so that coding efficiency can be optimized.

(Intra Prediction Image Generation Unit 21a)

The intra prediction image generation unit 21a generates a prediction image Pred_Intra for each partition using intra-frame prediction. Specifically, the intra prediction image generation unit 21a (1) selects a prediction mode to be used for the intra prediction of each partition, and (2) generates a prediction image Pred_Intra from a decoded image P using the selected prediction mode. The intra prediction image generation unit 21a supplies the generated intra prediction image Pred_Intra to the prediction scheme control unit 21d.

Furthermore, the intra prediction image generation unit 21a determines an estimated prediction mode for a target partition from a prediction mode allocated to a neighbouring partition of the target partition, and supplies an estimated prediction mode flag indicating whether or not the estimated prediction mode and a prediction mode actually selected for the target partition are identical to the variable-length code encoder 27 through the prediction scheme control unit 21d as part of the intra prediction parameter PP_Intra. The variable-length code encoder 27 is configured to incorporate the flag into the coded data #1.

If the estimated prediction mode for the target partition and the prediction mode actually selected for the target partition are different, the intra prediction image generation unit 21a supplies a remaining prediction mode index indicating a prediction mode for the target partition to the variable-length code encoder 27 through the prediction scheme control unit 21d as part of the intra prediction parameter PP_Intra. The variable-length code encoder 27 is configured to incorporate the remaining prediction mode index into the coded data #1.

(Motion Vector Detection Unit 21b)

The motion vector detection unit 21b detects a motion vector mv for each partition. Specifically, the motion vector detection unit 21b (1) selects an adaptively filtered decoded image P_ALF' to be used as a reference image, and (2) searches the selected adaptively filtered decoded image P_ALF' for a region that is best approximated to the target partition to detect a motion vector mv for the target partition. The adaptively filtered decoded image P_ALF' is an image obtained by performing an adaptive filter process using the loop filter 26 on a decoded image whose entire frame has been already decoded. The motion vector detection unit 21b can read the pixel values of pixels constituting the adaptively filtered decoded image P_ALF' from the frame memory 25. The motion vector detection unit 21b supplies the detected motion vector mv, together with a reference image index RI that specifies the adaptively filtered decoded image P_ALF' used as a reference image, to the inter prediction image generation unit 21c and the motion vector redundancy removal unit 21e.

(Inter Prediction Image Generation Unit 21c)

The inter prediction image generation unit 21c generates a motion-compensated image mc for each inter prediction partition using inter-frame prediction. Specifically, the inter prediction image generation unit 21c generates a motion-compensated image mc from the adaptively filtered decoded image P_ALF' specified by the reference image index RI supplied from the motion vector detection unit 21b, using the motion vector mv supplied from the motion vector detection unit 21b. Similarly to the motion vector detection unit 21b, the inter prediction image generation unit 21c can read the pixel values of the pixels constituting the adaptively filtered decoded image P_ALF' from the frame memory 25. The inter prediction image generation unit 21c supplies the generated motion-compensated image mc (inter prediction image Pred_Inter) to the prediction scheme control unit 21d together with the reference image index RI supplied from the motion vector detection unit 21b.

(Prediction Scheme Control Unit 21d)

The prediction scheme control unit 21d compares the intra prediction image Pred_Intra and the inter prediction image Pred_Inter with the image to be coded, and selects which of intra prediction and inter prediction to perform. If intra prediction is selected, the prediction scheme control unit 21d supplies the intra prediction image Pred_Intra to the adder 24 and the subtractor 28 as a prediction image Pred, and supplies the intra prediction parameter PP_Intra supplied from the intra prediction image generation unit 21a to the variable-length code encoder 27. On the other hand, if inter prediction is selected, the prediction scheme control unit 21d supplies the inter prediction image Pred_Inter to the adder 24 and the subtractor 28 as a prediction image Pred, and supplies the reference image index RI, and a motion vector predictor index PMVI and a motion vector difference MVD, described below, which are supplied from the motion vector redundancy removal unit 21e, to the variable-length code encoder 27 as an inter prediction parameter PP_Inter. The prediction scheme control unit 21d further supplies prediction type information Pred_type indicating which prediction image among the intra prediction image Pred_Intra and the inter prediction image Pred_Inter has been selected to the variable-length code encoder 27.

(Motion Vector Redundancy Removal Unit 21e)

The motion vector redundancy removal unit 21e removes redundancy in the motion vector mv detected by the motion vector detection unit 21b. Specifically, the motion vector redundancy removal unit 21e (1) selects an estimation method to be used for the estimation of the motion vector mv, (2) derives an estimated motion vector pmv in accordance with the selected estimation method, and (3) subtracts the estimated motion vector pmv from the motion vector mv to generate a motion vector difference MVD. The motion vector redundancy removal unit 21e supplies the generated motion vector difference MVD to the prediction scheme control unit 21d together with a motion vector predictor index PMVI indicating the selected estimation method.

(Transformer/Quantizer 22)

The transformer/quantizer 22 (1) performs a frequency transform such as a DCT transform (Discrete Cosine Transform) on a prediction residual D obtained by subtracting the prediction image Pred from the image to be coded for each block (transform unit), (2) quantizes a transform coefficient Coeff_IQ obtained by the frequency transform, and (3) supplies a transform coefficient Coeff obtained by quantization to the variable-length code encoder 27 and the dequantizer/inverse transformer 23. Note that the transformer/quantizer 22 (1) selects a quantization step QP to be used for quantization, for each TU, (2) supplies a quantization parameter difference $\Delta_{qp}$ indicating the size of the selected quantization step QP to the variable-length code encoder 27, (3) and supplies the selected quantization step QP to the dequantizer/inverse transformer 23. The quantization parameter difference $\Delta_{qp}$ refers to a difference value obtained by subtracting the value of a quantization parameter qp' for the immediately preceding frequency transformed and quantized TU from the value of a quantization parameter qp (for example, QP=$2^{pq/6}$) for the TU to be frequency transformed and quantized.

The DCT transform performed by the transformer/quantizer 22 is given by, for example, mathematical expression (2) below, for example, if the target block has a size of 8×8 pixels and an unquantized transform coefficient for a horizontal frequency u and a vertical frequency v is represented by Coeff_IQ(u, v) (0≤u≤7, 0≤v≤7).

[Math. 2]

$$\text{Coeff\_IQ}(u, v) = \frac{1}{4} C(u)C(v) \sum_{i=0}^{7} \sum_{j=0}^{7} D(i, j) \cos\left\{\frac{(2i+1)u\pi}{16}\right\} \cos\left\{\frac{(2j+1)v\pi}{16}\right\} \quad (2)$$

Here, D(i, j) (0≤i≤7, 0≤j≤7) represents a prediction residual D at the position (i, j) in the target block. In addition, C(u) and C(v) are given as follows.
C(u)=1/√2 (u=0)
C(u)=1 (u≠0)
C(v)=1/√2 (v=0)
C(v)=1 (v≠0)

(Dequantizer/Inverse Transformer 23)

The dequantizer/inverse transformer 23 (1) dequantizes the quantized transform coefficient Coeff, (2) performs an inverse frequency transform such as an inverse DCT (Discrete Cosine Transform) transform on a transform coefficient Coeff_IQ obtained by dequantization, and (3) supplies a prediction residual D obtained by the inverse frequency transform to the adder 24. The quantized transform coefficient Coeff is dequantized using the quantization step QP supplied from the transformer/quantizer 22. The prediction residual D output from the dequantizer/inverse transformer 23 is a residual in which a quantization error is added to the prediction residual D to be input to the transformer/quantizer 22. However, the same designation is used here for simplicity. A more specific operation of the dequantizer/inverse transformer 23 is almost similar to that of the dequantizer/inverse transformer 13 included in the video decoding device 1.

(Adder 24)

The adder 24 adds the prediction image Pred selected by the prediction scheme control unit 21d to the prediction residual D generated by the dequantizer/inverse transformer 23 to generate a (locally) decoded image P. The (locally) decoded image P generated by the adder 24 is supplied to the loop filter 26 and is further stored in the frame memory 25 so as to be used as a reference image for intra prediction.

(Variable-Length Code Encoder 27)

The variable-length code encoder 27 encodes (1) the quantized transform coefficient Coeff and Δqp supplied from the transformer/quantizer 22, (2) the quantization parameter PP (inter prediction parameter PP_Inter, and intra prediction parameter PP_Intra) supplied from the prediction scheme control unit 21d, (3) the prediction type information Pred_type, and (4) a filter parameter FP supplied from the loop filter 26, using variable-length coding to generate coded data #1.

Figure 27:
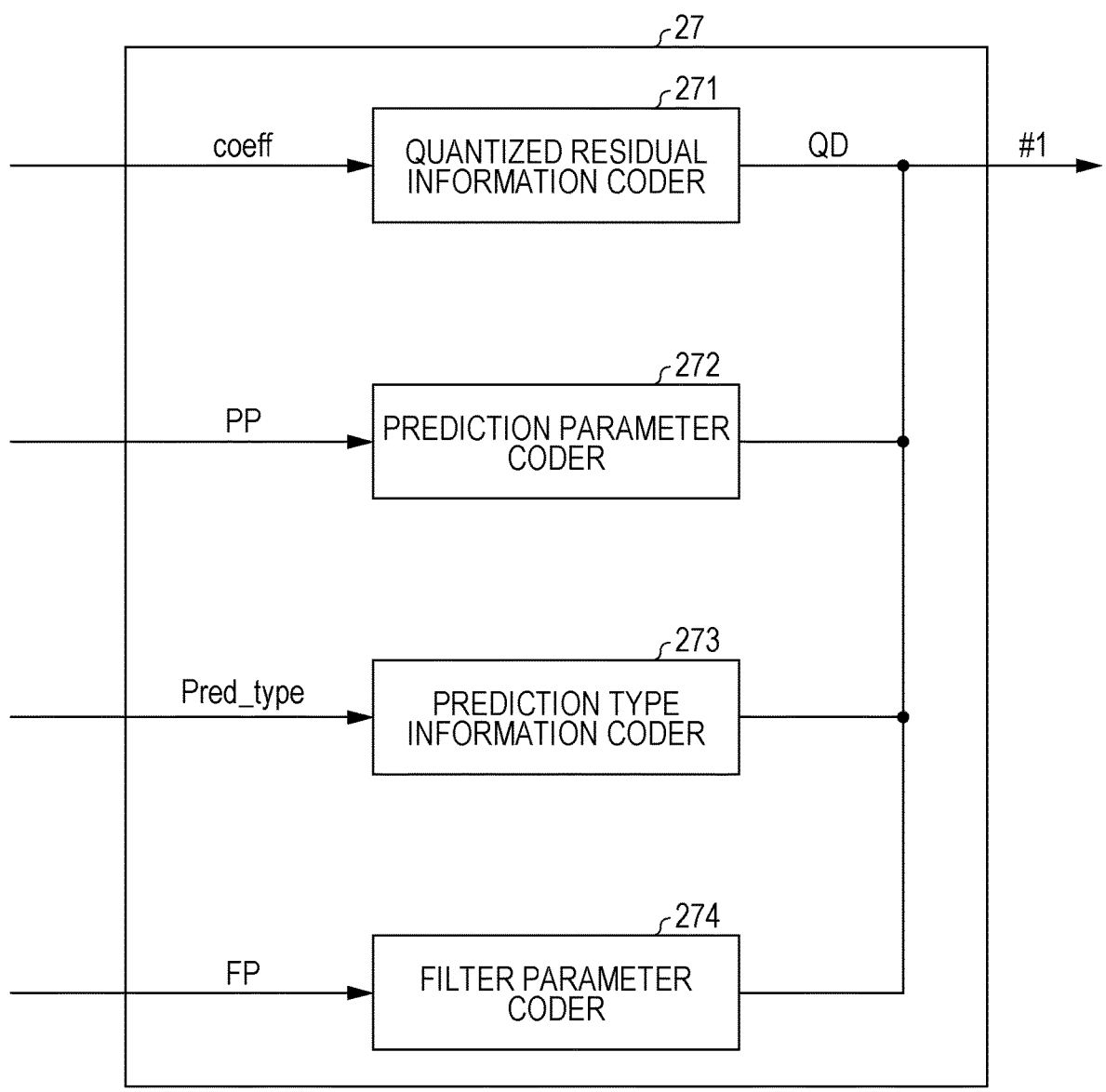
FIG. 27 is a block diagram illustrating configuration of a variable-length code encoder included in the video coding device according to the embodiment.

FIG. 27 is a block diagram illustrating a configuration of the variable-length code encoder 27. As illustrated in FIG. 27, the variable-length code encoder 27 includes a quantized residual information coder 271 for coding the quantized transform coefficient Coeff, a prediction parameter coder 272 for coding the prediction parameter PP, a prediction type information coder 273 for coding the prediction type information Pred_type, and a filter parameter coder 274 for coding the filter parameter FP. A specific configuration of the quantized residual information coder 271 will be described below, and is not described here.

(Subtractor 28)

The subtractor 28 subtracts the prediction image Pred selected by the prediction scheme control unit 21d from the image to be coded to generate a prediction residual D. The prediction residual D generated by the subtractor 28 is frequency transformed and quantized by the transformer/quantizer 22.

(Loop Filter 26)

The loop filter 26 has (1) a function of a deblocking filter (DF) for smoothing block boundaries in the decoded image P or images around partition boundaries (deblocking process), and (2) a function of an adaptive filter (ALF: Adaptive Loop Filter) for performing an adaptive filter process on an image to which the deblocking filter has been applied, using the filter parameter FP.

(Quantized Residual Information Coder 271)

The quantized residual information coder 271 encodes the quantized transform coefficient Coeff(uiPosX, uiPosY) using context-based adaptive binary arithmetic coding (CABAC) to generate quantized residual information QD. The syntax elements included in the generated quantized residual information QD are as illustrated in FIG. 5.

As described above, uiPosX and uiPosY are indices indicating the position of each frequency component in a frequency region, and are indices corresponding to the horizontal frequency u and vertical frequency v described above, respectively. In the following, the quantized transform coefficient Coeff may be referred to simply as the transform coefficient Coeff.

(Quantized Residual Information Coder 271)

Figure 28:
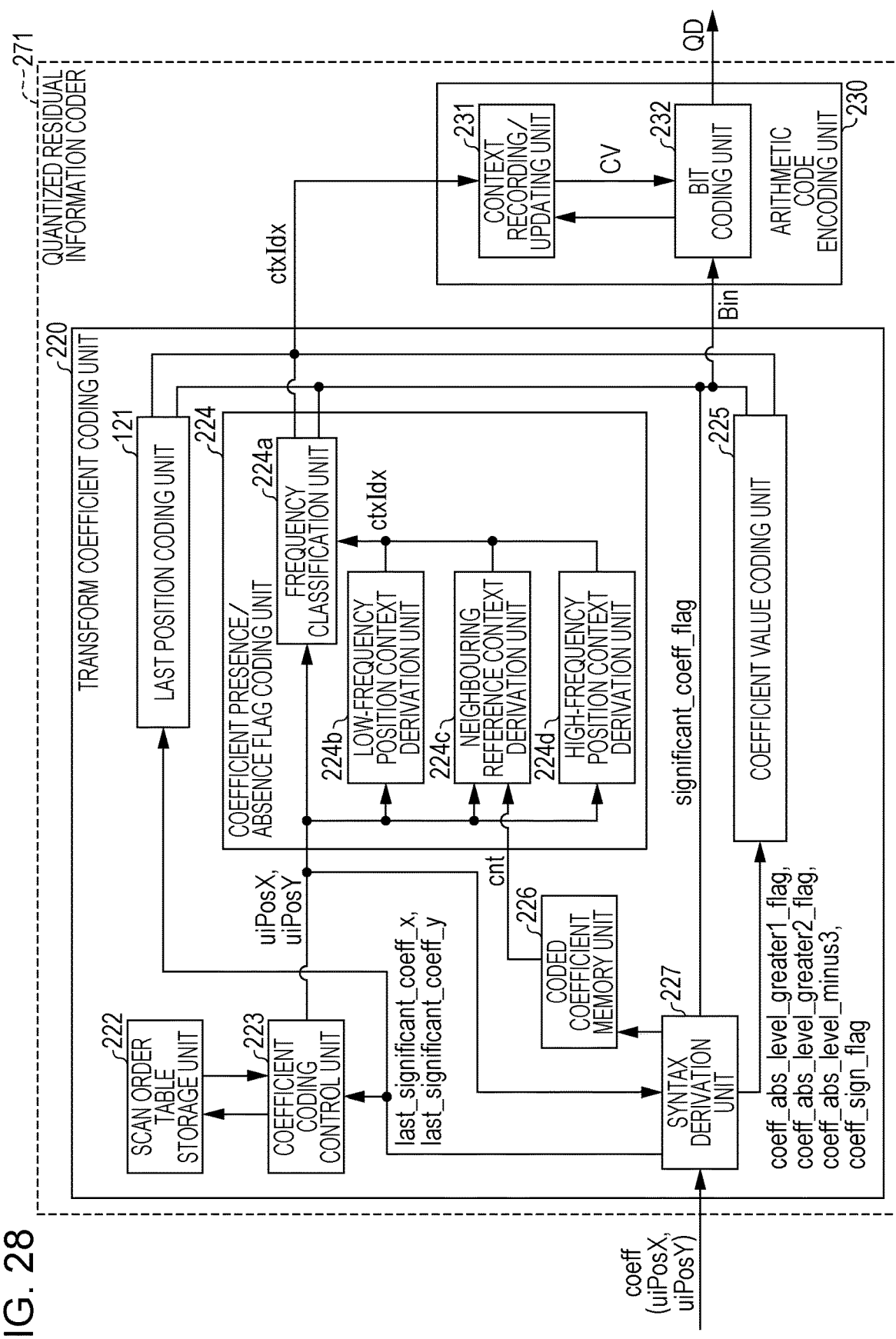
FIG. 28 is a block diagram illustrating a configuration of a quantized residual information coder included in the variable-length code encoder according to the embodiment.

FIG. 28 is a block diagram illustrating a configuration of the quantized residual information coder 271. As illustrated in FIG. 28, the quantized residual information coder 271 includes a transform coefficient coding unit 220 and an arithmetic code encoding unit 230.

(Arithmetic Code Encoding Unit 230)

The arithmetic code encoding unit 230 has a configuration for coding each bin supplied from the transform coefficient coding unit 220 by referring to a context to generate quantized residual information QD, and includes, as illustrated in FIG. 1, a context recording/updating unit 231 and a bit coding unit 232.

(Context Recording/Updating Unit 231)

The context recording/updating unit 231 has a configuration for recording and updating a context variable CV managed by each context index ctxIdx. The context variable CV includes (1) a most probable symbol MPS that occurs with high probability, and (2) a probability state index pStateIdx that specifies the probability of occurrence of the most probable symbol MPS.

The context recording/updating unit 231 refers to the context index ctxIdx supplied from each unit included in the transform coefficient coding unit 220 and the value of a bin coded by the bit coding unit 232 to update the context variable CV, and records the updated context variable CV until the next time the context variable CV is updated. The most probable symbol MPS is equal to 0 or 1. The most probable symbol MPS and the probability state index pStateIdx are updated each time the bit coding unit 232 codes one bin.

The context index ctxIdx may directly specify a context for each frequency component, or may be an increment value from the offset of a context index that is set for each TU to be processed (this similarly applies to the following).

(Bit Coding Unit 232)

The bit coding unit 232 refers to the context variable CV recorded on the context recording/updating unit 231, and codes each bin supplied from each unit included in the transform coefficient coding unit 220 to generate quantized residual information QD. The value of the coded bin is also supplied to the context recording/updating unit 231, and is referred to in order to update the context variable CV.

(Transform Coefficient Coding Unit 220)

As illustrated in FIG. 28, the transform coefficient coding unit 220 includes a last position coding unit 221, a scan order table storage unit 222, a coefficient coding control unit 223, a coefficient presence/absence flag coding unit 224, a coefficient value coding unit 225, a coded coefficient memory unit 226, and a syntax derivation unit 227.

(Syntax Derivation Unit 227)

The syntax derivation unit 227 refers to the values of transform coefficients Coeff(uiPosX, uiPosY), and derives the values of syntax elements last_significant_coeff_x, last_significant_coeff_y, significant_coeff_flag, coeff_abs_level_greater1_flag, coeff_abs_level_greater2_flag, coeff_sign_flag, and coef-f_abs_level_minus3 for specifying these transform coefficients in a target frequency region. The derived syntax elements are supplied to the coded coefficient memory unit 226. Of the derived syntax elements, last_significant_coeff_x and last_significant_coeff_y are also supplied to the coefficient coding control unit 223 and the last position coding unit 221. Of the derived syntax elements, furthermore, significant_coeff_flag is also supplied to the coefficient presence/absence flag coding unit 224. The content of the respective syntax elements has been described above, and is not described here.

(Last Position Coding Unit 221)

The last position coding unit 221 codes the syntax element last_significant_coeff_x and last_significant_coeff_y supplied from the syntax derivation unit 227. The last position coding unit 221 supplies each bin obtained by the coding of these syntax elements to the bit coding unit 232. The context index ctxIdx used for the coding of the syntax elements last_significant_coeff_x and last_significant_coeff_y is supplied to the context recording/updating unit 231.

(Scan Order Table Storage Unit 222)

The scan order table storage unit 222 stores a table that provides the position of the frequency component to be processed in a frequency region using the size of the TU to be processed, a scan index indicating a type of scan direction, and a frequency component identification index assigned in scan order as arguments. Examples of the scan order table include ScanOrder illustrated in FIG. 5.

(Coefficient Coding Control Unit 223)

The coefficient coding control unit 223 has a configuration for controlling the order of the coding process in each unit included in the quantized residual information coder 271. The coefficient coding control unit 223 refers to the syntax elements last_significant_coeff_x and last_significant_coeff_y supplied from the syntax derivation unit 227 to identify the position of the last non-zero transform coefficient in a forward scan, and supplies the position (uiPosX, uiPosY) of the frequency components to the coefficient presence/absence flag coding unit in scan order that starts with the identified position of the last non-zero transform coefficient as the origin and that is reverse scan order to the scan order provided in the scan order table stored in the scan order table storage unit 222.

The coefficient coding control unit 223 may be configured to identify the position of the last non-zero transform coefficient in a forward scan, and to supply the position (uiPosX, uiPosY) of the frequency components to the coefficient presence/absence flag coding unit in scan order that starts with the initial component (DC component) as the origin and ends with the identified position of the last non-zero transform coefficient and that is forward scan order of the scan order provided in the scan order table stored in the scan order table storage unit 222.

(Coefficient Value Coding Unit 225)

The coefficient value coding unit 225 codes the syntax elements coeff_abs_level_greater1_flag, coeff_abs_level_greater2_flag, coeff_sign_flag, and coef-f_abs_level_minus3 supplied from the syntax derivation unit 227. The coefficient value coding unit 225 supplies each bin obtained by the coding of these syntax elements to the bit coding unit 232. The context index ctxIdx used for the coding of these syntax elements is supplied to the context recording/updating unit 231.

(Coded Coefficient Memory Unit 226)

The coded coefficient memory unit 226 has a configuration for storing the values of the syntax elements derived by the syntax derivation unit 227. In particular, the coded coefficient memory unit 226 stores the values of the syntax element significant_coeff_flag derived by the syntax derivation unit 227.

(Coefficient Presence/Absence Flag Coding Unit)

The coefficient presence/absence flag coding unit according to this embodiment has a configuration for classifying a frequency region into one or a plurality of sub-regions in accordance with the magnitude of the frequency, deriving a context index ctxIdx using a derivation method determined for each sub-region, and coding the syntax element significant_coeff_flag indicating the presence or absence of a non-zero transform coefficient using the derived context index ctxIdx.

First Example Configuration of Coefficient Presence/Absence Flag Coding Unit

FIG. 28 illustrates a coefficient presence/absence flag coding unit 224 serving as a first example configuration of the coefficient presence/absence flag coding unit according to this embodiment.

As illustrated in FIG. 28, the coefficient presence/absence flag coding unit 224 according to this example configuration includes a frequency classification unit 224a, a low-frequency position context derivation unit 224b, a neighbouring reference context derivation unit 224c, and a high-frequency position context derivation unit 224d.

(Frequency Classification Unit 224a)

The frequency classification unit 224a has a configuration for classifying a frequency component to be coded into any of a plurality of sub-regions in accordance with the position of the frequency component in the frequency region, and for allocating a context index ctxIdx derived by any of the low-frequency position context derivation unit 224b, the neighbouring reference context derivation unit 224c, and the high-frequency position context derivation unit 224d to the frequency component to be coded.

The frequency classification unit 224a calculates a context index ctxIdx for determining a context to be used to code the syntax element significant_coeff_flag using the arithmetic code encoding unit 230. The context index ctxIdx is calculated for each frequency region size and for each frequency component to be decoded.

Other specific processes performed by the frequency classification unit 224a according to this example configuration are similar to those for the frequency classification unit 124a included in the video decoding device 1, and are not described here.

(Low-Frequency Position Context Derivation Unit 224b)

The low-frequency position context derivation unit 224b has a configuration for deriving a context index ctxIdx for the frequency component to be coded, on the basis of the position of the frequency component in the frequency region if the frequency component is included in a low-frequency-side sub-region.

A specific process performed by the low-frequency position context derivation unit 224b according to this example configuration is similar to that for the low-frequency position context derivation unit 124b included in the video decoding device 1, and is not described here.

(Neighbouring Reference Context Derivation Unit 224c)

The neighbouring reference context derivation unit 224c has a configuration for deriving a context index ctxIdx for the frequency component to be coded, on the basis of the number of coded non-zero transform coefficients for neighbouring frequency components of the frequency component.

A specific process performed by the neighbouring reference context derivation unit 224c according to this example configuration is similar to that for the neighbouring reference context derivation unit 224c included in the video decoding device 1, and is not described here.

(High-Frequency Position Context Derivation Unit 224d)

The high-frequency position context derivation unit 224d has a configuration for deriving a context index ctxIdx for the frequency component to be coded, on the basis of the position of the frequency component in the frequency region if the frequency component is included in a high-frequency-side sub-region.

A specific process performed by the high-frequency position context derivation unit 224d according to this example configuration is similar to that for the high-frequency position context derivation unit 124d included in the video decoding device 1, and is not described here.

Second Example Configuration of Coefficient Presence/Absence Flag Coding Unit

A coefficient presence/absence flag coding unit according to this embodiment may have a configuration corresponding to the coefficient presence/absence flag decoding unit 124-1 included in the video decoding device 1.

Specifically, the coefficient presence/absence flag coding unit according to this example configuration may include respective units similar to the frequency classification unit 124a, the low-frequency position context derivation unit 124b, the neighbouring reference context derivation unit 124c, the preceding scan sequence context derivation unit 124e, and the non-zero transform coefficient counting unit 124f.

These units have been described in the description of the coefficient presence/absence flag decoding unit 124-1 included in the video decoding device 1, and are not described here.

Third Example Configuration of Coefficient Presence/Absence Flag Coding Unit

A coefficient presence/absence flag coding unit according to this embodiment may have a configuration corresponding to the coefficient presence/absence flag decoding unit 124-2 included in the video decoding device 1.

Specifically, the coefficient presence/absence flag coding unit according to this example configuration may include respective units similar to the frequency classification unit 124a, the low-frequency position context derivation unit 124b, and the neighbouring reference context derivation unit 124g.

These units have been described in the description of the coefficient presence/absence flag decoding unit 124-2 included in the video decoding device 1, and are not described here.

The coefficient presence/absence flag decoding unit 124-2 may also have a configuration corresponding to the configuration illustrated in another example configuration of the third example configuration of the coefficient presence/absence flag coding unit.

Fourth Example Configuration of Coefficient Presence/Absence Flag Coding Unit

A coefficient presence/absence flag coding unit according to this embodiment may have a configuration corresponding to the coefficient presence/absence flag decoding unit 124' included in the video decoding device 1.

Specifically, the coefficient presence/absence flag coding unit according to this example configuration may include respective units similar to the frequency classification unit 124a', the low-frequency position context derivation unit 124b, the neighbouring reference context derivation unit 124g, and the high-frequency position context derivation unit 124d.

These units have been described in the description of the coefficient presence/absence flag decoding unit 124' included in the video decoding device 1, and are not described here.

Fifth Example Configuration of Coefficient Presence/Absence Flag Coding Unit

A coefficient presence/absence flag coding unit according to this embodiment may have a configuration corresponding to the coefficient presence/absence flag decoding unit 124-3 included in the video decoding device 1.

Specifically, the coefficient presence/absence flag coding unit according to this example configuration may include respective units similar to the frequency classification unit 124a, the low-frequency position context derivation unit 124b, the high-frequency region context derivation unit 124h, the neighbouring reference context derivation unit 124i, the preceding scan sequence context derivation unit 124e, and the non-zero transform coefficient counting unit 124f.

These units have been described in the description of the coefficient presence/absence flag decoding unit 124-3 included in the video decoding device 1, and are not described here.

Sixth Example Configuration of Coefficient Presence/Absence Flag Coding Unit

A coefficient presence/absence flag coding unit according to this embodiment may have a configuration corresponding to the coefficient presence/absence flag decoding unit 124-4 included in the video decoding device 1.

Specifically, the coefficient presence/absence flag coding unit according to this example configuration may include respective units similar to the frequency classification unit 124*a*, the low-frequency position context derivation unit 124*b*, and the neighbouring reference context derivation unit 124*k*.

These units have been described in the description of the coefficient presence/absence flag decoding unit 124-4 included in the video decoding device 1, and are not described here.

In the following, a description will be given of seventh to ninth configurations of the coefficient presence/absence flag coding unit corresponding to the seventh to ninth configurations of the coefficient presence/absence flag decoding unit included in the video decoding device 1. In the seventh to ninth configurations of the coefficient presence/absence flag coding unit, coefficient presence/absence flags are not coded using an entire frequency region as one transform block, but coefficient presence/absence flags are coded by dividing a transform block into, for example, 4×4 sub-blocks and using a sub-block as a unit. FIG. 32 illustrates sub-block scanning performed by the coefficient presence/absence flag coding unit according to the seventh to ninth configurations. In a case where the coding of coefficient presence/absence flags is based on sub-block, a flag (sub-block coefficient presence/absence flag) indicating whether or not at least one non-zero transform coefficient is present in a sub-block is coded for each sub-block in sub-block reverse scan order. Furthermore, if the sub-block coefficient presence/absence flag is not equal to 0, a coefficient presence/absence flag is coded for each transform coefficient in a sub-block in reverse scan order within the sub-block.

Seventh Configuration of Coefficient Presence/Absence Flag Coding Unit

Figure 43:
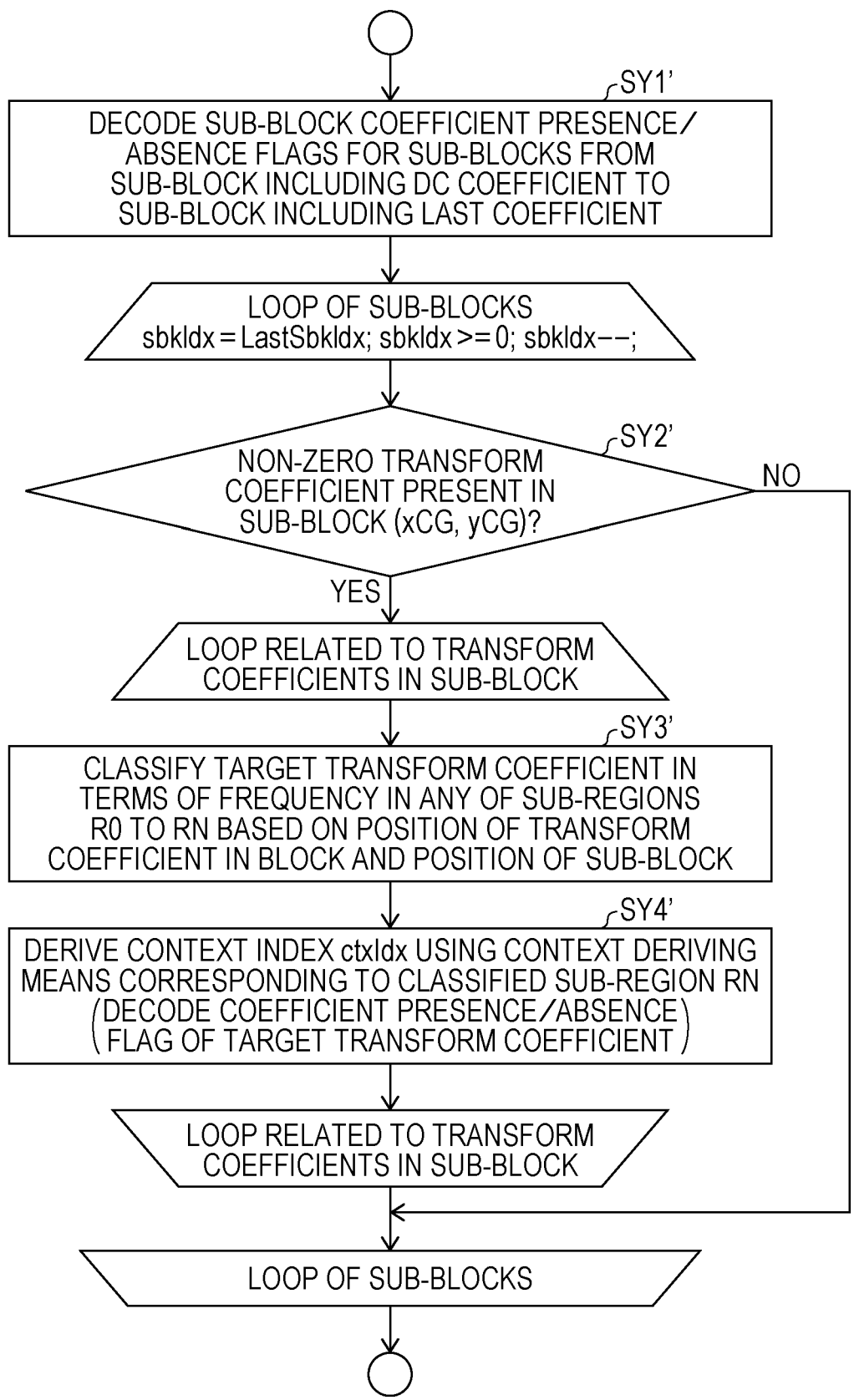
FIG. 43 is a flowchart illustrating the flow of the operation with the seventh to ninth example configurations of the coefficient presence/absence flag coding unit according to the embodiment.
Figure 44:
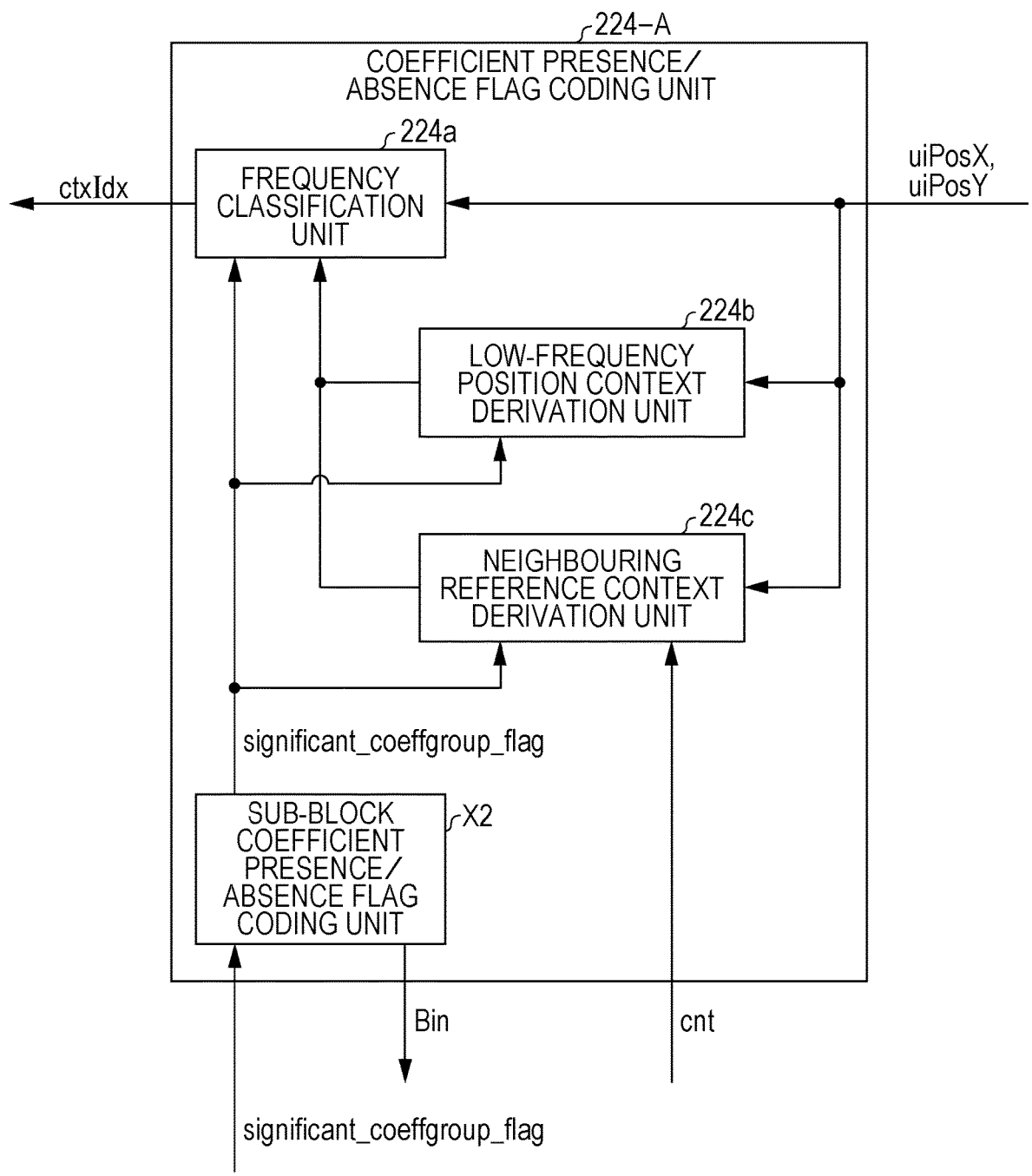
FIG. 44 is a block diagram illustrating the seventh example configuration of the coefficient presence/absence flag coding unit according to the embodiment.

FIG. 44 is a block diagram illustrating a configuration of a coefficient presence/absence flag coding unit 224-A corresponding to the coefficient presence/absence flag decoding unit 124-A. FIG. 43 is a flowchart illustrating the flow of the operation of the coefficient presence/absence flag coding unit 224-A according to this example configuration.

As illustrated in FIG. 44, the coefficient presence/absence flag coding unit 224-A according to this example configuration includes a sub-block coefficient presence/absence flag coding unit X2, a frequency classification unit 224*a*, a low-frequency position context derivation unit 224*b*, and a neighbouring reference context derivation unit 224*c*.

(Sub-Block Coefficient Presence/Absence Flag Coding Unit X2)

The sub-block coefficient presence/absence flag coding unit X2 codes a sub-block coefficient presence/absence flag (significant_coeffgroup_flag) indicating whether or not at least one non-zero transform coefficient is present in each of sub-blocks constituting a frequency region of a target transform block supplied from the syntax derivation unit 227 (step SY1' in FIG. 43). Further, each bin obtained by the coding of the sub-block coefficient presence/absence flag is supplied to the bit coding unit 232.

Then, the sub-block coefficient presence/absence flag coding unit X2 codes, for each sub-block in a transform block, a coefficient presence/absence flag in the sub-block (step SY2' to step SY4' in FIG. 43). That is, if the sub-block coefficient presence/absence flag is equal to 1 (YES in step SY2' in FIG. 43) in the sub-block coefficient presence/ absence flag coding unit X2, a coefficient presence/absence flag in the sub-block is coded using the frequency classification unit 224*a*, the low-frequency position context derivation unit 224*b*, and the neighbouring reference context derivation unit 224*c*. If the sub-block coefficient presence/absence flag is equal to 0 (NO in step SY2' in FIG. 43), the coding of a coefficient presence/absence flag in the sub-block is skipped, and the process proceeds to the processing of the subsequent sub-block.

In the loop of the sub-blocks in FIG. 43, sbkIdx represents the scan order number of the target sub-block in a forward scan of sub-blocks, and LastSbkIdx represents the scan order number of the sub-block that includes the last coefficient in the forward scan of sub-blocks. If a transform block of sz×sz is divided into 4×4 sub-blocks, the values that sbkIdx and LastSbkIdx take are in the range of 0 to (sz>>2)× (sz>>2)−1.

(Frequency Classification Unit 224*a* Included in Coefficient Presence/Absence Flag Coding Unit 224-A)

The frequency classification unit 224*a* included in the coefficient presence/absence flag coding unit 224-A classifies the frequency component to be coded into any of a plurality of sub-regions in accordance with the position of the frequency component to be coded in the frequency region, and allocates a context index ctxIdx derived by any of the low-frequency position context derivation unit 224*b* and the neighbouring reference context derivation unit 224*c* to the frequency component to be coded (step SY3' in FIG. 43).

The frequency classification unit 224*a* included in the coefficient presence/absence flag coding unit 224-A calculates a context index ctxIdx for determining a context to be used to code the syntax element significant_coeff_flag using the arithmetic code encoding unit 230. The context index ctxIdx is calculated for each frequency region size and for each frequency component to be coded (step SY4' in FIG. 43).

Other specific processes performed by the frequency classification unit 224*a* included in the coefficient presence/ absence flag coding unit 224-A are similar to those for the frequency classification unit 124*a* in the coefficient presence/absence flag decoding unit 124-A, and are not described here.

In the following, a description will be given of context derivation for the sub-regions R0 to R2.

(Low-Frequency Position Context Derivation Unit 224*b* Included in Coefficient Presence/Absence Flag Coding Unit 224-A)

The low-frequency position context derivation unit 224*b* included in the coefficient presence/absence flag coding unit 224-A derives a context index ctxIdx for the frequency component to be coded, on the basis of the position of the frequency component in the frequency region if the frequency component is included in a low-frequency-side sub-region.

The low-frequency position context derivation unit 224*b* according to this example configuration derives a context index ctxIdx for the frequency components included in the sub-region R0 using a process similar to the process of the low-frequency position context derivation unit 124*b* in the coefficient presence/absence flag decoding unit 124-A, and supplies the derivation result ctxIdx to the frequency classification unit 224*a*.

(Neighbouring Reference Context Derivation Unit 224c Included in Coefficient Presence/Absence Flag Coding Unit 224-A)

The neighbouring reference context derivation unit 224c included in the coefficient presence/absence flag coding unit 224-A derives a context index ctxIdx for the frequency component to be coded, on the basis of the number of coded non-zero transform coefficients for neighbouring frequency components of the frequency component.

The neighbouring reference context derivation unit 224c according to this embodiment derives a context index ctxIdx for the frequency components included in the sub-regions R1 and R2 using a process similar to the process of the neighbouring reference context derivation unit 124c in the coefficient presence/absence flag decoding unit 124-A, and supplies the derivation result ctxIdx to the frequency classification unit 224a.

Eighth Configuration of Coefficient Presence/Absence Flag Coding Unit

Figure 45:
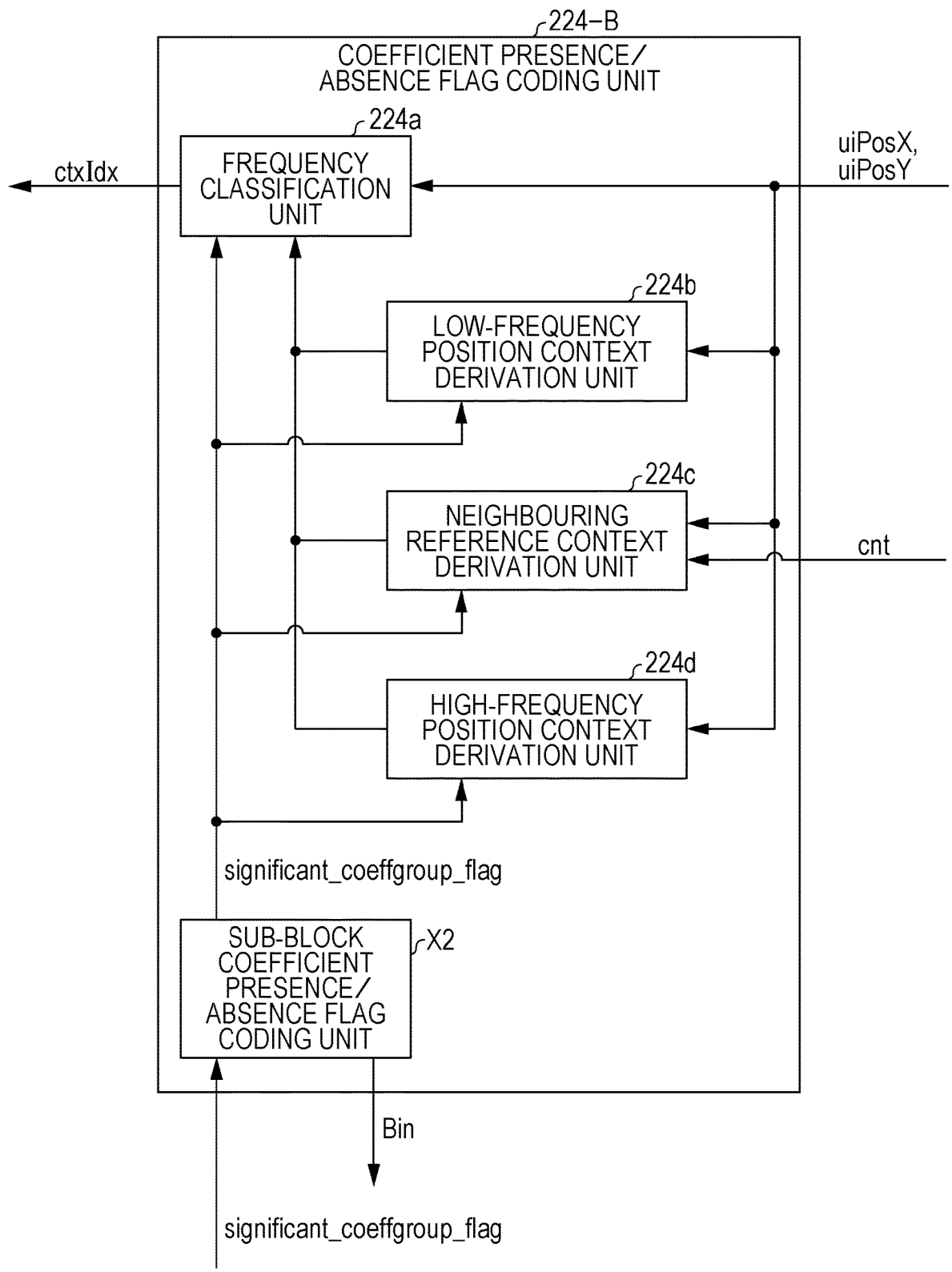
FIG. 45 is a block diagram illustrating the eighth example configuration of the coefficient presence/absence flag coding unit according to the embodiment.

FIG. 45 is a block diagram illustrating a configuration of a coefficient presence/absence flag coding unit 224-B corresponding to the coefficient presence/absence flag decoding unit 124-B. The flow of the operation of the coefficient presence/absence flag coding unit 224-B will be described using a flowchart illustrated in FIG. 43.

As illustrated in FIG. 45, the coefficient presence/absence flag coding unit 224-B according to this example configuration includes a sub-block coefficient presence/absence flag coding unit X2, a frequency classification unit 224a, a low-frequency position context derivation unit 224b, a neighbouring reference context derivation unit 224c, and a high-frequency position context derivation unit 224d.

(Sub-Block Coefficient Presence/Absence Flag Coding Unit X2 Included in Coefficient Presence/Absence Flag Coding Unit 224-B)

The sub-block coefficient presence/absence flag coding unit X2 included in the coefficient presence/absence flag coding unit 224-B codes a sub-block coefficient presence/absence flag (significant_coeffgroup_flag) indicating whether or not at least one non-zero transform coefficient is present in each of sub-blocks constituting a frequency region of a target transform block supplied from the syntax derivation unit 227 (step SY1' in FIG. 43). Further, each bin obtained by the coding of the sub-block coefficient presence/absence flag is supplied to the bit coding unit 232.

Then, the sub-block coefficient presence/absence flag coding unit X2 codes, for each sub-block in a transform block, a coefficient presence/absence flag in the sub-block (step SY2' to step SY4' in FIG. 43). That is, if the sub-block coefficient presence/absence flag is equal to 1 (YES in step SY2' in FIG. 43) in the sub-block coefficient presence/absence flag coding unit X2, a coefficient presence/absence flag in the sub-block is coded using the frequency classification unit 224a, the low-frequency position context derivation unit 224b, the neighbouring reference context derivation unit 224c, and the high-frequency position context derivation unit 224d. If the sub-block coefficient presence/absence flag is equal to 0 (NO in step SY2' in FIG. 43), the coding of a coefficient presence/absence flag in the sub-block is skipped, and the process proceeds to the processing of the subsequent.

(Frequency Classification Unit 224a Included in Coefficient Presence/Absence Flag Coding Unit 224-B)

The frequency classification unit 224a included in the coefficient presence/absence flag coding unit 224-B classifies the frequency component to be coded into any of a plurality of sub-regions in accordance with the position of the frequency component to be coded in the frequency region, and allocates a context index ctxIdx derived by any of the low-frequency position context derivation unit 224b, the neighbouring reference context derivation unit 224c, and the high-frequency position context derivation unit 224d to the frequency component to be coded (step SY3' in FIG. 43).

The frequency classification unit 224a included in the coefficient presence/absence flag coding unit 224-B calculates a context index ctxIdx for determining a context to be used to code the syntax element significant_coeff_flag using the arithmetic code encoding unit 230. The context index ctxIdx is calculated for each frequency region size and for each frequency component to be coded (step SY4' in FIG. 43).

Other specific processes performed by the frequency classification unit 224a included in the coefficient presence/absence flag coding unit 224-B are similar to those for the frequency classification unit 124a in the coefficient presence/absence flag decoding unit 124-B, and are not described here.

In the following, a description will be given of context derivation for the sub-regions R0 to R3.

(Low-Frequency Position Context Derivation Unit 224b Included in Coefficient Presence/Absence Flag Coding Unit 224-B)

The low-frequency position context derivation unit 224b included in the coefficient presence/absence flag coding unit 224-B derives a context index ctxIdx for the frequency components included in the sub-region R0 using a process similar to the process of the low-frequency position context derivation unit 124b in the coefficient presence/absence flag decoding unit 124-B, and supplies the derivation result ctxIdx to the frequency classification unit 224a.

(Neighbouring Reference Context Derivation Unit 224c Included in Coefficient Presence/Absence Flag Coding Unit 224-B)

The neighbouring reference context derivation unit 224c included in the coefficient presence/absence flag coding unit 224-B derives a context index ctxIdx for the frequency components included in the sub-regions R1 and R2 using a process similar to the process of the neighbouring reference context derivation unit 124c in the coefficient presence/absence flag decoding unit 124-B, and supplies the derivation result ctxIdx to the frequency classification unit 224a.

(High-Frequency Position Context Derivation Unit 224d Included in Coefficient Presence/Absence Flag Coding Unit 224-B)

The high-frequency position context derivation unit 224d included in the coefficient presence/absence flag coding unit 224-B derives a context index ctxIdx for the frequency component to be coded, on the basis of the position of the frequency component in the frequency region and the position of the sub-block including the frequency component if the frequency component is included in a high-frequency-side sub-region.

The high-frequency position context derivation unit 224d included in the coefficient presence/absence flag coding unit 224-B derives a context index ctxIdx for the frequency components included in the sub-region R3 using a process similar to the process of the high-frequency position context derivation unit 124d in the coefficient presence/absence flag decoding unit 124-C, and supplies the derivation result ctxIdx to the frequency classification unit 224a.

According to the frequency classification unit 224a having the configuration described above, a branching process for switching the context derivation method in accordance with the position of a transform coefficient can be replaced by a branching process that uses sub-block coordinates (xCG, yCG). A branching process in which (uiPosX, uiPosY) are referred to, which is performed within a sub-block, can be omitted, improving the throughput of context derivation, compared to the branching process in which (uiPosX, uiPosY) are referred to.

Furthermore, the coefficient presence/absence flag coding unit and the sub-block coefficient presence/absence flag coding unit having the configuration described above allows the position context to be such that a context for a coefficient presence/absence flag at the position of a given transform coefficient is determined regardless of the value of a previously coded coefficient presence/absence flag, achieving the advantage of providing parallel execution of the derivation of contexts for coefficient presence/absence flags and the coding of coefficient presence/absence flags.

Ninth Configuration of Coefficient Presence/Absence Flag Coding Unit

Figure 46:
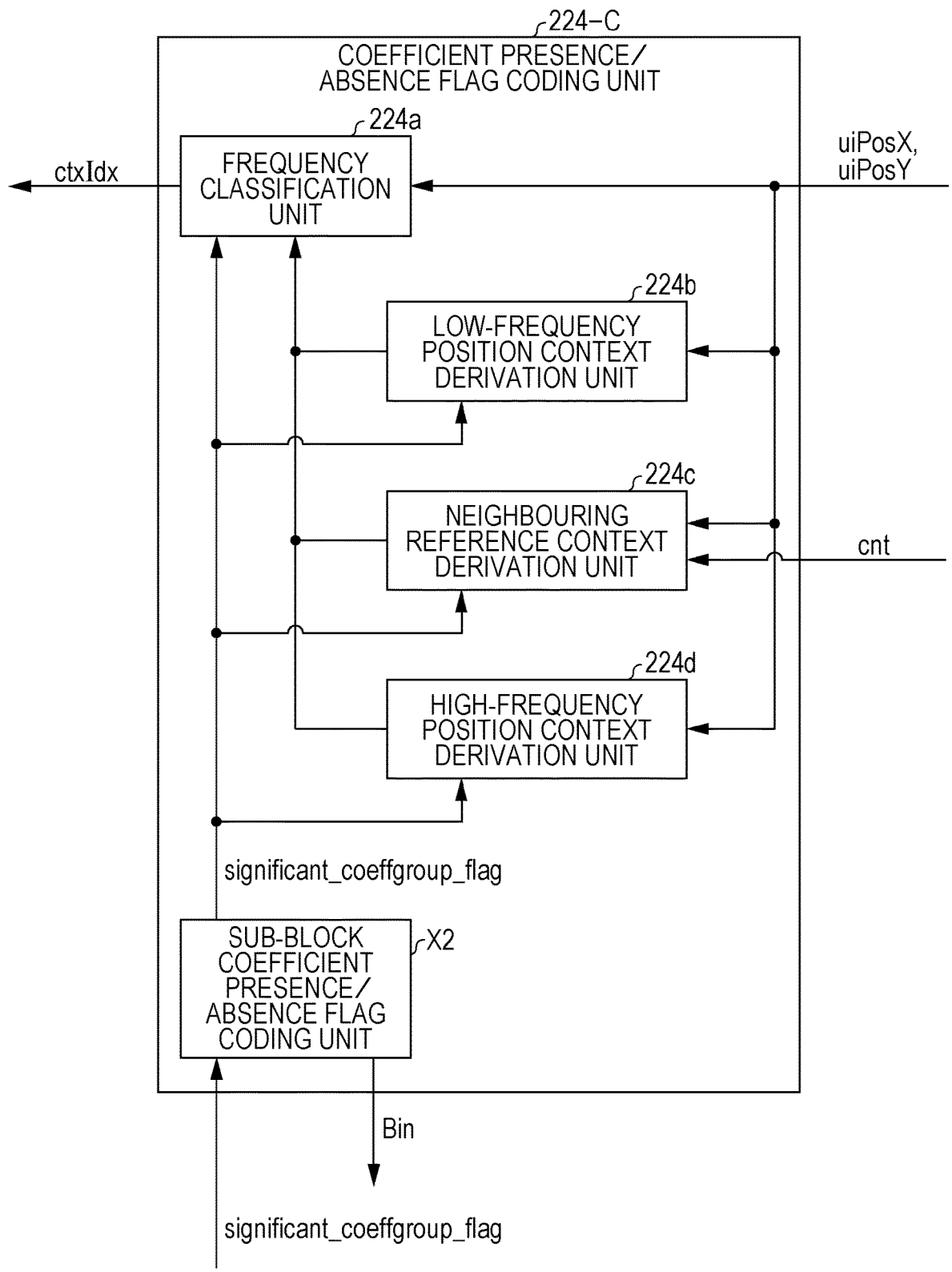
FIG. 46 is a block diagram illustrating the ninth example configuration of the coefficient presence/absence flag coding unit according to the embodiment.

FIG. 46 is a block diagram illustrating a configuration of a coefficient presence/absence flag coding unit 224-C corresponding to the coefficient presence/absence flag decoding unit 124-C. The flow of the operation of the coefficient presence/absence flag coding unit 224-C will be described using a flowchart illustrated in FIG. 43.

As illustrated in FIG. 46, the coefficient presence/absence flag coding unit 224-C according to this example configuration includes a sub-block coefficient presence/absence flag coding unit X2, a frequency classification unit 224a, a low-frequency position context derivation unit 224b, a neighbouring reference context derivation unit 224c, and a high-frequency position context derivation unit 224d.

(Sub-Block Coefficient Presence/Absence Flag Coding Unit X2 Included in Coefficient Presence/Absence Flag Coding Unit 224-C)

The sub-block coefficient presence/absence flag coding unit X2 included in the coefficient presence/absence flag coding unit 224-C is similar to the coefficient presence/absence flag coding unit X2 of the coefficient presence/absence flag coding unit 224-B, and a description thereof is thus omitted.

(Frequency Classification Unit 224a)

The frequency classification unit 224a included in the coefficient presence/absence flag coding unit 224-C classifies the frequency component to be coded into any of a plurality of sub-regions in accordance with the position of the frequency component to be coded in the frequency region, and allocates a context index ctxIdx derived by any of the low-frequency position context derivation unit 224b, the neighbouring reference context derivation unit 224c, and the high-frequency position context derivation unit 224d to the frequency component to be coded (step SY3' in FIG. 43).

The frequency classification unit 224a included in the coefficient presence/absence flag coding unit 224-C calculates a context index ctxIdx for determining a context to be used to code the syntax element significant_coeff_flag using the arithmetic code encoding unit 230. The context index ctxIdx is calculated for each frequency region size and for each frequency component to be coded (step SY4' in FIG. 43).

Other specific processes performed by the frequency classification unit 224a included in the coefficient presence/absence flag coding unit 224-C are similar to those for the frequency classification unit 124a in the coefficient presence/absence flag decoding unit 124-C, and are not described here.

In the following, a description will be given of context derivation for the sub-regions R0 to R4.

(Low-Frequency Position Context Derivation Unit 224b Included in Coefficient Presence/Absence Flag Coding Unit 224-C)

The low-frequency position context derivation unit 224b included in the coefficient presence/absence flag coding unit 224-C derives a context index ctxIdx for the frequency components included in the sub-region R0 using a process similar to the process of the low-frequency position context derivation unit 124b in the coefficient presence/absence flag decoding unit 124-C, and supplies the derivation result ctxIdx to the frequency classification unit 224a.

(Neighbouring Reference Context Derivation Unit 224c Included in Coefficient Presence/Absence Flag Coding Unit 224-C)

The neighbouring reference context derivation unit 224c included in the coefficient presence/absence flag coding unit 224-C derives a context index ctxIdx for the frequency components included in the sub-regions R1, R2, and R3 using a process similar to the process of the neighbouring reference context derivation unit 124c in the coefficient presence/absence flag decoding unit 124-C, and supplies the derivation result ctxIdx to the frequency classification unit 224a.

(High-Frequency Position Context Derivation Unit 224d Included in Coefficient Presence/Absence Flag Coding Unit 224-C)

The high-frequency position context derivation unit 224d included in the coefficient presence/absence flag coding unit 224-C derives a context index ctxIdx for the frequency components included in the sub-region R4 using a process similar to the process of the high-frequency position context derivation unit 124d in the coefficient presence/absence flag decoding unit 124-C, and supplies the derivation result ctxIdx to the frequency classification unit 224a.

As described above, according to the coefficient presence/absence flag coding unit 224-C according to this example configuration, for a higher-frequency-side sub-region (for example, the sub-region R3 in FIG. 41) than a predetermined threshold value THF, the number of coded non-zero transform coefficients to be referred to for the derivation of a context index to be allocated to each transform coefficient presence/absence flag is smaller than the number of coded non-zero transform coefficients to be referred to for a low-frequency-side sub-region (for example, the sub-region R2 in FIG. 41). Thus, it is possible to reduce the amount of processing for a context index derivation process on the high-frequency side. Furthermore, for a higher-frequency-side sub-region (for example, the sub-region R4 in FIG. 41) than the other threshold value THG, a context index is derived on the basis of the position regardless of a surrounding reference. Thus, it is possible to further reduce the amount of processing. In addition, a position reference does not use the value of a previously coded coefficient presence/absence flag for the derivation of a context. Thus, it is also possible to improve parallelism.

As described above, in the coefficient presence/absence flag coding unit 224-C according to this example configuration, the frequency classification unit 224a is configured to classify the target frequency region into at least three sub-regions in accordance with the position of the transform coefficient presence/absence flag to be processed and the position of the sub-block to which the transform coefficient presence/absence flag belongs.

The neighbouring reference context derivation unit 224c derives a context index by referring to N1 decoded non-zero transform coefficients (where N1 is a natural number) for a first sub-region (the sub-region R1 or R2), and referring to N2 decoded non-zero transform coefficients (where N2 is a natural number satisfying N2<N1) for a second sub-region (the sub-region R3).

For a third sub-region (the sub-region R4), the high-frequency position context derivation unit 224d derives a context index in accordance with the position of a sub-block to which a transform coefficient presence/absence flag belongs.

According to the configuration described above, a combination of a sub-region where the number of coded non-zero transform coefficients to be referred to for the derivation of a context index is set to be smaller and a sub-region for which a context index is derived on the basis of the position of a transform coefficient presence/absence flag in the target frequency region and the position of the sub-block to which the transform coefficient presence/absence flag belongs can reduce the amount of processing for a context index derivation process on the high-frequency side, compared to an existing configuration, while achieving high coding efficiency.

Other Example Configuration 1 of Transform Coefficient Coding Unit 220

While the transform coefficient coding unit 220 according to this embodiment has been described focusing on an example configuration of the coefficient presence/absence flag coding unit, the configuration of the transform coefficient coding unit 220 according to this embodiment is not limited to that in the example described above.

For example, the transform coefficient coding unit 220 may be configured to restrict the coding of transform coefficients so that only a transform coefficient for a frequency component satisfying the following condition $$uiPosX+uiPosY<TH2$$

is coded, and a flag high_coeff_restriction_flag indicating whether or not the restriction described above is applied may be included in the sequence parameter set SPS in the coded data #1.

Furthermore, the restriction described above may be applied only when the TU to be processed has a specific size (for example, 32×32 or 16×16).

A specific example of restriction and processing associated therewith are similar to those described in the section entitled (Other example configuration 1 of transform coefficient decoding unit 120), and are not described here.

Other Example Configuration 2 of Transform Coefficient Coding Unit 220

If the target TU has a size of 8×8 pixels, the coefficient presence/absence flag coding unit included in the transform coefficient coding unit 220 may be configured to derive a context index ctxIdx using the expression below, and to allocate the context index ctxIdx to each frequency component.

$$ctxIdx=N8+4\times tbl[uiPosY]+tbl[uiPosX]$$

Here, $$tbl=\{0,1,1,2,2,3,3,3\}.$$

N8 is the starting point of a context index when the frequency region size is 8×8.

The process performed by the coefficient presence/absence flag coding unit according to this example configuration is similar to that described in the section entitled (Other example configuration 2 of transform coefficient decoding unit 120), and is not described here.

(Video Decoding Device 3)

A video decoding device 3 as another example of the video decoding device according to this embodiment will be described hereinafter with reference to FIG. 61 to FIG. 73. In the following, the same portions as the portions described above are assigned the same numerals, and a description thereof is omitted.

The video decoding device 3 includes a quantized residual information decoder Y111 in place of the quantized residual information decoder 111 in the video decoding device 1 of FIG. 7.

FIG. 61 is a block diagram illustrating a configuration of the quantized residual information decoder Y111 of the video decoding device 3. As illustrated in FIG. 61, the quantized residual information decoder Y111 includes a transform coefficient decoding unit Y120 and an arithmetic code decoding unit 130.

As illustrated in FIG. 61, the transform coefficient decoding unit Y120 includes a last coefficient position decoding unit 121, a scan order table storage unit 122, a coefficient decoding control unit 123, a coefficient presence/absence flag decoding unit Y124, a coefficient value decoding unit Y125, a decoded coefficient memory unit 126, and a sub-block coefficient presence/absence flag decoding unit Y127.

(Scan Order Table Storage Unit 122)

The scan order table storage unit 122 stores a table that provides the position of the frequency component to be processed in a frequency region using the size of the TU (block) to be processed, a scan index indicating a type of scan direction, and a frequency component identification index assigned in scan order as arguments.

The scan order table storage unit 122 also stores a sub-block scan order table for specifying the scan order of sub-blocks.

(Coefficient Decoding Control Unit 123)

The coefficient decoding control unit 123 has a configuration for controlling the order of the decoding process in each unit included in the quantized residual information decoder Y111.

(Block Size Less than or Equal to Predetermined Size)

When the block size is less than or equal to a predetermined size, the coefficient decoding control unit 123 refers to the syntax elements last_significant_coeff_x and last_significant_coeff_y supplied from the last coefficient position decoding unit 121 to identify the position of the last non-zero transform coefficient in a forward scan, and supplies the position (xC, yC) of the frequency components to the coefficient presence/absence flag decoding unit Y124 and the decoded coefficient memory unit 126 in scan order that starts with the identified position of the last non-zero transform coefficient as the origin and that is reverse scan order to the scan order provided in the scan order table stored in the scan order table storage unit 122.

The coefficient decoding control unit 123 further supplies sz, which is a parameter indicating the size of the TU to be processed, that is, the size of the target frequency region, to each unit included in the transform coefficient decoding unit Y120 (not illustrated in the drawing). Here, specifically, sz is a parameter indicating the number of pixels in one side of the TU to be processed, that is, the number of frequency components in one side of the target frequency region.

The coefficient decoding control unit 123 may be configured to supply the position (xC, yC) of the frequency components to the coefficient presence/absence flag decoding unit in forward scan order that is the scan order provided in the scan order table stored in the scan order table storage unit 122.

(Block Size Larger than Predetermined Size)

When the block size is larger than the predetermined size, the coefficient decoding control unit 123 refers to the syntax elements last_significant_coeff_x and last_significant_coeff_y supplied from the last coefficient position decoding unit 121 to identify the position of the last non-zero transform coefficient in a forward scan, and supplies the position (xCG, yCG) of the sub-blocks to the sub-block coefficient presence/absence flag decoding unit Y127 in scan order that starts with the position of the sub-block including the identified last non-zero transform coefficient as the origin and that is reverse scan order to the scan order provided in the sub-block scan order table stored in the scan order table storage unit 122.

The coefficient decoding control unit 123 further supplies, for a sub-block to be processed, the position (xC, yC) of the frequency components included in the sub-block to be processed to the coefficient presence/absence flag decoding unit Y124 and the decoded coefficient memory unit 126 in reverse scan order to the scan order provided in the scan order table stored in the scan order table storage unit 122. Specifically, the scan order of the frequency components included in the sub-block to be processed may be a diagonal scan (Up-right diagonal scan).

(Sub-Block Coefficient Presence/Absence Flag Decoding Unit Y127)

The sub-block coefficient presence/absence flag decoding unit Y127 interprets each bin supplied from the bit decoding unit 132, and decodes a syntax element significant_coeffgroup_flag[xCG][yCG] specified by each sub-block position (xCG, yCG). Furthermore, the sub-block coefficient presence/absence flag decoding unit Y127 calculates a context index ctxIdx for determining a context to be used to decode a bin of the syntax element significant_coeffgroup_flag[xCG][yCG] using the arithmetic code decoding unit 130. The calculated context index ctxIdx is supplied to the context recording/updating unit 131. The syntax element significant_coeffgroup_flag[xCG][yCG] is a syntax element that takes 1 if at least one non-zero transform coefficient is included in the sub-block specified by the sub-block position (xCG, yCG), and takes 0 if no non-zero transform coefficients are included. The values of the decoded syntax element significant_coeffgroup_flag[xCG][yCG] are stored in the decoded coefficient memory unit 126.

(Coefficient Presence/Absence Flag Decoding Unit Y124)

The coefficient presence/absence flag decoding unit Y124 according to this embodiment decodes a syntax element significant_coeff_flag[xC][yC] specified by each coefficient position (xC, yC). The values of the decoded syntax element significant_coeff_flag[xC][yC] are stored in the decoded coefficient memory unit 126. Furthermore, the coefficient presence/absence flag decoding unit Y124 calculates a context index ctxIdx for determining a context to be used to decode a bin of the syntax element significant_coeff_flag[xC][yC] using the arithmetic code decoding unit 130. The calculated context index ctxIdx is supplied to the context recording/updating unit 131.

(Coefficient Value Decoding Unit Y125)

The coefficient value decoding unit Y125 interprets each bin supplied from the bit decoding unit 132, and derives the value of a transform coefficient (more specifically, a non-zero transform coefficient) for the frequency component to be processed. The context index ctxIdx used for the decoding of the various syntax elements is supplied to the context recording/updating unit 131. The derived values of the transform coefficient are stored in the decoded coefficient memory unit 126.

(Decoded Coefficient Memory Unit 126)

The decoded coefficient memory unit 126 has a configuration for storing the values of transform coefficients decoded by the coefficient value decoding unit Y125. The decoded coefficient memory unit 126 also stores the values of the syntax element significant_coeff_flag decoded by the coefficient presence/absence flag decoding unit Y124. The values of the transform coefficients stored in the decoded coefficient memory unit 126 are supplied to the dequantizer/inverse transformer 13.

(Configuration of Quantized Residual Information QD of Related Art)

FIG. 62 and FIG. 63 illustrate a configuration of quantized residual information QD of the related art. FIG. 62 and FIG. 63 illustrate syntax elements included in the quantized residual information QD of the related art (denoted by residual_coding_cabac( ) in FIG. 62).

FIG. 62 is a diagram illustrating the first portion of a syntax table indicating syntax elements included in the quantized residual information QD. FIG. 63 is a diagram illustrating the second portion of the syntax table indicating the syntax elements included in the quantized residual information QD.

As illustrated in FIG. 62 and FIG. 63, the quantized residual information QD includes syntax elements last_significant_coeff_x, last_significant_coeff_y, significant_coeffgroup_flag, significant_coeff_flag, coeff_abs_level_greater1_flag, coeff_abs_level_greater2_flag, coeff_sign_flag, and coeff_abs_level_minus3.

The syntax elements included in the quantized residual information QD have been encoded using context-based adaptive binary arithmetic coding (CABAC). In the "Descriptor" column in FIG. 62 and FIG. 63, ae(v) means that the corresponding syntax element is encoded using CABAC.

In the "Descriptor" column in FIG. 63, bypass means that the corresponding syntax element is coded in bypass mode. According to the H.264/MPEG-4.AVC specification, whether or not to code a syntax element in bypass mode is indicated by a table being na, the table indicating the allocation of context indices ctxIdx. However, here, whether or not to use bypass mode is written in the syntax table for ease of understanding. In the related art, coeff_sign_flag and coeff_abs_level_minus3 are coded in bypass mode. Since the two syntax elements that are coded in bypass mode are consecutive, high throughput may be obtained in the decoding process for this portion.

(Quantized Residual Information QD Having First Configuration of this Embodiment)

FIG. 64 to FIG. 66 illustrate syntax elements included in quantized residual information QD of a first configuration of this embodiment.

FIG. 64 is a diagram illustrating the first portion of a syntax table indicating syntax elements included in the quantized residual information QD. In this configuration, the configuration of coded data is changed in accordance with the value of a flag cabac_lowcomp_flag indicating whether or not to simplify the CABAC process. If cabac_lowcomp_flag=0, that is, if the simplified process is not performed, residual_coding_cabac2_normal( ) illustrated in FIG. 65 is used. On the other hand, if cabac_lowcomp_flag=1, that is, if the simplified process is to be performed, residual_coding_cabac2 lowcomp( ) illustrated in FIG. 66 is used. FIG. 65 and FIG. 66 are diagrams illustrating the second portion of the syntax table indicating the syntax elements included in the quantized residual information QD.

As illustrated in FIG. 64 to FIG. 66, the quantized residual information QD includes syntax elements last_significant_coeff_x, last_significant_coeff_y, significant_coeffgroup_flag, significant_coeff_flag, coeff_abs_level_greater1_flag, and coeff_sign_flag. Furthermore, significant_coeff_flag, coeff_abs_level_greater1_flag, and coeff_sign_flag are coded in bypass mode.

The syntax structure in the first portion in FIG. 64 and the syntax structure illustrated in FIG. 65 in which the simplified process is not performed are similar to the syntax elements of the related art illustrated in FIG. 5.

In the syntax elements in FIG. 66 in which the simplified process is performed, the syntax element significant_coeff_flag indicating the value of a transform coefficient is changed from non-bypass mode to bypass mode. In addition, the number of syntax elements indicating the absolute value of a transform coefficient is reduced from four, that is, significant_coeff_flag, coeff_abs_level_greater1_flag, coeff_abs_level_greater2_flag, and coeff_abs_level_minus3, to two, that is, significant_coeff_flag and coeff_abs_level_minus1. If the expression of a given value is represented using a plurality of syntax elements, a decoding process basically requires a number of cycles equal to the number of syntax elements required for expression. Accordingly, reducing the number of syntax elements required for expression by two can provide throughput that is better by a number of times more than or equal to two cycles. In addition, both significant_coeff_flag and coeff_abs_level_minus1 are coded in bypass mode, and throughput can be further improved.

In the configuration described above, there is provided an example of an arithmetic code decoding device for decoding coded data for each individual transform coefficient obtained for each frequency component by performing a frequency transform on a target image for each unit region, the coded data being obtained by arithmetic coding of various syntax elements representing the individual transform coefficient, the arithmetic code decoding device being configured to decode a value of each transform coefficient by selectively using a regular mode in which M1 syntax elements (where M1 is a natural number) are decoded to decode a value of each transform coefficient or a simplified mode in which M2 syntax elements (where M2 is a natural number satisfying M2<M1) are decoded to decode a value of each transform coefficient. A simplified configuration of a configuration in FIG. 68 to FIG. 70 described below also has the configuration described above.

In the configuration described above, there is provided an example of an arithmetic code decoding device for decoding coded data for respective transform coefficients obtained for each frequency component by performing a frequency transform on a target image for each unit region, the coded data being obtained by arithmetic coding of various syntax elements representing the respective transform coefficients, and the syntax decoding means described above decodes the M1 syntax elements using a context in the regular mode, and decodes the M2 syntax elements using a context in the simplified mode. A simplified configuration in a configuration in FIG. 68 to FIG. 70 described below also has the configuration described above.

As given in the illustrated data structure, desirably, significant_coeffgroup_flag is coded in non-bypass mode, that is, using a context. If the sub-block size is 4×4, only one significant_coeffgroup_flag is present for 16 frequency positions. Thus, even if contexts are used, throughput will not be reduced.

Furthermore, the mode in which the simplified process described above is performed is also referred to as a simplified mode, and the mode in which the simplified process described above is not performed is also referred to as a regular mode.

(Judgment of Execution of Transform Coefficient Simplification Process of this Embodiment)

The coefficient presence/absence flag decoding unit Y124 and the coefficient value decoding unit Y125 that decode this coded data can switch between a regular process and a simplified process in accordance with the value of a simplification flag cabac_lowcomp_flag. cabac_lowcomp_flag is derived in accordance with the value of a higher level simplification flag xps_cabac_lowcomp_flag included in the SPS, PPS, slice header, and the like and the last position. In the following, a derivation method for the simplification flag cabac_lowcomp_flag will be described.

FIG. 72 is a flowchart illustrating a derivation process for the simplification flag cabac_lowcomp_flag. In order to decode a transform coefficient in each frequency region, the coefficient decoding control unit 123 performs the process in FIG. 72, and derives cabac_lowcomp_flag.

First, the coefficient decoding control unit 123 initializes the simplification flag cabac_lowcomp_flag to 0 each time the decoding of each frequency region is performed (SX101).

Then, the coefficient decoding control unit 123 determines whether the higher level simplification flag xps_cabac_lowcomp_flag is equal to 1, which indicates the higher level simplification flag xps_cabac_lowcomp_flag is enabled, or 0, which indicates the higher level simplification flag xps_cabac_lowcomp_flag is disabled. If the higher level simplification flag xps_cabac_lowcomp_flag is enabled, the process proceeds to SX103, and, otherwise, the determination process ends (SX102).

The coefficient decoding control unit 123 further determines whether or not the last position identified by last_significant_coeff_pos_x and last_significant_coeff_pos_y is larger than a predetermined value (SX103). If the last position is larger than the predetermined value, the simplification flag cabac_lowcomp_flag is set to 1, which indicates the simplification flag cabac_lowcomp_flag is enabled (SX104).

Through the process described above, the simplified process, which provides high-speed throughput, can be used in a case where a large number of transform coefficients are generated, such as when the last position is larger than the predetermined position, and the regular process, which provides high coding efficiency, can be performed otherwise. Since the simplified process can be performed only when necessary, it is possible to achieve high coding efficiency while maintaining throughput.

FIG. 73 is a diagram illustrating a specific example of determination illustrated in S103 of FIG. 72 of whether or not the last position is larger than the predetermined value, in which two processes, that is, a process illustrated in part (a) of FIG. 73 and a process illustrated in part (b) of FIG. 73, are illustrated. In the process in part (a) of FIG. 73, the coefficient decoding control unit 123 compares the sum of last_significant_coeff_pos_x and last_significant_coeff_pos_y with a predetermined multiple (here, a value multiplied by "a" and then right-shifted by 2 bits) of the maximum value of the width and height of a frequency region (SX103A). If, as a result of the determination, the sum of the last position is larger, the coefficient decoding control unit 123 may enable the simplification flag, and may otherwise disable the simplification flag. The value "a" described above may be equal to, for example, 3, 4, 5, or the like. For example, if "a" is equal to 4, the simplified operation is performed when the last position exceeds a position that is approximately half in scan order.

In the process in part (b) of FIG. 73, different determination is made depending on whether the width "width" and height "height" of a frequency region are equal or not. Examples of the case where the width "width" and height "height" of a frequency region are not equal include a 16×4 transform, a 4×16 transform, a 32×8 transform, and an 8×32 transform. As illustrated in the flowchart in part (b) of FIG. 73, the coefficient decoding control unit 123 determines whether or not the width "width" and height "height" of a frequency region are equal (SX103B). If both are equal, the coefficient decoding control unit 123 sets "a", which defines the threshold value for comparison, to "a1" (SX103C). If both are not equal, the coefficient decoding control unit 123 sets "a" to "a2" (here, a2≤a1) (SX103D). Then, the coefficient decoding control unit 123 compares the sum of last_significant_coeff_pos_x and last_significant_coeff_pos_y with a predetermined multiple (here, a value multiplied by "a" and then right-shifted by 2 bits) of the maximum value of the width and height of the frequency region (SX103A). In this manner, when the width "width" and height "height" of a frequency region are not equal, a value that is relatively smaller than when the width "width" and height "height" of the frequency region are equal is used as the threshold value used for determination, allowing determination based on what position the last position is at in scan order overall. It is appropriate to select the values "a1" and "a2" so as to satisfy, for example, a2=a1/2, and a1=4, a2=2, and so forth are appropriate.

(Process of Coefficient Presence/Absence Flag Decoding Unit Y124 and Coefficient Value Decoding Unit Y125 According to this Embodiment when Simplified Process is not Performed)

The process of the coefficient value decoding unit Y125 configured to decode this coded data when the simplified process is not performed will be described hereinafter with reference to FIG. 65. First, the coefficient value decoding unit Y125 decodes a transform coefficient using a double loop process, that is, a sub-block-by-sub-block outer loop (LP_Y70) and inner loops (LP_Y71 to LP_Y75) for decoding transform coefficients in a sub-block.

The coefficient presence/absence flag decoding unit Y124 processes the first inner loop (LP_Y71), and decodes significant_coeff_flag. Specifically, if the sub-block coefficient presence/absence flag significant_coeffgroup_flag is used, that is, if the maximum value of the width and height of a frequency region is greater than or equal to 16, the coefficient presence/absence flag decoding unit Y124 refers to significant_coeffgroup_flag, and decodes significant_coeff_flag, using a context, for a non-last position with significant_coeffgroup_flag not equal to 0 (SYN_Y71). The determination of the last position or not is based on the following expression.

(xC!=last_significant_coeff_x)||
(yC!=last_significant_coeff_y))

In contrast, if the sub-block coefficient presence/absence flag significant_coeffgroup_flag is not used, significant_coeff_flag is decoded using a context for a transform coefficient at a non-last position (SYN_Y72).

The coefficient value decoding unit Y125 processes the second through fifth inner loops.

In the second inner loop (LP_Y72), the coefficient value decoding unit Y125 decodes coeff_abs_level_greater1_flag, using a context, for a frequency position with significant_coeff_flag equal to a value other than 0 (SYN_Y73).

In the third inner loop (LP_Y73), the coefficient value decoding unit Y125 decodes coeff_abs_level_greater2_flag, using a context, for a frequency position with coeff_abs_level_greater1_flag equal to a value other than 0 (SYN_Y74).

In the fourth inner loop (LP_Y74), the coefficient value decoding unit Y125 decodes coeff_sign_flag, in bypass mode, for a frequency position with significant_coeff_flag equal to a value other than 0 (SYN_Y75).

In the fifth inner loop (LP_Y75), the coefficient value decoding unit Y125 decodes coeff_abs_level_minus3, in bypass mode, for a frequency position with coeff_abs_level_greater2_flag equal to a value other than 0 (SYN_Y76). The coefficient value decoding unit Y125 further decodes the value of a transform coefficient for a frequency position with significant_coeff_flag equal to a value other than 0 using the following expression.

(coeff_abs_level_minus3[n]+3)*(1?2*coeff_sign_flag
[n])

Through the process described above, the value of a transform coefficient is decoded.

(Process of Coefficient Presence/Absence Flag Decoding Unit Y124 and Coefficient Value Decoding Unit Y125 in First Simplification Configuration of this Embodiment)

Next, the process of the coefficient presence/absence flag decoding unit Y124 and the coefficient value decoding unit Y125 configured to decode this coded data in a case where simplification is performed will be described with reference to FIG. 66.

The coefficient presence/absence flag decoding unit Y124 processes the first inner loop (LP_Y81), and decodes significant_coeff_flag. Specifically, if the sub-block coefficient presence/absence flag significant_coeffgroup_flag is used, that is, if the maximum value of the width and height of a frequency region is greater than or equal to 16, the coefficient presence/absence flag decoding unit Y124 refers to significant_coeffgroup_flag, and decodes significant_coeff_flag, in bypass mode, for a non-last position with significant_coeffgroup_flag not equal to 0 (SYN_Y81). On the other hand, if the sub-block coefficient presence/absence flag significant_coeffgroup_flag is not used, the coefficient presence/absence flag decoding unit Y124 decodes significant_coeff_flag, in bypass mode, for a non-last position (SYN_Y82).

The coefficient value decoding unit Y125 processes the second through third inner loops.

In the second inner loop (LP_Y82), the coefficient value decoding unit Y125 decodes coeff_sign_flag, in bypass mode, for a frequency position with significant_coeff_flag equal to a value other than 0 (SYN_Y83).

In the third inner loop (LP_Y83), the coefficient value decoding unit Y125 decodes coeff_abs_level_minus1, in bypass mode, for a frequency position with significant_coeff_flag equal to a value other than 0 (SYN_Y84). The coefficient value decoding unit Y125 further decodes the value of a transform coefficient for a frequency position with significant_coeff_flag equal to a value other than 0 using the following expression.

$$(coeff\_abs\_level\_minus1[n]+1)*(1?2*coeff\_sign\_flag[n])$$

Here, coeff_abs_level_minus1 may be binarized using a Golomb code, Huffman code, or the like.

In the comparison between a non-simplified process and a simplified process, the number of inner loops is reduced from five to three. Accordingly, the number of processes necessary for a loop is reduced compared to the case where multiple inner loops are performed, resulting in an improvement in throughput.

As described above, according to coded data in the first configuration and the quantized residual information decoder configured to decode the coded data, in the case of simplification, syntax indicating the absolute value of a transform coefficient is expressed using one syntax element coeff_abs_level_minus1, and the flag significant_coeff_flag indicating the presence or absence of a non-zero transform coefficient, a code flag coeff_sign_flag, and a value with the absolute value minus 1 coeff_abs_level_minus1 are all coded/decoded in bypass mode, enabling high-throughput processing. Furthermore, non-bypass mode is used for significant_coeffgroup_flag and bypass mode is used for significant_coeff_flag among the flags indicating the presence or absence of a non-zero transform coefficient, enabling high-throughput processing while maintaining high coding efficiency.

In addition, in NPL 2 in which binarization for CAVLC coding is used, two modes, namely, run mode and level mode, are used, whereas in a configuration of this embodiment, a simplified process can be performed with single binarization, resulting in the advantage of a simpler processing configuration. Findings are provided that particularly in a high-bit-rate region that involves a problem of throughput, the ratio of zero transform coefficients is relatively low and coding efficiency similar to that in run mode can be implemented in level mode. In this configuration, run mode in which a number of consecutive 0 coefficients are coded is not used but only a mode for directly coding a value, which corresponds to level mode, is used, resulting in a reduction in the complexity of device configuration while maintaining coding efficiency. This can also be applied to the following configurations other than the first configuration.

(Quantized Residual Information QD in Second Simplification Configuration of this Embodiment)

In a second simplification configuration of this embodiment, a syntax structure in FIG. 67 is used instead of that in FIG. 66. FIG. 67 illustrates syntax elements included in quantized residual information QD in the second simplification configuration of this embodiment.

In FIG. 66, significant_coeff_flag is coded in bypass mode, whereas, in this configuration, a context is used. Since the probability of the value of a transform coefficient being equal to 0 is very high depending on the position of the transform coefficient, the configuration in FIG. 66 in which all the values of significant_coeff_flag indicating a non-zero coefficient or not are coded in bypass mode may increase the reduction in coding efficiency. In this configuration, a context is used only for significant_coeff_flag, which is the most important, resulting in the advantage of higher coding efficiency than that in the configuration in FIG. 66.

(Process of Coefficient Presence/Absence Flag Decoding Unit Y124 and Coefficient Value Decoding Unit Y125 in Second Simplification Configuration of this Embodiment)

In the second simplification configuration of this embodiment, the process for the first inner loop processed by the coefficient presence/absence flag decoding unit Y124 is different. The first inner loop process illustrated in FIG. 67 will be described hereinafter.

The coefficient presence/absence flag decoding unit Y124 processes the first inner loop (LP_Y91), and decodes significant_coeff_flag. Specifically, if the sub-block coefficient presence/absence flag significant_coeffgroup_flag is used, that is, if the maximum value of the width and height of a frequency region is greater than or equal to 16, the coefficient presence/absence flag decoding unit Y124 refers to significant_coeffgroup_flag, and decodes significant_coeff_flag, using a context, for a non-last position with significant_coeffgroup_flag not equal to 0 (SYN_Y91). On the other hand, if the sub-block coefficient presence/absence flag significant_coeffgroup_flag is not used, the coefficient presence/absence flag decoding unit Y124 decodes significant_coeff_flag, using a context, for a non-last position (SYN_Y92).

As described above, according to coded data in the second configuration and the quantized residual information decoder configured to decode the coded data, syntax indicating the absolute value of a transform coefficient is expressed using one syntax element coeff_abs_level_minus1, and the flag significant_coeff_flag indicating the presence or absence of a non-zero transform coefficient is coded/decoded using a context while the code flag coeff_sign_flag and the value with the absolute value minus 1 coeff_abs_level_minus1 are coded/decoded in bypass mode, enabling high-throughput processing. Furthermore, non-bypass mode is used for significant_coeffgroup_flag and significant_coeff_flag, which are flags indicating the presence or absence of a non-zero transform coefficient, enabling high-throughput processing while maintaining high coding efficiency.

(Quantized Residual Information QD in Third Simplification Configuration of this Embodiment)

In a third simplification configuration of this embodiment, a syntax structure in FIG. 68 is used instead of that in FIG. 67. FIG. 68 illustrates syntax elements included in quantized residual information QD in the third simplification configuration of this embodiment.

(Process of Coefficient Presence/Absence Flag Decoding Unit Y124 and Coefficient Value Decoding Unit Y125 in Third Simplification Configuration of this Embodiment)

The basic operation of the coefficient value decoding unit Y125 is the same as that in the second configuration, except for the following: In the second configuration, the code flag coeff_sign_flag and the value with the absolute value minus 1 coeff_abs_level_minus1 are processed in different inner loops in the processing within a sub-block. In the third configuration, however, as described below, two syntax elements are processed in a single inner loop.

In the first inner loop (LP_Y101), the coefficient presence/absence flag decoding unit Y124 decodes significant_coeff_flag. Specifically, if the sub-block coefficient presence/absence flag significant_coeffgroup_flag is used, that is, if the maximum value of the width and height of a frequency region is greater than or equal to 16, the coefficient presence/absence flag decoding unit Y124 refers to significant_coeffgroup_flag, and decodes significant_coeff_flag for a non-last position with significant_coeffgroup_flag not equal to 0 (SYN_Y101). On the other hand, if the sub-block coefficient presence/absence flag significant_coeffgroup_flag is not used, the coefficient presence/absence flag decoding unit Y124 decodes significant_coeff_flag for a non-last position (SYN_Y102).

In the second inner loop (LP_Y102), the coefficient presence/absence flag decoding unit Y124 decodes coeff_sign_flag, in bypass mode, for a frequency position with significant_coeff_flag equal to a value other than 0 (SYN_Y103). The coefficient presence/absence flag decoding unit Y124 further decodes coeff_abs_level_minus1 in bypass mode (SYN_Y104). Furthermore, the coefficient presence/absence flag decoding unit Y124 decodes the value of a transform coefficient for a frequency position with significant_coeff_flag equal to a value other than 0.

(coeff_abs_level_minus1[n]+1)*(1?2*coeff_sign_flag[n])

Here, coeff_abs_level_minus1 may be binarized using a Golomb code, Huffman code, or the like.

As described above, according to the process for coded data having the third configuration, compared to the first process and the second process, the number of inner loops is reduced from three to two. Accordingly, the number of processes necessary for a loop and the number of processes for determining whether or not significant_coeff_flag is equal to a value other than 0 are reduced compared to the case where multiple inner loops are performed, resulting in an improvement in throughput. That is, the code flag coeff_sign_flag, which is a syntax element for which bypass mode is used, and the value with the absolute value minus 1 coeff_abs_level_minus1 can be interleaved and coded so as to be processed in a single loop, resulting in an improvement in throughput. That is, the two syntax elements coeff_sign_flag and coeff_abs_level_minus1, which are processed in bypass mode, can be successively placed in a single loop, resulting in an improvement in throughput.

(Process of Coefficient Presence/Absence Flag Decoding Unit Y124 for Adaptive Simplification)

In the following, a description will be given of the process of the coefficient presence/absence flag decoding unit Y124 for more adaptive simplification. In the derivation method for the simplification flag cabac_lowcomp_flag described with reference to FIG. 72 and FIG. 73, whether or not to implement simplification is set by referring to the last position at the initial point in time when a transform coefficient in each frequency region is decoded. In the following process, however, a decoding process is performed using a context at the initial point in time when a transform coefficient in each frequency region is decoded, and the decoding mode of frequency components constituting the frequency region is switched midway from decoding using a context to decoding in bypass mode in accordance with a result of decoding.

More specifically, the coefficient presence/absence flag decoding unit Y124 derives a flag significant_coeff_flag mode indicating whether or not to use a context in significant_coeff_flag. If the value of the flag significant_coeff_flag mode is equal to 0, the coefficient presence/absence flag decoding unit Y124 decodes significant_coeff_flag using a context. If significant_coeff_flag mode is equal to 1, the coefficient presence/absence flag decoding unit Y124 decodes significant_coeff_flag using a bypass process without using a context.

The decoding operation corresponding to the configuration in FIG. 67 and the configuration in FIG. 68 will be described hereinafter.

In the configuration in FIG. 67, the following operation is performed. The coefficient presence/absence flag decoding unit Y124 processes the first inner loop (LP_Y91), and decodes significant_coeff_flag. Specifically, if the sub-block coefficient presence/absence flag significant_coeffgroup_flag is used, that is, if the maximum value of the width and height of a frequency region is greater than or equal to 16, the coefficient presence/absence flag decoding unit Y124 refers to significant_coeffgroup_flag, and decodes significant_coeff_flag for a non-last position with significant_coeffgroup_flag not equal to 0 (SYN_Y91). On the other hand, if the sub-block coefficient presence/absence flag significant_coeffgroup_flag is not used, the coefficient presence/absence flag decoding unit Y124 decodes significant_coeff_flag for a non-last position (SYN_Y92). In the configuration in FIG. 68, LP_Y91, SYN_Y91, and SYN_Y92 in the foregoing description are replaced by LP_Y101, SYN_Y101, and SYN_Y102, respectively. In an adaptive simplified process, in SYN_Y91, SYN_Y92, SYN_Y101, and SYN_Y102, significant_coeff_flag is decoded using a context when significant_coeff_flag mode is equal to 0, and significant_coeff_flag is decoded in bypass mode when significant_coeff_flag mode is equal to 1.

In the following, a description will be given of two derivation methods for the flag significant_coeff_flag mode indicating whether or not to simplify the decoding of a non-zero coefficient.

An example of a derivation method for the flag significant_coeff_flag mode indicating whether or not to simplify the decoding of a non-zero coefficient will be described hereinafter. In the processing of the initial sub-block, significant_coeff_flag mode is set to 0. In the processing of a sub-block other than the initial sub-block, the value set in the preceding sub-block is used. At the time when significant_coeff_flag for one sub-block is decoded, the number of non-zero coefficients that occur in the sub-block is counted. If the count described above (the count of significant_coeff_flag) is greater than or equal to a predetermined constant N in a given sub-block, significant_coeff_flag mode is set to 1, and the subsequent sub-block is processed. Otherwise, the value of significant_coeff_flag mode for the preceding sub-block is used as it is as significant_coeff_flag mode for the subsequent sub-block.

(Quantized Residual Information QD in Fourth and Fifth Simplification Configurations of this Embodiment)

In fourth and fifth simplification configurations of this embodiment, syntax structures in FIG. 69 and FIG. 70 are used, respectively. FIG. 69 and FIG. 70 illustrate syntax elements included in the quantized residual information QD in the fourth and fifth simplification configurations of this embodiment.

In the first to third simplification configurations, two syntax elements, that is, the syntax element significant_coeff_flag indicating the value of coded data and the value with the absolute value minus 1 coeff_abs_level_minus1, are used. However, the fourth and fifth configurations have a feature in that one syntax element, that is, the absolute value coeff_abs_level, can be used for positions other than the last position. In the fourth and fifth simplification configurations, the processing of significant_coeff_flag is not performed. In the fourth and fifth configurations, therefore, the coefficient presence/absence flag decoding unit Y124 is used only in the regular process, whereas the coefficient presence/absence flag decoding unit Y124 is not used in the simplified process.

(Process of Coefficient Value Decoding Unit Y125 in Fourth Simplification Configuration of this Embodiment)

The coefficient value decoding unit Y125 processes the first inner loop and the second inner loop.

In the first inner loop (LP_Y111), the coefficient value decoding unit Y125 decodes coeff_abs_level_minus1 and coeff_abs_level. Specifically, if the target transform coefficient is located at the last position, the coefficient value decoding unit Y125 decodes coeff_abs_level_minus1 using a bypass process, and derives coeff_abs_level using coeff_abs_level=coeff_abs_level_minus1+1 (SYN_Y111). Otherwise, the coefficient value decoding unit Y125 performs the following process. If the sub-block coefficient presence/absence flag significant_coeffgroup_flag is used, that is, if the maximum value of the width and height of a frequency region is greater than or equal to 16, the coefficient value decoding unit Y125 refers to significant_coeffgroup_flag, and decodes coeff_abs_level using a bypass process when significant_coeffgroup_flag is not equal to 0 (SYN_Y112). On the other hand, if the sub-block coefficient presence/absence flag significant_coeffgroup_flag is not used, the coefficient value decoding unit Y125 decodes coeff_abs_level using a bypass process (SYN_Y113).

In the second inner loop (LP_Y112), the coefficient value decoding unit Y125 decodes coeff_sign_flag, in bypass mode, for a frequency position with coeff_abs_level equal to a value other than 0 (SYN_Y114). The coefficient value decoding unit Y125 further decodes the value of a transform coefficient for a frequency position with coeff_abs_level equal to value other than 0 using the following expression.

$$(coeff\_abs\_level[n])*(1?2*coeff\_sign\_flag[n])$$

As described above, according to coded data in the fourth configuration and the quantized residual information decoder configured to decode the coded data, coeff_abs_level, which is the absolute value of a transform coefficient, and coeff_abs_level_minus1, which is the absolute value of the transform coefficient minus 1, are coded in bypass mode, resulting in an improvement in the throughput of the decoding process. Non-bypass mode (regular mode) is used for significant_coeffgroup_flag and bypass mode is used for significant_coeff_flag among the flags indicating the presence or absence of a non-zero transform coefficient, enabling high-throughput processing while maintaining high coding efficiency.

(Process of Coefficient Value Decoding Unit Y125 in Fifth Simplification Configuration of this Embodiment)

The coefficient value decoding unit Y125 processes the first inner loop and the second inner loop.

In the first inner loop (LP_Y121), the coefficient value decoding unit Y125 decodes coeff_abs_level. In the fourth simplification configuration, coeff_abs_level_and coeff_abs_level_minus1 are decoded using a bypass process. In the fifth simplification configuration, however, the first bit of coeff_abs_level_is decoded using a context, and bits after the first bit of coeff_abs_level_are decoded in bypass mode. Note that all the bits of coeff_abs_level_minus1 may be decoded in bypass mode, or only the first bit may be decoded using a context.

FIG. 71 is a diagram depicting a binary configuration of a value for which only the first bit of coeff_abs_level uses bypass mode. As illustrated in FIG. 71, the coefficient value decoding unit Y125 uses a context for the first bit when the value of a transform coefficient is binarized. More specifically, since the first bit of coeff_abs_level corresponds to significant_coeff_flag, any of the various methods described previously can be used as a context index derivation method.

The first bit of coeff_abs_level may not necessarily be decoded always using a context. More specifically, the coefficient value decoding unit Y125 may derive significant_coeff_flag mode using the process described above, and may switch the decoding mode such that decoding using a context is performed when the value of significant_coeff_flag mode is equal to 0 and decoding in bypass mode is performed when the value of significant_coeff_flag mode is equal to 1.

As described above, according to coded data in the fifth configuration and the quantized residual information decoder configured to decode the coded data, a context is used for the first bit of coeff_abs_level, which is the absolute value of a transform coefficient, resulting in the achievement of both high throughput and high coding efficiency.

(Video Coding Device 4)

A video coding device 4 as another video coding device according to this embodiment will be described hereinafter with reference to FIG. 74. In the following, the same portions as the portions described above are assigned the same numerals, and a description thereof is omitted.

The video coding device 4 includes a quantized residual information coder Y271 in place of the quantized residual information coder 271 in the video coding device 2.

(Quantized Residual Information Coder Y271)

FIG. 74 is a block diagram illustrating a configuration of the quantized residual information coder Y271. As illustrated in FIG. 74, the quantized residual information coder Y271 includes a transform coefficient coding unit Y220 and an arithmetic code encoding unit 230.

(Transform Coefficient Coding Unit Y220)

As illustrated in FIG. 74, the transform coefficient coding unit Y220 includes a last position coding unit 221, a scan order table storage unit 222, a coefficient coding control unit 223, a coefficient presence/absence flag coding unit Y224, a coefficient value coding unit Y225, a coded coefficient memory unit 226, a sub-block coefficient presence/absence flag coding unit Y227, and a syntax derivation unit Y228.

(Syntax Derivation Unit Y228)

The syntax derivation unit Y228 refers to the values of transform coefficients Coeff(xC, yC), and derives the values of syntax elements last_significant_coeff_x, last_significant_coeff_y, significant_coeff_flag, coeff_abs_level_greater1_flag, coeff_abs_level_greater2_flag, coeff_sign_flag, and coeff_abs_level_minus3 for specifying these transform coefficients in a target frequency region. The derived syntax elements are supplied to the coded coefficient memory unit 226. Of the derived syntax elements, last_significant_coeff_x and last_significant_coeff_y are also supplied to the coefficient coding control unit 223 and the last position coding unit 221. Of the derived syntax elements, furthermore, significant_coeff_flag is also supplied to the coefficient presence/absence flag coding unit Y224. The content of the respective syntax elements has been described above, and is not described here.

(Scan Order Table Storage Unit 222)

The scan order table storage unit 222 stores a table that provides the position of the frequency component to be processed in a frequency region using the size of the TU (block) to be processed, a scan index indicating a type of scan direction, and a frequency component identification index assigned in scan order as arguments. Examples of the scan order table include ScanOrder illustrated in FIG. 5.

The scan order table storage unit 222 also stores a sub-block scan order table for specifying the scan order of sub-blocks. The sub-block scan order table is specified by a scan index scanIndex associated with the size of the TU (block) to be processed and the prediction mode index of the intra prediction mode.

(Coefficient Coding Control Unit 223)

The coefficient coding control unit 223 has a configuration for controlling the order of the coding process in each unit included in the quantized residual information coder Y271.

(Block Size Less than or Equal to Predetermined Size)

When the block size is less than or equal to a predetermined size (for example, 4×4 component, 8×8 component, etc.), the coefficient coding control unit 223 refers to the syntax elements last_significant_coeff_x and last_significant_coeff_y supplied from the syntax derivation unit Y228 to identify the position of the last non-zero transform coefficient in a forward scan, and supplies the position (xC, yC) of the frequency components to the coefficient presence/absence flag coding unit in scan order that starts with the identified position of the last non-zero transform coefficient as the origin and that is reverse scan order to the scan order provided in the scan order table stored in the scan order table storage unit 222.

The coefficient coding control unit 223 further supplies sz, which is a parameter indicating the size of the TU to be processed, that is, the size of the target frequency region, to each unit included in the transform coefficient coding unit Y220 (not illustrated in the drawing). Here, specifically, sz is a parameter indicating the number of pixels in one side of the TU to be processed, that is, the number of frequency components in one side of the target frequency region.

The coefficient coding control unit 223 may be configured to supply the position (xC, yC) of the frequency components to the coefficient presence/absence flag coding unit Y224 in forward scan order that is the scan order provided in the scan order table stored in the scan order table storage unit 222.

(Block Size Larger than Predetermined Size)

When the block size is larger than the predetermined size, the coefficient coding control unit 223 refers to the syntax elements last_significant_coeff_x and last_significant_coeff_y supplied from the syntax derivation unit Y228 to identify the position of the last non-zero transform coefficient in a forward scan, and supplies the position (xCG, yCG) of the sub-blocks to the sub-block coefficient presence/absence flag coding unit Y227 in scan order that starts with the position of the sub-block including the identified last non-zero transform coefficient as the origin and that is reverse scan order to the scan order provided in the sub-block scan order table stored in the scan order table storage unit 222.

The coefficient coding control unit 223 further supplies, for a sub-block to be processed, the position (xC, yC) of the frequency components included in the sub-block to be processed to the coefficient presence/absence flag coding unit Y224 in reverse scan order to the scan order provided in the scan order table stored in the scan order table storage unit 222. Specifically, the scan order of the frequency components included in the sub-block to be processed may be a diagonal scan (Up-right diagonal scan).

In this manner, the coefficient coding control unit 223 is configured to switch the scan order for each intra prediction mode. In general, there is a correlation between an intra prediction mode and a deviation of a transform coefficient. Thus, switching the scan order in accordance with the intra prediction mode may result in sub-block scanning suitable for a deviation of the sub-block coefficient presence/absence flag. Accordingly, the amount of coding of the sub-block coefficient presence/absence flag to be coded and decoded can be reduced, resulting in an improvement in coding efficiency.

(Coefficient Value Coding Unit Y225)

The coefficient value coding unit Y225 performs a different process depending on whether to perform a regular process or a simplified process. In the case of the regular process, the coefficient value coding unit Y225 generates bins indicating the syntax elements coeff_abs_level_greater1_flag, coeff_abs_level_greater2_flag, coeff_sign_flag, and coeff_abs_level_minus3 supplied from the syntax derivation unit Y228. As described regarding the video decoding device 3, in the case of the simplified process, bins indicating coeff_sign_flag and coeff_abs_level_minus1 are generated in the first to third simplification configurations. In the fourth to fifth simplification configurations, bins indicating coeff_sign_flag, coeff_abs_level_minus1, and coeff_abs_level_are generated.

The generated bins are supplied to the bit coding unit 232. Furthermore, context indices ctxIdx that specify contexts to be referred to in order to code the bins of the syntax elements described above are supplied to the context recording/updating unit 231. In the case of the simplified process, the derivation of context indices is omitted.

(Coefficient Presence/Absence Flag Coding Unit Y224)

The coefficient presence/absence flag coding unit Y224 according to this embodiment codes the syntax element significant_coeff_flag[xC][yC] specified by each position (xC, yC). More specifically, the coefficient presence/absence flag coding unit Y224 generates a bin indicating the syntax element significant_coeff_flag[xC][yC] specified by each position (xC, yC). The generated bins are supplied to the bit coding unit 232. Furthermore, the coefficient presence/absence flag coding unit Y224 calculates a context index ctxIdx for determining a context to be used to code the bin of the syntax element significant_coeff_flag[xC][yC] using the arithmetic code encoding unit 230. The calculated context index ctxIdx is supplied to the context recording/updating unit 231.

Note that, as described regarding the video decoding device 3, in the first simplification configuration through the third simplification configuration, the context index of significant_coeff_flag is derived in the regular process whereas the context index is not derived when bypass mode is used in the simplified process.

FIG. 75 is a block diagram illustrating a configuration of the coefficient presence/absence flag coding unit Y224. As illustrated in FIG. 75, the coefficient presence/absence flag coding unit Y224 includes a frequency classification unit 224a, a position context derivation unit 224b, a neighbouring reference context derivation unit 224c, a coefficient presence/absence flag memory unit 224d, and a coefficient presence/absence flag configuration setting unit 224e.

The specific processes performed by the frequency classification unit 224a, the neighbouring reference context derivation unit 224c, and the coefficient presence/absence flag memory unit 224d are similar to those of means included in the video decoding device 3, and are not described here.

(Coefficient Presence/Absence Flag Configuration Setting Unit 224e)

The coefficient presence/absence flag configuration setting unit 224e generates a bin indicating the syntax element significant_coeff_flag[xC][yC] supplied from the syntax derivation unit Y228. The generated bin is supplied to the bit coding unit 232. Furthermore, the coefficient presence/absence flag configuration setting unit 224e refers to the values of significant_coeff_flag[xC][yC] included in the target sub-block, and sets the value of significant_coeffgroup_flag[xCG][yCG] for the target sub-block to 0 when all the values of significant_coeff_flag[xC][yC] included in the target sub-block are equal to 0, that is, when the target sub-block does not include any non-zero transform coefficient, or otherwise sets the value of significant_coeffgroup_flag[xCG][yCG] for the target sub-block to 1. significant_coeffgroup_flag[xCG][yCG], the value of which has been a value assigned in the manner described above, is supplied to the sub-block coefficient presence/absence flag coding unit Y227.

According to the configuration described above, in the case of the simplified process, the context derivation process and the context update process can be omitted, resulting in an improvement in throughput. In addition, in NPL 2 in which binarization for CAVLC coding is used, two modes, namely, run mode and level mode, are used, whereas in a configuration of this embodiment, a simplified process can be performed with single binarization, resulting in the advantage of a simpler processing configuration. Findings are provided that particularly in a high-bit-rate region that involves a problem of throughput, the ratio of zero transform coefficients is relatively low and coding efficiency similar to that in run mode can be implemented in level mode. In this configuration, run mode in which a number of consecutive 0 coefficients are coded is not used but only a mode for directly coding a value, which corresponds to level mode, is used, resulting in a reduction in the complexity of device configuration while maintaining coding efficiency.

APPENDIX 1

The video coding device 2 and the video decoding device 1 described above may be mounted in various apparatuses for transmitting, receiving, recording, and reproducing a moving image for use. The moving image may be a natural moving image captured using a camera or the like, or may be an artificial moving image (including CG and GUI) generated using a computer or the like.

First, the use of the video coding device 2 and the video decoding device 1 described above for the transmission and reception of a moving image will be described with reference to FIG. 29.

Part (a) of FIG. 29 is a block diagram illustrating a configuration of a transmitting apparatus PROD_A including the video coding device 2. As illustrated in part (a) of FIG. 29, the transmitting apparatus PROD_A includes a coder PROD_A1 for coding a moving image to obtain coded data, a modulator PROD_A2 for modulating a carrier wave using the coded data obtained by the coder PROD_A1 to obtain a modulation signal, and a transmitter PROD_A3 for transmitting the modulation signal obtained by the modulator PROD_A2. The video coding device 2 described above may be used as the coder PROD_A1.

The transmitting apparatus PROD_A may further include sources from which moving images to be input to the coder PROD_A1 are supplied, including a camera PROD_A4 for capturing a moving image, a recording medium PROD_A5 having a moving image recorded thereon, an input terminal PROD_A6 through which a moving image is input from outside, and an image processor A7 for generating or modifying an image. In part (a) of FIG. 29, all of them are included in the transmitting apparatus PROD_A, by way of example. However, some of them may be omitted.

The recording medium PROD_A5 may have recorded thereon a moving image that has not been coded, or may have recorded thereon a moving image that has been coded using a coding scheme for recording different from a coding scheme for transmission. In the latter case, a decoder (not illustrated) may be disposed between the recording medium PROD_A5 and the coder PROD_A1 to decode coded data read from the recording medium PROD_A5 in accordance with a coding scheme for recording.

Part (b) of FIG. 29 is a block diagram illustrating a configuration of a receiving apparatus PROD_B including the video decoding device 1. As illustrated in part (b) of FIG. 29, the receiving apparatus PROD_B includes a receiver PROD_B1 for receiving a modulation signal, a demodulator PROD_B2 for demodulating the modulation signal received by the receiver PROD_B1 to obtain coded data, and a decoder PROD_B3 for decoding the coded data obtained by the demodulator PROD_B2 to obtain a moving image. The video decoding device 1 described above may be used as the decoder PROD_B3.

The receiving apparatus PROD_B may further include destinations to which a moving image output from the decoder PROD_B3 is to be supplied, including a display PROD_B4 on which the moving image is displayed, a recording medium PROD_B5 on which the moving image is recorded, and an output terminal PROD_B6 through which the moving image is output to outside. In part (b) of FIG. 29, all of them are included in the receiving apparatus PROD_B, by way of example. However, some of them may be omitted.

The recording medium PROD_B5 may be configured to have recorded thereon a moving image that has not been coded, or may be configured to have recorded thereon a moving image that has been coded using a coding scheme for recording different from a coding scheme for transmission. In the latter case, a coder (not illustrated) may be disposed between the decoder PROD_B3 and the recording medium PROD_B5 to code a moving image acquired from the decoder PROD_B3 in accordance with a coding scheme for recording.

A transmission medium on which a modulation signal travels may be wireless or wired. A transmission form in which a modulation signal is transmitted may be broadcasting (here, a transmission form in which a destination is not specified in advance) or communication (here, a transmission form in which a destination is specified in advance). That is, the transmission of a modulation signal may be implemented by any of radio broadcasting, wire broadcasting, wireless communication, and wired communication.

For example, a broadcasting station (such as a broadcasting facility)/receiving station (such as a television receiver) of terrestrial digital broadcasting is an example of the transmitting apparatus PROD_A/the receiving apparatus PROD_B for transmitting/receiving a modulation signal via radio broadcasting. A broadcasting station (such as a broadcasting facility)/receiving station (such as a television receiver) of cable television broadcasting is an example of the transmitting apparatus PROD_A/the receiving apparatus PROD_B for transmitting/receiving a modulation signal via wire broadcasting.

A server (such as a workstation)/client (such as a television receiver, a personal computer, or a smartphone) for VOD (Video On Demand) services, video sharing services, and the like over the Internet is an example of the transmitting apparatus PROD_A/the receiving apparatus PROD_B for transmitting/receiving a modulation signal via communication (in general, wireless or wired transmission media may be used for LANs, and wired transmission media are used for WANs). Examples of the personal computer include a desktop PC, a laptop PC, and a tablet PC. Examples of the smartphone also include a multifunctional mobile phone terminal.

A client for video sharing services has a function to decode coded data downloaded from a server and to display video on a display, and also has a function to code a moving image captured using a camera and to upload the coded image to a server. That is, a client for video sharing services serves as both the transmitting apparatus PROD_A and the receiving apparatus PROD_B.

Next, the use of the video coding device 2 and the video decoding device 1 described above for the recording and reproduction of a moving image will be described with reference to FIG. 30.

Part (a) of FIG. 30 is a block diagram illustrating a configuration of a recording apparatus PROD_C including the video coding device 2 described above. As illustrated in part (a) of FIG. 30, the recording apparatus PROD_C includes a coder PROD_C1 for coding a moving image to obtain coded data, and a writer PROD_C2 for writing the coded data obtained by the coder PROD_C1 to a recording medium PROD_M. The video coding device 2 described above may be used as the coder PROD_C1.

The recording medium PROD_M may be (1) of a type incorporated in the recording apparatus PROD_C, for example, like an HDD (Hard Disk Drive) or an SSD (Solid State Drive), or (2) of a type connected to the recording apparatus PROD_C, for example, an SD memory card or a USB (Universal Serial Bus) flash memory, or may be (3) set in a drive device (not illustrated) incorporated in the recording apparatus PROD_C, for example, a DVD (Digital Versatile Disc) or a BD (Blu-ray Disc) (registered trademark).

The recording apparatus PROD_C may further include sources from which moving images to be input to the coder PROD_C1 are supplied, including a camera PROD_C3 for capturing a moving image, an input terminal PROD_C4 through which a moving image is input from outside, a receiver PROD_C5 for receiving a moving image, and an image processor PROD_C6 for generating or modifying an image. In part (a) of FIG. 30, all of them are included in the recording apparatus PROD_C, by way of example. However, some of them may be omitted.

The receiver PROD_C5 may be configured to receive a moving image that has not been coded, or may be configured to receive coded data that has been coded using a coding scheme for transmission which is different from a coding scheme for recording. In the latter case, a transmission decoder (not illustrated) may be disposed between the receiver PROD_C5 and the coder PROD_C1 to decode coded data which has been coded using a coding scheme for transmission.

Examples of the recording apparatus PROD_C include a DVD recorder, a BD recorder, and an HDD (Hard Disk Drive) recorder (in this case, the input terminal PROD_C4 or the receiver PROD_C5 serves as a main source from which a moving image is supplied). Other examples of the recording apparatus PROD_C include a camcorder (in this case, the camera PROD_C3 serves as a main source from which a moving image is supplied), a personal computer (in this case, the receiver PROD_C5 or the image processor PROD_C6 serves as a main source from which a moving image is supplied), and a smartphone (in this case, the camera PROD_C3 or the receiver PROD_C5 serves as a main source from which a moving image is supplied).

Part (b) of FIG. 30 is a block diagram illustrating a configuration of a reproducing apparatus PROD_D including the video decoding device 1 described above. As illustrated in part (b) of FIG. 30, the reproducing apparatus PROD_D includes a reader PROD_D1 for reading coded data written in a recording medium PROD_M, and a decoder PROD_D2 for decoding the coded data read by the reader PROD_D1 to obtain a moving image. The video decoding device 1 described above may be used as the decoder PROD_D2.

The recording medium PROD_M may be (1) of a type incorporated in the reproducing apparatus PROD_D, for example, an HDD or an SSD, or (2) of a type connected to the reproducing apparatus PROD_D, for example, an SD memory card or a USB flash memory, or may be (3) set in a drive device (not illustrated) incorporated in the reproducing apparatus PROD_D, for example, a DVD or a BD.

The reproducing apparatus PROD_D may further include destinations to which a moving image output from the decoder PROD_D2 is to be supplied, including a display PROD_D3 on which the moving image is displayed, an output terminal PROD_D4 through which the moving image is output to outside, and a transmitter PROD_D5 for transmitting the moving image. In part (b) of FIG. 30, all of them are included in the reproducing apparatus PROD_D, by way of example. However, some of them may be omitted.

The transmitter PROD_D5 may be configured to transmit a moving image that has not been coded, or may be configured to transmit coded data that has been coded using a coding scheme for transmission which is different from a coding scheme for recording. In the latter case, a coder (not illustrated) may be disposed between the decoder PROD_D2 and the transmitter PROD_D5 to code a moving image using a coding scheme for transmission.

Examples of the reproducing apparatus PROD_D include a DVD player, a BD player, and an HDD player (in this case, the output terminal PROD_D4, to which a television receiver or the like is connected, serves as a main destination to which a moving image is to be supplied). Other examples of the reproducing apparatus PROD_D include a television receiver (in this case, the display PROD_D3 serves as a main destination to which a moving image is to be supplied), a digital signage (also referred to as an electronic signboard, an electronic bulletin board, or the like, in which case the display PROD_D3 or the transmitter PROD_D5 serves as a main destination to which a moving image is to be supplied), a desktop PC (in this case, the output terminal PROD_D4 or the transmitter PROD_D5 serves as a main destination to which a moving image is to be supplied), a laptop or tablet PC (in this case, the display PROD_D3 or the transmitter PROD_D5 serves as a main destination to which a moving image is to be supplied), and a smartphone (in this case, the display PROD_D3 or the transmitter PROD_D5 serves as a main destination to which a moving image is to be supplied).

APPENDIX 2

The respective blocks of the video decoding device 1 and the video coding device 2 described above may be implemented in hardware as a logic circuit formed on an integrated circuit (IC chip) or may be implemented in software using a CPU (Central Processing Unit).

In the latter case, each of the devices described above includes a CPU for executing instructions in a program for implementing individual functions, a ROM (Read Only Memory) having the program stored therein, a RAM (Random Access Memory) into which the program is loaded, a storage device (recording medium), such as a memory, for storing the program and various types of data, and so on. The object of the present invention may also be achieved by supplying to each of the devices described above a recording medium on which program code (an execute form program, an intermediate code program, or a source program) of a control program for each of the devices described above, which is software implementing the functions described above, is recorded in a computer-readable form, and by reading and executing the program code recorded on the recording medium using a computer (or a CPU or an MPU).

Examples of the recording medium include tapes such as a magnetic tape and a cassette tape, disks including magnetic disks such as a floppy (registered trademark) disk and a hard disk, and optical disks such as a CD-ROM, an MO disk, an MD, a DVD, and a CD-R, cards such as an IC card (including a memory card) and an optical card, semiconductor memories such as a mask ROM, an EPROM, an EEPROM, and a flash ROM, and logic circuits such as a PLD (Programmable logic device) and an FPGA (Field Programmable Gate Array).

In addition, each of the devices described above may be configured to be connectable to a communication network, and may be supplied with the program code described above via the communication network. The communication network is not particularly limited so long as it can transmit program code. For example, the Internet, an intranet, an extranet, a LAN, an ISDN, a VAN, a CATV communication network, a virtual private network, a telephone network, a mobile communication network, a satellite communication network, or the like may be used. A transmission medium forming the communication network may be a medium capable of transmitting program code, and is not limited to any specific configuration or type. A wired transmission medium, such as IEEE 1394, USB, power line carrier, cable TV lines, telephone lines, or ADSL (Asymmetric Digital Subscriber Line) lines, or a wireless transmission medium, such as infrared type, for example, IrDA or a remote control, Bluetooth (registered trademark), IEEE 802.11 radio, HDR (High Data Rate), NFC (Near Field Communication), DLNA (Digital Living Network Alliance), a mobile phone network, a satellite network, or a terrestrial digital network, may be used.

Invention (A) Described Herein

The invention described herein provides at least the following.

A1.

An arithmetic decoding device for decoding coded data for each individual transform coefficient obtained by performing a frequency transform on a target image for each unit region, the coded data being obtained by arithmetic coding of various syntax elements representing the individual transform coefficient, including:

dividing means for dividing a target frequency region corresponding to a unit region to be processed into a plurality of sub-regions;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means derives a context index to be allocated to a transform coefficient presence/absence flag that belongs to each high-frequency-side sub-region among the plurality of sub-regions, in accordance with the position of the transform coefficient presence/absence flag in the target frequency region.

A2.

An arithmetic decoding device for decoding coded data for each individual transform coefficient obtained by performing a frequency transform on a target image for each unit region, the coded data being obtained by arithmetic coding of various syntax elements representing the individual transform coefficient, including:

dividing means for dividing a target frequency region corresponding to a unit region to be processed into a plurality of sub-regions;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means is configured to derive a context index to be allocated to a transform coefficient presence/absence flag, on the basis of the number of decoded non-zero transform coefficients included in a reference region set near the position of the transform coefficient presence/absence flag in the target frequency region, and a reference region set in a high-frequency-side sub-region among the plurality of sub-regions is smaller than a reference region set in a low-frequency-side sub-region among the plurality of sub-regions.

A3.

The arithmetic decoding device according to A2, wherein the context index deriving means is configured to derive a context index by adding together a predetermined starting point determined for each of the sub-regions and a variable determined for each of the sub-regions, and is configured to set starting points for a plurality of sub-regions for each of which the variable is derived using a different method to an equal value so that a common context is used for the plurality of sub-regions for each of which a context index is derived using a different method.

A4.

The arithmetic decoding device according to any one of A1 through A3, wherein the dividing means is configured to classify the target frequency region into at least three sub-regions in accordance with a position of a transform coefficient presence/absence flag to be processed, and the context index deriving means derives a context index by referring to N1 decoded non-zero transform coefficients (where N1 is a natural number) for a first sub-region and by referring to N2 decoded non-zero transform coefficients (where N2 is a natural number satisfying N2<N1) for a second sub-region, and derives a context index for a third sub-region in accordance with a position of the transform coefficient presence/absence flag.

A5.

The arithmetic decoding device according to A2, wherein the context index deriving means derives a context index to be allocated to each transform coefficient presence/absence flag lying along a current scan sequence in a high-frequency-side sub-region among the plurality of sub-regions, further on the basis of the number of non-zero transform coefficients lying along a preceding scan sequence.

A6.

An arithmetic decoding device for decoding coded data for each individual transform coefficient obtained by performing a frequency transform on a target image for each unit region, the coded data being obtained by arithmetic coding of various syntax elements representing the individual transform coefficient, including:

dividing means for dividing a target frequency region corresponding to a unit region to be processed into a plurality of sub-regions;

context index deriving means for sequentially deriving, along each scan sequence, a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means derives a context index to be allocated to each transform coefficient presence/absence flag lying along a current scan sequence in a high-frequency-side sub-region among the plurality of sub-regions, on the basis of the number of non-zero transform coefficients lying along a preceding scan sequence.

A7.

An arithmetic decoding device for decoding coded data for each individual transform coefficient obtained by performing a frequency transform on a target image for each unit region, the coded data being obtained by arithmetic coding of various syntax elements representing the individual transform coefficient, including:

dividing means for dividing a target frequency region corresponding to a unit region to be processed into a plurality of sub-regions;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means is configured to derive a context index to be allocated to a transform coefficient presence/absence flag, on the basis of the number of decoded non-zero transform coefficients included in a reference region set near the position of the transform coefficient presence/absence flag in the target frequency region, and the number of decoded transform coefficients included in the reference region is less than or equal to 4.

A8.

An arithmetic decoding device for decoding coded data for each individual transform coefficient obtained by performing a frequency transform on a target image for each unit region, the coded data being obtained by arithmetic coding of various syntax elements representing the individual transform coefficient, including:

dividing means for dividing a target frequency region corresponding to a unit region to be processed into a plurality of sub-regions;

context index allocating means for allocating a different context index to each sub-region; and syntax decoding means for arithmetically decoding a transform coefficient presence/absence flag that is a syntax element indicating whether or not a transform coefficient included in each sub-region is 0, on the basis of a probability state specified by a context index allocated to a sub-region to which the transform coefficient presence/absence flag belongs, wherein a low-frequency-side sub-region among the plurality of sub-regions is smaller than a high-frequency-side sub-region among the plurality of sub-regions.

A9.

The arithmetic decoding device according to A1, wherein the dividing means is configured to divide the target frequency region into a plurality of sub-regions in accordance with SUM representing a sum of X coordinate and Y coordinate of a transform coefficient presence/absence flag, the dividing means divides the target frequency region into at least a low-frequency-side sub-region and the high-frequency-side sub-region in accordance with a magnitude relationship between the SUM and a first threshold value TH2 determined in accordance with a size sz of the target frequency region, and the first threshold value TH2 is greater than or equal to sz.

A10.

The arithmetic decoding device according to A2, wherein the dividing means is configured to divide the target frequency region into a plurality of sub-regions in accordance with SUM representing a sum of X coordinate and Y coordinate of a transform coefficient presence/absence flag, the dividing means divides the target frequency region into at least the low-frequency-side sub-region and the high-frequency-side sub-region in accordance with a magnitude relationship between the SUM and a first threshold value TH2 determined in accordance with a size sz of the target frequency region, and the first threshold value TH2 is less than or equal to sz−2.

A11.

The arithmetic decoding device according to A4, wherein the dividing means is configured to divide the target frequency region into a plurality of sub-regions in accordance with SUM representing a sum of X coordinate and Y coordinate of a transform coefficient presence/absence flag, the dividing means divides the target frequency region into the first sub-region and the second sub-region in accordance with a magnitude relationship between the SUM and a first threshold value TH2 determined in accordance with a size sz of the target frequency region, and divides the target frequency region into the second sub-region and the third sub-region in accordance with a magnitude relationship between the SUM and a second threshold value TH3 determined in accordance with the size sz of the target frequency region, and the first threshold value TH2 is less than or equal to sz−2 and the second threshold value TH3 is greater than or equal to sz.

A12.

An image decoding device including:

the arithmetic decoding device according to any one of A1 through A11;

inverse frequency transform means for performing an inverse frequency transform on a transform coefficient decoded by the arithmetic decoding device to generate a residual image; and decoded image generating means for generating a decoded image by adding together the residual image generated by the inverse frequency transform means and a prediction image predicted from a generated decoded image.

A13.

An arithmetic coding device for arithmetically coding, for each individual transform coefficient obtained by performing a frequency transform on a target image for each unit region, various syntax elements representing the individual transform coefficient to generate coded data, including:

dividing means for dividing a target frequency region corresponding to a unit region to be processed into a plurality of sub-regions;

context index deriving means for deriving a context index to be allocated to each transform coefficient presence/absence flag that is a syntax element indicating whether or not a transform coefficient included in each sub-region is 0; and syntax coding means for arithmetically coding a transform coefficient presence/absence flag that belongs to each sub-region, on the basis of a probability state specified by the context index allocated to the transform coefficient presence/absence flag, wherein the context index deriving means derives a context index to be allocated to a transform coefficient presence/absence flag that belongs to a high-frequency-side sub-region among the plurality of sub-regions, in accordance with the position of the transform coefficient presence/absence flag in the target frequency region.

A14.

An image coding device including:

transform coefficient generating means for generating transform coefficients by performing a frequency transform on a residual image between an image to be coded and a prediction image for each unit region; and the arithmetic coding device according to A13, wherein the arithmetic coding device is configured to arithmetically code various syntax elements representing transform coefficients generated by the transform coefficient generating means to generate coded data.

A15.

A data structure of coded data obtained by, for each individual transform coefficient obtained by performing a frequency transform on a target image for each unit region, arithmetic coding of various syntax elements representing the individual transform coefficient, including a restriction flag indicating whether or not to decode a high-frequency-side transform coefficient in each target frequency region corresponding to a unit region, wherein an arithmetic decoding device configured to decode the coded data does not decode the high-frequency-side transform coefficient in a case where the restriction flag indicates that the high-frequency-side transform coefficient is not decoded.

Invention (B) Described Herein

The invention described herein further provides at least the following.

B1.

An arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including:

sub-block dividing means for dividing a target frequency region corresponding to a unit region to be processed into sub-blocks having a predetermined size;

sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient;

dividing means for dividing the target frequency region into a plurality of sub-regions using at least either of each frequency component and each sub-block as a unit of division;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/absence flag that belongs to the target sub-block, in accordance with the position of the target sub-block in the target frequency region, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

B2.

The arithmetic decoding device according to B1, wherein the dividing means is configured to divide the target frequency region into at least a low-frequency-side sub-region and the high-frequency-side sub-region in accordance with a magnitude relationship between a sum of X coordinate and Y coordinate of a sub-block to which a transform coefficient presence/absence flag belongs and a threshold value THA determined in accordance with a size of the target frequency region, and the threshold value THA has a value greater than or equal to $sz/16$, where $sz$ represents the number of frequency components that lie along each side of the target frequency region.

B3.

An arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including:

sub-block dividing means for dividing a target frequency region corresponding to a unit region to be processed into sub-blocks having a predetermined size;

sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient;

dividing means for dividing the target frequency region into a plurality of sub-regions using at least either of each frequency component and each sub-block as a unit of division;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region or a low-frequency-side sub-region in the target frequency region, the context index deriving means derives a context index to be allocated to each transform coefficient presence/absence flag that belongs to the target sub-block, on the basis of the number of decoded non-zero transform coefficients included in a reference region that is either a high-frequency-side reference region or a low-frequency-side reference region selected in accordance with a position of a sub-block to which the transform coefficient presence/absence flag belongs in the target frequency region, the reference region being set near the position of the transform coefficient presence/absence flag in the target frequency region, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

B4.

An arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including:

sub-block dividing means for dividing a target frequency region corresponding to a unit region to be processed into sub-blocks having a predetermined size;

sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient;

dividing means for dividing the target frequency region into a plurality of sub-regions using at least either of each frequency component and each sub-block as a unit of division;

context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/ absence flag that belongs to the target sub-block, on the basis of the number of non-zero transform coefficients that are decoded non-zero transform coefficients included in a reference region set near the position of the transform coefficient presence/absence flag in the target frequency region, the number of non-zero transform coefficients excluding a non-zero transform coefficient decoded immediately before the transform coefficient presence/absence flag in processing order, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

B5.

The arithmetic decoding device according to B3 or B4, wherein the dividing means is configured to divide the target frequency region into at least three sub-regions, and the context index deriving means derives a context index by referring to N1 decoded non-zero transform coefficients (where N1 is a natural number) for a first sub-region and by referring to N2 decoded non-zero transform coefficients (where N2 is a natural number satisfying N2<N1) for a second sub-region, and derives a context index for a third sub-region in accordance with a position of a transform coefficient presence/absence flag.

B6.

The arithmetic decoding device according to B3, wherein the dividing means is configured to divide the target frequency region into at least a low-frequency-side sub-region and the high-frequency-side sub-region in accordance with a magnitude relationship between a sum of X coordinate and Y coordinate of a sub-block to which a transform coefficient presence/absence flag belongs and a threshold value THB determined in accordance with a size of the target frequency region, and the threshold value THB has a value less than or equal to sz/4, where the number of frequency components that lie along each side of the target frequency region is represented by sz.

B7.

The arithmetic decoding device according to B5, wherein the dividing means is configured to divide the target frequency region into the first sub-region and the second sub-region in accordance with a magnitude relationship between a sum of X coordinate and Y coordinate of a sub-block to which a transform coefficient presence/absence flag belongs and a threshold value THB determined in accordance with a size of the target frequency region, and is configured to divide the target frequency region into the second sub-region and the third sub-region in accordance with a magnitude relationship between the sum of the X coordinate and the Y coordinate of the sub-block to which the transform coefficient presence/absence flag belongs and a threshold value THC determined in accordance with the size of the target frequency region, and the threshold value THB has a value less than or equal to sz/4, and the threshold value THC has a value greater than or equal to (sz/4)+2, where sz represents the number of frequency components that lie along each side of the target frequency region.

B8.

An image decoding device including:

the arithmetic decoding device according to any one of B1 through B7;

inverse frequency transform means for performing an inverse frequency transform on a transform coefficient decoded by the arithmetic decoding device to generate a residual image; and decoded image generating means for generating a decoded image by adding together the residual image generated by the inverse frequency transform means and a prediction image predicted from a generated decoded image.

B9.

An arithmetic coding device for arithmetically coding, for each individual transform coefficient obtained for each frequency component by performing a frequency transform on a target image for each unit region, various syntax elements representing the individual transform coefficient to generate coded data, including:

sub-block dividing means for dividing a target frequency region corresponding to a unit region to be processed into sub-blocks having a predetermined size;

sub-block coefficient presence/absence flag coding means for coding, for each of the sub-blocks obtained by the sub-block dividing means through division, a sub-block coefficient presence/absence flag indicating whether or not the sub-block includes at least one non-zero transform coefficient;

dividing means for dividing the target frequency region into a plurality of sub-regions using at least either of each frequency component and each sub-block as a unit of division;

context index deriving means for deriving a context index to be allocated to each transform coefficient presence/absence flag that is a syntax element indicating whether or not a transform coefficient included in each sub-region is 0; and syntax coding means for arithmetically coding a transform coefficient presence/absence flag that belongs to each sub-region, on the basis of a probability state specified by the context index allocated to the transform coefficient presence/absence flag, wherein in a case where a sub-block coefficient presence/absence flag coded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/absence flag that belongs to the target sub-block, in accordance with the position of the target sub-block in the target frequency region, and in a case where a sub-block coefficient presence/absence flag coded for a target sub-block indicates that the target sub-block does not include a non-zero transform coefficient, a coding process is performed, given that a transform coefficient presence/absence flag for each of all transform coefficients belonging to the target sub-block indicates that the transform coefficient is 0.

B10.

An image coding device including:

transform coefficient generating means for generating transform coefficients by performing a frequency transform on a residual image between an image to be coded and a prediction image for each unit region; and the arithmetic coding device according to B9, wherein the arithmetic coding device is configured to arithmetically code various syntax elements representing transform coefficients generated by the transform coefficient generating means to generate coded data.

B11.

A data structure of coded data obtained by, for each individual transform coefficient obtained for each frequency component by performing a frequency transform on a target image for each unit region, arithmetic coding of various syntax elements representing the individual transform coefficient, including a sub-block coefficient presence/absence flag indicating, for each of sub-blocks having a predetermined size which are obtained by dividing a frequency region corresponding to the unit region, whether or not the sub-block includes at least one non-zero transform coefficient, wherein a decoding device configured to decode the coded data is configured to in a case where a sub-block coefficient presence/absence flag decoded for a target sub-block indicates that the target sub-block includes at least one non-zero transform coefficient and in a case where the target sub-block is included in a high-frequency-side sub-region in the target frequency region, derive a context index to be allocated to each transform coefficient presence/absence flag that belongs to the target sub-block, in accordance with the position of the target sub-block in the target frequency region, and arithmetically decode a transform coefficient presence/absence flag that belongs to each sub-region, on the basis of a probability state specified by the context index allocated to the transform coefficient presence/absence flag, and in a case where a sub-block coefficient presence/absence flag decoded for a target sub-block indicates that the target sub-block does not include a non-zero transform coefficient, perform a decoding process, given that a transform coefficient presence/absence flag for each of all transform coefficients belonging to the target sub-block indicates that the transform coefficient is 0.

Invention (C) Described Herein

The invention described herein further provides at least the following.

C1.

An arithmetic decoding device according to an aspect of the present invention is an arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including sub-block dividing means for dividing a target frequency region corresponding to a unit region to be processed into sub-blocks having a predetermined size; sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient; dividing means for dividing the target frequency region into a plurality of sub-regions using at least either of each frequency component and each sub-block as a unit of division; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/absence flag that belongs to the target sub-block, in accordance with the position of the target sub-block in the target frequency region, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

According to the arithmetic decoding device having the configuration described above, in a case where a target sub-block is included in a high-frequency-side sub-region in a target frequency region, the context index deriving means derives a context index to be allocated to each transform coefficient presence/absence flag that belongs to the target sub-block, in accordance with the position of the target sub-block in the target frequency region. Thus, it is possible to reduce the amount of processing for a context index derivation process on the high-frequency side, compared to an existing configuration, while achieving high coding efficiency.

According to the configuration described above, furthermore, in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0. Thus, the amount of processing for decoding transform coefficients can be reduced, compared to the configuration in which a sub-block coefficient presence/absence flag is not used.

C2.

Preferably, the dividing means is configured to divide the target frequency region into at least two, low-frequency-side and high-frequency-side sub-regions, and the context index deriving means derives a context index for at least one of sub-regions located on the low-frequency side by referring to a decoded non-zero transform coefficient, and derives, for a sub-region located on the high-frequency side, a value that is based on a position in the frequency region or a fixed predetermined value as a context index.

According to the configuration described above, a context index for at least one of sub-regions located on the low-frequency side is derived by referring to a decoded non-zero transform coefficient, and, for a sub-region located on the high-frequency side, a value that is based on a position in the frequency region or a fixed predetermined value is derived as a context index. Thus, it is possible to reduce the amount of processing while maintaining high coding efficiency.

C3.

Furthermore, preferably, in the arithmetic decoding device, the value of a context index used for a sub-region located on the high-frequency side, which is derived by the context index deriving means, is within the range of context indices used for sub-regions located on the low-frequency side.

According to the configuration described above, the value of a context index used for a sub-region located on the high-frequency side is within the range of context indices used for sub-regions located on the low-frequency side. Thus, the amount of processing for deriving a context index can be reduced.

C4.

Furthermore, preferably, in the arithmetic decoding device, the value of a context index for luma, which is a context index used for a sub-region located on the high-frequency side and which is derived by the context index deriving means, is a value outside the range of context indices used for sub-regions located on the low-frequency side, and the value of a context index for chroma, which is a context index used for a sub-region located on the high-frequency side and which is derived by the context index deriving means, is within the range of context indices used for sub-regions located on the low-frequency side.

According to the configuration described above, the value of a context index for chroma, which is a context index used for a sub-region located on the high-frequency side, is within the range of context indices used for sub-regions located on the low-frequency side. Thus, the amount of processing for deriving a context index for chroma can be reduced.

C5.

Furthermore, preferably, the dividing means is configured to divide the target frequency region into at least two, low-frequency-side and high-frequency-side sub-regions, and the context index deriving means derives a context index for at least one sub-region located on the low-frequency side by referring to N1 or more decoded non-zero transform coefficients (where N1 is a natural number), and derives a context index for a sub-region located on the high-frequency side by referring to N2 decoded non-zero transform coefficients (where N2 is a natural number satisfying N2<N1).

According to the configuration described above, the number of decoded non-zero transform coefficients to be referred to for a sub-region located on the high-frequency side is smaller than the number of decoded non-zero transform coefficients to be referred to for at least one sub-region located on the low-frequency side. Thus, it is possible to reduce the amount of processing for a context index derivation process on the high-frequency side.

C6.

Furthermore, preferably, the context index deriving means derives a context index for a sub-region located on the low-frequency side, by performing many-to-one transformation on the number of decoded non-zero transform coefficients, and derives the number of non-zero transform coefficients as a context index for a sub-region located on the high-frequency side.

According to the configuration described above, a context index for a sub-region located on the high-frequency side is derived without using a process for performing many-to-one transformation on the number of non-zero transform coefficients. Thus, the amount of processing can be reduced.

C7.

Furthermore, preferably, the dividing means is configured to divide the target frequency region into at least a low-frequency-side sub-region and the high-frequency-side sub-region in accordance with a magnitude relationship between a sum of X coordinate and Y coordinate of a transform coefficient presence/absence flag or a sum of X coordinate and Y coordinate of a sub-block to which the transform coefficient presence/absence flag belongs and a threshold value THA determined in accordance with a size obtained by the maximum value of the width and height of the target frequency region, and the threshold value THA has a value less than or equal to sz in the case of the sum of the X coordinate and the Y coordinate, and has a value less than or equal to a size of sz/sub-block in the case of the sum of the X coordinate and the Y coordinate of the sub-block, where sz represents the size of the target frequency region.

According to the configuration described above, the target frequency region is divided into at least a low-frequency-side sub-region and the high-frequency-side sub-region in accordance with a magnitude relationship between a sum of X coordinate and Y coordinate of a transform coefficient presence/absence flag or a sum of X coordinate and Y coordinate of a sub-block to which the transform coefficient presence/absence flag belongs and a threshold value THA determined in accordance with a size obtained by the maximum value of the width and height of the target frequency region, and the threshold value THA has a value less than or equal to sz in the case of the sum of the X coordinate and the Y coordinate, and has a value less than or equal to a size of sz/sub-block in the case of the sum of the X coordinate and the Y coordinate of the sub-block, where sz represents the size of the target frequency region. Thus, it is possible to reduce the amount of processing while maintaining high coding efficiency.

Furthermore, in the arithmetic decoding device, preferably, the dividing means is configured to divide the target frequency region into at least a low-frequency-side sub-region and the high-frequency-side sub-region in accordance with a magnitude relationship between a sum of X coordinate and Y coordinate of a sub-block to which a transform coefficient presence/absence flag belongs and a threshold value THA determined in accordance with a size of the target frequency region, and the threshold value THA has a value greater than or equal to sz/16 where the number of frequency components that lie along each side of the target frequency region is represented by sz.

According to the configuration described above, the target frequency region can be divided suitably for high coding efficiency and reduction in the amount of processing.

C8.

An arithmetic decoding device according to an aspect of the present invention is an arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including sub-block dividing means for dividing a target frequency region corresponding to a unit region to be processed into sub-blocks having a predetermined size; sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient; dividing means for dividing the target frequency region into a plurality of sub-regions using at least either of each frequency component and each sub-block as a unit of division; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region or a low-frequency-side sub-region in the target frequency region, the context index deriving means derives a context index to be allocated to each transform coefficient presence/absence flag that belongs to the target sub-block, on the basis of the number of decoded non-zero transform coefficients included in a reference region that is either a high-frequency-side reference region or a low-frequency-side reference region selected in accordance with a position of a sub-block to which the transform coefficient presence/absence flag belongs in the target frequency region, the reference region being set near the position of the transform coefficient presence/absence flag in the target frequency region, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

According to the arithmetic decoding device having the configuration described above, in a case where a target sub-block is included in a high-frequency-side sub-region or a low-frequency-side sub-region in the target frequency region, the context index deriving means derives a context index to be allocated to each transform coefficient presence/absence flag that belongs to the target sub-block, on the basis of the number of decoded non-zero transform coefficients included in a reference region set near the position of the transform coefficient presence/absence flag in the target frequency region. Thus, it is possible to reduce the amount of processing for a context index derivation process on the high-frequency side, compared to an existing configuration, while achieving high coding efficiency.

According to the configuration described above, furthermore, in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0. Thus, the amount of processing for decoding transform coefficients can be reduced, compared to the configuration in which a sub-block coefficient presence/absence flag is not used.

C9.

An arithmetic decoding device according to an aspect of the present invention is an arithmetic decoding device for decoding coded data for each individual transform coefficient obtained for each frequency component by performing a frequency transform on a target image for each unit region, the coded data being obtained by arithmetic coding of various syntax elements representing the individual transform coefficient, including sub-block dividing means for dividing a target frequency region corresponding to a unit region to be processed into sub-blocks having a predetermined size; sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient; dividing means for dividing the target frequency region into a plurality of sub-regions using at least either of each frequency component and each sub-block as a unit of division; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein in a case where a sub-block coefficient presence/absence flag decoded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/absence flag that belongs to the target sub-block, on the basis of the number of non-zero transform coefficients that are decoded non-zero transform coefficients included in a reference region set near the position of the transform coefficient presence/absence flag in the target frequency region, the number of non-zero transform coefficients excluding a non-zero transform coefficient decoded immediately before the transform coefficient presence/absence flag in processing order, and in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0.

According to the arithmetic decoding device having the configuration described above, in a case where a target sub-block is included in a high-frequency-side sub-region in a target frequency region, the context index deriving means derives a context index to be allocated to each transform coefficient presence/absence flag that belongs to the target sub-block, on the basis of the number of non-zero transform coefficients that are decoded non-zero transform coefficients included in a reference region set near the position of the transform coefficient presence/absence flag in the target frequency region, the number of non-zero transform coefficients excluding a non-zero transform coefficient decoded immediately before the transform coefficient presence/absence flag in processing order. Thus, it is possible to reduce the amount of processing for a context index derivation process on the high-frequency side, compared to an existing configuration, while achieving high coding efficiency.

According to the configuration described above, furthermore, in a case where a sub-block coefficient presence/absence flag decoded for a target sub-block indicates that the target sub-block does not include a non-zero transform coefficient, a decoding process is performed, given that a transform coefficient presence/absence flag for each of all transform coefficients belonging to the target sub-block indicates that the transform coefficient is 0. Thus, the amount of processing for decoding transform coefficients can be reduced, compared to the configuration in which a sub-block coefficient presence/absence flag is not used.

C10.

Furthermore, in the arithmetic decoding device, preferably, the dividing means is configured to divide the target frequency region into at least three sub-regions, and the context index deriving means derives a context index by referring to N1 decoded non-zero transform coefficients (where N1 is a natural number) for a first sub-region and by referring to N2 decoded non-zero transform coefficients (where N2 is a natural number satisfying N2<N1) for a second sub-region, and derives a context index for a third sub-region on the basis of the position of a transform coefficient presence/absence flag.

According to the configuration described above, a sub-region for which the number of decoded non-zero transform coefficients to be derived to in order to refer to a context index is set to be smaller, and a sub-region for which a context index is derived in accordance with the position of the transform coefficient presence/absence flag in the target frequency region are combined. Thus, it is possible to reduce the amount of processing particularly for a context index derivation process on the high-frequency side, compared to an existing configuration, while achieving high coding efficiency.

C11.

Furthermore, in the arithmetic decoding device, preferably, the dividing means is configured to divide the target frequency region into at least a low-frequency-side sub-region and the high-frequency-side sub-region in accordance with a magnitude relationship between a sum of X coordinate and Y coordinate of a sub-block to which a transform coefficient presence/absence flag belongs and a threshold value THB determined in accordance with a size of the target frequency region, and the threshold value THB has a value less than or equal to sz/4, where sz represents the number of frequency components that lie along each side of the target frequency region.

According to the configuration described above, the target frequency region can be divided suitably for high coding efficiency and reduction in the amount of processing.

C12.

Furthermore, in the arithmetic decoding device, preferably, the dividing means is configured to divide the target frequency region into the first sub-region and the second sub-region in accordance with a magnitude relationship between a sum of X coordinate and Y coordinate of a sub-block to which a transform coefficient presence/absence flag belongs and a threshold value THB determined in accordance with a size of the target frequency region, and is configured to divide the target frequency region into the second sub-region and the third sub-region in accordance with a magnitude relationship between the sum of the X coordinate and the Y coordinate of the sub-block to which the transform coefficient presence/absence flag belongs and a threshold value THC determined in accordance with the size of the target frequency region, and the threshold value THB has a value less than or equal to sz/4, and the threshold value THC has a value greater than or equal to (sz/4)+2, where sz represents the number of frequency components that lie along each side of the target frequency region.

According to the configuration described above, the target frequency region can be divided suitably for high coding efficiency and reduction in the amount of processing.

C13.

An image decoding device according to an aspect of the present invention is an image decoding device including the arithmetic decoding device described above; inverse frequency transform means for performing an inverse frequency transform on a transform coefficient decoded by the arithmetic decoding device to generate a residual image; and decoded image generating means for generating a decoded image by adding together the residual image generated by the inverse frequency transform means and a prediction image predicted from a generated decoded image.

According to the image decoding device, it is possible to decode coded data with high coding efficiency while reducing the amount of processing for syntax derivation.

C14.

An arithmetic coding device according to an aspect of the present invention is an arithmetic coding device for arithmetically coding, for each individual transform coefficient obtained for each frequency component by performing a frequency transform on a target image for each unit region, various syntax elements representing the individual transform coefficient to generate coded data, including sub-block dividing means for dividing a target frequency region corresponding to a unit region to be processed into sub-blocks having a predetermined size; sub-block coefficient presence/absence flag coding means for coding, for each of the sub-blocks obtained by the sub-block dividing means through division, a sub-block coefficient presence/absence flag indicating whether or not the sub-block includes at least one non-zero transform coefficient; dividing means for dividing the target frequency region into a plurality of sub-regions using at least either of each frequency component and each sub-block as a unit of division; context index deriving means for deriving a context index to be allocated to each transform coefficient presence/absence flag that is a syntax element indicating whether or not a transform coefficient included in each sub-region is 0; and syntax coding means for arithmetically coding a transform coefficient presence/absence flag that belongs to each sub-region, on the basis of a probability state specified by the context index allocated to the transform coefficient presence/absence flag, wherein in a case where a sub-block coefficient presence/absence flag coded for a target sub-block indicates that the target sub-block includes at least one non-zero transform coefficient and in a case where the target sub-block is included in a high-frequency-side sub-region in the target frequency region, the context index deriving means derives a context index to be allocated to each transform coefficient presence/absence flag that belongs to the target sub-block, in accordance with the position of the target sub-block in the target frequency region, and in a case where a sub-block coefficient presence/absence flag coded for a target sub-block indicates that the target sub-block does not include a non-zero transform coefficient, a coding process is performed, given that a transform coefficient presence/absence flag for each of all transform coefficients belonging to the target sub-block indicates that the transform coefficient is 0.

According to the arithmetic coding device having the configuration described above, in a case where a target sub-block is included in a high-frequency-side sub-region in a target frequency region, the context index deriving means derives a context index to be allocated to each transform coefficient presence/absence flag that belongs to the target sub-block, in accordance with the position of the target sub-block in the target frequency region. Thus, it is possible to reduce the amount of processing for a context index derivation process on the high-frequency side, compared to an existing configuration, while achieving high coding efficiency.

According to the configuration described above, furthermore, in a case where a sub-block coefficient presence/absence flag decoded for a target sub-block indicates that the target sub-block does not include a non-zero transform coefficient, a coding process is performed, given that a transform coefficient presence/absence flag for each of all transform coefficients belonging to the target sub-block indicates that the transform coefficient is 0. Thus, the amount of processing for coding transform coefficients can be reduced, compared to the configuration in which a sub-block coefficient presence/absence flag is not used.

C15.

An image coding device according to an aspect of the present invention is an image coding device including transform coefficient generating means for generating transform coefficients by performing a frequency transform on a residual image between an image to be coded and a prediction image for each unit region; and the arithmetic coding device described above, wherein the arithmetic coding device is configured to arithmetically code various syntax elements representing transform coefficients generated by the transform coefficient generating means to generate coded data.

According to the image coding device, it is possible to generate high-coding-efficiency coded data while reducing the amount of processing for syntax derivation.

C16.

Furthermore, a data structure of coded data according to an aspect of the present invention is a data structure of coded data obtained by, for each individual transform coefficient obtained for each frequency component by performing a frequency transform on a target image for each unit region, arithmetic coding of various syntax elements representing the individual transform coefficient, including a sub-block coefficient presence/absence flag indicating, for each of sub-blocks having a predetermined size which are obtained by dividing a frequency region corresponding to the unit region, whether or not the sub-block includes at least one non-zero transform coefficient, wherein a decoding device configured to decode the coded data is configured to, in a case where a sub-block coefficient presence/absence flag decoded for a target sub-block indicates that the target sub-block includes at least one non-zero transform coefficient and in a case where the target sub-block is included in a high-frequency-side sub-region in the target frequency region, derive a context index to be allocated to each transform coefficient presence/absence flag that belongs to the target sub-block, in accordance with the position of the target sub-block in the target frequency region, and arithmetically decode a transform coefficient presence/absence flag that belongs to each sub-region, on the basis of a probability state specified by the context index allocated to the transform coefficient presence/absence flag, and, in a case where a sub-block coefficient presence/absence flag decoded for a target sub-block indicates that the target sub-block does not include a non-zero transform coefficient, perform a decoding process, given that a transform coefficient presence/absence flag for each of all transform coefficients belonging to the target sub-block indicates that the transform coefficient is 0.

The coded data having the configuration described above includes a sub-block coefficient presence/absence flag indicating, for each of sub-blocks having a predetermined size which are obtained by dividing a frequency region corresponding to the unit region, whether or not the sub-block includes at least one non-zero transform coefficient, wherein a decoding device configured to decode the coded data is configured to, in a case where a sub-block coefficient presence/absence flag decoded for a target sub-block indicates that the target sub-block includes at least one non-zero transform coefficient and in a case where the target sub-block is included in a high-frequency-side sub-region in the target frequency region, derive a context index to be allocated to each transform coefficient presence/absence flag that belongs to the target sub-block, in accordance with the position of the target sub-block in the target frequency region, and arithmetically decode a transform coefficient presence/absence flag that belongs to each sub-region, on the basis of a probability state specified by the context index allocated to the transform coefficient presence/absence flag, and, in a case where a sub-block coefficient presence/absence flag decoded for a target sub-block indicates that the target sub-block does not include a non-zero transform coefficient, perform a decoding process, given that a transform coefficient presence/absence flag for each of all transform coefficients belonging to the target sub-block indicates that the transform coefficient is 0. Thus, it is possible to reduce the amount of processing for decoding while maintaining high coding efficiency.

C17.

Furthermore, an arithmetic decoding device according to an aspect of the present invention is an arithmetic decoding device for decoding coded data for each individual transform coefficient obtained for each frequency component by performing a frequency transform on a target image for each unit region, the coded data being obtained by arithmetic coding of various syntax elements representing the individual transform coefficient, the arithmetic decoding device being configured to decode a value of each transform coefficient by selectively using a regular mode in which M1 syntax elements (where M1 is a natural number) are decoded to decode a value of each transform coefficient or a simplified mode in which M2 syntax elements (where M2 is a natural number satisfying M2<M1) are decoded to decode a value of each transform coefficient.

According to the arithmetic decoding device, a number of syntax elements smaller than in regular mode are used in simplified mode. Thus, the throughput of the decoding process can be improved.

C18.

Preferably, the arithmetic decoding device includes syntax decoding means for decoding each syntax element by using arithmetic decoding out of arithmetic decoding that is based on a probability state specified by a context assigned to each syntax element and arithmetic decoding that is based on a fixed probability state without using a context, and the syntax decoding means decodes the M1 syntax elements using a context in the regular mode, and decodes the M2 syntax elements using a context in the simplified mode.

According to the arithmetic decoding device, in simplified mode, contexts are used for a number of syntax elements smaller than in regular mode. Thus, a process necessary for context derivation and context updating can be omitted, resulting in an improvement in the throughput of the decoding process.

C19.

Furthermore, preferably, the arithmetic decoding device includes sub-block dividing means for dividing a target frequency region corresponding to a unit region to be processed into sub-blocks having a predetermined size, sub-block coefficient presence/absence flag decoding means for decoding, for each of the sub-blocks obtained by the sub-block dividing means through division, a sub-block coefficient presence/absence flag indicating whether or not the sub-block includes at least one non-zero transform coefficient, the sub-block coefficient presence/absence flag and a transform coefficient presence/absence flag indicating whether or not a transform coefficient is 0 are decoded using a context in regular mode, and the sub-block coefficient presence/absence flag is decoded using a context and the transform coefficient presence/absence flag is decoded without using a context in simplified mode.

According to the arithmetic decoding device, a context is used for the sub-block coefficient presence/absence flag significant_coeffgroup_flag, which is a syntax element with low frequency of occurrence and for which it is important to keep the amount of coding low, regardless of regular mode or simplified mode. Thus, it is possible to improve throughput while keeping high coding efficiency.

C20.

Furthermore, preferably, in regular mode, the arithmetic decoding device decodes a transform coefficient presence/absence flag significant_coeff_flag indicating whether or not a transform coefficient is 0, a syntax element coeff_abs_greater1 flag indicating whether or not the absolute value of a transform coefficient is larger than 1, a syntax element coeff_abs_greater2_flag indicating whether or not the absolute value of a transform coefficient is larger than 2, a syntax element coeff_abs_minus3 indicating a value obtained by subtracting 3 from the absolute value of a transform coefficient, and a syntax element coeff_sign indicating the sign of a transform coefficient, and in simplified mode, the arithmetic decoding device decodes the transform coefficient presence/absence flag significant_coeff_flag, a syntax element coeff_abs_minus1absolute indicating a value obtained by subtracting 1 from the absolute value of a transform coefficient, and a syntax element coeff_sign indicating the sign of a transform coefficient.

According to the arithmetic decoding device, a number of syntax elements smaller than in regular mode are used in simplified mode. Thus, the throughput of the decoding process can be improved.

C21.

Furthermore, preferably, in regular mode, the arithmetic decoding device decodes the transform coefficient presence/absence flag significant_coeff_flag, the syntax element coeff_abs_greater1_flag indicating whether or not the absolute value of a transform coefficient is larger than 1, and the syntax element coeff_abs_greater2_flag indicating whether or not the absolute value of a transform coefficient is larger than 2 using a context, and in simplified mode, the arithmetic decoding device decodes the transform coefficient presence/absence flag significant_coeff_flag, the syntax element coeff_abs_minus1 indicating a value obtained by subtracting 1 from the absolute value of a transform coefficient, and the syntax element coeff_sign indicating the sign of a transform coefficient without using a context.

According to the arithmetic decoding device, in simplified mode, a syntax element constituting a value of a transform coefficient is decoded without using a context. Thus, the throughput of the decoding process can be improved.

C22.

Furthermore, preferably, in regular mode, the arithmetic decoding device decodes the transform coefficient presence/absence flag significant_coeff_flag, the syntax element coeff_abs_greater1 flag indicating whether or not the absolute value of a transform coefficient is larger than 1, and the syntax element coeff_abs_greater2_flag indicating whether or not the absolute value of a transform coefficient is larger than 2 using a context, and in simplified mode, the arithmetic decoding device decodes the syntax element coeff_abs_minus1 indicating a value obtained by subtracting 1 from the absolute value of a transform coefficient and the syntax element coeff_sign indicating the sign of a transform coefficient without using a context.

According to the arithmetic decoding device, in simplified mode, most of syntax elements constituting a value of a transform coefficient are decoded without using a context. Thus, the throughput of the decoding process can be improved.

C23.

Furthermore, preferably, in simplified mode, the arithmetic decoding device successively decodes the syntax element coeff_abs_minus1 indicating a value obtained by subtracting 1 from the absolute value of a transform coefficient and the syntax element coeff_sign indicating the sign of a transform coefficient.

According to the arithmetic decoding device, in simplified mode, syntax elements decoded without using a context are placed successively. Thus, the throughput of the decoding process can be improved.

C24.

Furthermore, preferably, in regular mode, the arithmetic decoding device decodes a transform coefficient presence/absence flag significant_coeff_flag indicating whether or not a transform coefficient is 0, a syntax element coeff_abs_greater1_flag indicating whether or not the absolute value of a transform coefficient is larger than 1, a syntax element coeff_abs_greater2_flag indicating whether or not the absolute value of a transform coefficient is larger than 2, a syntax element coeff_abs_minus3 indicating a value obtained by subtracting 3 from the absolute value of a transform coefficient, and a syntax element coeff_sign indicating the sign of a transform coefficient, and in simplified mode, the arithmetic decoding device decodes a syntax element coeff_abs_minus1 indicating a value obtained by subtracting 1 from the absolute value of a transform coefficient, the absolute value of a transform coefficient coeff_abs, and a syntax element coeff_sign indicating the sign of a transform coefficient.

According to the arithmetic decoding device, a number of syntax elements smaller than in regular mode are used in simplified mode. Thus, the throughput of the decoding process can be improved.

C25.

Furthermore, preferably, in regular mode, the arithmetic decoding device decodes the transform coefficient presence/absence flag significant_coeff_flag, the syntax element coeff_abs_greater1 flag indicating whether or not the absolute value of a transform coefficient is larger than 1, and the syntax element coeff_abs_greater2_flag indicating whether or not the absolute value of a transform coefficient is larger than 2 using a context, and in simplified mode, the arithmetic decoding device decodes the syntax element coeff_abs_minus1 indicating a value obtained by subtracting 1 from the absolute value of a transform coefficient and a syntax element coeff_sign indicating the sign of a transform coefficient without using a context.

According to the arithmetic decoding device, in simplified mode, most of syntax elements constituting a value of a transform coefficient are decoded without using a context. Thus, the throughput of the decoding process can be improved.

C26.

Furthermore, preferably, in accordance with magnitude comparison between the sum of the X coordinate and the Y coordinate of the last position of transform coefficients and a predetermined threshold value, the arithmetic decoding device selects the simplified mode if the sum of the X coordinate and the Y coordinate of the last position is larger, and otherwise selects the regular mode.

According to the arithmetic decoding device, simplified mode is used only in a case where it is determined that processing with high throughput is necessary. Thus, it is possible to improve the throughput of the decoding process while keeping high coding efficiency.

C27.

Furthermore, preferably, if the sum of the X coordinate and the Y coordinate of the last position is larger, the arithmetic decoding device reduces the number of syntax elements to be decoded using a context, when compared to otherwise.

According to the arithmetic decoding device, need for high-throughput processing can be properly determined. Thus, due to simplified mode, it is possible to improve the throughput of the decoding process while keeping high coding efficiency.

C28.

Furthermore, preferably, the arithmetic decoding device uses different values as a threshold value when frequency regions have an equal width and height and when frequency regions have different widths and heights.

According to the arithmetic decoding device, need for high-throughput processing can be properly determined also when frequency regions have different widths and heights. Thus, due to simplified mode, it is possible to improve the throughput of the decoding process while keeping high coding efficiency.

C29.

Furthermore, preferably, the arithmetic decoding device includes dividing means for dividing the target frequency region into a plurality of sub-regions using at least either of each frequency component and each sub-block as a unit of division, and context index deriving means for deriving a context index to be allocated to each transform coefficient presence/absence flag that is a syntax element indicating whether or not a transform coefficient included in each sub-region is 0, wherein in a case where the number of transform coefficient presence/absence flags for a given sub-block is greater than or equal to a predetermined value, a transform coefficient presence/absence flag for the sub-block to be processed subsequently to the given sub-block is decoded without a context.

According to the arithmetic decoding device, simplified mode is used only when it is determined that there is a need for high-throughput processing. Thus, it is possible to improve the throughput of the decoding process while keeping high coding efficiency.

C30.

Furthermore, an arithmetic coding device according to an aspect of the present invention is an arithmetic coding device for arithmetically coding, for each individual transform coefficient obtained for each frequency component by performing a frequency transform on a target image for each unit region, various syntax elements representing the individual transform coefficient to generate coded data, the arithmetic coding device being configured to code a value of each transform coefficient by selectively using a regular mode in which M1 syntax elements (where M1 is a natural number) are used to code a value of each transform coefficient or a simplified mode in which M2 syntax elements (where M2 is a natural number satisfying M2<M1) are used to code a value of each transform coefficient.

According to the arithmetic coding device, a number of syntax elements smaller than in regular mode are used in simplified mode. Thus, the throughput of the coding and decoding process can be improved.

C31.

An arithmetic decoding device according to an aspect of the present invention is an arithmetic decoding device for decoding coded data for each individual transform coefficient obtained by performing a frequency transform on a target image for each unit region, the coded data being obtained by arithmetic coding of various syntax elements representing the individual transform coefficient, including dividing means for dividing a target frequency region corresponding to a unit region to be processed into a plurality of sub-regions; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means derives a context index to be allocated to a transform coefficient presence/absence flag that belongs to each high-frequency-side sub-region among the plurality of sub-regions, in accordance with the position of the transform coefficient presence/absence flag in the target frequency region.

According to the arithmetic decoding device having the configuration described above, a context index to be allocated to a transform coefficient presence/absence flag that belongs to a high-frequency-side sub-region among the plurality of sub-regions in the target frequency region is derived in accordance with the position of the transform coefficient presence/absence flag in the target frequency region. Thus, it is possible to reduce the amount of processing for a context index derivation process on the high-frequency side, compared to an existing configuration, while achieving high coding efficiency.

C32.

Furthermore, an arithmetic decoding device according to an aspect of the present invention is an arithmetic decoding device for decoding coded data for each individual transform coefficient obtained by performing a frequency transform on a target image for each unit region, the coded data being obtained by arithmetic coding of various syntax elements representing the individual transform coefficient, including dividing means for dividing a target frequency region corresponding to a unit region to be processed into a plurality of sub-regions; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means is configured to derive a context index to be allocated to a transform coefficient presence/absence flag, on the basis of the number of decoded non-zero transform coefficients included in a reference region set near the position of the transform coefficient presence/absence flag in the target frequency region, and a reference region set in a high-frequency-side sub-region among the plurality of sub-regions is smaller than a reference region set in a low-frequency-side sub-region among the plurality of sub-regions.

According to the arithmetic decoding device having the configuration described above, a context index to be allocated to each transform coefficient presence/absence flag is derived on the basis of the number of decoded non-zero transform coefficients included in a reference region set near the position of the transform coefficient presence/absence flag in the target frequency region. In the plurality of sub-regions described above, a reference region set in a high-frequency-side sub-region is smaller than a reference region set in a low-frequency-side sub-region. Thus, it is possible to reduce the amount of processing for a context index derivation process on the high-frequency side, compared to an existing configuration in which a reference region set in a low-frequency-side sub-region and a reference region set in a high-frequency-side sub-region have the same size, and it is also possible to achieve high coding efficiency.

C33.

Furthermore, preferably, the context index deriving means is configured to derive a context index by adding together a predetermined starting point determined for each of the sub-regions and a variable determined for each of the sub-regions, and is configured to set starting points for a plurality of sub-regions for each of which the variable is derived using a different method to an equal value so that a common context is used for the plurality of sub-regions for each of which a context index is derived using a different method.

According to the arithmetic decoding device having the configuration described above, in a plurality of sub-regions for each of which a different derivation method is used, the starting points determined for respective sub-regions are made equal, thus making it possible to reduce the amount of processing, without increasing the number of contexts, while achieving high coding efficiency.

C34.

Furthermore, preferably, the dividing means is configured to classify the target frequency region into at least three sub-regions in accordance with a position of a transform coefficient presence/absence flag to be processed, and the context index deriving means derives a context index by referring to N1 decoded non-zero transform coefficients (where N1 is a natural number) for a first sub-region and by referring to N2 decoded non-zero transform coefficients (where N2 is a natural number satisfying N2<N1) for a second sub-region, and derives a context index for a third sub-region in accordance with a position of the transform coefficient presence/absence flag.

According to the arithmetic decoding device having the configuration described above, a sub-region for which the number of decoded non-zero transform coefficients to be derived to in order to refer to a context index is set to be smaller, and a sub-region for which a context index is derived on the basis of the position of the transform coefficient presence/absence flag in the target frequency region are combined. Thus, it is possible to reduce the amount of processing for a context index derivation process on the high-frequency side, compared to an existing configuration, while achieving high coding efficiency.

C35.

Furthermore, preferably, in the arithmetic decoding device, the context index deriving means derives a context index to be allocated to each transform coefficient presence/absence flag lying along a current scan sequence in a high-frequency-side sub-region among the plurality of sub-regions, further on the basis of the number of non-zero transform coefficients lying along a preceding scan sequence.

According to the configuration described above, the context index deriving means is configured to derive a context index to be allocated to each transform coefficient presence/absence flag lying along the current scan sequence in a high-frequency-side sub-region among the plurality of sub-regions described above, on the basis of the number of non-zero transform coefficients that lie along the preceding scan sequence and the number of decoded non-zero transform coefficients included in a reference region set near the position of the transform coefficient presence/absence flag in the target frequency region. A reference region set in a high-frequency-side sub-region among the plurality of sub-regions is smaller than a reference region set in a low-frequency-side sub-region among the plurality of sub-regions described above. Thus, it is possible to more effectively reduce the amount of processing for a context index derivation process on the high-frequency side, than an existing configuration, and it is also possible to achieve high coding efficiency.

C36.

Furthermore, an arithmetic decoding device according to an aspect of the present invention is an arithmetic decoding device for decoding coded data for each individual transform coefficient obtained by performing a frequency transform on a target image for each unit region, the coded data being obtained by arithmetic coding of various syntax elements representing the individual transform coefficient, including dividing means for dividing a target frequency region corresponding to a unit region to be processed into a plurality of sub-regions; context index deriving means for sequentially deriving, along each scan sequence, a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means derives a context index to be allocated to each transform coefficient presence/absence flag lying along a current scan sequence in a high-frequency-side sub-region among the plurality of sub-regions, on the basis of the number of non-zero transform coefficients lying along a preceding scan sequence.

According to the arithmetic decoding device having the configuration described above, a context index allocated to each transform coefficient presence/absence flag lying along the current scan sequence in a high-frequency-side sub-region among the plurality of sub-regions is derived on the basis of the number of non-zero transform coefficients lying along a preceding scan sequence. If the number of non-zero transform coefficients lying along a preceding scan sequence is counted once, the number of non-zero transform coefficients can be commonly used to derive a context index to be allocated to each transform coefficient presence/absence flag lying along the current scan sequence. Thus, it is possible to reduce the amount of processing for a context index derivation process on the high-frequency side, compared to an existing configuration which requires separate derivation of context indices for transform coefficient presence/absence flags at different positions, and it is also possible to achieve high coding efficiency.

C37.

Furthermore, an arithmetic decoding device according to an aspect of the present invention is an arithmetic decoding device for decoding coded data for each individual transform coefficient obtained by performing a frequency transform on a target image for each unit region, the coded data being obtained by arithmetic coding of various syntax elements representing the individual transform coefficient, including dividing means for dividing a target frequency region corresponding to a unit region to be processed into a plurality of sub-regions; context index deriving means for deriving a context index to be allocated to each transform coefficient presence/absence flag that is a syntax element indicating whether or not a transform coefficient included in each sub-region is 0; and syntax decoding means for arithmetically decoding a transform coefficient presence/absence flag that belongs to each sub-region, on the basis of a probability state specified by the context index allocated to the transform coefficient presence/absence flag, wherein the context index deriving means is configured to derive a context index to be allocated to a transform coefficient presence/absence flag, on the basis of the number of decoded non-zero transform coefficients included in a reference region set near the position of the transform coefficient presence/absence flag in the target frequency region, and the number of decoded transform coefficients included in the reference region is less than or equal to 4.

According to the arithmetic decoding device having the configuration described above, a context index to be allocated to each transform coefficient presence/absence flag is derived on the basis of the number of decoded non-zero transform coefficients included in a reference region set near the position of the transform coefficient presence/absence flag in the target frequency region. The number of decoded transform coefficients included in the reference region is less than or equal to 4. Thus, it is only required to refer to a number of decoded transform coefficients smaller than that in an existing configuration. According to the configuration described above, therefore, it is possible to reduce the amount of processing for a context index derivation process on the high-frequency side, compared to an existing configuration, and it is also possible to achieve high coding efficiency.

C38.

Furthermore, an arithmetic decoding device according to an aspect of the present invention is an arithmetic decoding device for decoding coded data for each individual transform coefficient obtained by performing a frequency transform on a target image for each unit region, the coded data being obtained by arithmetic coding of various syntax elements representing the individual transform coefficient, including dividing means for dividing a target frequency region corresponding to a unit region to be processed into a plurality of sub-regions; context index allocating means for allocating a different context index to each sub-region; and syntax decoding means for arithmetically decoding a transform coefficient presence/absence flag that is a syntax element indicating whether or not a transform coefficient included in each sub-region is 0, on the basis of a probability state specified by a context index allocated to a sub-region to which the transform coefficient presence/absence flag belongs, wherein a low-frequency-side sub-region among the plurality of sub-regions is smaller than a high-frequency-side sub-region among the plurality of sub-regions.

According to the arithmetic decoding device having the configuration described above, in the plurality of sub-regions above, a low-frequency-side sub-region is smaller than a high-frequency-side sub-region. Thus, finer context indices can be allocated to low-frequency-side regions. According to the configuration described above, therefore, it is possible to efficiently decode a syntax element for the low-frequency side, resulting in an increase in coding efficiency.

C39.

Furthermore, preferably, the dividing means is configured to divide the target frequency region into a plurality of sub-regions in accordance with SUM representing a sum of X coordinate and Y coordinate of a transform coefficient presence/absence flag, the dividing means divides the target frequency region into at least a low-frequency-side sub-region and the high-frequency-side sub-region in accordance with a magnitude relationship between the SUM and a first threshold value TH2 determined in accordance with a size sz of the target frequency region, and the first threshold value TH2 is greater than or equal to sz.

According to the arithmetic decoding device having the configuration described above, also in a case where context index to be allocated to a transform coefficient presence/absence flag in a target frequency region is derived on the basis of the position of the transform coefficient presence/absence flag in the target frequency region, it is possible to reduce the amount of processing for a context index derivation process on the high-frequency side, compared to an existing configuration, while achieving high coding efficiency.

C40.

Furthermore, preferably, the dividing means is configured to divide the target frequency region into a plurality of sub-regions in accordance with SUM representing a sum of X coordinate and Y coordinate of a transform coefficient presence/absence flag, the dividing means divides the target frequency region into at least the low-frequency-side sub-region and the high-frequency-side sub-region in accordance with a magnitude relationship between the SUM and a first threshold value TH2 determined in accordance with a size sz of the target frequency region, and the first threshold value TH2 is less than or equal to sz−2.

According to the arithmetic decoding device having the configuration described above, also in a case where a sub-region for which the number of decoded non-zero transform coefficients to be derived to in order to refer to a context index is set to be smaller, it is possible to reduce the amount of processing for a context index derivation process on the high-frequency side, compared to an existing configuration, while achieving high coding efficiency.

C41.

Furthermore, preferably, the dividing means is configured to divide the target frequency region into a plurality of sub-regions in accordance with SUM representing a sum of X coordinate and Y coordinate of a transform coefficient presence/absence flag, the dividing means divides the target frequency region into the first sub-region and the second sub-region in accordance with a magnitude relationship between the SUM and a first threshold value TH2 determined in accordance with a size sz of the target frequency region, and divides the target frequency region into the second sub-region and the third sub-region in accordance with a magnitude relationship between the SUM and a second threshold value TH3 determined in accordance with the size sz of the target frequency region, and the first threshold value TH2 is less than or equal to sz−2 and the second threshold value TH3 is greater than or equal to sz.

According to the arithmetic decoding device having the configuration described above, also in a case where a sub-region for which the number of decoded non-zero transform coefficients to be derived to in order to refer to a context index is set to be smaller, and a sub-region for which a context index is derived in accordance with the position of the transform coefficient presence/absence flag in the target frequency region are combined, it is possible to reduce the amount of processing for a context index derivation process on the high-frequency side, compared to an existing configuration, while achieving high coding efficiency.

C42.

Furthermore, an image decoding device according to an aspect of the present invention is an image decoding device including the arithmetic decoding device described above; inverse frequency transform means for performing an inverse frequency transform on a transform coefficient decoded by the arithmetic decoding device to generate a residual image; and decoded image generating means for generating a decoded image by adding together the residual image generated by the inverse frequency transform means and a prediction image predicted from a generated decoded image.

According to the image decoding device, it is possible to decode coded data with high coding efficiency while reducing the amount of processing for syntax derivation.

C43.

Furthermore, an arithmetic coding device according to an aspect of the present invention is an arithmetic coding device for arithmetically coding, for each individual transform coefficient obtained by performing a frequency transform on a target image for each unit region, various syntax elements representing the individual transform coefficient to generate coded data, including dividing means for dividing a target frequency region corresponding to a unit region to be processed into a plurality of sub-regions; context index deriving means for deriving a context index to be allocated to each transform coefficient presence/absence flag that is a syntax element indicating whether or not a transform coefficient included in each sub-region is 0; and syntax coding means for arithmetically coding a transform coefficient presence/absence flag that belongs to each sub-region, on the basis of a probability state specified by the context index allocated to the transform coefficient presence/absence flag, wherein the context index deriving means derives a context index to be allocated to a transform coefficient presence/absence flag that belongs to a high-frequency-side sub-region among the plurality of sub-regions, in accordance with the position of the transform coefficient presence/absence flag in the target frequency region.

According to the arithmetic coding device having the configuration described above, a context index to be allocated to a transform coefficient presence/absence flag that belongs to a high-frequency-side sub-region among the plurality of sub-regions is derived in accordance with the position of the transform coefficient presence/absence flag in the target frequency region. Thus, it is possible to reduce the amount of processing for a context index derivation process on the high-frequency side, compared to an existing configuration.

C44.

Furthermore, an image coding device according to an aspect of the present invention is an image coding device including transform coefficient generating means for generating transform coefficients by performing a frequency transform on a residual image between an image to be coded and a prediction image for each unit region; and the arithmetic coding device described above, wherein the arithmetic coding device is configured to arithmetically code various syntax elements representing transform coefficients generated by the transform coefficient generating means to generate coded data.

According to the image decoding device, it is possible to generate coded data with high coding efficiency while reducing the amount of processing for syntax derivation.

C45.

Furthermore, a data structure of coded data according to an aspect of the present invention is a data structure of coded data obtained by, for each individual transform coefficient obtained by performing a frequency transform on a target image for each unit region, arithmetic coding of various syntax elements representing the individual transform coefficient, including a restriction flag indicating whether or not to decode a high-frequency-side transform coefficient in each target frequency region corresponding to a unit region, wherein an arithmetic decoding device configured to decode the coded data does not decode the high-frequency-side transform coefficient in a case where the restriction flag indicates that the high-frequency-side transform coefficient is not decoded.

The coded data having the configuration described above includes a restriction flag indicating whether or not to decode a high-frequency-side transform coefficient in each target frequency region corresponding to a unit region. If the restriction flag indicates that a high-frequency-side transform coefficient is not decoded, an arithmetic decoding device configured to decode the coded data can omit the decoding process for the high-frequency-side transform coefficient. Accordingly, the amount of processing for decoding transform coefficients can be reduced.

The present invention is not limited to the embodiments described above, and a variety of modifications can be made within a scope defined by the CLAIMS. Embodiments achievable by appropriately combining technical means disclosed in different embodiments also fall within the technical scope of the present invention.

INDUSTRIAL APPLICABILITY

The present invention can be suitable for use in arithmetic decoding devices for decoding coded data that has been arithmetically encoded, and arithmetic coding devices for generating coded data that has been arithmetically encoded.

REFERENCE SIGNS LIST 1 video decoding device (image decoding device)
11 variable-length code decoder
111 quantized residual information decoder (arithmetic decoding device)
120 transform coefficient decoding unit
124 coefficient presence/absence flag decoding unit
124a frequency classification unit (dividing means, context index deriving means)
124b low-frequency position context derivation unit (context index deriving means)
124c, 124g neighbouring reference context derivation unit (context index deriving means)
124d high-frequency position context derivation unit (context index deriving means)
X1 sub-block coefficient presence/absence flag decoding unit (sub-block coefficient presence/absence flag decoding means)
130 arithmetic code decoding unit
131 context recording/updating unit
132 bit decoding unit (syntax decoding means)
2 video coding device (image coding device)
27 variable-length code encoder
271 quantized residual information coder (arithmetic coding device)
220 transform coefficient coding unit
224 coefficient presence/absence flag coding unit
224a frequency classification unit (dividing means, syntax coding means)
224b low-frequency position context derivation unit
224c neighbouring reference context derivation unit
224d high-frequency position context derivation unit (context index deriving means)
X2 sub-block coefficient presence/absence flag coding unit (sub-block coefficient presence/absence flag coding means)
230 arithmetic code encoding unit
231 context recording/updating unit
232 bit coding unit (syntax coding means)

The invention claimed is:

1. A decoding device for decoding coded data, the decoding device comprising:
   a context derivation circuitry that derives: (i) a first context index for a sub-block coefficient presence/absence flag indicating whether or not at least one of transform coefficients of a sub-block at location (xS, yS) has a non-zero value and (ii) a second context index for a coefficient presence/absence flag indicating whether a corresponding transform coefficient is equal to non-zero; and
   a coefficient presence/absence flag decoding circuitry decodes the coefficient presence/absence flag, if a value of the sub-block coefficient presence/absence flag is equal to one, wherein
   if a size of a transform block is a 16×16 size or a 32×32 size, the context derivation circuitry sets the location (xS, yS) of the sub-block by using a current location (xC, yC) as xS=xC>>2 and yS=yC>>2, and
   if a value of the coefficient presence/absence flag is equal to one, the coefficient presence/absence flag decoding circuitry performs decoding function (i) or (ii):
      (i) decoding a coefficient absolute level greater one flag indicating whether an absolute value of the transform coefficient is larger than one, and decoding a coefficient absolute level remaining parameter indicating a remaining absolute value of the transform coefficient, and
      (ii) not decoding the coefficient absolute level greater one flag and decoding the coefficient absolute level remaining parameter.

2. An encoding device for encoding data, the encoding device comprising:
   a context derivation circuitry that derives: (i) a first context index for a sub-block coefficient presence/absence flag indicating whether or not at least one of transform coefficients of a sub-block at location (xS, yS) has a non-zero value, and (ii) a second context index for a coefficient presence/absence flag indicating whether a corresponding transform coefficient is equal to non-zero; and
   a coefficient presence/absence flag encoding circuitry that encodes the coefficient presence/absence flag, if a value of the sub-block coefficient presence/absence flag is equal to one, wherein
   if a size of a transform block is a 16×16 size or a 32×32 size, the context derivation circuitry sets the location (xS, yS) of the sub-block by using a current location (xC, yC) as xS=xC>>2 and yS=yC>>2, and
   if a value of the coefficient presence/absence flag is equal to one, the coefficient presence/absence flag encoding circuitry performs encoding function (i) or (ii):
      (i) encoding a coefficient absolute level greater one flag indicating whether an absolute value of the transform coefficient is larger than one, and encoding a coefficient absolute level remaining parameter indicating a remaining absolute value of the transform coefficient, and (ii) not encoding the coefficient absolute level greater one flag and encoding the coefficient absolute level remaining parameter.

3. A decoding method for decoding coded data, the decoding method including:

decoding: (i) a first context index for a sub-block coefficient presence/absence flag indicating whether or not at least one of transform coefficients of a sub-block at location (xS, yS) has a non-zero value, and (ii) a second context index for a coefficient presence/absence flag indicating whether a corresponding transform coefficient is equal to non-zero, decoding the coefficient presence/absence flag, if a value of the sub-block coefficient presence/absence flag is equal to one; and setting the location (xS, yS) of the sub-block by using a current location (xC, yC) as xS xC>>2 and yS=yC>>2, if a size of a transform block is a 16×16 size or a 32×32 size, wherein if a value of the coefficient presence/absence flag is equal to one, performing decoding function (i) or (ii):

(i) decoding a coefficient absolute level greater one flag indicating whether an absolute value of the transform coefficient is larger than one, and decoding a coefficient absolute level remaining parameter indicating a remaining absolute value of the transform coefficient, and (ii) not decoding the coefficient absolute level greater one flag and decoding the coefficient absolute level remaining parameter.

* * * * *